(12) United States Patent
Redlich et al.

(10) Patent No.: US 11,310,274 B2
(45) Date of Patent: *Apr. 19, 2022

(54) INFORMATION INFRASTRUCTURE MANAGEMENT TOOLS WITH EXTRACTOR, SECURE STORAGE, CONTENT ANALYSIS AND CLASSIFICATION AND METHOD THEREFOR

(71) Applicant: Digital Doors, Inc., Miami Beach, FL (US)

(72) Inventors: Ron M. Redlich, Miami Beach, FL (US); Martin A. Nemzow, Miami Beach, FL (US)

(*) Notice: Subject to any disclaimer, the term of this patent is extended or adjusted under 35 U.S.C. 154(b) by 1089 days.

This patent is subject to a terminal disclaimer.

(21) Appl. No.: 14/597,357

(22) Filed: Jan. 15, 2015

(65) Prior Publication Data

US 2015/0199410 A1 Jul. 16, 2015

Related U.S. Application Data

(62) Division of application No. 11/746,440, filed on May 9, 2007, now Pat. No. 9,015,301.

(Continued)

(51) Int. Cl.
| | |
|---|---|
| H04L 29/06 | (2006.01) |
| H04L 29/08 | (2006.01) |
| G06F 16/23 | (2019.01) |
| G06F 16/26 | (2019.01) |
| G06F 16/28 | (2019.01) |
| G06F 16/2455 | (2019.01) |
| G06F 16/2458 | (2019.01) |
| G06Q 10/10 | (2012.01) |

(Continued)

(52) U.S. Cl.
CPC ............. *H04L 63/20* (2013.01); *G06F 16/23* (2019.01); *G06F 16/2455* (2019.01); *G06F 16/2465* (2019.01); *G06F 16/26* (2019.01); *G06F 16/282* (2019.01); *G06F 16/93* (2019.01); *G06F 21/6218* (2013.01); *G06Q 10/10* (2013.01); *H04L 63/0227* (2013.01); *H04L 63/105* (2013.01); *H04L 67/1097* (2013.01)

(58) Field of Classification Search
CPC ... H04L 63/20; H04L 63/0227; H04L 63/105; H04L 67/1097; G06F 17/30345; G06F 17/30477; G06F 17/30539; G06F 17/30572; G06F 17/30589; G06F 21/6218; G06Q 10/10
USPC .......................................................... 709/223
See application file for complete search history.

(56) References Cited

U.S. PATENT DOCUMENTS

| | | | |
|---|---|---|---|
| 7,308,268 B2 * | 12/2007 | Barbosa da Torre | ........................ H04W 16/18 455/445 |
| 2005/0132070 A1 * | 6/2005 | Redlich | ............... G06F 21/6209 709/228 |
| 2007/0195814 A1 * | 8/2007 | Barrie | ................. H04L 63/0236 370/463 |

* cited by examiner

*Primary Examiner* — Sm A Rahman
(74) *Attorney, Agent, or Firm* — Robert C. Kain, Jr.; Scott D. Smiley; Scott M. Garrett

(57) ABSTRACT

Method of creating data stores by either processing data throughput or a method for processing data throughput or data mining in a distributed computing system works. The system and method operates on sensitive content (e.g., trade secrets) or select content (e.g., critical content) and applies configurable filters (expanding, contracting, hierarchical/orthogonal classifier filters) to separate and store sensitive/select data in designated, distributed data stores or to supple- (Continued)

ment data collections. Sensitive/select data stores may have security clearance requirements.

6 Claims, 59 Drawing Sheets

Related U.S. Application Data

(60) Provisional application No. 60/883,522, filed on Jan. 5, 2007.

(51) Int. Cl.
*G06F 16/93* (2019.01)
*H04L 67/1097* (2022.01)
*G06F 21/62* (2013.01)

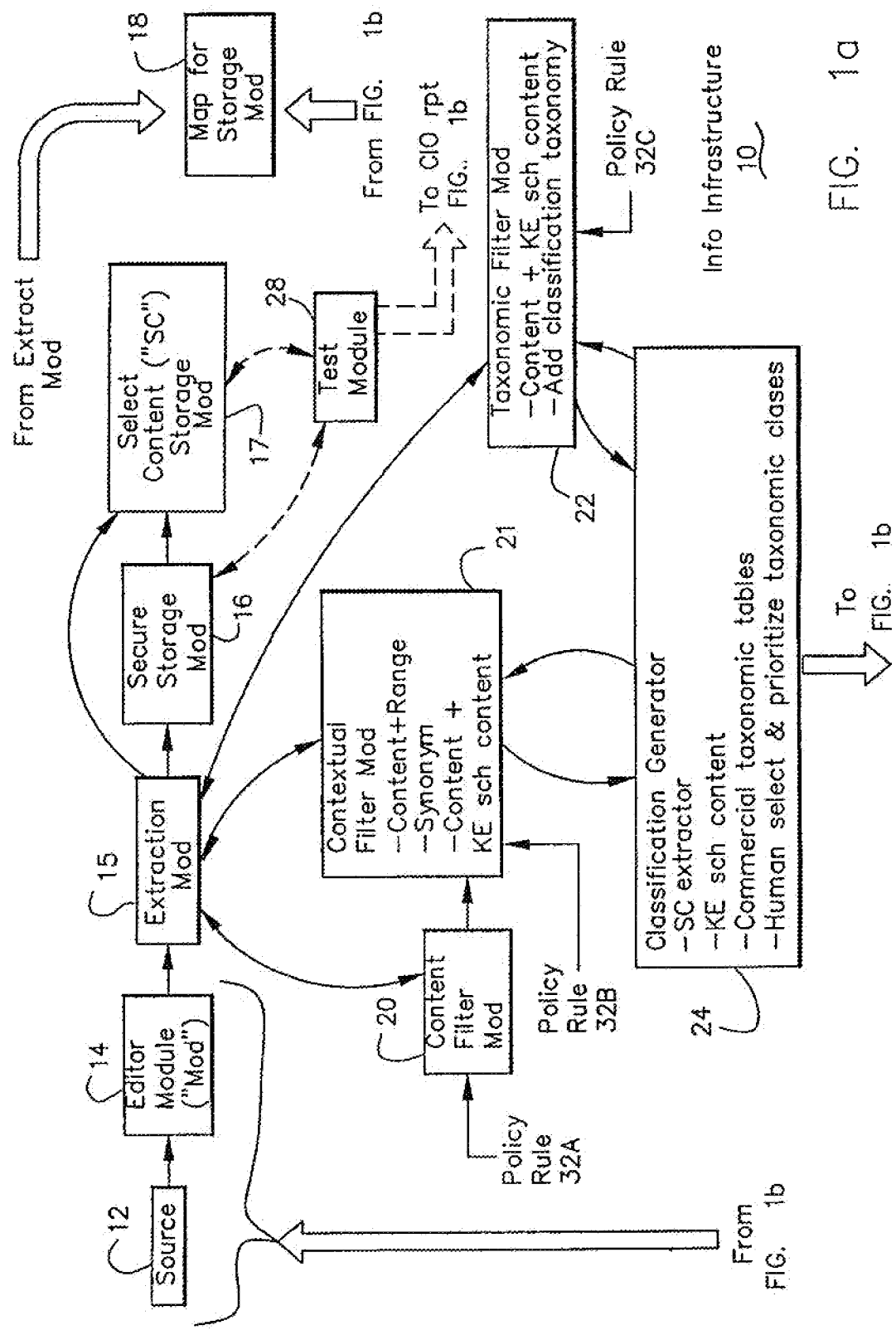

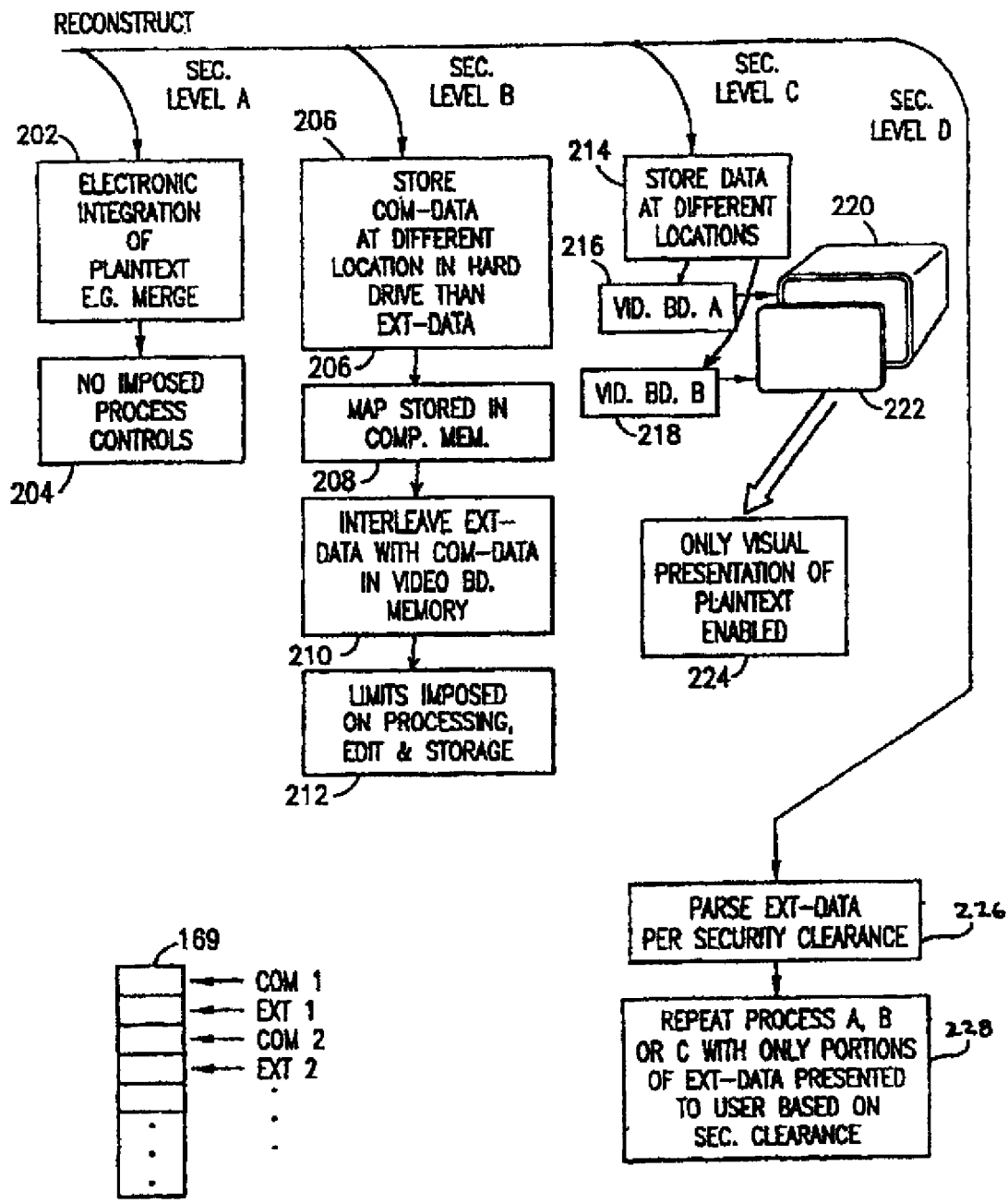

FIG. 23

Table 1. Categorical Identifiers For Personal Identity name
address(es) and variants
telephone number(s) and variants
username
biometrics
gene typing
photograph
date of birth
age
marital status
gender
sexual orientation
sexual proclivities
disabilities
tattoos
scars
visible or functional injuries
age/age range
hair color
eye color
race profile
educational history
employment history
home price
ethnicity
personal interests
personal descriptive information (e.g., SWHM 38, Professional)
physical stigmata
skill set
credit history
credit reports (formal NCR, etc.)
social security number
patient ID or other location- or process-specific user assignment
insurance number
credit card numbers
birthplace
heritage
health history
political party
political beliefs
association(s)
frequent flyer/buyer club info
remittance advice
investigation evidence
court evidence
EDI/EDIFACT records
applications
personal web sites
Chain of trust forms
Chain of custody forms
skill set
religion
personal interests
travel log
number of siblings
business partners
business name
profession
account numbers (banking, services, suppliers)
service providers (physicians, insurers, hospitals, clinics, etc.)
X-rays
surveillance
dental charts
medical records
account balances
account transfer or transaction amounts
income range
neighborhood/city/region/country
license (driver, occupational, professional)
vehicle registration (license, tag, plate, etc.)
vehicle identification
vehicle make, type, model, color, year
date of life events
incident reports (legal, criminal, health services, news)
accident reports (auto, OSHA, EPA, EEOC, etc.)
criminal convictions
court records
abuse records
divorce proceedings
bankruptcy records
organization registrations
Corporation officers and registrations
tax records (chattel, land, local, state, Federal, and special use taxes)
property ownership
permit applications
donor lists
news reports
family history
family relationships
family health history
legal documents
consent forms
newsgroup postings FIG.24    Table 2: Ranked Identity Category name
address
telephone
username
biometrics
gene typing
photograph
date of birth
age
marital status
sex
sexual orientation
sexual proclivities disabilities
tattoos
scars
injuries
age range
hair color
eye color
race profile
education
employment
personal interests FIG.25    Table 3: Categorical Identifiers for Manufacturing Business Manufacturing
    product brand names
    product generic name
    drawings
    tools (brand names and generic names)
        hand tools
        software
        machines
    software, computer programs, etc.
    Research and Development
        competitors products, competitor names, patent numbers, patent titles,
        project names, project personnel
Sales
    personnel
    competitors
    sales data
        quantity
        geographic distribution
    customers
        names, addresses, contacts
    sales projections
Financial
    chart of accounts
    ledgers
    financial statements
    tax returns
Human Resources
    see categorical identifiers for personal identity TO FIG.31b (CONT.)

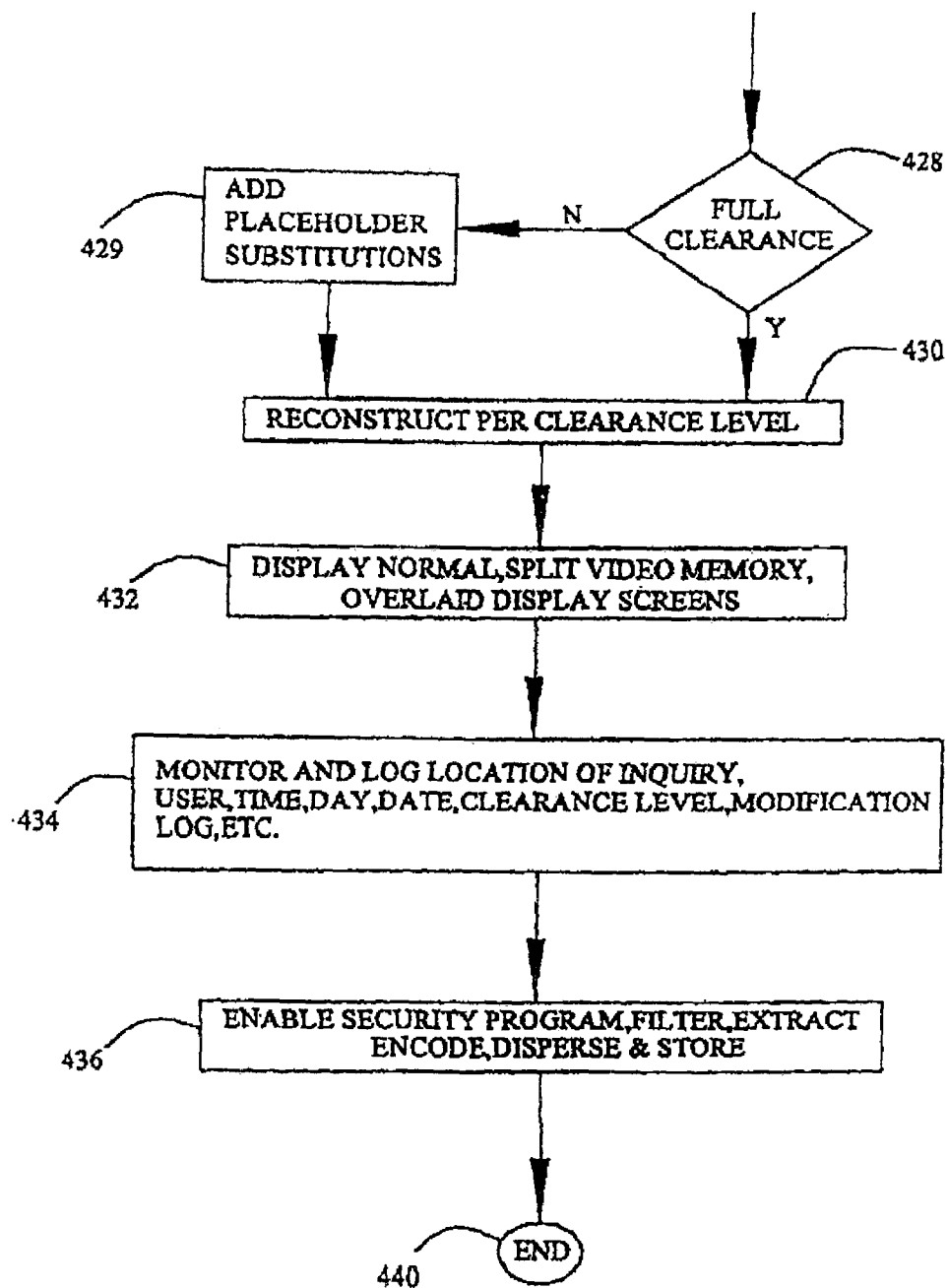

FIG.34

Standard Automatic Defenses Matrix Table

| Mode | Normal | Threat | Attack |
|---|---|---|---|
| Encryption | Targeted Encryption | Full Encryption | Multi Type Encryption |
| Extraction | Plain-text Extraction | Extraction of Encrypted Data | Extraction of Multi Type Encryption |
| Distributed Dispersion | Single Storage Location | Several Storage Locations | Many Storage Locations |
| Display | Single display | Color/Dither Protection | Multiple Displays |

FIG.35

Optional Automatic Defenses Matrix Table

| | Normal | Threat | Attack |
|---|---|---|---|
| Mode | Normal | Threat | Attack |
| Substitution of Code Words | None | Partial | Many |
| Substitution of Misinformation | None | Partial | Many |
| Controlled Release-Storage | Full | Partial | Conditional |
| Storage Locations | 2 | 4 | 10 or more |
| Time for release | Anytime | Working Hours | Conditional |
| Authorized Users | Many | Partial | Conditional |
| What to Release | All | Partial | Conditional |
| Secret Sharing | None | Two Users | As Configured |

FIG.36

Security Meter Module Table

| | Normal Mode | Threat Mode | Attack Mode |
|---|---|---|---|
| ENCRYPTION | Targeted encryption | Full encryption | Multi layer encryption |
| | (Secret sharing) | (Secret sharing) | (Secret sharing) |
| EXTRACTION | Plain-text extraction | Extraction of encrypted Data | Extraction of multi encryption |
| Distributed Storage | 1 critical storage | few critical storage | many critical storage |
| Controlled Release-Storage | Storage # ID | | |
| | Time for release | | |
| | Authorized Users | | |
| | What to release | | |
| | Special conditions | 2 users online | 3 or more users |
| Display | single display | single display | multiple displays |
| Substitution of code words | No | No | No |

FIG.37

Normal Work Mode Table

| | Extraction Level 1 | Level 2 | Level 3 | Level 4 | Storage Web | Offline | Remote | Removable | Local |
|---|---|---|---|---|---|---|---|---|---|
| social security | X | | | | | | X | | |
| credit card | X | | | | | | | | |
| last name | 'X | | | | | | X | | |
| number | X | | | | | | X | | |
| telephone | | X | | | | | | X | |
| name | | X | | | | | | X | |
| URL | | X | | | | | | X | |
| e-mail | | X | | | | | | X | |
| uppercase | | X | | | | | | X | |
| initial cap | | X | | | | | | X | |
| currency | | | X | | | | | | X |
| postal code | | | X | | | | | | X |
| address | | | X | | | | | | X |
| location | | | X | | | | | | X |
| date | | | X | | | | | | X |

FIG.38

Threat Mode Table

| | Extraction Level 1 | Level 2 | Level 3 | Level 4 | Storage Web | Offline | Remote | Removable | Local |
|---|---|---|---|---|---|---|---|---|---|
| social security | X | | | | | | | X | |
| credit card | X | | | | | | | X | |
| last name | X | | | | | | | X | |
| number | X | | | | | | | X | |
| telephone | | X | | | | | | X | |
| name | | X | | | | | | X | |
| URL | | X | | | | | | X | |
| e-mail | | X | | | | | | X | |
| uppercase | | X | | | | | | X | |
| initial capital | | | | | | | | X | |
| currency | | | X | | | | | | X |
| postal code | | | X | | | | | | X |
| address | | | X | | | | | | X |
| location | | | X | | | | | | X |
| date | | | | | | | | | X |

FIG.39

Attack Mode Table

| | Extraction Level 1 | Level 2 | Level 3 | Level 4 | Storage Web | Offline | Remote | Removable |
|---|---|---|---|---|---|---|---|---|
| social security | X | | | | | X | | |
| credit card | X | | | | | X | | |
| last name | X | | | | | X | | |
| number | X | | | | | X | | |
| telephone | X | | | | | | X | |
| name | X | X | | | | | X | |
| URL | X | X | | | | | X | |
| e-mail | X | X | | | | | X | |
| uppercase | X | X | | | | | X | |
| initial capital | X | X | | | | | X | |
| currency | | | | | | | X | |
| postal code | | | | | | | X | |
| address | | | | | | | X | |
| location | | | | | | | X | |
| date | | | | | | | X | |

FIG. D-21 omitted
FIG. D-22 omitted
FIG. D-23 omitted

INFORMATION INFRASTRUCTURE MANAGEMENT TOOLS WITH EXTRACTOR, SECURE STORAGE, CONTENT ANALYSIS AND CLASSIFICATION AND METHOD THEREFOR

This is a divisional patent application based upon and claiming priority of patent application Ser. No. 11/746,440, filed May 9, 2007, now pending, and is based upon provisional patent application Ser. No. 60/883,522 filed Jan. 5, 2007. The present invention relates to identifying sensitive-secret or select data content, extracting key content, and applying data processing actions based upon such content, including storage of sensitive/select content in distributed data stores.

A.0 INTRODUCTION

The present invention relates to information management data processing modules and computer software system and method enabling protection of confidential information, identification of such information, identification of select content, classification for the same, and security system for the same. Businesses and enterprises use information in many different types of forms and format. Structured information is typically data found in database or spreadsheet formats or stored in self-defining formats wherein the information is managed by a software application. A further example of self-defining format is XML documents in format schematics. Some information is "semi-structured" wherein the information has certain defined fields such as email and the structured data fields from, to, cc, bcc and subject, but the body of the email message is unstructured. Unstructured information includes documents generated by end users with the assistance of applications program such as Microsoft Office, word processing programs, image processing programs (Adobe), files downloaded from the Internet, audio and video files etc. Enterprises focus their attention on mission critical applications and data relative thereto which is often located in structured databases or other structured data formats. However, a large majority of information is contained in unstructured or semi-structured formats. There are significant risks involved in handling and locating confidential information in these information files as well as identifying and handling intellectual property data in those files.

The content of these information files are important from a legal standpoint, a data security standpoint, and a government regulation or compliance standpoint. Although the content of the information files may be searched and indexed, the resulting information must then be classified. The enterprise must establish policies which dictate how the information files are handled in light of legal, security and compliance risk factors. Further, enterprise policies regarding information or document retention and immutability (the degree and extent that a particular document or information file may be changed) must be established and enforced.

Simply indexing the content of an information file is not adequate. Semantic analysis, key word tagging and classification categorization (taxonomic analysis) should be conducted. Information tools and computer programs and methods should enable the users (an enterprise) to analyze, categorize and actively manage unstructured information in the enterprise. Theft or accidental loss of customers' information or employees' private information is no longer acceptable. Laws mandate disclosure of such data loses.

Further, the public is acutely aware of identity theft and privacy issues. Also, theft or misuse of intellectual property and other confidential business information is a mission critical aspect of many enterprises. To complicate matters, businesses and enterprises do not operate closed informational systems but often times invite partners, customers, vendors, contractors and other third parties to participate in the enterprise informational system. Therefore, most enterprises operate an open ecosystem informational structure. Employees of the enterprise in addition to its partners, customers, vendors and others participate in the production of information and the use/and consumption of information.

In the past, most commentators believed that a breach of confidentiality and misuse of data was a result of an outsider "hacker" getting access to enterprise information by penetrating a firewall or other security system. However, there is a greater risk to the enterprise that rogue insider will take the information and misuse that information. Further, trusted employees constantly copy files onto laptops, PDAs (personal data assistance), USB thumb drives (flash memory), CDs and other removable media in order to fulfill the tasks assigned by the enterprise. This portable data can be easily misplaced or stolen. Further, the ease of electronic transfer of documents to others exposes the information contained therein to mis-directed addresses, as well as unauthorized theft and misuse.

Therefore, enterprises and organizations must manage the access to the information and use of the information and monitor such access and use and audit (log) these activities. A system of information rights management should concern the following aspects: (1) control who can open, print or edit a document or information file; (2) prevent or limit distribution of the information file; (3) enable the enterprise to change permissions on an information file per enterprise policy or changed conditions; and (4) maintain an audit trail of such activity.

The information infrastructure tools also must accommodate the changeable value of information over the life cycle of the information file. Although the information and content of the file does not change, the value of the information changes due to contextual events and external environmental conditions. External events which change the value of information and information file can be summarized as follows: (a) creation and modification and use of the information in the information file as it is processed by the enterprise; (b) completion of the project or event associated with the information file; (c) government regulations imposed on the information; (d) legal actions associated with the content of the information file and financial audits related to such information; (e) distributing the information in the information file to individuals with different access or security clearances or rights; (f) distribution of the information, both physically and electronically, to others who are not in the enterprise; (g) the types and operation of storage devices and the media which retain the information files; (h) the discovery of new uses for the information content in the file; (i) new software applications which replace obsolete applications; (k) personnel changes within the enterprise and associated changes and permissions to access, control and modify the information file; (l) expansion and contraction of the enterprise itself (organizational changes) and the changeable nature of business relationships with partners, customers and suppliers.

In view of the foregoing, it is necessary to have an information classification system or engine which automatically categorizes information in unstructured information files and labels the same and permits the enterprise to establish a policy for that information and implement the policy recommendation with specific actions to ensure that the information is properly handled, distributed, retained, deleted (document retention) and otherwise managed.

OBJECTS OF THE INVENTION

It is an object of the present invention to provide a system operator or CIO with data processing tools to manage and organize data processed by an enterprise.

It is a further object of the present invention to provide tools for securing secret or security sensitive sec-con data in the enterprise computer system and to locate, identify and secure select content SC which may be of interest or importance to the enterprise.

It is an additional object of the present invention to employ a dynamic, adaptive filter to enhance select content (SC) collection, to employ classification systems to organize such SC, and, in some cases, to do so continuously.

It is a further object of the present invention to assist in data processing or manipulation including processes such as coping, data extraction, data archiving, data distribution, data destruction (a document retention process), inter-enterprise and intra-enterprise data distribution, data access request processing, and data distribution denials.

SUMMARY

The present invention is a method of organizing and processing data in a distributed computing system. The invention is also implemented as a computer program on a computer medium and as a distributed computer system. Software modules can be configured as hardware. The method and system organizes select content which is important to an enterprise operating said distributed computing system. The select content is represented by one or more predetermined words, characters, images, data elements or data objects. The computing system has a plurality of select content data stores for respective ones of a plurality of enterprise designated categorical filters which include content-based filters, contextual filters and taxonomic classification filters, all operatively coupled over a communications network. A data input is processed through at least one activated categorical filter to obtain select content, and contextually associated select content and taxonomically associated select content as aggregated select content. The aggregated select content is stored in the corresponding select content data store. A data process from the group of data processes including a copy process, a data extract process, a data archive process, a data distribution process and a data destruction process is associated with the activated categorical filter and the method and system applies the associated data process to a further data input based upon a result of that further data being processed by the activated categorical filter utilizing the aggregated select content data. In effect, the system and process translates the sec-con or SC data and then stores the same in certain locations or secure stores. In this manner, a transformation of the data is achieved. By transposing the sec-con or SC data, higher levels of organization are realized or higher levels of security are implemented.

The enterprise designated filters screen data for enterprise policies such as a level of service policy, customer privacy policy, supplier privacy policy, enterprise human resource privacy policy, financial data handling policy, public company reporting policy, health care regulation policy, technical innovation policy, competitive reporting policy and document or data retention policy.

In another embodiment, the method and system extracts security sensitive content from a data input to obtain extracted security sensitive data for a corresponding security level and remainder data. This extracted security sensitive data is stored in a respective security sensitive extract store. Remainder data is stored in the distributed computer system. Distribution of the data input with respect to said distributed computing system is limited based upon throughput from at least one of the enterprise designated filters. The controlled release of corresponding extracted security sensitive data from the respective extract stores with the associated security clearances for corresponding security levels is permitted by the system. In this manner, security sensitive content is separately stored apart form the select content, which is stored in select content data stores.

| Table of Contents | |
|---|---|
| A.1 | Creating An Information Infrastructure |
| A.2 | Sampling and Creation of a Simple Info Infrastructure |
| A.3 | System Tools and Processing Methods for an Information Infrastructure |
| A.4 | Information Dispersal - Basic |
| A.5 | Alternative to Information Dispersal Algorithm |
| A.6 | Adding Prior Art Information Dispersal Algorithms to Granular Data Dispersion |
| A.7 | Automatic Dispersal of Data to Remote Storage Locations |
| A.8 | Dispersal - Breaking Down the Context of Data Streams while Maintaining Access to the Content of its Parts |
| A.9 | Granular Tagging - Basic |
| A.10 | Automated Granular Data Level Manipulation |
| A.11 | Process for Creation of Automated Granular Tagging and Labeling |
| A.12 | Process for Creation of Automated Tagged Tear Lines |
| A.13 | Category Tags as Placeholders in Databases |
| A.14 | Controlled Release - Basic |
| A.15 | Layered Build-up of Data Streams, Layer upon Layer |
| A.16 | Granular Data Release from Third Party Repository |
| A.17 | Creation of Modular Data Components from Granular Data Streams |
| A.18 | "Rolling" Exposure of Granular Data Streams |
| A.19 | Controlled Release of Extracts after Verification |
| A.20 | Multi Purpose Usage of Filtering and Extraction Process |
| A.21 | Filtering and Copying "Selected Data" |
| A.22 | Combined Process of Extracting Part of the "Selected Data" and Copying Parts of the "Selected Data" |
| A.23 | Data Mining Search Results Basic - Distribution as Multi Level Security Versions |
| A.24 | Data Mining - A Search Creating Automatically Key Words |

-continued

| | Table of Contents |
|---|---|
| A.25 | Data Mining - Continuous Data Mining with Query Refinement |
| A.26 | Automatic Continuous Search - with Divergence and Convergence |
| A.27 | Distributed Data Mining |
| A.28 | Content Inference Engine - Basic |
| A.29 | An Inference Engine - Searching for the Unknowns |
| A.30 | Securing Information Sharing with an Inference Engine |
| A.31 | Automatic Web Data Inference Crawler Robots |
| A.32 | Changeable Data Classifications Based on Content Inference Threats |
| A.33 | Search Operations Creating New Continuously Growing Digital Data Streams |
| A.34 | Distributed Searches from Different Storage Nodes |
| A.35 | Storage of Separated Data Pieces in One Location |
| A.36 | Storage of Granular Data Streams - Basic |
| A.37 | Configuration of Granular Data Streams Dispersal to Distributed Storage Stores |
| A.38 | Granular Data Stream Transport |
| A.39 | Shuttling Data and Granular Data Streams Between Distributed Storage Stores |
| A.40 | Replication of Granular Data Streams with Minimal Security Risk |
| A.41 | Anonymizing Classified and Unclassified Storage Stores |
| A.42 | Controlled Release of Granular Data Streams - Granular Data Manipulation and Control |
| A.43 | Sanitization Process with Inference Filtering - Basic |
| A.44 | Process for Sanitizing Data on the Network for Privacy Security and Survivability |
| A.45 | Automated Sanitization of Important Data |
| A.46 | Sanitization of Non-Important Data |
| A.47 | Release of Granular Data Streams in With Increasing Levels of Access Identifiers |
| A.48 | Release of Granular Data Streams After Obtaining Consideration |
| A.49 | Secured Release of Granular Data Streams into Multiple Screens |
| A.50 | Ecosystem Based on "Granular Data Control" - Basic |
| A.51 | Eco System for Information Superiority and Survivability Based on "Granular Data Control" |
| A.52 | System and Method for Minimizing Data Exposure |
| A.53 | Creating "Digital Doors" for Access and Controlled Release in a Data Stream |
| A.54 | General Aspects - Basic |
| A.55 | Automatic Creation of a User or Object's Identification Profile |
| A.56 | Copying Filtered Granular Data and Dispersing |
| A.57 | Combining Extraction and Copying for Filtering of Filtered Granular Data |
| B.1 | Basic Operational Theory of Secure or Select Data Storage |
| B.2 | General Operation |
| B.3 | System Configurations |
| B.4 | Input or Initial Processing Considerations (Basic Filter Modules) |
| B.5 | Storage |
| B.6 | Extraction and Storage Enhancements |
| B.7 | Basic Reconstruction |
| B.8 | Reconstruction Techniques |
| C.0 | Testing the Security System |
| C.1 | The Etiology of Information |
| C.2 | Metasearch Engine for Knowledge Discovery: Search Convergence and Divergence |
| C.3 | Initial Process - Metasearch Engine and Knowledge Expander |
| C.4 | Simple Metasearch Engine |
| C.5 | Automatic Metatagging |
| C.6 | Automatic secondary tagging of a "range" |
| C.7 | MLS, Multi-level Security-Compliant Search and Distributions |
| C.8 | Benefits of the Metasearch - Knowledge Expander |
| C.9 | Information Life Cycle Engine |
| C.10 | Information Life Cycle Searches |
| C.11 | Search With Prioritized Classifications |
| C.12 | Simple Filters |
| C.13 | Complex Filters |
| C.14 | The Editor As An Information Expander |
| C.15 | Document Object Model (DOM) - Protection and Processing |
| C.16 | Recognizing The Document Object Model (DOM) |
| C.17 | Content |
| C.18 | DOM Process Editor |
| C.19 | Five Informational Attributes |
| C.20 | Select Content Introns and Exons |
| C.21 | Hierarchical Taxonomic Class Examples |
| C.22 | Knowledge Expander (KE) Basic Program |
| C.23 | Secured Metasearch Engine Based on Granular Data Control |
| D.1 | Secure Editor, DOM Editor (General) and DOM Editor Applied as Extractor Modules |
| D.2 | Applications of the Secure and SC Data Systems |
| D.3 | Automatic Features |
| D.4 | Multiple Security Levels |
| D.5 | Sharing Data with Different Security Levels - Data Mining |
| D.6 | Multilevel Security through Sanitization with Reconstruction of Sanitized Content |
| D.7 | Multiple Independent Levels of Security (MILS) |
| D.8 | MLS Server and Workstation Components |
| D.9 | Flexibility of the Present MLS Approach |
| D.10 | Multiple Extraction Filters and Application Outline |
| D.11 | Multiple Security Features for Data |
| D.12 | Adaptive Data Security - Event Responsive System |

-continued

| Table of Contents |  |
|---|---|
| D.13 | Email, Web-based and Other Types of Applications |
| D.14 | Portable Computing Device Environment |
| E.1 | General System Comments |

BRIEF DESCRIPTION OF THE DRAWINGS

Further objects and advantages of the present invention can be found in the detailed description of the preferred embodiments when taken in conjunction with the accompanying drawings in which:

FIGS. 1a and 1b diagrammatically illustrate a basic system diagram, method and flow chart for an information infrastructure.

FIG. 7 diagrammatically illustrates a basic flowchart showing reconstruction for various security levels.

FIG. 8 diagrammatically illustrates interleaving distinct data into different memory locations in a video memory.

FIGS. 23, 24, 25 show examples of categorical identifiers, ranked id categories and categorical ids for a business.

FIGS. 31a and 31b diagrammatically illustrates a flowchart showing the key component steps for the multiple layer security program for the community of users.

FIGS. 34 to 39 show tabular examples of attack and response levels for Standard Automatic Defenses Matrix; Optional Automatic Defenses Matrix; Security Meter Module; Normal Work Mode; Threat Made Table; and, Attack Mode.

FIG. 48 diagrammatically illustrates a MILS or multiple independent levels of security computer network with three (3) sub-networks at security levels top secret TS, secret S, and unclassified U.

DETAILED DESCRIPTION OF THE PREFERRED EMBODIMENTS

Figure 1B:
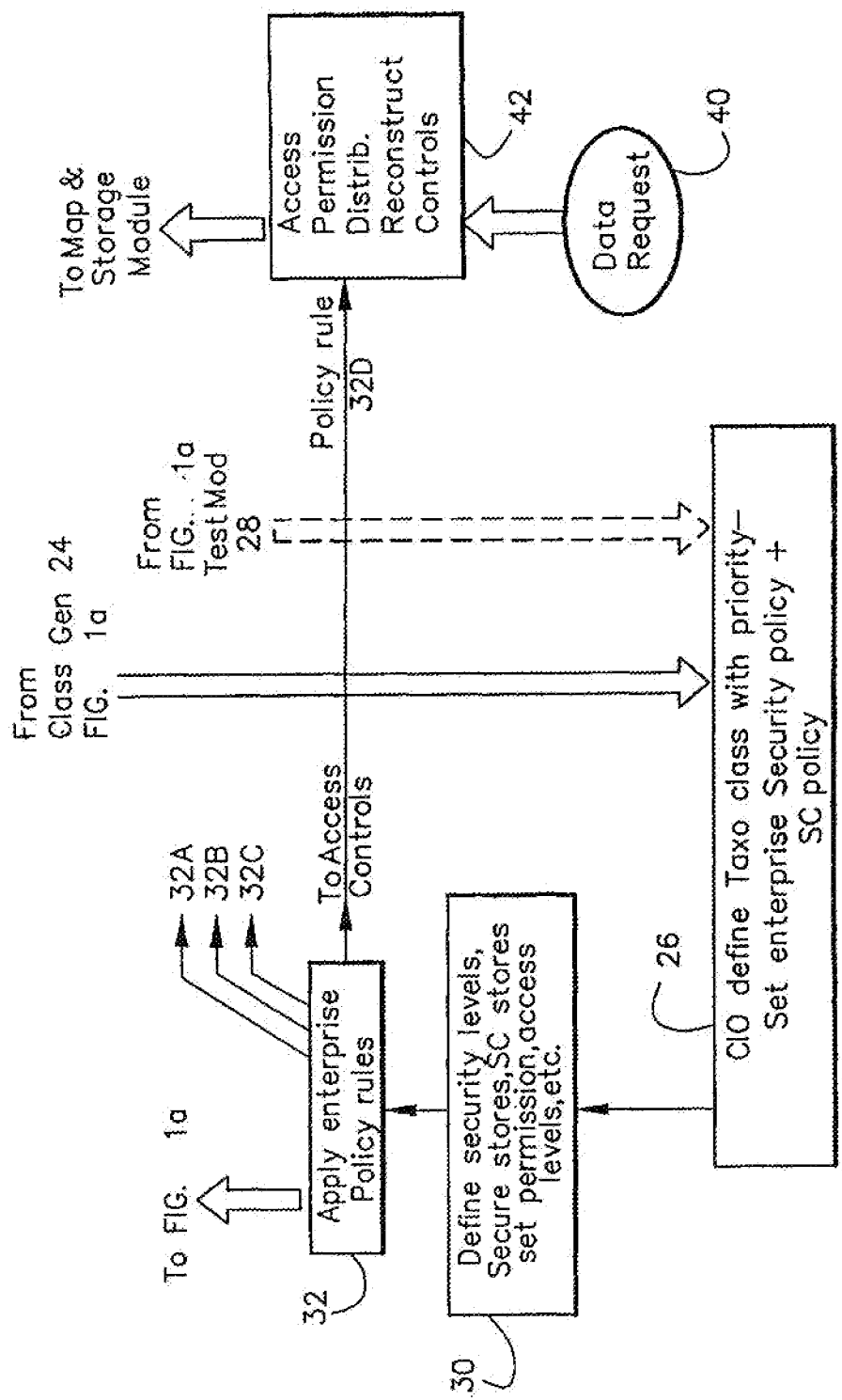

The present invention relates to an information infrastructure with many different features and characteristics. The infrastructure is a system, a methodology and a process implemented on a personal computer (PC) system, on a computer network (LAN or WAN) and over the Internet and computer programs and computer modules and an information processing system to accomplish the functions described herein. An Abbreviations Table is provided at the end of this specification. Also, the General System Comments section E.1 describes certain aspects relative to the implementation of this invention. In the drawings, and sometimes in the specification, reference is made to certain abbreviations. The Abbreviations Table (section E.1) near the end of the specification provides some correspondence between the abbreviations and the item or feature.

A.1 CREATING AN INFORMATION INFRASTRUCTURE

With respect to unstructured data (including semi-structured data) in information files, the prime considerations in creating an information infrastructure involve a recognition of different service levels, different retention-destruction periods for the files and different protective measures imposed by legal, security and compliance requirements. Confidential data may involve the enterprise, its employees, its customers and/or third parties. Further, the enterprise should gather, control disseminate and utilize its intellectual property (IP) rights in and to the data in unstructured data files. The current mind set relative to an open informational ecosystem, wherein employees of an enterprise, at many levels, openly communicate with enterprise partners, customers, vendors, contractors and other third parties, results in many communications paths wherein confidential data and IP data is subject to dispersal, misuse and theft. Concern over hackers accessing such sensitive data, rogue insiders taking and misusing the data and accidental loss of data by authorized users requires that the enterprise build an information infrastructure to identify, contain and classify the confidential data and IP data.

Information Rights Management (IR Mgt) can and is presently imposed on data files with the use of data file metadata, tags or labels. For example, the file property may be set at "Read Only" which limits revision rights. However, the content in information files is not subject to many controls. IR Mgt (a) controls the open, print and edit functions; (b) limits access, permissions, and distribution; (c) establishes and permits changes to permission levels; and, (d) provides and audit trail. Since the value of the information changes over the life cycle of the information file, oftentimes due to events and objects outside of the information file itself, it is the content that should be managed and subjected to an information infrastructure.

The present invention employs an extraction engine which identifies, selects and then extracts the security sensitive content (sec-con) or select content (SC), a classification engine that assists the user (the enterprise's CIO) to classify and organize the content, and a vibrant testing cycle to continually challenge the sec-con store, the sec-con security levels and the quality, breadth, depth and scope of the SC store. The classification engines can be used by the Chief Information Officer ("CIO") to establish information infrastructure policies and re-set the extraction engines to enforce the policies (data acquisition and handling rules) established thereby.

A.2 SAMPLING AND CREATION OF A SIMPLE INFO INFRASTRUCTURE

As discussed above, mission critical data is oftentimes captured in structured data compilations such as databases and spreadsheets. Herein, a "spreadsheet" is included in the definition of a database because a spreadsheet is a two dimensional database. Therefore, confidential data in unstructured information files which matches some or all of the data in structure files represents the initial starting point to define mission critical enterprise data. Some of this some of this mission critical enterprise data represents secret or confidential data of various parties (the enterprise, its partners, customers, vendors, contractors and other third parties) and IP data of various parties. Data from the structured files initially can be used as a content filter to extract the same confidential information from unstructured files and store the security sensitive sec-con data in extract stores as explained later herein. A simple classification system (hierarchical taxonomic system) can be established by reviewing the label descriptions on the structured data and then expanding class definitions with the use of the knowledge expander KE search engine described later in section C.2 and C.22, among others. The data and information returned from the KE engine can be used by the CIO (system administrator) to create increasingly broader or higher levels of data classifications. The hierarchical taxonomic system can be used to build contextual filters and taxonomic filters which can further protect sec-con data and expand the value and quantity of SC data. Once the CIO has established the classes of data, he or she can set policies for (a) storage and retention; (b) extraction-dispersal-access-release; and (c) levels of service and permission levels.

After removal and secure storage of known security sensitive data from unstructured data sources (using filters designed from structured data sources), a review of unknown data in unstructured files may be appropriate.

A.3 SYSTEM TOOLS AND PROCESSING METHODS FOR AN INFORMATION INFRASTRUCTURE

FIGS. 1a and 1b diagrammatically illustrate a basic system diagram, method and flow chart for an information infrastructure. The infrastructure is a dynamic process and hence the CIO or system administrator can enter the process at many points. Information (Info) infrastructure 10 includes a number of modules or process routines or functions which are described in detail in sections B.1-D. 14. The prime operational modules or functions are set forth in FIGS. 1a and 1b (which is a composite of FIGS. 1a and 1b). The prime objective of the info infrastructure is to process data from source document or source information file 12. The source is first processed via an editor module 14 to deconstruct the source doc into its constituent parts. See sections C.14-C.22, and more critically, section D.1.

After deconstruction (which may be optional per the system operator's choice), the infrastructure processes data with extraction module 15. Extracted data and remainder data is processed by secure storage Sec-Con module 16 and, if appropriate to the CIO's designed task, the select content SC storage module 17. The extraction and secure store is discussed throughout the specification but is particularly discussed in sections B.1-B.6. The select content SC store module is discussed in sections C.1-C.13. C.20-C.22. The use of an editor module in sections C.14-C.19 is used to process input data which, after such processing, is applied to the content filter modules, the context filter modules and the taxonomic filter modules. The system coordinates storage of data with map module 18.

Extraction module 15 handles input from content filter module 20, contextual filter module 21 and taxonomic filter module 22. The infrastructure system and process is adaptive therefore the extraction module also outputs data to filter modules 20, 21 and 22. Content filters are discussed in many places in the specification (see particularly sections B.4, and C.12). Since the extraction is employed with the (a) security system and (b) the knowledge expander KE system to generate select content SC data, this dual purpose both feeds data to the filters modules 20, 21 and 22 and accepts data therefrom to define the filters used to extract critical data from the data flow. A contextual filter module 21 is employed in an infrastructure security system in order to assure the CIO-system operator ("sys-admin") that (a) the source document (source doc) is properly scrubbed and (b) to add new words, terms or data objects to the list of security sensitive data objects of concern. See sections B.4, C.13, C.20. The new data objects become content filters for another processing cycle for anew source doc. When configured as a knowledge expander KE infrastructure for select content SC, contextual filters increase the SC data extracted form the source doc and increase the value and informational content of the SC store. The taxonomic filter ("tax-filter") permits the sys-admin to employ a higher conceptual layer on either the security extraction or the SC extraction and compilation. Tax-filters are discussed in sections C.1-C.22 and particularly in sections C.1, C.11, C.14, C.21 and C.22.

The sys-admin may use the info infrastructure with an existing classification system and information policy, ruled-based or may have no pre-existing classification system for his or her documents. The infrastructure process 10 includes a classification generator module 24 which employs an SC extractor, a KE search engine to generate additional supplemental documents (supple docs) which the sys-admin may use the create the hierarchical taxonomic classification system. otherwise, the sys-admin may purchase taxonomic classifications commercially from others. However, the sys-admin must ultimately prioritize the hierarchical taxonomic for the enterprise. The taxonomic system can be created by operation of the modules in sections C.1 through C.23. The KE expander module can be configured to list docs and data entries and this listing can be used by the sys-admin to (a) build the hierarchical taxonomic and (b) prioritize the classes. Once the hierarchical taxonomic classes are gathered, the sys-admin defines which tree, branch and leaf is critical in module 26, then defines (or redefines) security levels, sets secure stores, ids SC, sets SC stores and sets permission levels, service levels, access levels and other policies for the enterprise which policies are translated into a rules-based system for the processing of data. Module 32 applies the rules 32A, 32B, 32C, and 32D to filter modules 20, 21 and 22 and to the access-permission module or control function 42. Data requests 40 from others are input into access, permission, distribution, reconstruction control module 42. Features and functions for this module are discussed in sections B.7, B.8. C.9-C.14, C.20-C.23 and in the applications D.2 through D.14. The request for data may be an alarm function or may be a data request form another. The info infrastructure then cycles back to source doc 12, editor module 14 and extractor module 15.

To test the security levels and system, the sys-admin may activate test module 28. Section C.0 discusses how the KE search engine is employed to test the security system.

Figure 2:
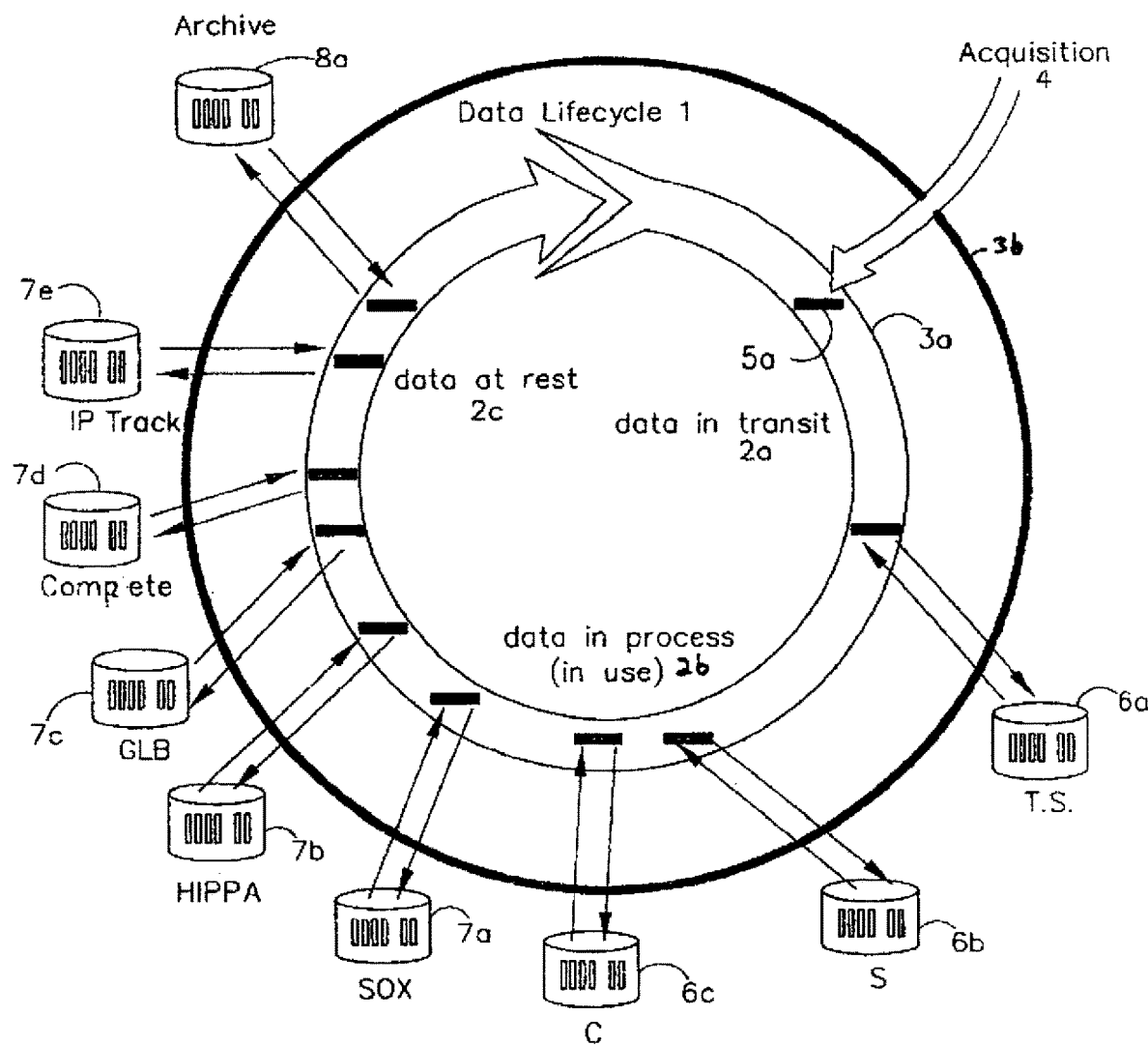
FIG. 2 diagrammatically illustrates a basic information life cycle process or system wherein secure content (seccon) and select content (SC) is separately stored per categorical filters operable by the enterprise.

FIG. 2 diagrammatically illustrates a basic information life cycle process or system wherein secure content (sec-con) and select content (SC) is separately stored per categorical filters operable by the enterprise. Data lifecycle 1 in general begins with an acquisition 4 and process or storage 5a in the enterprise distributed computing system or environment represented by data lifecycle ring 3a and outer ring 3b. Storage memory units 6a-8a are part of the distributed computer system of the enterprise. However, the enterprise may contract out the storage facilities. In any event, the enterprise controls storage 6a-8a. Some storage units 7a-8a may be combined. However, archive storage 8a may be less expensive (slower process and access time) than the SC storage units 7a-7e. Further, the filter SC storage units 7a-7e may be in a single memory, and simply segmented by control parameters. In general, as explained in sections B.1-B.8 and others (see D.7-D.9), the memory units 6a, 6b and 6c are distinct and access to these sec-con stores is controlled with software or hardware guards (see section A.23 or D.6) or the extract stores are physically separate. Some data stores may be copy protected.

Data on the right side of inner enterprise ring 3a is in transit 2a due to acquisition 4 and other high frequency access, distribution and processing aspects (service levels). A high service level may be assigned to data in transit 2a. Data in process section 2b is undergoing manipulation and processing by the enterprise. This may include the use of sec-con filters and extraction to top secret TS store 6a, secret S store 6b and classified C store 6c. Remainder data is kept in the enterprise store in ring 3a.

Enterprise designated categorical filters are used to store select content SC relative to the category in certain SC stores. These categories cover a wide range of topics which may be of interest to the enterprise. For example, enterprise designated filters screen data in process 2b for various enterprise policies including, but not limited to level of service policies, customer privacy policies, supplier privacy and proprietary informational policies (business privacy issues), enterprise human resource privacy policies, financial data handling policies (see GLB or Gramm-Leach-Bliley Act of 1999), public company reporting policies (see SOX or Sarbanes Oxley Act or Public Company Accounting and Reform and Investor Protection Act of 2002), health care regulatory policies (see HIPAA or Health Insurance Portability and Accountability Act), technical innovation policies (intellectual property (IP) disclosures, patent disclosure systems, trade secret tracking systems), competitive reporting policies (a collection of all data on the enterprise's prime competitor) and document or data retention policies. The enterprise sets these policies and the CIO or sys-operator fashions filters which either continually or upon certain events or periodically sweep the enterprise data system, locate SC and store the SC in the relevant data bases. As a further example, technical information on a certain product may be important and, in light of the fact that 60-80% of all corporate data is in unstructured documents, the data lifecycle sweep may filter all processed data looking for that certain product. The technical filter content file is expanded to include additional contextual materials by looking at outside or extra-enterprise data, thereby creating aggregated SC data for the special technical data SC filter. With the application of a taxonomic classification system, the product specific tech filter is further expanded to cover higher classifications of product types and lower, more detailed products that relate to the target product. A cross-check operation with IP SC filter and database 7e also provides guidance. If the IP is very valuable, it may be stored in sec-con extract stores 6a-6c.

Figure 3:
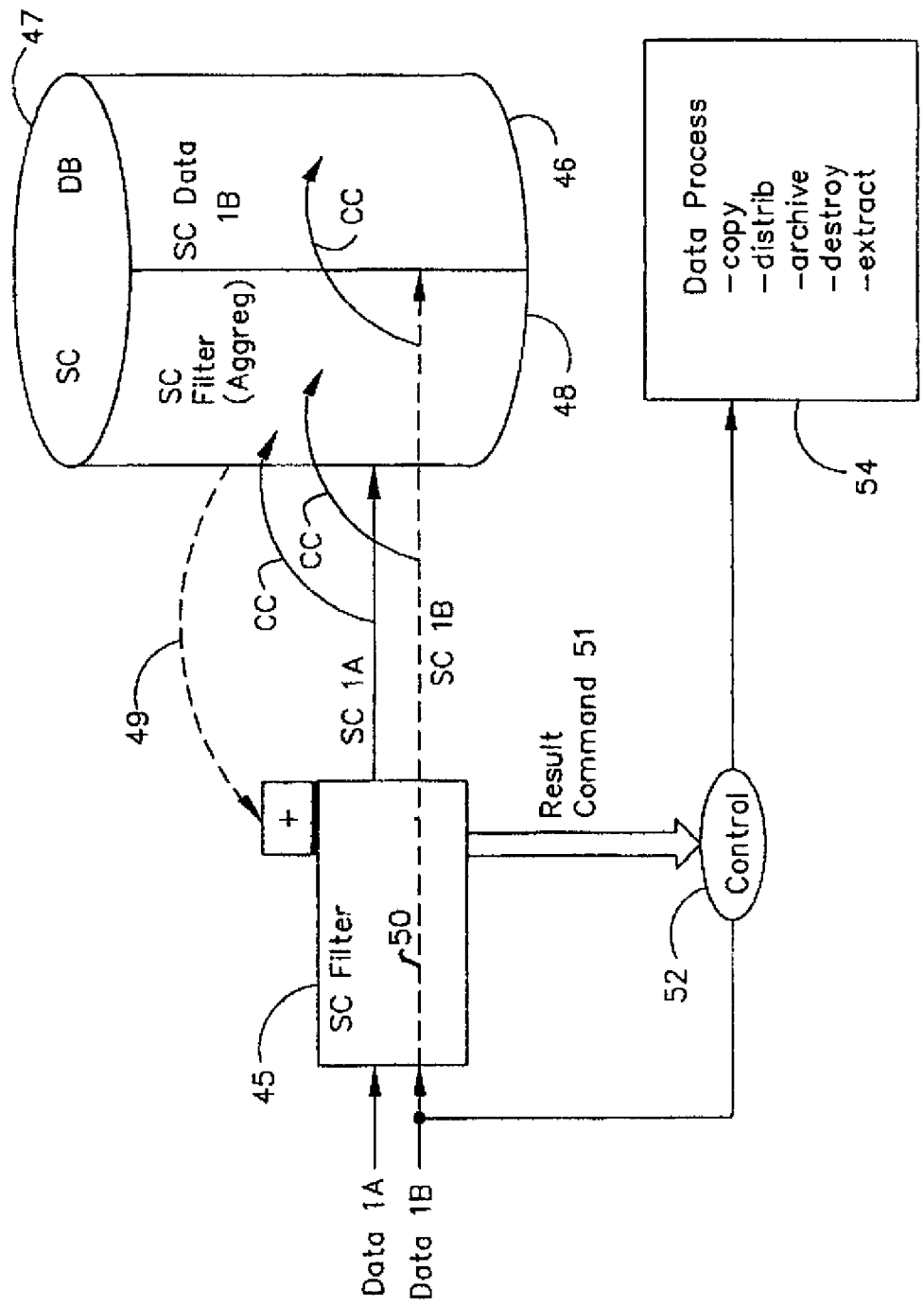
FIG. 3 diagrammatically illustrates a simplistic dynamic filter and select content (SC) storage coupled to a data processing event.

FIG. 3 diagrammatically illustrates a simplistic dynamic filter and select content (SC) storage coupled to a data processing event. SC filter 45 may be one or more of a content-based filter, contextual filter or a taxonomic classification filter. The SC filter 45 accepts, in a first instance, data input 1A and, in a second instance, further data input 1B. As explained below, data 1A may be the same as data 1B. As an example, a sequential operation is described. Input data 1A is fed to SC filter 45. The SC filter identifies SC content SC-1A and this content is sent to SC database 47. Any type of storage may be used rather than a database, however, some type of indexing is useful. The SC content copied from data input 1A is added "cc" to SC filter aggregated 48. The SC database uses the SC aggregated data to supplement the SC filter 45 with a summation+function via operational path 49.

The next process supplies further data input 1B to SC filter 45. The data 1B is processed by the filter 45 and select content SC-1B is copied "cc" to SC filter aggregation file 48 and also copied "cc" to the SC data file or structure 46. The SC aggregate is fed back to the SC filter via route 49. In this manner, the SC filter can be one or more content-based filters, contextual filters or taxonomic classification filters. This is the adaptive and dynamic filter for the categorical filtering discussed above. If data 1A is obtained outside of the enterprise, the SC filter expands. See KE expander system in sections C.2-C.22. Outside or external data is primarily to expand the filter. It is stored in the SC aggregate file. If the input data 1A is internal or intra-enterprise data, both the aggregate file is expanded and the sys-operator needs to know that the SC is an internal document and this internal SC-1B is stored in SC data file 46.

Data 1B is also applied to control 52. The SC filter 45 generates a result command 51 or an output control signal to indicate the presence or absence of certain SC data in data block 1B. Contextual relevance or taxonomic key words or terms may also trigger filter result output 51. This signal is applied to control 52 which activates data process 54. Some data processes are copy, extract, distribute, archive, or destroy. Further, as discussed below, SC filter 45 may be set as a screening filter which is then used to identify a certain categorical filter which then triggers the data process. Alternatively, the data input 1A or 1B may come with a data process request and the data must be filtered or scrubbed before the data process is carried out by the enterprise computer system.

Some key operations of the system and process follow. The invention organizes and processes data important to an enterprise operating the distributed computing system. The SC or select content is represented by one or more predetermined words, characters, images, data elements or data objects. The computing system has a plurality of select content data stores 7a-7e for respective ones of a plurality of enterprise designated categorical filters which include content-based filters, contextual filters and taxonomic classification filters, all operatively coupled over a communications network. An archive filter 8a operates with data at rest 2c at the top left of lifecycle 1. Aged content is subject to archiving policies or back-up policies. A data input 1A or 1B is processed through at least one activated categorical SC filter 45 to obtain select content, and contextually associated select content and taxonomically associated select content (SC-1a) as aggregated select content. The aggregated select content is stored in the corresponding select content data store 47 and, more specifically, filter aggregate file 48. A data process 54 from the group of data processes including a copy process, a data extract process, a data archive process, a data distribution process and a data destruction process is associated with the activated categorical SC filter 45 and the method and system applies the associated data process 54 to a further data input 1B based upon a result 51 of that further data 1B being processed by the activated categorical SC filter 45 utilizing the aggregated select content data per path 49.

In another embodiment, the method and system extracts security sensitive content TS or S or C (FIG. 2) from a data input to obtain extracted security sensitive data for a corresponding security level and remainder data. Remainder data can be considered left-over data which is extraneous to the sec-con or SC. It may be surplus or residue data. In this manner, the remainder data is complementary to the sec-con or SC data. This extracted security sensitive data is stored for the corresponding security level in a respective security sensitive extract store 6a, 6b or 6c. Remainder data is stored in the distributed computer system. Distribution of the data input 1A (FIG. 3) with respect to said distributed computing system is limited based upon throughput from at least one of the enterprise designated SC filter 45 (e.g., patient privacy or HIPAA filter linked to SC store 76). The controlled release of corresponding extracted security sensitive data from the respective extract TS or S or C stores 6a-6c with the associated security clearances for corresponding security levels is permitted by the system. In this manner, security sensitive content is separately stored apart from the select content, which is stored in select content data stores 7a-7e and 8a.

The sys-operator may activate ON a categorical filter or the system may be automatic. Prior to activating a designated categorical filter (see GLB SC content filter 7c), the data input 1B is processed through a screening taxonomical classification SC filter 45 which output 51 activates said at least one designated categorical filter for the sensed data input 1B. Several categorical filters may be activated, operating concurrently or sequentially, dependent upon processing speed and memory access, based upon the screening taxonomical classification filter output.

The further data input 1B may be the same as the initial data input 1A. In other words, an iterative process may be imposed on data 1A/1B. First, the SC filter 45 is used to expand the SC content, maybe to add contextual material, or to add a higher or lower classification SC data per the taxonomic filter. Thereafter, the data 1A/1B is processed again by SC filter 45 with the data process 54 associated therewith.

Regarding the initial data processing, the further data input 1B may be structured or unstructured data. If structured, the data input should be deconstructed and special attention should be paid to the structured items. In email, a partially structured data item, addressee and the addresser data and the regarding field often are key SC items for the enterprise. If unstructured data is filtered, a deconstruction process should be used. See sections C.14 and D.1, among others. The constituent data elements are then SC filtered by 45.

Activating the enterprise designated categorical SC filter 45 may be automatic or manual. An automatic activation can be is time-based (2:00 AM every day), distributed computer system condition-based (when data flow falls below x % or process speeds exceed y %), or event-based (see section D.3, D.11, and others which discuss event triggers). Activation of the categorical filter can be linked to a data process request from the group of data processes.

The data processes include a copy process, a data extract process, a data archive process, a data distribution process and a data destruction process, an inter-enterprise data distribution process, an intra-enterprise data distribution process, a data access request coupled with said data distribution process (a request to send data 1A to a newspaper via email (copy and distribute)), a data distribution denied process, and a limit data distribution process. The data process associated with a data block 1A/1B may trigger one or more SC filters or a discovery of SC in a data block 1B may cause a change in the data process from "full distribute" to limit distribution to key enterprise persons." In litigation, discussions of the lawsuit may be an SC filter topic. The groups of data processes may activate different categorical filters. The result 51 of the further data 1B processed by the activated categorical SC filter 45 indicates the presence or absence of select content or aggregated select content in the data 1B.

On the output side, the system may impose a classification taxonomy on the stored aggregated select content SC file 48. This enables the sys-op to see the scope of the filter (depth, detail, higher level classifications, orthogonal data fields, etc.). See, for example, section C.22. Preferably, the select content file 46 is stored separate from the aggregated select content 48 in the select content store 47. A separate storage permits the sys-op to see what SC data resides in his or her enterprise as compared with the scope of the filter. The system may impose a classification taxonomy onto the stored select content 46. See FIGS. 12*b* and 12*d*. Further, the stored SC 46 may be a copy of the obtained select content from data 1A/1B or may be a representation thereof in said select content data store. A representation may be a marker or pointer to an index of SC. This process avoids multiple copies of SC storage. Additionally, in order to track the origin of the data 1A/1B, the data input has a source indicator (like a URL or the path to the original document location) and the obtained select content SC-1A or SC-1B, when stored in the select content data store 46, includes a corresponding representative source indicator pointing to or linking to the source of the data. In this manner, the sys-op knows where the SC data came from. Additionally, the process may generate a tag or label responsive to the source indicator of data 1A, and the corresponding representative source indicator. The tag or label can be electronically attached to the source document to indicate SC content, importance of the SC content and category thereof.

A.4 INFORMATION DISPERSAL

Basic

The dispersal of information into the secure storage or the select storage, with maps to the original or source document, is one of several important aspects of the information infrastructure. The storage processes and modules provide an alternative to prior art information dispersal algorithms. A prior art information dispersal algorithm is discussed in U.S. Pat. No. 5,485,474 to Rabin and in an article entitled "Survivable Information Storage Systems" by J. Wylie M. Bigrigg, J. Strunk, G. Ganger, H. Kiliccote, and P. Khosla, published August, 2000 in COMPUTER, pp. 61-67. The present system of information dispersal can be additive to the prior art information dispersal algorithms. The present system and method can be automated to facilitate dispersal of information to remote storages upon detection of certain events. Lastly, the information dispersal techniques can provide for the dispersal of context of the whole data stream while maintaining access to the constituent parts of the content.

A.5 ALTERNATIVE TO INFORMATION DISPERSAL ALGORITHM

The invention provides a system and method for dispersal of plain text data and an alternative to usage of prior art information dispersal algorithms. The usage of prior art information dispersal algorithms does not permit the user or sys-admin to view or use data stored within a particular storage. The prior art algorithms permit one to view and have access to data only when data is retrieved from a few stores and then is combined together.

The present inventive process and system enables use of granular data which is which is stored in a known and accessible storage store (in defined storage locations (sec-con store or SC store). The security risk in the present system can be reduced by storing smaller and more granular pieces of data. Further, after splitting granular data from a source document or data stream, the granular pieces of data may be processed using the prior art information dispersal algorithms.

A.6 ADDING PRIOR ART INFORMATION DISPERSAL ALGORITHMS TO GRANULAR DATA DISPERSION

The present invention provides a system and method for dispersal of granular data to distributed storage stores and the possibility to add the prior art Information Dispersal Algorithms ("IDA"). The invention provides a system and method for dispersal of data to distributed storage stores—in essence an inherent "built in" security feature. The Information Dispersal Algorithm or IDA delivers a relatively high level of security, however it does not permit nor allow access to data content for search and other Knowledge Management operations.

On the other hand, the present invention may (a) first granularly extract the data form the source, then (b) use the IDA for securing extracted granular pieces of data, one at a time. This combination brings flexibility to the system as a whole since granular pieces can be reconstituted, one at a time, and released from IDA for knowledge management operations without compromising the security of the whole document. By securing granular data pieces with the Information Dispersal Algorithm or IDA, the system's granular data parts once reconstituted by the IDA are available in system storage and are stand alone data structures—(encrypted or not). These stand alone data structures and the granular data therein can be read on their own without the need to bring together other data shares. Because extracts can be in plain text or decrypted- and stand in their own data structure, the sys-admin can authorize an advanced search and knowledge management operations through the granular data structure.

Splitting a data stream and dispersing the slices of the split data to distributed data stores creates a very high level of security. This emulates military tactics of splitting and hiding forces. In words of the great strategist, Sun Tzu, the present process and system creates "disorder from order" (the order being the source document, the disorder being the granular and dispersed data parts) and it creates a formless organization which makes it a very hard target for the attacker. The level of security may be further raised if, at the storage stores, there are strong access control mechanisms for authentication and validation of users. Dispersal of data to distributed storage stores achieves higher security as well as a lower overall security costs.

Distributed storage stores need less security then a centralized data repository for a number of reasons. First, the distributed storage stores hold only parts of the data and they are of lower interest to an attacker that will need to attack few dispersed stores to get the total content. Second, the stores are scattered and if hidden they call for less security. The need for less security means lower costs; more efficiency and less processing power. Thus dispersal of data to distributed storage stores is inherently "built in", "baked in" security. The split granular data pieces may be sent to distributed storage to be processed in an Information Dispersal Algorithm scheme. Each granular item will be split into n pieces, which will be sent to distributed storage. Reconstructed of a granular item will be enabled by access to M out of N pieces. A directory/map connects all granular pieces recreate a partial or original document. Using the Information Dispersal Algorithm (IDA) with the present invention may deliver a much higher degree of security. The data stores may be correlated to the sec-con or SC content or maybe otherwise designated.

A.7 AUTOMATIC DISPERSAL OF DATA TO REMOTE STORAGE LOCATIONS

The present invention provides a system and method for the automatic dispersal of data to remote storage locations. Examples of these systems and methods are found in sections D.2 through D.14. Any document data stream created by a user may be automatically split and transported to distributed storage locations. This may take several forms. One form is, when a file is being closed, it will automatically be split and its pieces sent automatically to distributed local or remote storage locations.

A.8 DISPERSAL

Breaking Down the Context of Data Streams while Maintaining Access to the Content of its Parts The present invention provides a system and method for splitting a document or data stream into granular parts for security and privacy reasons which hides the data stream's context. By splitting a document or data stream into different granular pieces and dispersing the pieces into distributed storage, the context of the original document or data stream is broken. The more splits and slices imposed on the data, the harder it is to inference the content, concept and context of the source document or data stream. The uniqueness of this invention is that each distributed piece and its granular content can be independently accessed for different usage. This storage technique is very different than the Rabin Information Dispersal Algorithm (U.S. Pat. No. 5,485,474) in which slices of the original document are distributed in different storage locations but the content of each slice or piece of data is not accessible.

The present system and method permits the sys-admin to establish an info infrastructure for data mining a plurality of source documents or information files. See sections C.8, C.17, D.5 and D.13. The sys-admin can also employ the knowledge expander KE search engine to enhance the data mined form source docs. See sections C.2 through C.23.

A.9 GRANULAR TAGGING

Basic

The present method and system permits granular extraction and tagging of data. As a result, the system permits (a) automated granular data level manipulation; (b) a process for creation of automated granular tagging and labeling; (c) a process for creation of automated tagged tear lines; and (d) use and implementation of category tags as placeholders in databases.

A.10 AUTOMATED GRANULAR DATA LEVEL MANIPULATION

The system and method provides for granular data manipulation. All input data is analyzed, optionally categorized and optionally presented in a matrix or other format (a data structure). The analysis involves deconstruction or decompilation of the source doc (see section C.14-C.16 and, more particularly, section D.1. Categorization is discussed in sections C.11 and C.21. Different tools enable selection of granular data items for different activities which may include, among other things, their use as: (1) key words to search engines; (2) headings for granular data elements, meta tags for such elements; (3) a base for build up of expansive content (supple docs); and (4) filling in missing information from documents (data mining third party sources.

Granular data control may be used for various information processing activities listed in the Action Table below. The Action Table, in one embodiment of the invention, is a pull-down menu which enables the user of the system to select the granular action associated with the activity.

| Action Table |
|---|
| (1) security |
| (2) privacy |
| (3) compliance |
| (4) archiving |
| (5) replication |
| (6) backup |
| (7) continuity |
| (8) survivability |
| (9) broadcasting |
| (10) alerting |

The granular actions are selected automatically (based upon the initial set-up of the system), manually or a combination of both. Granular items may be connected to other granular items in the matrix/format or connected to other data processing steps external to it. Different data matrixes or data structures in the sec-con store or SC store can be constructed for the granular output of the original, source input data. The original data ad constituent parts thereof may be replicated to form different matrixes based on different categorizations. The selected granular data items will usually have semantic meaning. However it is feasible to combine granular items in different ways which do not have an inherent semantic meaning. This might be done for search and content inference purposes. By categorizing and labeling every granular data element, the invention in essence differently weights different granular content items.

A.11 PROCESS FOR CREATION OF AUTOMATED GRANULAR TAGGING AND LABELING

The invention provides a system and method for automatic creation of tagging and labeling at the granular data level. See sections C.3, C.5, C.6, C.7 and D.1. There is a need for automation in tagging data and content in a document and data stream. the tagging and labeling can be used for security or for data mining or knowledge expansion. The need security tagging includes: Top Secret paragraph, Secret paragraph. Top Secret line, Secret line (tagging plus contextual filter set as a range (paragraph and line). There is a need for tagging at a more granular level such as Top secret word/character, or Secret word/character. The need for tagging at a very granular level also is impressed upon an enterprise by the requirements of recent laws for removal of sensitive names and sources from documents. There is a need for other types of categorization/labeling/tagging. For example, there is a need for a Private tag, Public tag, and a need for High Priority, Low Priority, Medium Priority tags. The enterprise policy discussed above, when applied with the use of the present method and system, implements this categorization/labeling/tagging operation. Each item, word, character, image in a data stream (also optionally at a bit and binary level) is monitored, analyzed, categorized and tagged. This is done by filtering, i.e., matching the granular data items against pre-set lists wherein a match yields the right classification tag for the granular data element. The element is marked by creation of a tag for the granular data element. For example "name," "location," and "social security number."

Following process outlines an automatic tagging system. (1) Within the input data stream, all the data and content element is monitored and categorized by a filter or filters. The filters may be content filters, like a "dirty word" list of others. (2) Every data element is categorized contextually (name location, phone etc). Every element may be also labeled, tagged, and categorized according to other categorizations like security classification, Top Secret. See, for example, the discussion of hierarchical taxonomic in section C.21. (3) Every tag may be checked contextual validity and may be checked and verified by an inference engine.

By categorizing and labeling every granular data element, the invention in essence different weights to the different granular content items.

A.12 PROCESS FOR CREATION OF AUTOMATED TAGGED TEAR LINES

The invention provides a system and method for automatic creation of automated tear tagged lines or contextual ranges about identified content. There is a need for automation in classifying ranges of content within a document or data stream. The need may be for security ranges like Top Secret paragraph, Secret paragraph etc. as well as for other types of categorization/labeling/tagging. For example, there may be a need for Private tag, Public tag, High, Low or Medium priority tags. Based on automatic categorization of each item, word, character, image, in a data stream, a contextual defined range, such as a line a paragraph or a group of words, can be tagged by one of the tags in that grouping. For example, if a paragraph has 15 words with 15 tags, the paragraph may be tagged as a whole based on one or few of the tags. In situations where tags represent a hierarchy—("Top secret, Secret, . . . "), the paragraph can automatically be tagged by the highest level tag. Tagging of the paragraph sets a range or a tear line, which can be selected for different uses including a range for searching for key words for a search operation.

Following is a process for creating automatic tagging with automatic tear line tagger. (1) Select ranges of content (drop-down menu or pre-set range or manual highlight selection). (2) A range of content means a contiguous content stream, which may be a phrase, line, paragraph, page, chapter etc. (3) Within the defined range, every data element and content element is monitored and categorized by a filter or filters. The filters may be content filters like dirty word list of others. (4) Every data element is categorized contextually (name location, phone etc). (5) Every element may be also labeled tagged and categorized according to other categorizations like security classification. (6) After categorization of every element, a process may select a categorization labile to define the content range. (for example, a paragraph may have 10 words 5 labeled are as Top Secret, 3 labeled as Secret, and 2 words labeled as Confidential. (7) The range might be labeled, tagged as Top Secret. (8) Rules can be set so that when a combination of a few words appears the range, the range group is tagged at their level higher or lower. (9) Every tag's contextual validity maybe checked and verified by an inference engine. By categorizing and labeling every data element, the invention in essence assigns different weights to the different granular content items.

A.13 CATEGORY TAGS AS PLACEHOLDERS IN DATABASES

The invention provides for a system and method for substituting tags as placeholders for removed data thereby creating the info infrastructure for unstructured data. For security or privacy reasons, granular data elements are removed from a repository, database, document, or file, etc. Tags are inserted as placeholders to replace the data that was removed to other storage locations. Data mining searches locate the tags instead of data. The benefit of this operational system and process enables data mining that will not produce the removed secured data but it will let the user know that the data does exists and what type of data it is (name, location, social security number, etc). Data mining is possible based on tags organized by categories, not whole information in unstructured data files. As an example, a document may be processed to show: (a) Date birth xxxxxx; (b) Mothers name yyyyy; and (c) School zzzz. The data categories (birth, mother's name, school) is listed, but the granular data elements are in different locations—and the owner of data needs to trigger the release of different granular data elements.

Further, the tagging and sec-con and SC data extraction can be used to populate a taxonomic database (or non-taxonomic database). The tags or labels are the filed names in the database. The structured data in the database will be the extracted data. Therefore, the sys-admin creates the info infrastructure with the present process.

A.14 CONTROLLED RELEASE

Basic

The controlled release of information (see reconstruction aspects in sections B.7, B.8 and the applications in sections D.2-D.14) results in the following unique features and characteristics: Layered build up of data streams, layer upon layer; Granular data release from a third party repository; Creation of modular data components from granular data streams; "Rolling" exposure of granular data streams; Controlled release of extracts after verification; Multi purpose usage of filtering and extraction process; Filtering and copying "Selected data;" and, A combined process of extracting part of the "selected data" and copying parts of the "selected data."

A.15 LAYERED BUILD-UP OF DATA STREAMS, LAYER UPON LAYER

The present invention provides a system and method for the controlled release of granular data streams which release builds up, layer by layer, a reconstructed document or data stream. The controlled release of data or granular data streams—layer by layer—forms a new, whole or partial document. A granular data stream is defined as extracted, granular data elements and/or the remainder data filtered from an original data stream. The filter may process the original data stream by content filter or other filtering methods. Controlled release of granular data layers during reconstruction can be done in a document, data stream, and website, database or other format. Each layer is built upon the other one to enable a view of a full or partial document. The invention provides a system and method for controlled release of data and granular data streams after verification and validation before the release of each layer.

One aspect of the present invention focuses on release from storage of granular data pieces. The security risk is reduced by storing smaller and more granular pieces. The attacker needs to access few stores to piece together all the content Layers of data of the original document data stream may be released at once or at different times. The granular data stream is released into a file with existing content (remainder, or sanitized file) or creating a new file. See section D.6 for a sanitized document reconstruction. For security reasons and to avoid covert channels, Trojans and other attacks, the granular data layers can be released onto different screens in the same computer or different screens on different computers. See sections B.7 and B.8. The build up can be done in a way that resembles build up of modular components. Different layers can be built up in different sequences.

A.16 GRANULAR DATA RELEASE FROM THIRD PARTY REPOSITORY

The present invention provides a system and method for granular data control and release from a third party repository. Users control their own private data-release from $3^{rd}$ party or government repositories and databases. When a user wants to release information, he or she will release it in a controlled release fashion. A higher level of security and privacy is delivered in situations where the data is split into data streams and stored in different memories and or locations. When the information is dispersed, the chances for leakage are minimal. The user may release different data streams from the different storage locations.

To deliver a higher level of security the user may chose to route the dispersed data streams in different communication paths. For example: deliver critical information in parts over the phone line, cell line, email and fax.

A.17 CREATION OF MODULAR DATA COMPONENTS FROM GRANULAR DATA STREAMS

The system and method provides for the creation of modular data components from granular data streams. Splitting original document or data streams into granular data streams enables the user or sys-admin to build and maintain a component infrastructure for internal usage (within the enterprise) or for external usage (to others). A granular data stream is defined as the extract and/or remainder data filtered from an original data stream. The filter may process the original data stream by content filter or other filtering methods.

The trend of implementing Service Oriented Architecture—SOA, in web applications teaches the need for modular code, the benefits of code reuse and other added value. In the same vein, splitting original documents or data streams into granular pieces and creating a modular framework brings different added value and advantages which include: (1) parts of the data stream can be used by the originator, other parts by other users or machines to construct other data streams; (2) the granular data streams may be used as tags or metatags; and, (3) the granular data pieces may be used as elements to feed search engines. Modular data components may be granular data streams or pieces, granular data pieces with hooks, granular data pieces with tags etc. Hooks are metadata that relate one data element to another data element or file or data object. The modularity enables data pieces to be easily combined into a larger data structure where they may be reused.

A.18 "ROLLING" EXPOSURE OF GRANULAR DATA STREAMS

The invention provides a system and method for flexible content access based on "rolling" granular data exposure with decryption for better workflow. In situations where information must be accessed on an ongoing basis in plain text like search operations, encryption may be a major hindrance. The need to decrypt the encrypted plain text and then to encrypt it again, and do the same loop many times, is a major obstacle to work flow and performance.

The invention introduces a solution based on creation of (1) granular pieces of data (2) a distributed storage framework as a way to deal with the need to encrypt yet not overwhelm the processing and other computing workflow. The system creates granular data pieces out of the original document/ data stream. This is done through a process of content analysis, selection, extraction and dispersal to distributed storage.

The granular pieces may be encrypted. The added value of the granularity effect is that there is no need to decrypt the whole original document at once pieces of granular data can be decrypted separately at the different storage locations.

Operationally, the system may be pre-set to encrypt and/or granularly extract and store based upon (i) event, e.g., save doc, log OFF, or (ii) time function; or (iii) user activated switch for encrypt and/or granularly extract and store.

A.19 CONTROLLED RELEASE OF EXTRACTS AFTER VERIFICATION

The invention provides a system and method for controlled release of extracts after verification and validation. See sections B.7 and B.8 and the applications in sections D.2-D.14. One aspect of the invention focuses on release from storage of granular data pieces. The security risk is reduced by storing smaller and more granular pieces. The attacker needs to access few stores to piece together all the content. It in noted that after their splitting from a document or data stream, granular pieces of data may be processed using the Information Dispersal Algorithm.

The invention provides a system and method for controlled release of extracts after verification and validation. Controlled release of extracts will take place at once or in stages only after verification and validation of different identifiers including any of the following or their combinations thereof: Identification code (PIN); Biometrics; Past history; Chain of title of data extracts; Past projects user was involved in; Current projects user is involved with; and People user is involved with.

A.20 MULTI PURPOSE USAGE OF FILTERING AND EXTRACTION PROCESS

The present invention provides a system and method for multi purpose usage of the process of: filtering the elements in the data stream, the selected data is extracted, and dispersed to memories and reconstructing process—including an interface therefor. See, for example, section D.13 and the web-based process. The process of document or data stream filtering, extracting selected data, dispersing to memories and reconstructing process is created for different purposes. These purposes may be presented to the user in a pull down menu. The purposes include: (1) Archiving; (2) Compliance with policy and regulations; (3) Security; (4) Data searching/data mining; (5) Survivability; (6) Continuity of operations; (7) Replication/Copying; (8) Backup storage; and, (9) Information sharing. All potential applications or part of them can be presented to users in various interfaces including a drop down menu or in a different menu including a mouse menu. Presentation of a key or identity card including credit card etc. may be requested to enable access to manual or automatic processing of selected choices. In each case, the original document or original input data stream data is being analyzed at the content level.

The process includes: (a) the original data or data stream is split into different levels/pieces of data, created with the appropriate tagging and extracted to different memories. (b) split—the different data pieces are transferred to different memories, which will allow reconstruction or multi level reconstruction.

A.21 FILTERING AND COPYING "SELECTED DATA"

The present invention provides a system and method for of filtering the elements in the data stream, resulting in selected data, creating copies of the selected data and dispersing the copies to memories and reconstructing process—including a user selectable interface for activating such operation. The process of document or data stream filtering, extracting selected data, dispersing to memories and reconstructing process created for different purposes includes:

(a) in each case, the original document or original input data stream data is being analyzed at the content level; (b) the selected pieces of data are copied then (c) appropriately tagged then (d) the different pieces are extracted to different memory stores, which (e) will allow reconstruction or multi level reconstruction.

A.22 COMBINED PROCESS OF EXTRACTING PART OF THE "SELECTED DATA" AND COPYING PARTS OF THE "SELECTED DATA"

The invention includes a system and method for multi purpose usage of the process of: (a) filtering the data elements in the data stream, (b) resulting in selected data, (c) extracting and removing part of the selected data while (d) copying other parts of the selected data for further processing. Copying selected data, extracting data, dispersing to memories and reconstructing process—are all actuated by a user controlled interface—such as a pull down menu.

For each of the purposes specified below, the original document or original input data stream data is being analyzed at the content level. The selected pieces of data are either: (1) Copied then appropriately tagged then the different pieces are extracted to different memory stores, which will allow reconstruction or multi level reconstruction. Or (2) Split from the original document the content pieces may be appropriately tagged then the different pieces are extracted to different memory stores, which will allow reconstruction or multi level reconstruction. Presentation of a key or identity card (including credit card data) to enable automatic processing of selected choices.

A.23 DATA MINING SEARCH RESULTS BASIC

Distribution as Multi Level Security Versions

The present invention can be configured as a data mining tool for search results which are distributed in multi level security versions, a search—creating automatically key words, a continuous data mining with query refinement; an automatic continuous search—with divergence and convergence, and with distributed data mining.

The present invention provides a system and method for search results distributed as multi level versions. The KE engine (section C.2-C.23) can be combined with the multi-level security system per sections D.4-D.9. There is a need to enable a user with a security clearance level and a specific role to search documents, data streams, data bases and data repositories that are at varying security levels which he is not allowed to access. The problem can be overcome by allowing a search to takes place in the different databases. This invention provides a system and method for multi level scrubbing and distribution of multi level search results Search takes place in all data bases—a multi level security guard is positioned at gateways scrubbing all results generated from the different sources/databases. User gets results scrubbed to his level of access. The system can be positioned as a guard at the gateway of the search process. The system scrubs the search results or scrubs a copy of the results in such a manner that every user gets a version of the resulting document according to his clearance level, or role. The results of the search are (1) sanitized and versions are created that correspond to the user security level and role or (2) a sanitized remainder document is prepared and granular data will be released into it from storage store or stores, local or remote.

Presented herein is a multi level filtering and dissemination system and method of search results and search hits. The searching takes place in different security level databases. In situations where the search is conducted by a search engine that delivers at first summaries or hits of documents, the following process will take place: (A) The result/hits pages are opened. (B) Each page is filtered; (C) Selected words are tagged and extracted; and (D) MLS—multi level security is enforced for distribution to the users. Each user sees only what his security clearance level permits him to see. The summary of the search hits may also filtered creating words that are tagged by different security clearances. Each user then will see words in the summary of hits that he is allowed to access at his clearance level

A.24 DATA MINING

A Search Creating Automatically Key Words

The present invention provides a system and method for automated search engine with automated creation of key words. Reference is made to sections C.2-C.23, particularly C.9, C.10, and C.22, C.23. Documents are the core of the "knowledge economy." Finding documents in an organization or enterprise is a tough challenge because of the ocean of information. The challenge is even harder trying to find the needed information outside the organization, including searching open source information on the Internet. Since it is hard to locate relevant information studies show that more than 50% of data existing in the organizations is recreated. A filtering system is presented herein to remove and to locate relevant documents/data streams from daunting volume of documents in an organization as well as open source data.

The system and process can be pre-set to automatically trigger a keyword search in which the keyword/search items are not submitted by a person into the search engine, but submitted by an automatic machine process after a body of content, like a document/paragraph or other data stream, is fed into the machine. The machine analyzes the content of the data stream and, based on preset filtering processes, locates the key words and submits them to a search engine or multiple search engines. Different key words may be added to the search that are not included in the processed data stream. The triggering starting point: A search may be triggered by a user dragging a document/paragraph/line into the search engine, copying content into the search engine, or through an automatic feed of data into the search engine, for example an automatic feed of news articles. Selection of search key words: The system analyses every word character icon image and categorizes them. The system selects the ones, which match the predetermined rule set and routes them to a search engine for a search. Words, characters and icons images that are not recognized by the filtering and categorization process may be categorized as "unknowns" and sent as key words to the search engine. Reduction of relevant search results: Results of the search may be processed (by use of a filter or filters) to reduce noise and deliver most relevant results.

A.25 DATA MINING

Continuous Data Mining with Query Refinement

The present invention provides a system and method for automated non-stop data mining cycles with query refinement. Data mining triggered by key word or document feeding into search engine. Search results are filtered again to find new keywords so another search will take place. As results are submitted they are automatically filtered by preset filters and new keywords are located and sent to search engine. Selection of key words: All key words may be sent to search engine. It is more practical to implement an n word automatic (possibly manual) selection of most relevant keywords for the search process. Different filters may be used. Categorization filters may be used—if data in originating document (or other process related documents) where granularly categorized—selection of specific categories may be enforced in the filter. For example: "select only names and locations"—This will reduce the number of key words only to those, which are names and locations. Other filters (sieves) may be used for example; "select only items with a high sensitivity level tagging" then only items such as Top Secret will be selected. Selection of range for key words: To focus on creating key words for search from specific content area within the data stream ranges of operation will be set. The range defines an area within a document; data stream within that area key words for search will be located, selected and fed to search engines. Ranges can be created automatically based on categorization of items within the data stream.

The inventive system and process may also be set for dispersal to storage of a federated data search/mining operation. Filtering options and combinations for sending keywords to search engine include: (1) Word list—a dirty list filter; (2) Group word list—a list of groups of words representing some context possibly a concept; (3) Categories—filter based on selection of specific pre-selected categories (like names, locations); (4) Security level—a filter based on selecting a specific security level (Top Secret tagged content or Secret tagged content); (5) Range—A meta filter determining what content area in a data stream would be the focus of the search. (tear line); (6) Scope—A filter selecting what extracted words in the selected range; and, (7) Other key words for a joint search may be presented.

A.26 AUTOMATIC CONTINUOUS SEARCH

With Divergence and Convergence

The present invention provides a system and method for storage with an automatic data search/mining operations (convergence). Automatic data search and mining operations in a data store is triggered by data residing within the data store. Keywords are selected and sent to search engine or engines. Data search mining is triggered by key word or document fed into search engine. Search results are filtered again to find new keywords so another search will take place. Other inputs triggering an automatic search may be sent from other sources including other storage stores, thereby creating a federated search. The data search mining operation may continue on an ongoing basis. The user has the ability to set the system ON for a continuous, non-stop cycle of filtering keywords and feeding them to search engines. The user may set the system ON for a set number q of search cycles. (e.g., stop after 5 cycles). The user has an ability to control cycles by establishing a time (cycles stop after 30 minutes). All results are filtered to reduce noise and achieve a high level of relevancy. Results may be matched to words in the originating data stream to insure relevancy. Data search results or other input of the storage store may be sold, bartered exchanged with others.

Currently, data storage is cheap yet there is minimal usage of data in storage. When data in storage is used, the data has added value for the enterprise. The system data mines unstructured data and enables the enterprise to sell search results, or combine newly discovered data with enterprise data, for a synergistic resultant data of higher value. The sale or barter of data may be for a price.

A.27 DISTRIBUTED DATA MINING

The present invention provides a system and method for distributed data mining. Running search operations from dispersed locations both for security as well as better coverage and expansion of select content SC data. For security reasons, searches should take place from different dispersed locations, in order not to enable a compromise of the data. (for example a compromised insider at Google can know all the subjects that are searched by a person or organization).

A.28 CONTENT INFERENCE ENGINE

Basic

The present invention can be configured as a content inference engine with the following features: (a) an inference engine searching for the unknowns; (b) securing information sharing with an inference engine; (c) an automatic web data inference crawler robots; (d) changeable data classifications based on content inference threats; (e) search operations creating new continuously growing digital data streams; (f) distributed searches from different storage node; and, (g) storage of separated data pieces in one location

A.29 AN INFERENCE ENGINE

Searching for the Unknowns

The present invention provides a system and method for Data Inference Engine with Divergence data search focusing on "Unknown" data, that is, data which has not been identified by the initial set of filters used to process the source doc or information file. The objective is to locate hidden data and to infer data therefrom that is identifiable and relevant. The system locates documents, which the are related to the initial document, each other by context or concept. The search takes place in structured as well as unstructured documents. See the KE engine in sections C.2-C.13 and C.20-C.23. Data search mining is triggered by key word or document feeding into search engine. Search results are filtered again to find new keywords so another search will take place. Known key words are removed by the filters or given low priority—unknown keywords are sent to the search engine.

The user can set the system ON for continuous, non-stop cycle of filtering keywords and feeding them to search engines, set number of search cycles (e.g., stop after 5 cycles), and control cycles by establishing a time period. All results are filtered to reduce noise and achieve a high level of relevancy. Results may be matched to words in the originating data stream to insure relevancy.

A.30 SECURING INFORMATION SHARING WITH AN INFERENCE ENGINE

The invention provides a system and method to establish an information sharing environment counter-balanced by inference searching. Information sharing environments may be open to security risks therefore it must be counter-balanced by content inference searching and testing operations that will enable the sys-admin to identify a threat so that the security threat can be reduced. Therefore, search engines/inference engines must work constantly in a plain text environment. Different information sharing projects have been shut down because the data acquisition systems where a threat to privacy. Data mining is a constant threat to privacy and leads to many instances of identity theft. This invention provides a system and method for protecting privacy and security in data mining and information sharing operations.

The invention protects privacy and security by controlling the access to sensitive content. The sensitive information is defined by the inference engine. Documents and data streams are filtered by the inference engine, granular data is selected, (and may be extracted to distributed stores). Granular pieces of data are released by a controlled mechanism to avoid security and privacy breaches.

A.31 AUTOMATIC WEB DATA INFERENCE CRAWLER ROBOTS

The present system is a method for automatic crawling robots-spiders locating data and locating threats to data and minimizing the threats including scrubbing web sites. Automatic agents, robots, mobile code analyze data in documents, data bases and data streams. Using inference capabilities, which may include artificial intelligence, the system locates users' private data which may lead to a threat of compromising his other data his privacy etc.

The system can be configured to remove the threatening data. Removal of threatening data with the option of reconstructing it back upon presentation of proper identification and security clearance. Automatic robots, mobile code, may be used to crawl web sites, data centers, directories, and data streams on a continuous or part time basis. Consumer reports may be generated and sent confidentially to users. Thereafter, the user may demand that the web sites, data centers, directories, and data streams maintain user data in a confidential manner consistent with data privacy laws.

A.32 CHANGEABLE DATA CLASSIFICATIONS BASED ON CONTENT INFERENCE THREATS

The present invention provides a system and method for flexible changeable classifications and security classifications, with optional inference penetration testing. A system and method enable the user to change security classifications on the fly. Security levels of a document or data stream are upgraded or down graded based on the results of inference tests.

Due to the overwhelming ocean of data in an organization and in open source data, data classifications, and especially security classification, should be changed on the fly as new data is being integrated discovered and fed from search results. What was "secret" in the past (and important and critical) may now be public information and the value of the data may be lost. Data that was classified at a low priority may need to be upgraded as new information is analyzed. The system can be automated to change classification levels. Classification levels change and tags or labels change as well as security classifications based on results of content inferencing penetration testing. This present invention provides a system and method for on the fly change of classification including security classifications: (A) Data that is classified at a specific security level for example "Secret 'may be used by an attacker an insider or outsider to search that classified data against open source search engines or other databases. The results of such an inference attack may lead to new information about the classified document that is more secretive than the security level assigned to it. For example, an inference search might yield names and locations that where extracted from the "Secret "document in such a case the base classified document should be classified at a higher security level than "Secret." The system presented will conduct inference penetration test based on the level of sensitivity of the located information the security clearance level will be upgraded.

Since data is constantly changing, real time analysis must take place on an ongoing 24 hours effort. The user requesting access to the data will receive data not based on the old security clearances of the document but based on the up to the minute update. The system and method may be automated based upon enterprise informational policies.

A.33 SEARCH OPERATIONS CREATING NEW CONTINUOUSLY GROWING DIGITAL DATA STREAMS

The present invention provides a system and method for automatic data mining operations creating new intelligent digital data streams/entities. Automatic data search mining operations create a wealth of information. A wide net is cast and many documents data streams are located. A filtering process is used to deliver most relevant results. On going search operations create a digital data growth which can be described as a growing tree with branches that are constantly growing and branching out. In essence new intelligent digital data streams are created on the fly around a "content target." The term "content target" is defined as a "concept" which may grow in different directions based on results of the data search operations. The invention provides a system and method for automatic addition of relevant search results to the "content target." Automatic scanning of data within a computer, data base, or network nodes results in analysis of content. Identification of, among other things: (1) what are the critical elements of the data and/or; (2) what elements of the data need more relevant data including updated data. Then, the system automatically searches for relevant data to update or to add to the targeted data. The addition of data can be in the form of an attachment, a URL, a meta tag or data in different formats or linked by different methodologies. The analysis process can be done in various ways including the use of content filters.

A.34 DISTRIBUTED SEARCHES FROM DIFFERENT STORAGE NODES

The present invention provides a system and method for distributed searches and establishes an interaction between distributed storage stores with data mining operations. Distributed storage stores each individually carrying data mining operations can yield a vast body of distributed data and knowledge. An infrastructure for interaction between stores is presented herein. The infrastructure enables sharing of data sharing of key words in order to enable better more comprehensive data search operations. For example, if one store stores data on a subject A and another store stores data on subject B, sharing of key words or data between the stores will enable better key word searches. In essence, searching in different stores (each one with its own subject matter) results in more robust search results.

A.35 STORAGE OF SEPARATED DATA PIECES IN ONE LOCATION

The invention provides a system and method for storing different data extracts in one storage location. The system and method stores extracts of a data stream in different memories within one storage location. There is a major difference between splitting a document or a data stream and placing its parts in one storage location and this invention, which deals with placing extracts of a document or a data stream in one storage location. This invention deals in a situation that a whole data asset was already parsed—and split into a "remainder" and "extracts". What is transferred to one storage location is not all the pieces of a whole document or data assets but partial part of the whole the "extracts." The storage location can be one computer one storage node or other medium that is located in one physical location. To overcome security risks, the extracts in the different memories within the one storage location may contain protective elements which make it very hard to match the different extracted pieces together to create an original data stream. Those protective elements may include adding a substantial amount of additional data assets that will create chaos. It will be a major obstacle for an attacker to locate the original extracts and piece them together. Another protective measure is to encrypt each of the extracts in the different memories and store their encryption keys in a different storage location. An attacker who will penetrate the extract storage location will need the encryption keys in order to access the content. The encryption key or keys may be split in a secret splitting scheme. In essence, m out of n keys will be needed to access the content of the extracts in the different memories. The storage location can be also software storage without a physically defined location.

A.36 STORAGE OF GRANULAR DATA STREAMS

Basic

The present system and method can provide for configuration of granular data streams and dispersal to distributed storage stores; shuttling of data and granular data streams between distributed storage stores; replication of granular data streams with minimal security risk; and, anonymizing classified and unclassified storage stores.

A.37 CONFIGURATION OF GRANULAR DATA STREAMS DISPERSAL TO DISTRIBUTED STORAGE STORES

The present invention provides a system and method for control of data extracts in dispersed storage environment. A granular data stream is defined as the extract and/or remainder data filtered from an original data stream. The filter may process the original data stream by content filter or other filtering methods. Granular data streams are filtered and the results or parts thereof form bigger data streams. The resulting granular data streams may be extracted or copied for further processing and storage. To achieve high levels of efficiency as well as security, a set of configurations is required to enable maximization of benefits in processing and storing granular data streams a distributed environment. Since granular data streams are part of a bigger data stream—the granular data stream location need to be entered into a map or directory of the full data stream to maintain context. Configurations—may include: how many storage locations are available, what would be transferred to each storage location, and when. The storage nodes may be simple storage nodes, or smart processing storage nodes. Enterprise policies set data processing rules for the info infrastructure based upon who, where, what, when, why, and how much-how little (quantity).

A.38 GRANULAR DATA STREAM TRANSPORT

The configuration of granular data streams transport to storage may include a selection of what type of data streams will be sent to which storage. The selection may be done randomly, or according to the types and or categories of content, specific key words in the granular data strings are going to be shuttled. The data storage facility may be selected at random or via an algorithm to enhance security. Storage by data class is discussed later. The configuration will also include locations of storage on the network. Special configurations will need to handle searches combined from key words in the different extracts, which might be in the same storage node or on other nodes. The configurations will cover the different possible permutations of combinations of which key words in the extracts may be sent as a combination to search operations and in what order.

A.39 SHUTTLING DATA AND GRANULAR DATA STREAMS BETWEEN DISTRIBUTED STORAGE STORES

The present invention provides a system and method for data asset interaction in a distributed network. Shuttling of data, including granular data streams, between distributed storage locations for data mining purposes (and other purposes such as add on to other data streams) causes chaos which increases security. Creating network paths/"road infrastructure" between storage stores so data and granular streams can move (1) when requested, or (2) on a scheduled basis, or (3) upon certain events (see attack application in section D.3).

The method and system also processes data and granular data streams from different distributed stores. The combined processing of the data may include cleaning the data, extracting, and packaging it for data mining search operations and other purposes. Artificial intelligence may be used in this process. Creating a "chamber" or "compartment" for processing data and granular data streams from different distributed stores is possible with the system. The combined processing of the data may include cleaning the data, extracting, and packaging it for data mining search operations and other purposes. Artificial intelligence may be employed.

A.40 REPLICATION OF GRANULAR DATA STREAMS WITH MINIMAL SECURITY RISK

The present invention provides a system and method for granular replication enabling the user access to many copies with minimal security risk. It is common practice that to achieve reliability there is a need to store a few copies of the data. The problem is that the bigger the number of copies made the bigger is the security risk. The invention splits a data stream into granular pieces replicates those pieces and disperses them to distributed storage. The security risk is minimized and can be controlling the size of the granular data pieces and their number.

The invention also proposes a new architecture for storage on the internet. The invention enables a user to make as many copies as he wants of a document or data stream with minimal amount of security risk If a storage node is attacked a small granular piece will not pose a serious threat. A small granular piece does not convey all the substance of the original document/data stream. If the replicated piece is small enough the attacker will find it useless because it is out of context. For example, a granular piece of data which is a name only can't create a serious threat because it is out of context. Other stores need to be attacked successfully to access their data to give context to the small granular data piece. The security risk of having many copies can be reduced by the user decreasing the size of the granular pieces and dispersing the different pieces to different distributed storage store.

A.41 ANONYMIZING CLASSIFIED AND UNCLASSIFIED STORAGE STORES

The invention also provides a system and method for not labeled, non security classified security storage stores, in essence. incognito storage stores. The storage stores may hold highly sensitive secret data but are not labeled with a security label or identifiable risky tag to avoid attacks. The classification of the storage store may be recorded at a distant location, which can be a registry, an index or a map. Data or granular pieces of data (split from a data stream) are stored in dispersed storage locations including Internet URLs. The different storage locations are not labeled or not labeled in a way that will lead to a possible attack. Sensitive storage stores that are commonly tagged with security or hardened classification at their physical location, like Top Secret or Secret, will not be tagged, tagged in a way that maintains their anonymity. For example, the data is labeled or tagged with a number, in a way that its content will be unknown to potential attackers.

A.42 CONTROLLED RELEASE OF GRANULAR DATA STREAMS

Granular Data Manipulation and Control

The present invention provides a system and method for granular data control and manipulation. Granular data control is defined as: the ability to manage manipulate and control granular pieces of data within a data stream or information file in order to achieve certain results. The result of such a process is the creation of new granular data streams or structured data. A granular data stream is defined as the extract data and/or the remainder data filtered from an original data stream. The filter may process the original data stream by content filter or other filtering methods. The resulting data or data stream can now be used or manipulated for different purposes. The resulting data can be presented in different formats to enable maximum data manipulation. For example, in one format, the resulting filtered data can be put into a matrix as structured data. Assuming a content filter was employed, and the filter also included tagging or labeling for categories (taxonomic filter), one axis of the data matrix may represent source doc markers and placement markers, the other axis may represent category groups (names, locations, and social security numbers), and the data in the matrix shows the critical sec-con or SC data, that is the granular filtered data elements form the source doc.

The granular content elements in the matrix can be manipulated manually or automatically based on pre-set rules and or configurations. Granular data manipulation and control enables the user to achieve different tasks including:

(a) Privacy; (b) Security; (c) Secured Information sharing—Multi level security/cross domain data sharing; (d) Compliance; (e) Survivability; (f) Continuity; (g) Secured backup; (h) Granular data replication; (i) High relevancy searches; and, (j) Creation of tags and meta tags.

The process for creating the info infrastructure described above in this Part A (A.1-A.3) establishes this granular data control and manipulation and use of the system tools to create the structured data and to implement the enterprise policies for tasks a-j with pre-set data processing rules.

A.43 SANITIZATION PROCESS WITH INFERENCE FILTERING

Basic

The present method ad system can implement a sanitization process associated with inference filtering of the source doc of information file. This process includes (a) process for sanitizing data on the network for privacy security and survivability; (b) automated sanitization of important data; (c) sanitization of non-important data; (d) release of granular data streams in lieu of access identifiers; (e) release of granular data streams in lieu of consideration; and, (f) secured release of granular data streams to multiple display screens.

A.44 PROCESS FOR SANITIZING DATA ON THE NETWORK FOR PRIVACY SECURITY AND SURVIVABILITY

The present invention provides a system and method for sanitizing data on the network for different purposes including: privacy security, compliance, information sharing and survivability. The sanitization process includes the following process modules: (1) First stage: filtering the input, original data stream, and locating important content items (sec-con or SC data) that needs to be masked or extracted. (2) Second stage: implementing an inference process to verify if anything can be inferenced from the sanitized data stream. (3) Optional third stage: masking or extracting more data items from the sanitized data stream based on the threat results (inference analysis) of the content inference process. The risk analysis can employ the risk modules from U.S. patent application Ser. No. 10/396,088 filed Mar. 25, 2003 which is incorporated herein by reference thereto. Alternatively, the first level output report in FIG. 12c and the tree or second level output report in FIG. 12d for the life cycle engine may be employed to assess risk by inference. See sections C.9-C.13 and C.23.

The user's network and data storage facilities need to be sanitized to defend against different types of attacks. Granular data items are extracted from the network and stored at dispersed storage locations. See sections B.1-B.6; see also, sections D.3-D.6 and D.11. The objective is to make the network "formless" to achieve, from order, a creation of disorder, so the attacker does not know what and where to attack. "Formlessness"—is the answer against virus attacks, Trojans worms/inference attacks, covert channels and insider attacks. The theory is to erase the user's digital foot prints while finding and inferencing the competitor's footprints.

The extracted granular data streams may be dispersed to storage or to distributed storage stores. The dispersed granular data streams will be tapped or retrieved for (1) reconstruction of the document (full or partial reconstruction); and, (2) to allow more data search needs.

A.45 AUTOMATED SANITIZATION OF IMPORTANT DATA

The present invention presents a method and system for automated sanitization of important content (sec-con or SC data). Data, content including data, and content over the network must be sanitized on ongoing basis to stop insiders attacks, Trojan and spyware, content inference attacks and other damage. Minimal information is exposed with the present system and methods. Optionally, upon presentation of identification by users, layers of data will be reconstructed. For higher security, information search operations need to take place in distributed storage stores/nodes, and users work mostly offline.

A.46 SANITIZATION OF NON-IMPORTANT DATA

The invention provides a system and method for automatic removal of non-relevant and unneeded content from information files. Automatic scanning and analysis of data within a computer, database, or network nodes is processed. Identifying data that might be not be relevant or needed is located. Extracting that data and removing it to a storage location or assignment of destruction-deletion codes is part of the info infrastructure. Data that is not relevant or not needed may include: (a) out-dated data; (b) data not relevant to the core document or data stream; (c) data not relevant to the user's organizations task and mission; (d) data files having mistakes therein; (e) data that takes too much space; and (f) data that may confuse the users or others. The data removed to storage (extracted and remainder data) may be indexed for reconstruction at a later date.

A.47 RELEASE OF GRANULAR DATA STREAMS IN WITH INCREASING LEVELS OF ACCESS IDENTIFIERS

The present invention provides a system and method for controlled release of layers of data for different access identifiers. A granular data stream is defined as extracted data and/or the remainder data filtered from an original data stream. The filter may process the original data stream by content filter or other filtering methods. Controlled release of layers of granular data streams filtered from an original data stream is permitted only after different access identifiers are presented. See sections B.7-B.8 and Part A herein above. As an example: release first granular layer like a paragraph after presentation of fingerprint, release of second paragraph after presentation of pin number, third paragraph released for retina scan, fourth paragraph released by secret sharing scheme need—other person to be online with his identification to enable a release.

A.48 RELEASE OF GRANULAR DATA STREAMS AFTER OBTAINING CONSIDERATION

The present invention provides a system and method controlled release of layers of granular data for different considerations received by the disclosing party or enterprise. A granular data stream is defined as the extract data and/or the remainder data filtered from an original data stream. The filter may process the original data stream by content filter or other filtering methods. Controlled release of granular data streams including data pieces and data extracts is provided layer by layer, after verification different criteria including: identity, past history, verification of chain of title of the granular data stream, past projects user was involved, current projects etc. Release layer by layer for consideration obtained by disclosing party. For example—release first paragraph if user inputs name and social security number. Release second paragraph if requester inputs phone number. Release third paragraph if user inputs name of friends or delivers what he is being asked to deliver. This invention provides also a system and method for controlled release of layers of data or granular data streams for different monetary considerations. See sections D.5 and D.6. Controlled release of layers of data for different monetary considerations. For example: Release of first granular layer like a paragraph after payment of $1.50, release of second paragraph after payment of $2.00, third paragraph released for payment of $25.00, and fourth paragraph released after payment of a negotiated price. This invention also provides a system and method Controlled release of granular data layers for a combination of different considerations. Controlled release of granular data layers for a combination of different considerations. Each granular layer may be released for a different type of consideration. For example: Release first paragraph for a payment, release second paragraph after biometrics identification, release third paragraph after— filling some information.

A.49 SECURED RELEASE OF GRANULAR DATA STREAMS INTO MULTIPLE SCREENS

The present invention provides a system and method release of granular data layers different computer screens. A granular data stream is defined as the extract data and/or remainder data filtered from an original data stream. The filter may process the original data stream by content filter or other filtering methods. To avoid Trojans, spy ware, and other attacks, granular data layers of original data stream are released into different screens in one or in separate computers. For example: Top Secret data layers will appear on a screen of one computer while rest of data layers (sanitized document) will appear on another computer screen. See sections B.7-B.8. This invention also presents an overlay of granular data streams stored in different memories which memories can be in one physical machine or archived to a higher level of security in different machines.

A.50 ECOSYSTEM BASED ON "GRANULAR DATA CONTROL"

Basic

The present method and system can be used to establish an ecosystem with the following features: (a) an ecosystem for information superiority and survivability—based on "granular data control;" (b) a system and method for minimizing data exposure; and (c) creating "digital doors" in a data stream limiting access the content of the stream or information file.

A.51 ECO SYSTEM FOR INFORMATION SUPERIORITY AND SURVIVABILITY

Based on "Granular Data Control"

The present invention provides a system and method for an ecosystem for delivering information for superiority purposes and for data survivability purposes, based on "granular data control." In the digital paperless environment, the interconnectivity of networks and the Internet create new threats that can be compared to a battlefield. To achieve information superiority and data structure survivability, the present system integrates the following concepts into one ecosystem. The network or ecosystem must be able to protect itself and the data it holds. It must conduct its own surveillance and generate information in real time on threats, in essence, a command and control capability. The system needs to be able to defend itself and sustain itself throughout different types of attacks and disasters. The core, basic concept for information superiority and survivability is the need for constant data updating, gathering and its secured sharing. To maintain competitiveness and defenses, ongoing and continuous information searching, data mining and data inferencing and information sharing operations need to take place throughout the organization as well as outside the organization. A combination of some or all of the following processes and methods is the basis for information superiority and organizational survivability: (A) Creation of granular data streams. A granular data stream is defined as the extract data and/or the remainder data filtered from an original data stream. The filter may process the original data stream by content filter or other filtering methods. (B) Creation of content "Formlessness" by dispersing the granular data streams. (C) Dispersal and hiding of the granular data streams. (D) Compartmentalization of the different granular data streams. (E) Access check points at the storage stores/nodes. (F) Reconstruction of granular data streams into the original data stream or parts of it. (G) Multi level reconstruction of data. (H) Replication for continuity and survivability. (I) Constant search—for security and info superiority. (J) Content inference for penetration testing as well as locating relevant information. (K) Secured information sharing. (L) Automatic continuous growth of a data stream by addition of new search resulted data to it.

To achieve information superiority an organization's data/content assets to constantly grow and be updated in real time. Organizations and individuals data resources should be updated in real time. A comprehensive search and data acquisition and organization is key to the organization—like food and oxygen is key to humans and animals. There is a need for on going search throughout the organization. Every node on the in enterprise's network must be engaged in searching data—in essence supplying oxygen to the existing data assets. To deliver "competitive survivability," the search capability needs to constantly locate relevant information and update the existing data repositories. Presented herein is a system for continuous or part-time search all over the organization assets and outside data resources including the Internet, all with updates in real time. The system and method is an ecosystem for managing constant searches for (1) updating its data repositories in real time, (2) creation of competitive knowledge, and (3) to secure itself from content inference attacks and other attacks and disasters. The interconnectivity of networks and the Internet create a digital battlefield. The answer against virus attacks, Trojans worms/inference attacks, covert channels employs the present process and method. The present system breaks away from the model of perimeter security and adopts a model that has been used in the battlefield for many years. The invention delivers capabilities to transform order within the data content into disorder making it very hard for an enemy to attack.

The idea of "formlessness" is one of the core strategies of the battlefield as expressed by Sun Tzu. Formlessness calls for minimization of data, in essence, controlled release of data especially small granular pieces of data. In a formlessness environment, all extracts are dispersed all over in distributed nodes. The Ecosystem is in constant mode of searching to secure itself—against inference attacks—and to gain knowledge. Results of search are needed for security for (1) triggering more extractions, (2) more dispersal of data, and (3) gather more misinformation which confuses the enemy—within or without the enterprise.

A.52 SYSTEM AND METHOD FOR MINIMIZING DATA EXPOSURE

It is impossible to project and foresee all possible threats to a digital environment. It is impossible to do all permutations of possible inference attacks. Therefore, the invention presents a solution with the minimization of data. The invention provides a system and method for flexible content access based on rolling granular data exposure with decryption for added security. Granular pieces of the original document/data stream are dispersed to distributed storage nodes to enable a controlled secured environment for release of data. The granular data layers can be exposed one at a time decrypted instead of exposure of a total document.

A.53 CREATING "DIGITAL DOORS" FOR ACCESS AND CONTROLLED RELEASE IN A DATA STREAM

The present invention presents a "digital door" system and method for creation of doors in a data stream to achieve data control and management via management of granular data. A system and method for controlling data and content within a computer, a network, server or web site by management and control of data and data flows at the granular data level. Content and data are monitored and controlled as they exit through access control points (see FIG. 1a, 1b and sections A.1-A.3) as well as when data enters the ecosystem, that is entry into the network, computer, servers, storage or web site. Content and data are monitored by the system as the data is held in storage. The system may remove data from storage through the access control points for security reasons or for other workflow and processing needs. Access controls or passwords and sec clearance protocols may be applied sequentially, of concurrently of subsequently with respect to the extraction of data and storage of data. Hierarchical access controls are oftentimes used. Controlling movement and storage of data by monitoring content, analyzing its granular parts when needed and masking or extracting granular data streams and when needed and tagging data for infrastructure purposes. Enforcing information rights management (IR Mgt) processes to control movement and storage of the granular data streams is a function of the present system.

The system and method provides for management of data in a digital paperless interconnected environment. Controlling data is achieved by focusing on the granular elements of data (character, word object, sentence paragraph etc.). When extraction is used, the system adds to "granular data control" the attributes of physical and logical separation of data. The security aspect may be further enhanced by transfer of the extracted granular data streams into distributed storage stores. Creation of access control points or monitors in a data stream means, among other things, extraction of data from a data stream with the intention to reconnect the data extracted in whole or in part. Extracted data can be put in a package storage with or without encryption. The package may be tagged so to allow better management (IR Mgt) of the extracted granular data streams enabling fast reconstruction.

The process may include: First stage: filtering of the inputted original data stream, locating important content items that need to be masked or extracted. Second stage: implementing an inference process to verify if any thing can be inferenced from the sanitized data stream. Third stage: masking or extracting more data items from the sanitized data stream based on the threat results of the content inference process.

A.54 GENERAL ASPECTS

Basic

In general, the present process and system has the following additional features and characteristics: (a) automatic creation of a user or object's identification profile; (b) copying of filtered granular data and dispersing; and (c) combining extraction and copying for filtering of filtered granular data.

A.55 AUTOMATIC CREATION OF A USER OR OBJECT'S IDENTIFICATION PROFILE

The invention provides a system and method for automatic creation of a user or data object's identification profile. The profile will enable automatic interactions that will locate relevant content for the profile including its update without a need for additional input. The profile may be used as a guard and as a filter to enable or disable various transactions or communications related to the profile. The automatic building of a profile is done in different ways including scanning of data assets within a computer, database, or network nodes. Analyzing the content including use of content filters and selecting patterns which define the profiled subject. The system analyses each data asset, categorized its content, and give weights to the data asset. See the KE engine C.2-C.23. The data profile includes the type of content, which parties interacted the data assets, at which time and location (audit or log data). Who sent what type of data to the data asset, for what reason? What is the security classification level of the data asset, how many people have accessed the data, was it a private document or a private one etc.

A.56 COPYING FILTERED GRANULAR DATA AND DISPERSING

The system and method includes filtering data and copying the granular data results and dispersing them to distributed storage. The process filters documents and data streams and cops resulting granular data items for dispersal to distributed storage locations. Dispersal may be done for different reasons for security, privacy, compliance, backup, continuity, survivability, backup or just close access or plain archiving. Dispersal of copied granular elements can be done to different locations applications search engines. Any resulting filtered granular data may be filtered again producing different levels or different sub groups. The granular results can categorized tagged and sent to different storage locations for possible retrieval, full reconstruction or partial reconstruction. The filtering process may result in creation of sub groups of granular items, in essence more then one group of granular items. Those groups may be dispersed to distributed storage.

A.57 COMBINING EXTRACTION AND COPYING FOR FILTERING OF FILTERED GRANULAR DATA

A system and method includes features for filtering data, resulting in parts of the granular data being extracted and the other parts being copied based on security threats, compliance requirements and operational needs. Dispersal may be done for different reasons for security, privacy, compliance, backup, continuity, survivability, backup or just close access or plain archiving. Dispersal of copied granular elements and extracted granular elements may be done to different locations applications search engines. Any resulting filtered granular data may be filtered again producing different levels or different sub groups. The granular results can categorized tagged and sent to different storage locations for possible retrieval, full reconstruction or partial reconstruction. The filtering process may result in creation of sub groups of granular items, in essence more then one group of granular items. Those groups may be dispersed to distributed storage.

B.1 Basic Operational Theory of Secure or Select Data Storage

Figure 4:
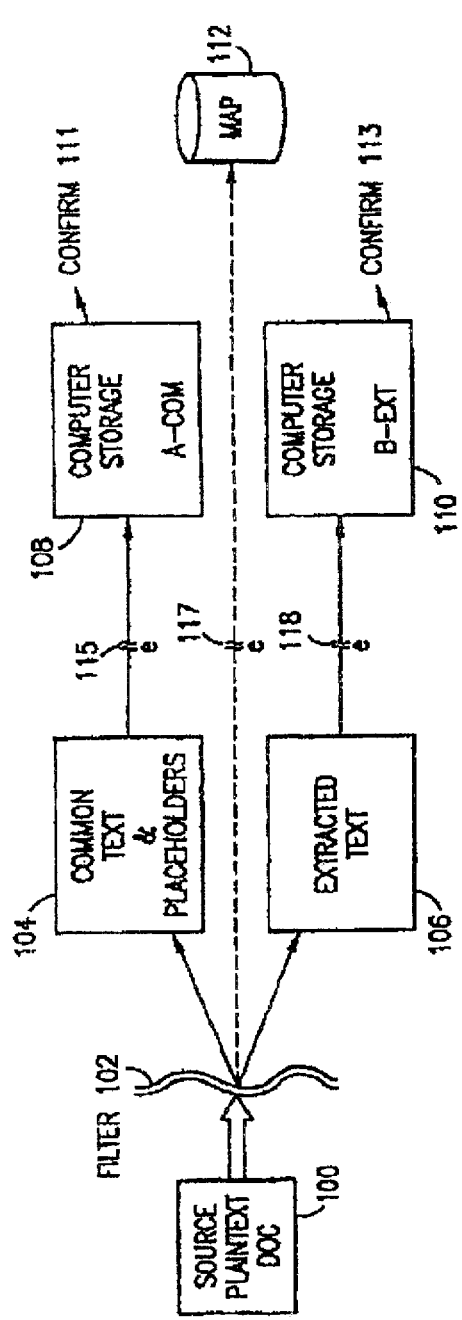
FIG. 4 diagrammatically illustrates a basic system diagram showing filtering and storing extracted data and remainder or common data and, in an enhanced embodiment, generating and storing a map.

FIG. 4 diagrammatically illustrates the basic processes for establishing a secure storage of information, generally identified herein as "data." The secure storage includes an extraction module and a secure storage module. "Data," as used herein, includes any data object, e.g., text, images, icons, data element, moving images, multiple images, data representing sound, video, electronic streams of information, etc. Sound bites and video images may also be extracted data. A source document 100 containing data, sometimes referred to as a "plaintext," is passed through a filter 102. Throughout this specification "source document" also refers to an information file containing data, particularly unstructured data. The module described herein operates on security sensitive content and operates on "select content," wherein select content is information which is deemed to be important to an enterprise. Select content may also be security sensitive content. In other words, select content has value, such as intellectual property IP value. Security sensitive content is deemed to be important in that its unauthorized release is some how detrimental to the enterprise. Although it is convenient to discuss and understand the invention herein in connection with a plaintext document, the document 100 is a data object. It is not limited to an electronic document representing words. The document 100 represents a data object that may be, e.g., text, images, icons, moving images, multiple images, data representing sound, video etc. The term "data object" as used in the claims is broadly defined as any item that can be represented in an electronic format such that the electronic format can be manipulated by a computer as described herein. The data object, or as discussed herein, the "plaintext" is sent to a filter. Filter 102, in a most basic sense, separates out common text or remainder data 104 from uncommon text, words, characters, icons or data objects. The security sensitive (or select content) words, characters, icons or data objects are separated from remainder or common text 104 as extracted text 106. It should be noted that although the word "text" is utilized with respect to remainder text 104 and extracted text 106, the text is a data object and includes words, phrases, paragraphs, single characters, portions of words, characters, whole or partial images, icons or data objects. In a basic implementation, filter 102 may utilize a dictionary such that words present in the dictionary (common words) are separated from the source plaintext document 100 and placed into remainder document or common data file 104. The uncommon words (extracted-security sensitive (or select content) words), not found in the dictionary, would be placed in an extracted text or extracted data file 106. For example, a business may wish to impose a security system on a contract document such that the names of the contracting parties (not found in the dictionary) and the street names (not found in the dictionary) would be stored in extracted data text file 106. The common text or remainder data would be stored in remainder data file 104. In the illustrated embodiment, remainder data file 104 also includes place holders which enables the extracted data to be easily inserted or set back into the remainder data file.

B.2 General Operation

Figure 9:
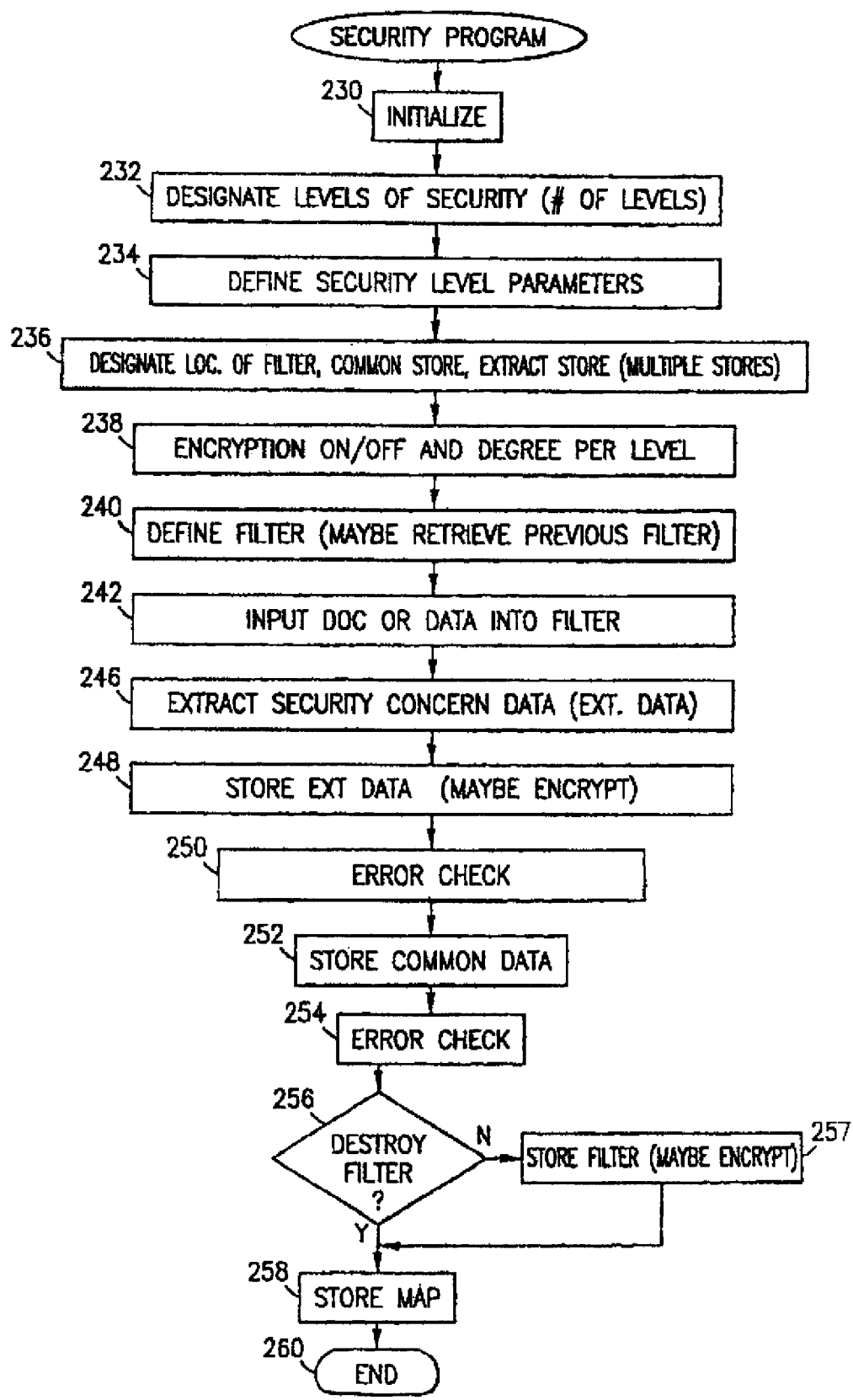
FIG. 9 diagrammatically illustrates a flowchart showing one embodiment of the principal portions of the data security program.

FIG. 9 diagrammatically illustrates the major components of a flowchart for the data security program and shows an extraction module, a content filter module and a secure storage module which can be modified to provide a select content SC module. Rather than operating a security system, the administrator (CIO) may operate a select content SC system to gather important or potentially important content in one location, with an audit trial to locate the source of the select content or "SC." It should be noted that this flowchart may be truncated to limit user selection of certain items. The system would be pre-set to contain these features. Step 230 initializes the system. Step 232 enables the user to designate various levels of security for the activity which he or she will soon engage. The system, in step 234, enables the user to define the levels of security parameters. The following Security Table gives some examples of the type of security that may be available to the user.

| Security Table |
| --- |
| to whom |
| to where |
| when (time of day, day of week, month, floating but predetermined time frame) |
| why (purpose, match purpose to other security parameters or to certain predetermined criteria) |
| how (through what medium (LAN, WAN, Internet, direct dial link), download to what site or destination) |
| how long (duration) the reconstruction process will be permitted per each security clearance level |
| how much (different security levels enable reconstitution of documents and data with different amounts of secure data therein) |
| timing systems may require synchronization for a standard clock (i.e., atomic clock) |

As an example of a truncated or pre-set program, a client-server system over the Internet may have URLs designating storage sites and an ASP 152 (FIG. 6) controlling storage. In this pre-set system, the user does not select the sites. The sites may be randomly selected by ASP 152. The ASP may use artificial intelligence AI to locate secure extract data storage sites. AI or inference machines can ascertain (a) traffic on communications channels, (b) storage limit issues, (c) transmission failures in the communications links, and (d) the degree of security necessitated by exterior events, i.e., terrorism alerts, virus alerts, war, data security warnings posted by trusted sources, MicroSoft, Norton, NASA, DoD, CDC, FBI, etc. Higher security alerts trigger the AI configured storage locator and facilitator to locate memory stores in higher secured places. These higher security facilities may be more costly, may be located in more stable countries or on more stable servers and may have greater degrees of encryption capabilities.

The user, in step 326 can designate the location of the filter, the common storage area for the remainder data, the extraction data storage and potentially multiple data storage areas or segments. The user may enable an AI filter design. Step 238 permits the user to engage or disengage encryption and, if engaged, establish the degree of encryption for the system. Step 240 enables the user to define the parameters of the filter. The user can retrieve a preexisting filter or may define a new filter for each data security session. These filters may consist of dictionaries or any type of compilation of words, characters, icon, data objects or pixel formation or any indication that can be perceived by the computer system. These are called content filters. Granular extraction of data elements (or SC) in a data object may be permitted. Step 242 recognizes that the user either inputs a preexisting plaintext document or types data into the system. In any event, the plaintext document is fed through the filter. Step 246 extracts the security data or SC data from the input document. Step 248 stores the extracted data. The extracted data may be encrypted prior to storage. Step 250 conducts an error check on the extracted data. This error check is helpful in discerning problems in the storage of the data prior to closing down the data security system. Step 252 stores the common data or the remainder data. Step 254 conducts an error check on the common or remainder data. The decision step 256 determines whether the user has selected a "destroy filter" command. If not, the filter is stored with or without encryption in step 257. If YES, the filter is destroyed with a deletion routine. Typically, deletion is complete erasure of all traces of the file including, in high security systems multiple write-overs or disc reformatting. Step 258 stores a map. The map may be stored locally or remotely as described earlier. This is the map module. The system ends in step 260. All traces of these data elements or objects may be swiped clean or removed from whatever computer system generated the data objects or processed them, other than the memory storage locations. Deletion of data also includes the concept of deletion of data transmission paths, URLs, storage site locations and all temporary memory stores. Deletion of file location in the root directory of hard drive 168 of computer 140 is preferable in high security systems.

Figure 10:
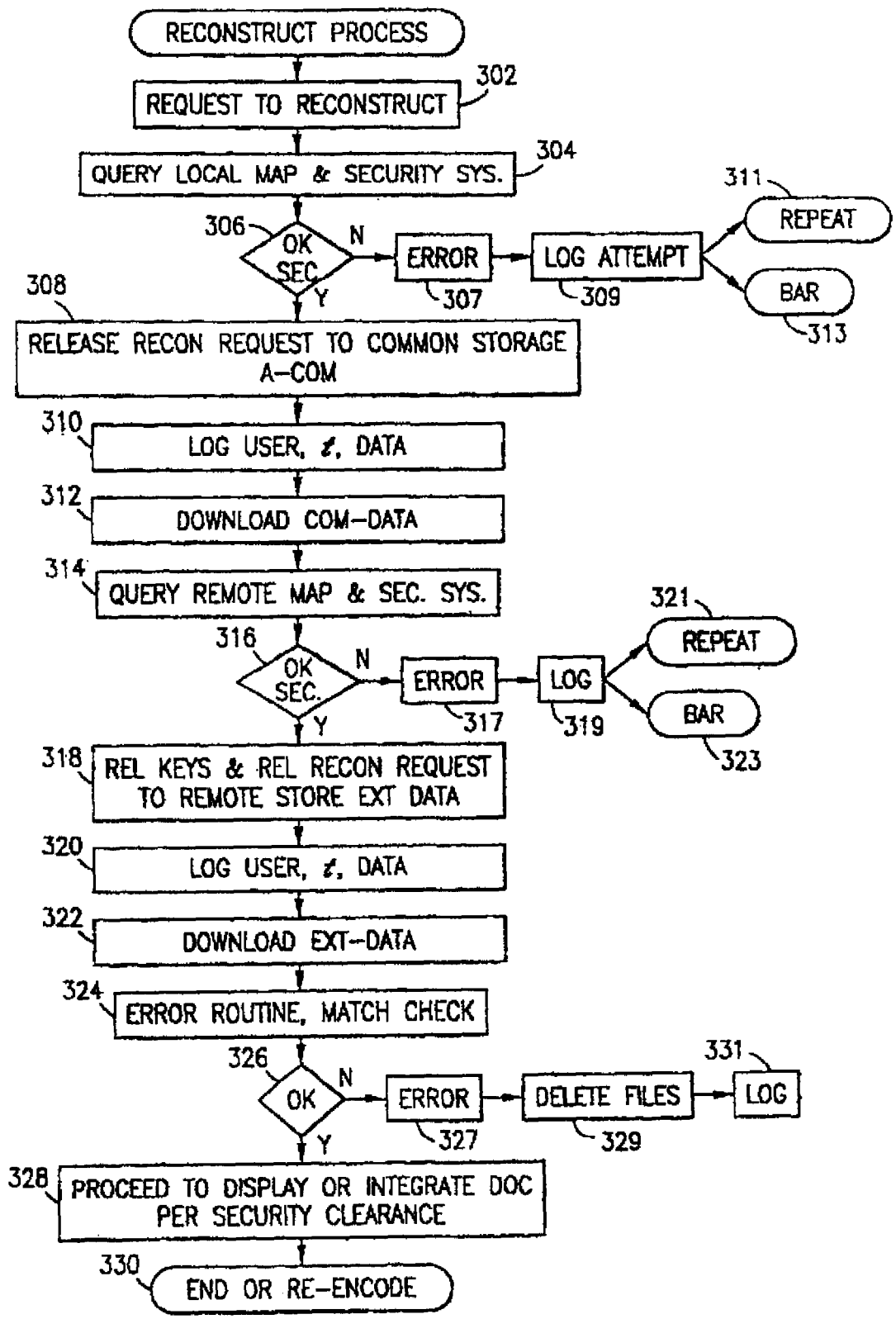
FIG. 10 diagrammatically illustrates a flowchart showing the basic elements of the reconstruction process for the data security program.

FIG. 10 diagrammatically illustrates basic flowchart features for the reconstruction process. The reconstruction process, although not shown in the flow chart for the info infrastructure, is a module that runs in conjunction with the access-permission-control module. Step 302 accepts a request to reconstruct the secured data. In a select content system, a search for the SC is initiated. Step 304 queries a local map and the security system or protocol. In a preferred embodiment the user would have to input several passwords, one of them being a local password on computer 140. A local map which may be accessed only through the password, may simply identify the URL of server 152. Decision step 306 determines whether the local password is acceptable. If not, and error step is indicated in step 307, the attempt to log on to the security system is noted in step 309 (an audit trail), and the system either branches to repeat step 311 or bars the user from further activity in step 313.

Figure 5:
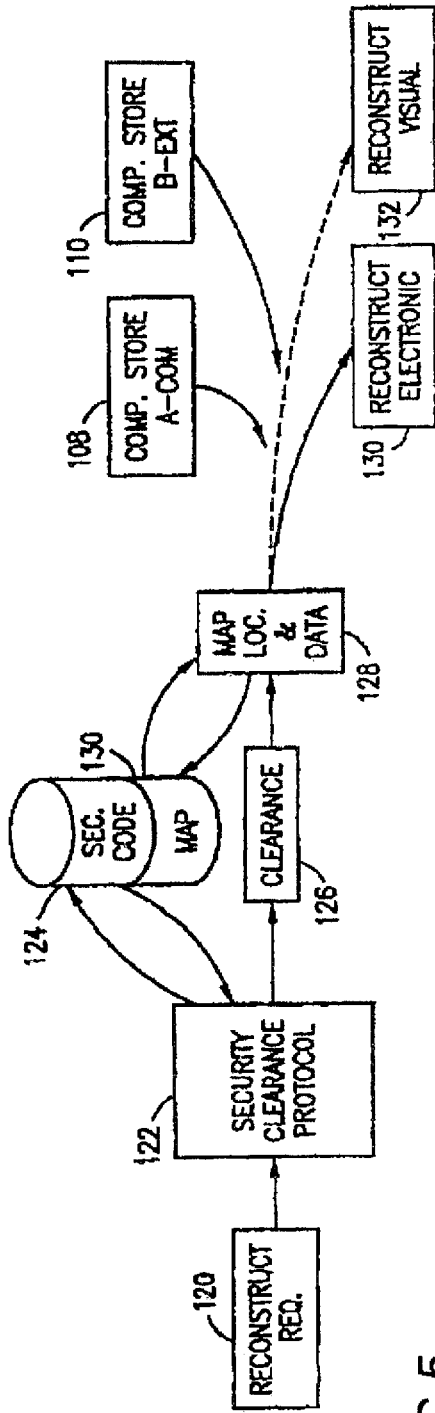
FIG. 5 diagrammatically illustrates a system diagram showing reconstruction of the data, various security clearances and both electronic reconstruction and visual reconstruction.
Figure 6:
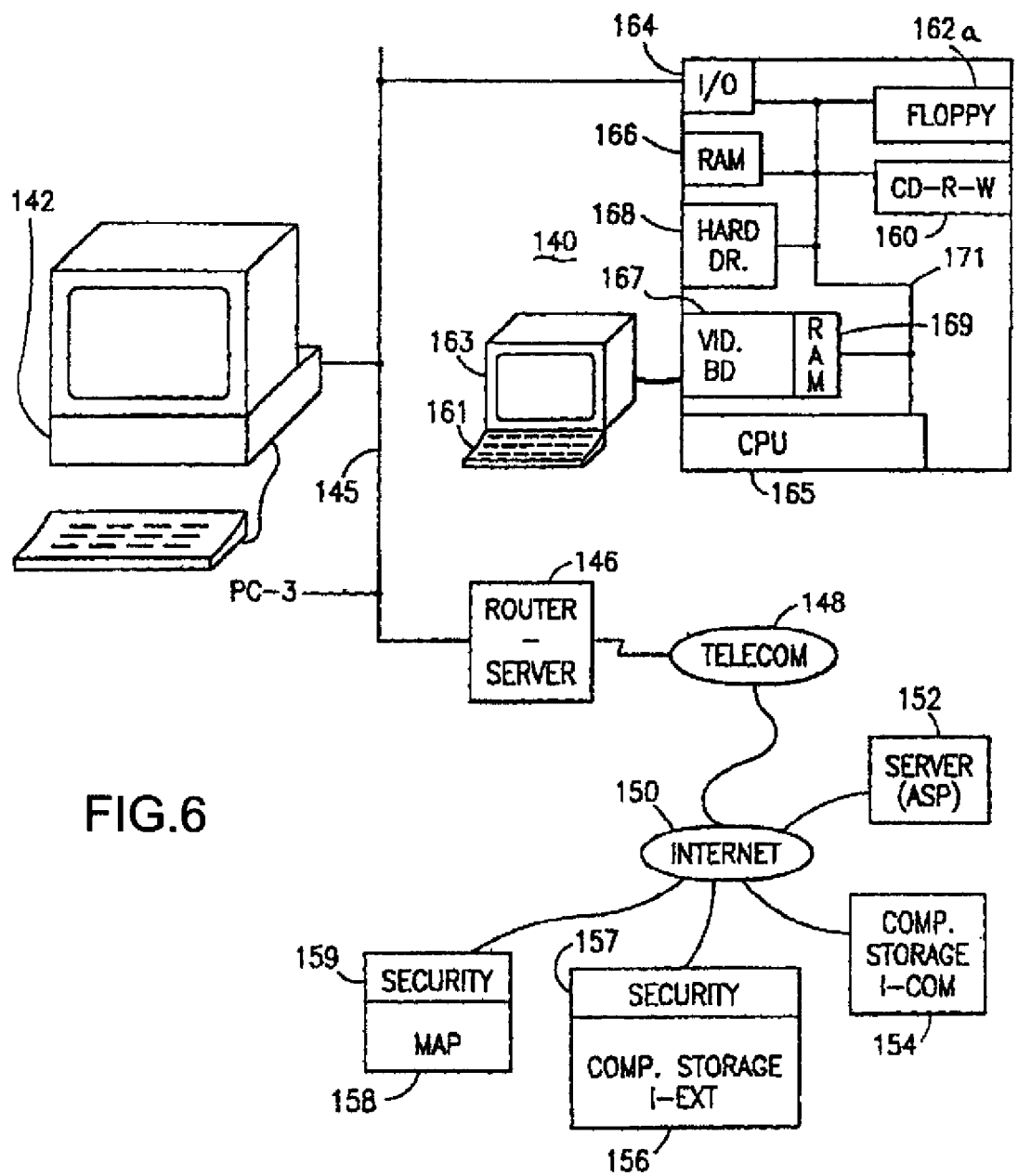
FIG. 6 diagrammatically illustrates a system showing major components of a single personal computer (PC) system, a networked system with several PCs (a LAN or WAN) and the network coupled to a telecommunications system and the Internet and shows the interconnection with a server and multiple, Internet-connected memory units.

Returning to decision step 306, if the password is locally acceptable, the YES branch is taken and the system executes step 308 which releases a reconstruction request to the common storage facility I-com 154 or A-com 108 (FIGS. 6 and 4 and 5). The system in step 310 logs the user in, as well as time and date and the data regarding the request. In step 312, a download from the common data storage is provided to RAM 166 or hard drive 168.

In step 314, a query is made to obtain the remote map from the remote security system. The decision step 316 indicates that the user again successfully inputs his or her security code. If not, error routine 317 is activated, the password failure is noted in step 319 (an audit trial), and the user is given an opportunity to repeat in step 321 or is barred or prohibited from further activity in step 323. In an SC mode, the requester may be required to pay money for the SC data. In the SC mode, a password may or may not be required. If the user has correctly input the security code, the system in step 318 releases the keys (to decrypt) and the map and releases the reconstruction request to the remote storage for the extracted data. This could be computer storage I-ext 156 or computer storage B-ext 110. In step 320, the user's access to the extracted data is logged in along with the time and day and type of data request (audit trail module). In step 322, the system downloads the extracted data into RAM 166 and/or hard drive 168 of computer 140. In step 324, an error routine is operated on the extracted data in order to insure that the extracted data properly matches the common or remainder previously stored. Decision step 326 determines whether the error routine properly generates the correct count or output. If not, the system in step 327 indicates an error, in step 329 the system deletes the common files and the extracted files and the system in step 331 logs in the failed attempt. If the error checking routine on the extracted data is acceptable, the YES branch is taken from decision step 326 and the system, in step 328, proceeds to display the plaintext document or to integrate the plaintext document pursuant to the security clearance initially input by the user. Step 330 ends this process. The end process may entail encrypting the data again and swiping clean all traces of data objects from the memory stores and computer handling units. Of course, every use of encryption requires decryption of the data prior to reconstruction.

The system may incorporate various types of security systems or routines.
   pass word
   pass phrase
   multiple choice questions and answers
   initial, intermediate and subsequent security clearance routines
   biometric security routines (voice, fingerprint, signature, eye or retina scan)

The reconstruction routines may be interrupted or the security system modules automatically activated or initiated upon the occurrence of externally generated triggers or upon certain predetermined conditions or conditional events. See sections D.12 and D.14, for example. Limited extraction, security clearance, release of data and reconstruction limits may be imposed. Artificial intelligence (AI) engines, inference engines or neural networks may be implemented to vary the permitted level of reconstruction via the security clearances. In other words, the AI system, as applied to reconstruction, may, relatively independent of the filter and storage processes, increase the necessary security levels permitted to access and generate full or partial plaintext recreation.

The display systems 220, 222 in FIG. 7 include CRT monitors, LCD screens, projection screens and combinations of those systems.

The audit trail to monitor reconstruct and reconstruction attempts may include adding a time/date stamp to the remainder data and/or the extracted data prior to storage and a cross-check to the audit trail log during the reconstruction process.

Placeholders in the remainder document may be:
blank spaces
data symbols or elements "---" or "xxx"
false data
clearly erroneous data "ABC Company" or "Baker"
chaff or hash marks
messages
bar code
serialization data
alerts
links to other data objects
null set indicators "[ ]"
URL or website addresses It is believed that the present invention is faster, during reconstruction, than standard encryption techniques, on the order of 100 to 1,000 times faster.

B.3 System Configurations

FIG. 6 diagrammatically illustrates a personal computer or PC computer system 140, a second PC or computer 142, and a third PC-3. PCs 140, 142 and PC-3 are connected together via a network 145 (LAN or WAN) and are also connected to an input/output device 146 that may be generally described as a router or a server to an outside communications system. The input/output device 146 is connected to a telecommunications system 148 which leads to Internet 150. The Internet is a global computer network. Internet 150 is coupled to a plurality of servers, one of which is server 152. Server 152 may be designated as an application service processor ASP. Internet 150 also includes various computer memory storage devices such as computer storage I-com 154, computer storage I-ext 156 and computer storage map 158. Computer storage enabling the store of extracted data includes a security level clearance module 157. Similarly, map computer storage 158 includes security level clearance module 159.

As stated earlier, the present data security system can be implemented on a single personal computer 140. In this case, different memory segments or hard drive 168 may be used for A-com and B-ext. Typically, PCs include a keyboard or data input device 161, a display 163, a central processing unit CPU 165, a video board 167 having video board memory 169, a fixed disc hard drive 168, a RAM 166, and input/output device 164, a removable memory media drive 162a (may be floppy disc) and a removable compact disk (CD) read-write (CD-RW) device or drive 160. Also, storage in EMP or electromagnetic pulse hardened data stores is possible. Print stores rather than digital stores provides another optional layer of security. The system may include other removable disk drives, tape drives, or flash memory units. Internal units CPU 165, video board 167, hard drive 168, RAM 166 input/output device 164, removable media (optionally floppy) drive 162a and CD-ROM device 160 are all coupled together via an internal bus 171. Bus 171 represents a plurality of buses as is known to persons of ordinary skill in the art.

One methodology of implementing the present invention utilizes distinct memory segments which may be designated in one or more of the following: hard drive 168, memory in a removable disk in drive 162a, memory in a removable CD disc in CD-RW device 160, and, to a very limited extend, RAM 166. In this manner, the user may select, generally at the outset of the process, that the extracted data memory storage B-ext 110 be stored on a floppy (removable memory) via drive 162a or a CD via CD-RW drive 160. The user can then simply remove the floppy or the CD and carry it with him or her. To reconstruct the data, the operative program, generally discussed above would have access to the floppy or the CD and particularly the memory location of the data on the floppy and the CD in order to reconstruct the entire plaintext document 100 (see FIG. 4). Alternatively, different portions of hard drive 168 may store A-com and B-ext. Of course, the computer system may utilize tape drives and memories or flash card, programmable memory.

In a local area network or wide area network implementation, PC 142 includes memory similar to memory units described in PC 140 and a memory segment may be set aside in PC 142 separate from the common data or remainder data storage typically placed on hard drive 168 in PC 140. As a further expansion of the present invention, the extracted data (that is, the high security data), may be stored on computer storage I-ext memory unit 156 via Internet 150, telecommunications system 148 and router/server 146. In this manner, the common data or remainder data is stored on hard drive 168 and the highly sensitive data is stored off site in a secured location. Access to that secured location may be limited via security layer 157. If the user implements an encryption system (see encryption e 118 in FIG. 4), the extracted data is further secured by the encryption during the transfer from computer 140 through network 145, router/server 146, telecommunication system 148, Internet 150 and ultimately to computer storage I-ext 156.

The present invention may also be embodied utilizing an Application Service Provider on server 152 and in a client-server network.

An implementation of the present invention over Internet 150 most likely includes the use of a uniform research locator or URL for map memory computer 158, computer storage I-ext 156, computer storage I-com 158 and ASP server 152. In a client-server environment, server 152 acts as a server generally commanding the operation of client computer 140. Of course, persons of ordinary skill in the art recognize that the server may be located on the local area network 145 rather than being interconnected with Internet 150 as shown in FIG. 6. The claims appended hereto are meant to cover the alternative embodiments.

As an example of a client-server or web-based implementation of the present invention, the user at computer 140 may define the filter 102 as described above, and input data (plaintext) via keyboard 161 or load plaintext data from drive 162a or CD-ROM drive 160 into RAM 166. In any event, whether the plaintext data is input via keyboard 161 or copied or accessed from removable media drive 162a or CD-RW drive 160, the plaintext data is filtered as discussed above in connection with FIG. 4. Prior to filtering, it would be appropriate for the user at computer 140 to identify where the remainder data or common data will be stored and where the extracted or high security data would be stored. A simple program may automatically select the secure store location. The system is sufficiently flexible to enable the user to select local storage on different memory segments of PC 140 (hard drive 168, removable (optionally floppy) drive 162a, CD-RW drive 160) or be flexible enough to enable user at computer 140 to designate off site storage of the high security data (extracted data) and/or the common or remainder data. An automatic store routine may only require the user to accept or reject to preferred first security level, second security level and higher security level stores. The off site data storage process may include activating server 152 and enabling the server to take over the process directly from user 140. In other words, the user at computer 140 could call up the URL of the server 152, the server could request certain user information (user name, password), and would request data from the client computer to establish the filter pursuant to input selected by the user. The client computer may (a) filter the plaintext thereat or (b) send the data to the server for filtering. The server could store data either locally on computer 140 or remotely at computer memories 154, 156. After storage of the data at any of these locations, the server 152 may establish a map and store the map in memory location 158. Of course, remainder data (cleansed, plaint-text data) and the map may be stored at ASP 152 or client computer 140. The map, if stored at map storage 158, may be downloaded to the user at computer 140. The filter may be stored at computer 140 or may be stored at a secured location on server 152. Alternatively, the map could be destroyed on user computer 140. The filter could also be destroyed on user computer 140. Of course, the filter could be stored in a fourth remote location (not shown), different from I-com 154, I-ext 156 and map computer memory 158. Storage of the map and decryption keys is a critical, high security task. Appropriate security measures should be utilized to protect those items. Local removable memory storage on disc in removable drive 162*a* or disc in CD-RW 160 may be reasonable. All traces of the map, the filter, the encryption key, the extracted data, and possibly the remainder data may be scrubbed or deleted from all computer memories (by write-over or disc reformat routines) other than the "com" and "ext" storage sites. Deletion of all URLs, links, x-pointers, etc. is also recommended for high security applications. Deletion systems are known to persons of ordinary skill in the art. For multiple security levels, multiple web site for storage of cleansed plaintext, first, second, third and higher security level extract text is preferable. Where the community of interest has access to the targeted and protected data via the Internet, multiple secured storage locations, multiple stores for filters, for encryption keys and for maps locating the secured stores is provided by multiple storage locations distributed throughout the Internet.

To reconstruct the document, the user at computer 140 would be required to call up the URL of server 152 and input the appropriate security code. The server 152 would then call up and download data from various memory locations whether they be memory locations on computer 140 or memory locations I-com 154, I-ext 156 and map memory 158. The system compiles the entirety of the plaintext document by gathering the dispersed components thereof or compiles partial reconstructions for different levels of security. By implementing different security levels, the system is dynamic enough such that server 152 can easily locate the various extracted data levels based upon various security codes representing different security levels, as those codes are input by the user at computer 140. Multiple security codes, at the inception and during the process, may be utilized. The user may be required to input security codes at multiple times during the reconstruction or compilation process. Regeneration of the source is possible with appropriate sec codes. Likewise, the source, via the processes herein, may be reorganized by using tags, labels and different named storage facilities. Maps tracking locations of sec or SC stores enable the user to reclaim data, reform the data previously stored and reorganize the same.

It should be noted that computer storage 154, 156 and 158 may be located on the same computer or may be located on different computers spread throughout the Internet. If the storage units are different computers spread throughout the Internet, computer storage 154, 156 and 158 would each have their own URL or Uniform Resource Locator. On a LAN, the computer storage 154, 156 and 158 would each have their own addresses for access thereon. In any event, during reconstruction, the server 152 gathers the information and downloads the information into RAM 166 of computer 140. This download may include a first download of the common or remainder data from I-com 154. At a separate time, which may or may not include a decryption routine, the extracted from I-ext 156 is downloaded. Preferably, other than inputting initial security codes and any required or desired intermediate security codes, the system operates automatically without further input from the operator at client computer 140. The download of both data sets may be simultaneous in that the download is not humanly perceivable. This is especially true if storage in different memory locations in PC 140 is utilized.

The role of server 152 may be expanded or reduced dependent upon the desires of the user and the degree of security necessary. For example, server 152 may only enable separate storage of extracted data in I-ext 156. In this limited role, server 152 would require the input of a proper security code and clearance prior to identifying and enabling the download of extracted data from I-ext 156.

In an expanded mode, server 152 may be involved in filtering the data, extracting the security sensitive (or select content) words, characters, icons or data objects to obtain extracted data and remainder data thereat, separately storing the extracted data from the remainder data (extracted data being placed in computer memory I-ext 156 and remainder data being stored in common remainder data memory I-com 154) and then permitting reconstruction via separate or combined downloads of the remainder data and the extracted data into computer 140.

The innovation is a system and method for automatically or manually controlled selection, extraction, storage, and release of selected and prioritized information. The system extracts selected information from data streams, in computers, computer networks communication devices, and networks, as well as electronic mail systems. The system and method can reside on a single computer, be distributed across multiple platforms, be distributed across multiple networks, or reside as a remote process (known as a hosted application service process in the state of the art).

B.4 Input or Initial Processing Considerations
(Basic Filter Modules)

The security sensitive (or select content) words, characters, icons or data objects may be any word, phrase, letter, character, icon, data object (full or partial), image or whatever, as pre-defined or as established by the user. The user may specifically design the filter, begin with a dictionary (a content filter source) to define common terms, identify any additional security sensitive words, letters, images, icon, data objects, partial versions of the foregoing or any other granular aspect of the plaintext. After defining the filter and accepting the data input, the system filters the plaintext and separates extracted data (security sensitive (or select content) items) from the remainder data. The filter may also include elements of artificial intelligence (AI). For example, the user may select one word as a security word and the AI filter may automatically select all synonymous words. A contextual filter may be thereby designed. The AI filter may enable the user to define a filter in real time at the entry of data via a keyboard. For example, the user may select to secure (i.e., extract and store) some proper names and may instruct the filter to secure names such as Block, Smythe and Cherry. During input of the plaintext, the system may detect Smith and ask the user if he or she wants to secure (a) all proper names in a common name dictionary collection and/or (b) all names with spellings similar to the filter input data, Block, Smythe and Cherry. As is known in the art, AI typically uses inference engines to define one pathway or to outline a course of action. The filter or extraction engine discussed herein can be configured with AI, inference engines, neural network systems or other automatic systems to carry out the functionality described herein for the dynamic operation of the security system.

The system and methodology described herein also encompasses parsing the plain text document by bit count, word, word count, page count, line count, paragraph count and parsing based upon any identifiable document characteristic, capital letters, italics, underline, etc. Parsing is a contextual filter using a content as a marker and a range defines by certain file parameters. Algorithms may be implemented to parse the plain text document. The target of the parsing algorithm (a bit count, word, letter, etc.) is equivalent to the "security word, character or icon, data object" (or SC) discussed herein. The parsing occurs with the filtering of the plain text source document 100 and the subsequent storage of extracted data apart from remainder data.

B.5 Storage

In a basic configuration, the common text or the remainder data is stored in common storage memory 108. The secure storage is similar to the select content SC storage module. This common or remainder data store is identified as A-com generally referring to a segmented memory in a PC or a computer A in a network (LAN or WAN). It should be understood that reference to "remainder data" is simply a short-hand representation of data that is not extracted or filtered by the system. In some cases, remainder data may be nil and all content is removed. Accordingly, "remainder data" is simply that data which can be viewed, manipulated or further processed by the user inputting or initially processing the data. Remainder data storage 108 may include a confirm storage signal function 111 to send back a confirm storage signal to the data input device generating source plaintext document 100. The extracted data file 106 is stored in a different memory computer storage 110 (B-ext). In a preferred embodiment, memory segment 108 (A-com) is at a different location than computer storage memory segment 110 (B-ext). In a PC embodiment, memory A-com is a different memory segment than memory B-ext. In a networked embodiment, computer storage 108 may be on a different computer as compared with computer storage 110. In an Internet embodiment, common text or cleansed text storage is at one web site (which may be one computer) and the extracted, high security data is stored at another web site, buried web page or other Internet-accessible memory store location. In any event, the remainder text is stored in a memory A-com and the extracted data or high security words, characters, icons or data objects are stored in memory B-ext. After storage of the extracted data in memory 110, a confirmation indicator 113 may be generated to the client computer or the computer handling source plaintext input document 100 (the originating computer system). Data may be stored on any type of computer memory or medium and may include non-volatile memory, such as ROM, flash memory, floppy disk, disk drive memory, CD-ROM, and other permanent storage. Additionally, computer readable medium may include, for example, volatile storage such as RAM, buffers, cache memory, and network circuits.

As a simple example, the program configured in accordance with the present invention, could automatically detect entry of all credit card numbers types into a user's computer. The filter is set to detect the unique credit card sequence and data string. Assuming that the user's computer is operating a browser and the user is communicating with a server on the Internet, the user's computer would filter out the credit card number and send the number to a secure storage site. The secure storage site is owned, operated or leased by a trusted party. The extracted data, i.e., the credit card data, is stored at the trusted site. The URL or other identifying data is sent to the vendor from which the user wants to purchase goods and services over the Internet. When the vendor seeks to complete the transaction, the vendor sends a request code to the secure site, the trusted party at the secure extracted data storage site debits the user's credit card account (or otherwise debits the user's bank account) and sends an approval code to the vendor. In this manner, the vendor is never given the user's credit card—the card number is sent to a trusted party automatically by the filter in the security program described herein. The security program may be incorporated in a browser to automatically protect credit card data, personal data (as a method to become anonymous on the Internet), etc. from being deliberately broadcast to others on the Internet or to block others from snooping into the user's personal data while the user communicates over the Internet.

In a further enhancement of the present invention, the computer or data input device handling source plaintext document 100 may also record the location of A-com 108 and B-ext 110. The location data is called herein a "map." A memory mapping function or module is utilized. The map may be stored in a third memory location 112. Memory location map 112 may be a segment of the memory of the data input computer originating plaintext 100. The map may be encrypted for security reasons.

B.6 Extraction and Storage Enhancements

As a further enhancement of the present invention, the user, prior to initiating the security system, may be given a choice of filtering out all the uncommon words or words not found in the dictionary and adding certain security sensitive (or select content) words, characters, icons or data objects to filter 102. The added words or terms are filtered out with the uncommon words. Of course, the user may be required to manually input all security words or download the security word filter from the Internet or another system on the LAN. For security systems having multiple security levels, a plurality of filters would be created, each filter associated with a different security level. Further, multiple security levels would require, in addition to remainder text document or data 104, a plurality of extracted data documents 106. The common or remainder text document or data 104 would still be stored in remainder computer storage A-com 108. However, each extracted data document 106 would be stored in a respective, separate computer memory segment or computer B-ext 110. Separate storage of a plurality of extracted data at multiple, separate locations in B-ext is one of the many important features of the present invention.

The ability of the program to locate security sensitive (or select content) words or characters can be enhanced by using a telephone book, properly dissected, to identify a collection of last names. Cities and towns and street names can also be identified in this manner. The compilation of last names and cities, towns and streets can be used as a list of critical, security sensitive (or select content) words. The filter is represented by this compilation of words. Similar techniques may be used to create filters for scientific words, or words unique to a certain industry, or country.

In view of increasing levels of security relating to (a) the storage location A-com; (b) the transfer of remainder text document 104 to memory computer storage A-com 108; (c) the storage of map 112 (possibly encrypted); (d) the creation, storage or transfer of filter 102 (possibly encrypted); (e) the storage of extracted data at memory storage B-ext (whether singular or plural storage sites); and (f) the transfer of extracted data thereto, the system may include an encryption e feature. The encryption e function 115, 117 and 118 is diagrammatically illustrated in FIG. 4.

The program of the present invention can be set to extract critical data (a) when the plaintext or the source document (data object) is created; (b) when the source document or data object is saved; (c) on aperiodic basis; (d) automatically; (e) per user command; (f) per ascertainable or programmable event; and (g) a combination of the foregoing. Timing for storage of the extracted data is based on these aspects. Reconstruction of the data object or plaintext may be (a) automatic and substantially transparent to the user; (b) based upon manual entry of security clearance data; (c) periodic; or (d) a combination of the foregoing dependent upon outside events and who is the author of the data object or other definable aspects of the data object, its environment of origination, current and anticipated security threats and its environment of proposed reconstruction. The timing for the extraction, storage and reconstruction is oftentimes dependent upon the level of security required by the user and/or his or her organization.

The system and method creates a high level of security by automatic selection and removal of critical and prioritized contents from a data objects stream, whether it be a digital document, digital file, database, sound bite, video clip, other structured, or streaming data formats. The system and method enables a controlled release of the extracted data objects, enabling instant display of the instantaneous returned contents, contingent on verification of user identity, access rights, time of operation, location of source and or user, destination of source and or user, and determine threat modes. The system and method delivers high security by removal of the selected prioritized content from memories. The copies and traces of the selected extracted contents are eradicated from the computer memory while the separated extract data stream is transferred to a safe removed storage memory media. The extract, extracts, and any part thereof, will be return transferred to user display as soon as identity and access rights are validated.

A replacement of the extract (sometimes called a placeholder) can also be substituted on-the-fly to provide updated results, misinformation, dis-information, messages, alerts, links (to reports, data mining, search engines, web sites, and hyperlinks understood in the current art), advertisements, and personalization and customization. The validation can be done instantly by password, challenge questions and answers, remote verification (phone, video, or personal contact with user), or by biometrics means.

The extraction of data objects within data streams includes words, structured data objects, characters, numbers, bullet points, footnotes, prices, images, sound segments, video segments, and selected digital data packets. The extraction is conducted by separating a source (original) data stream into two or more extracts data streams. The different data object extractions are separated into groups reflecting predefined contextual categories and restitution applications (such as to enable customization and personalization for the same or different users). The modified source (original) stream typically contains the majority of data objects of the source stream, whereas the extract streams contains a minority of the data objects which represent selected and categorized information and information deemed to be of prioritized importance.

The extracted categorized data objects are separated into one or more contiguous data streams. The extracted data stream or streams are scattered to one or more storage memory memories. The extracted data can be transported and shuttled between different storage or projection apparatus, as directed automatically by various constraints including: security risk criteria of threats and attacks, sources, targets, users, policies, time of day, and threat modes.

The extracted data, in some cases, is transported to an online removable storage and under extreme security threats to an off-line/off-network, digital or physical vaulted storage. Transport and shuttle is based on the level of security alert. The use and release of the vaulted extractions is controlled by a set of rules or organizational policy which includes the following options among others: (a) A vaulting of some, all, or specific data object extracts for long or short periods of time. (b) Release of extractions into a display, in which the extracted data objects will reconstitute with the modified original data stream, the original data objects stream or original document. (c) Release of extractions into a projection display in order to project with the modified data stream, the original document while maintaining complete separation of the modified source data stream (the source modified by the extraction of data objects and insertion of placeholders) and the extracted data object streams. (d) Release of extractions into a projection display in order to project a reconstitution of the original document, in other words to create altered versions of the original document, while maintaining complete separation of the modified data stream and the extracted streams. (e) In situations of high security threats, release of extractions into another projection display, PDA, floppy disk, paper document a wireless display, an overlay transparency while maintaining logical and physical separation of delivery streams. This will enable working with a representation of the initial source, but not the initial source itself, while understanding the prevalent, critical extracted information without comprising security to the initial source material by exposing sensitive, identifying, or critical information. (f) The distribution of sources, modified sources, or extracts to remote and distributed viewing devices. (g) Enable the ongoing operation of information delivery and display in defiance of known ongoing or unknown security flaws, breaches, or events compromising the general state of security. (h) The delivery of distinct and separate data streams, delivered on the same or different channels and media, each with minimal, limited, or even substantial usefulness in and by itself, that can be overlaid logically or physically to reconstitute the identifying data stream and display. Separate display devices can be used to create a composite image or they can be overlaid to physically separate display devices to reconstitute a useful composite display.

The objective is to create security for the single computer or extended network. When an intruder penetrates preexisting firewalls and other security systems, the data object and streams, digital documents, and digital files which will be valueless and prioritized data objects rendered unidentifiable, the penetration is valueless because the critical strategic information has been exported to a vaulted storage. Competitors or hackers, who learn that a computer or network is protected by the system and method, might decide to attack another target instead. This is comparable to a situation in which a bank robber, who finds out that the bank vault is empty, will most probably look for another bank.

The system and method has a menu of different options including the ability to extract: (a) All existing databases on the computer or network. (b) All newly loaded, mounted, or integrated data to the computer or network. (c) All plug-in memory devices (temporary or permanent) containing data. (d) All new and imported data to the computer or network. (e) All new work and output created by the computer or network. (f) All data being transported in/out of the computer or network including electronic mail. (g) All data being transmitted in/out of the computer or network including electronic mail.

The system and method releases the extracted data streams, subject to a controlled-release mechanism and process. The release mechanism is contingent on parameters including; rights to access specific contents, timing criteria, security restrictions, and preset policies. The release of the extracted data objects permits restitution of the source data stream in variations of the source that are full, partial, or modified representations of that source data stream. The release provides for various levels (through user configuration) of separation between the modified source data stream and the extracted data streams. The system enables the maximum grade of security by means of the option of a visual merged projection of said different data streams, while maintaining a strict physical and logical separation between the data streams.

B.7 Basic Reconstruction

FIG. 5 generally diagrammatically illustrates the major features of a reconstruction routine (module) or system. The user, typically at a computer terminal, inputs a reconstruction request 120. The system first executes a security clearance protocol routine 122 in order to determine whether the user has the proper security clearance. The security clearance may be thought of as a security clearance control. If multiple users are permitted access to the documents and those multiple users have different security clearances, the security clearance protocol determines the level of security clearance and, hence, the full or partial reconstruction of the plaintext. The security code input by the user is checked against a security code database or list 124. Clearance is provided in step 126. The location of the map and, hence, the location of the remainder data A-com 108 and extraction is provided to the user's computer in step 128. This may include obtaining a copy of the map 130 showing the location of memory segments in (a) the local computer; (b) the LAN or WAN; or (c) the Internet storage sites. The storage segments are A-com 108 and B-ext 110. The common or remainder data is downloaded or transferred or made available to the user's computer as shown at the output of map location and data step 128. Typically, the extracted or security sensitive (or select content) data from B-ext is downloaded. As described hereinafter, the data can be reconstructed as a complete electronic document in function 130 or may be reconstructed only as a visual reconstruction in step 132. Visual reconstruction is discussed later. Function 130 operates as a compiler to gather the extracted data and remainder data into a single plaintext document. If the data object represents sound or audio signals, reconstruction and play back may require a speaker output in function block 130. In a telecommunications implementation of the present invention, the input would include a microphone or audio detector (supplemental to the input device for document 100), an analog to digital converter (possibly with a voice to digital converter), the filter, extractor, storage facilities at least for the extracted data, and at the output of the system, a converter to audio and an audio announcer. The recipient of the secured data stream or message would be required to clear a security clearance and possibly obtain a decoding key prior to listening to the entire, decoded message. The key and the security data is separately downloaded to the recipient's device.

If remainder data in A-com memory 108 and extracted data in B-ext computer memory 110 is encrypted, the reconstruction process includes a decryption step. Encryptors and decryptors are relatively well known by persons of ordinary skill in the art. Further, the filter 102 (FIG. 4) may include some encryption routine operating on the data object (plaintext) during the filtering. A simple encryption may include substituting "dummy" text or images for the security words and keeping a pointer to an encryption key document mapping the security words with the dummy words. The filter may be stored or may be destroyed at the option of the user. Storage of the filter impacts the degree of security of the entire data system but storage of the same filter enables the user to reuse the filter at a later time. Encryption of the stored filter increases the security of the data. Creation and storage of map in memory 112 also impacts the degree of security of the system. However, if the filter 102 is destroyed and all copies of the map are destroyed on the user's computer originating plaintext document data 100, and the map is stored offsite in a third computer memory location 112, this offsite map storage may enhance the degree of security of the data. The originating computer processing plaintext 100 may be scrubbed to remove all reference and copies of the plaintext, remainder text, extracted data map storage data, etc., i.e., a deletion routine may be employed on the data input computer.

B.8 Reconstruction Techniques

FIG. 7 diagrammatically illustrates a system diagram for various reconstruction routines. A complete reconstruction is shown as security level path A. This involves an electronic integration of plaintext in step 202 resulting from the complete electronic reconstruction of document 100. For example, a merge may occur between the extracted data and the remainder data or common text data. The document is completely compiled in this process. Placeholders in the remainder document are utilized to locate and insert the extracted data. Most likely, there will be no process controls imposed on the integrated document as shown in step 204. In other words, if the user at computer 140 has the proper security clearance, he or she could download or recreate the entire original source, plaintext document and the user would be entitled to edit the document or change it in any way or copy it and reproduce it.

The second level of security, path B, results in storage of the common or remainder data in a different memory location on the hard drive 168 as compared with the extracted data. This is noted in step 206. Another words, in a simple example, hard drive 168 or RAM 166 would hold a copy of a remainder data document and another copy of the extracted data document, that is, two separate documents. Since two documents are available in RAM 166 or hard drive 168, these documents are stored in different locations in the memory. In step 208, a map showing the memory location of the common or remainder document and the extracted data document is provided to computer 140. Step 210 commands the processor CPU 165 in computer 140 to interleave the extracted data with the common or remainder data in the video board memory. In this process, the extracted data would typically have placeholders for the missing remainder data. Otherwise, control codes to locate the extracted data into the remainder data would be executed by CPU 165 to properly place the extracted data into the "visual space" of the placeholders in the remainder data document. The extracted data document may have placeholder for the remainder data. Some type of register between the two image documents may be necessary. The compiler, in this embodiment, gathers the document elements and visually compiles and presents the plaintext to the user.

FIG. 8 diagrammatically shows that video board memory 169 is loaded with remainder or common data 1 and a different location of the video memory is loaded with extracted data 1. The next video memory location is loaded with common data 2 and then a different video memory location is loaded with extraction data 2. Since the refresh rate of computer monitor 163 is fast, the display 163 will show the common or the remainder data and then show the extracted data such that the user could not humanly perceive a difference in the document. However, the user could not copy the document from display screen 163 (a "screen shot") since the document is never electronically integrated into a single document. There is only a visual presentation of the combined document by interleaving the extracted data with the common or remainder in the video memory 169. Step 212 notes that the user may be limited in his or her ability to process, edit and store the reconstructed and presented plaintext document.

Security level path C recognizes in step 214 that the data is stored in different memory or computer locations. In this situation, two video boards, video board A and video board B are shown as board 216 and 218. Video board 216 drives display monitor 220. Video board 218 drives display monitor 222. Display screens 220, 222 are overlaid atop each other. Video board 216 is fed with common or remainder data from the remainder data store (see I-com store 154 in FIG. 6) and video board 218 is fed with the extracted data from the extracted data store, for example, I-ext store 156. In this manner, as noted in step 224, the user is presented only with a visual presentation or compilation of the plaintext. Since there was physical separation between video monitor 222 and video monitor 220, there is no electronic integration at all of the plaintext document. Hence, the ability for the user to do any significant editing on the plaintext document is blocked or prohibited because the user only has access to either the data on video board 216 or the video board 218.

Security level path D shows that the extracted data may be parsed or further separated based on a plurality of security clearances in step 226. Step 228 recognizes that the system can repeat process and security process paths A, B and C only with portions of the extracted data presented to the user based upon the user's security clearance.

C.0 Testing the Security System

The prime purpose of the data security system is to limit the disclosure of critical data or select content SC data to persons or organizations who may misuse or abuse the data. A testing module supplies this functionality to the infrastructure. With the advent of cheap memory, fast processors and increasingly dynamic search engines and the high speed communications links established by the Internet, the ability of a suspect person or organization (a person/organization which is not permitted to have the SC or secure data) to associate some low level secure or SC data with public source (or accessible private source) data and "discover" the secret or SC presents a significant problem. Therefore, a system to test the secure nature of the SC or secure data system, with inference engines or knowledge expander KE search engines, is beneficial. The following sections C.1-C.23 discuss such search engines to test the security of the base system described in sections B.1-B.8.

Also, the information infrastructure is flexible enough that the system operator (CIO) initially builds the infrastructure using simple filters and simple access and permission policies and rules. The infrastructure becomes more complex due to testing of the secure storage and the SC storage. The higher degrees of complexity may cause the system operator to employ more complex filter (see sections C.11, C.12 and C.13 and employ aggressive deconstruction techniques (see section D.1, among others). Additional complexity is added to the system with further policies or rules which are prioritized and implemented with hierarchical taxonomic classifications. The hierarchical taxonomic classes must be bought, customized or built. The knowledge expander KE module is used in the development of the contextual filter modules, the testing modules, in the taxonomic filter modules and in the classification generator.

C.1 the Etiology of Information

Security, privacy and information sharing is predicated by the representation of the structure information. The structure has evolved in usage over time from simple linear formats to complex hierarchical trees typified by tags, metadata and modifiers. Although the predominant information delivery and information storage format is in a linear data stream, the internal structure or representations include all possible linear, field defined, metric, tree, compound and combined layouts. In other words, while data is delivered in a linear stream, the complexity of internal structure resolves into specific documented patterns, self-documenting meta data formats like HTML or XML, defined utilitarian and purpose-oriented formats like database management system (DBMS), ODF (open document format) or proprietary document object models (such as the Microsoft DOM model). The combination and recombination of metadata in source documents or data streams complicates finding, location, and expanding one's knowledge base of SC. The issue of the internal format is important to the regulation, interpretation and application of information.

As discussed above, the etiology of information involves a complex hierarchical trees of various types of data such as tags, metadata, and modifiers. Specifically to the issue of semiotic (words and objects in language) and pragmatic (words relationship to user) meaning, the internal format of information is important to its regulation, interpretation and the further use and application of the information. A discussion of the differentiation of the data as to content, context and concept is discussed later herein. The abstraction of information is also relevant here. For example, the database scheme DBMS and the DOM style sheets and the internal metadata all modify the encoding, format, structure, purpose and usage of the information. Links and references establish contextual meaning, just as the environment establishes meaning relevant to the multiple granular data in the information stream or document. Metadata can validate or invalidate meaning in the text of the data, for example, a format or a replace meta data element could indicate the complete deletion of material, the connection between topic and footnote, or modification with non-usage of the data. To perceive data only in context without the effects of format, purpose, reference and access rights, potentially misinterprets the importance of context and concept which may result in a misunderstanding of the information.

C.2 Metasearch Engine for Knowledge Discovery

Search Convergence and Divergence

As an overview, the system's metasearch engine is a novel and useful service to uncover unknown or concealed relationships, delivery of higher relevancy search results and connecting the dots. Although metasearch is derived from the technology for security and information sharing, it is useful to augment standard Internet search engines because it enables both search divergence for knowledge discovery and search convergence for assessing information integrity, the full process necessary for connecting the dots. Search divergence extends search with aggregation, inference and data-to-data interaction beyond simple content into the realm of context and concept. The system is a standalone system or can be integrated to process results of other search engines. Presented is a process and a technology for knowledge discovery, security and information sharing that is based on management and control granular data content to secure information while also providing interdomain information sharing. The basic assumption is that all data/content must be monitored, analyzed and categorized at the granular data level for basic security risk management and control. Risk measurement is driven by information recognition, multi-tier overlapping hierarchical meta-tagging technology, and granularization. This same technology, as a standalone deliverable product or service-oriented architecture, is applicable to knowledge discovery, uncovering unknown or concealed relationships, and for connecting the dots. The metasearch process is a serialized and repetitive process of knowledge discovery, usage of the innovation's secure engine, and the application of granular data content, as a standalone service for knowledge discovery. Because the risk measurement is driven by (1) content, (2) context, and (3) concept, it is essential that the system recognize content not only in isolation to itself as a data stream or document but also its value when combined with other private and public sources through aggregation, inference and data-to-data interaction. The metasearch is useful to augment standard Internet search engines because it enables both: (1) search divergence for knowledge discovery and (2) search convergence for assessing information integrity. It completes the process necessary for discovering new knowledge to connect the dots. Although testing for security is discussed above, testing for select content SC is possible. SC is unique information that is of some interest to the enterprise. If the store is to be complete and represent a viable and useful knowledge store, the quality of the information in the SC store can be tested to ascertain whether the content is unique or should be supplemented as discussed later herein.

C.3 Initial Process

Metasearch Engine and Knowledge Expander

The automated metasearch KE search engine takes as source any data stream or document. The metasearch engine module (FIGS. 11, 12a, for example) automatically parses the source for content recognition and assessment of granular content. This granular content is automatically metatagged by the search engine-system for range (contextual relevancy), sensitivity level (prioritized), compartmentalization (sensitivity levels at the same hierarchical level, but laterally or orthogonally disposed to one another, see TS—Navy compared to TS—Army wherein the Navy and the Army are compartments), categories (hierarchical taxonomic classes), relevancy (a type of sensitivity), and other multi-tiered overlapping hierarchical factors. The granularized data content becomes the search terms, while these metatags become metafilters for the knowledge discovery process. These search terms are submitted to any number of extant tools and services (other search engines, such as Google, Yahoo), for locating other relevant supplemental data streams, documents, databases, local, Intranet, Internet, and public or private data stores. Likely tools include Internet search engines, data mining tools, database query engines, data collections, indices and other knowledge management (KM) applications or services, which are generally classified as data structures or data collections herein. Inductive and deductive tools are advantageous too. Most tools can be easily integrated with the system, linked through service-oriented architectures (SOA), or their results piped into the source data steam or document (through Web 2.0 mashups). The metasearch engine also works with standard—a priori—search terms or keywords, like any desktop, web-enabled, or Internet search tool. This search operation may bypass the system's secure assessment of a relevant or representative source data stream or document.

C.4 Simple Metasearch Engine

The results from the extant tools (the results sometimes called supplemental documents or supple docs) are logged for auditing, dispersed to maintain a legal chain-of-custody, and aggregated into a single collated result. A List of Abbreviations is set forth in a later section E.1. This collated result (the source, results, reports and links or references) is automatically submitted into the metasearch engine. Inputs include the configuration for either (1) search convergence or (2) search divergence. Search convergence conforms to the standard purpose for using Internet search engines like Google or Alta Vista because it defines, authenticates, and validates the search terms. The first level search results provide for an integrity check for the initial information results in that it does not aggregate or inference the information therein.

The divergence function, on the other hand, is all about aggregation, inference, and data-to-data interaction because it specifically searches for links, references, relationships, outliers, and social networking associations to the search terms. The divergence function will likely ignore anything overlapping the search terms in order to expand the search. In other words, convergence increases the depth of knowledge where divergence increases the breadth of knowledge represented by the collated result. The divergence function explores new, novel, unknown, and hidden connections. If you want to connect the dots, divergence dredges new but factually uncertain information where convergence thereafter authenticates.

The system is automatically run. The source (which is now the aggregated result from the extant tool processes) is automatically parsed by the metasearch engine with secondary recognition and assessment of granular content.

C.5 Automatic Metatagging

This granular content of the source doc is automatically metatagged for: (1) Content categories, (name, location, date, dollar amount etc); (2) sensitivity level, ("Top Secret", "Private", "level 9"); (3) compartmentalization, ("top secret—Finance" "Top secret logistics"); and (4) relevancy, and other multi-tier hierarchical factors.

C.6 Automatic Secondary Tagging of a "Range"

A secondary level of metatagging may be created to define the "range" or "the area within the document" from which the keywords for the search will be selected. This is a simple contextual select content (SC) or secure content (sec-con) operation. Software modules carry out these functions. To create a higher level of relevancy in the search results the system controls the granular data within the document. Only "areas"/"ranges" with a high relevancy will become the basis for locating keywords for the next search. Range defines the area or areas within a document (characters from the target selected content, lines away, within the same paragraph, on the same page, etc.), which will be the base and platform for locating key words for the next search cycle. An analogy is the defining the range/area for oil drilling in a suburb of the city of Houston. All the drilling will take place only in that location. As an example of defining a "range," we present the system's creation of automated tear lines.

Each paragraph (the "range" can be also configured to a "sentence" or "line" or "page") is automatically tagged based on an algorithm. The algorithm may be "tag the paragraph based on the highest sensitivity level assigned to any of its words; or if a group of specific words appear in a paragraph," ("ATTA", "Hamburg" "New York" all tagged as Secret "S" security level or importance) and tag the paragraph at a higher sensitivity level than those words (i.e. Top Secret "TS").

The granularized selected content becomes the search terms and the metatags become the metafilters for the systems meta search. The automated results of the meta search process is an augmentation of existing knowledge or a breakthrough to unknown or covert relationships. The convergence search vets the integrity of a priori search terms, while the divergence search generates new search terms and new references. The metasearch is repeated, as configured, for a fixed number of times, for a fixed period of time, until results reach an asymptote, or indefinitely. The metasearch inputs also include the metafilters created prior to the presentation of the aggregated search result. These metafilters define the direction of the search by introducing "fine adjustments" to the search process. In essence the metafilters narrow the scope of all subsequent and serial submissions to the extant tools and services. The search may be configured to include one or a combination of filters as follows:

(1) Selection of keywords for search based on their categories. The system automatically categorizes each word and character. In one embodiment, there are over 50 different categories or hierarchical taxonomic classes. Categories may include name, location, date, dollar amount, credit card number etc. As an example the system may be configured to feed the search engine with words that where automatically categorized by the system as "locations" and "people" in such an example "Rome" "London" and "Muhammad Atta" may be selected automatically as the keywords for the next search cycle.

(2) Selection of keywords for search based on their sensitivity level or important or assigned weight. This is the sensitivity level of the hierarchical taxonomic classes. The system may be configured to select as keywords for its next search only data elements that where classified/tagged with a specific sensitivity classification/tagging. A possible example, is an instruction to use as keywords only words that where given "Top Secret" classification, or "private" classification or assigned with a specific weight (select words that where assigned weight 9 out of 10).

(3) Selection of keywords for search based on the specific importance of their content. For example, use as keywords, words that belong to a list of specific grouping of words. A list of associated words that convey a concept or a contextual relationship and other features and compartmentalization. Metafilters for standard search terms, which bypass the initial system's automatic review of a source, are optional.

C.7 MLS, Multi-Level Security-Compliant Search and Distributions

Because the system and all the extant knowledge management tools may run in a secure system high environment, results are likely to be system high too (classified at the same security level). However, the point of any search or knowledge exploration is to share information and distribute it to the users at the edge. The advantage of the system is that the new search terms, the aggregate result, and all intermediate reports and documents are processed for Multi Level MLS-compliant security and information sharing. Each user will get a result based on his security level (for example, TS or S or C or UC). Specifically, the list of new words, phrases, and other content is either automatically assessed or manually reviewed for addition to the system's dictionaries. Ownership sensitivity level, compartment, group, categories, mission, relevancy, and other multitier overlapping hierarchical metatags are applied to each discovery and distributed to users subject to MLS compliance. The aggregate result are secured with multiple MLS-compliant versions and distributed to the edge on a: (1) per sensitivity-level basis version, or (2) a base redacted document with objective security compliance for universal distribution and pushed to the edge with the system's reconstitution services. In other words, information sharing is implemented either through the delivery of: (1) Multi Level Security—MLS-compliant versions, or (2) Through a base redacted document with objective security compliance for universal distribution with reconstitution.

Reconstitution is supported in whole or in part as: (a) MLS-compliant results, or as (b) Step-wise reconstruction, with defenses-in-depth MLS-compliant results i.e. controlled release layer by layer.

These two options are also applied to all intermediate results, reports, lists, linked or referenced sources. Of note, all links and references, even access to public data sources can be optionally restricted to minimize subsequent risks from aggregation, inference, and data-to-data interaction. An agency with specific intent and knowledge is able to use aggregation, inference, and data-to-data interaction on public sources to create classified results. For example, if unclassified search terms including "president assassination British visit" returned news clippings and RSS feeds of a forthcoming presidential visit to 10 Downing Street, these public results are still unclassified but the context is clear and may be classified.

The systems metasearch is a novel and useful standalone service to uncover unknown or concealed relationships, and connect the dots. It is useful to augment standard Internet search engines because it enables both search divergence for knowledge discovery and search convergence for assessing information integrity, the full process necessary for connecting the dots. Search divergence extends search with aggregation, inference and data-to-data interaction beyond simple content into the realm of context and concept.

One of the main tools in the present knowledge expander (KE) engine is its ability to control granular data with automatic content analysis/filtering and tagging of all the select content SC data and unknown data elements in every document, data stream or input document.

The knowledge expander KE engine: (1) automatically creates a list of search terms; (2) automatically cleans the noise from the search term list; (3) automatically selects from the list of search terms those that will be sent to the next search cycle (preexisting rules for doing the selection)—example: select for search only the items found which are in the "names category" and "locations category"—from the list of search terms—for example the names "Redhouse," "Kohn," "Miami Beach," and "Ft Lauderdale" will be sent to the next search cycle; (4) conduct a divergence search—limit set at 200 supplemental documents (supple doc). Each supple doc goes through an automatic content analysis/filtering and tagging of all the data elements in the document. Key words are located in the supple docs by filtering of categories. The process cleans noise from the extract key words from the supple docs. Rules select which key words will be fed into next search cycle. For example, if 1 of the 200 documents had the name "Bob Smith" location "Sarasota" (as long as the rules for selection were not changed the next search will be fed with search terms—"Bob Smith" and "Sarasota") search is expanding—a diverging search. The last process wherein Bob Smith is added to the KE engine is a convergence filtering process because the search results will converge on Bob Smith.

C.8 Benefits of the Metasearch

Knowledge Expander

Typical search and data mining tools presupposes that the user already knows part of the answer. The user must know how to phrase the question (search terns it query) in order to get a proper answer. However, this is only partial solution to knowledge management in that does not begin to address the real issues needed to connect the dots. This knowledge management technique as called herein "convergent" because the operator starts with a known entity and the search confirms or denies the basic entity or gathers additional information in depth on the entity topic. The present knowledge expander search, with various modules operating together, automates the convergent process until no additional information is found on the topic.

The present system and process allows knowledge management as a divergent exploration. The basic starting point is any data stream (RSS, blog, documents, a fire hose of data) or multiple data streams, or a collection of search terms for an automated process. A single term defines a manual process with a primary search term. The automated process redacts the data stream(s) and looks for content and context of importance creating a list of primary search terms, metadata contextual filters, and noise reduction tools in order to expand the breath of knowledge with new links and references. Alternate spellings, misspellings, partial matches, duplicates, and other fuzzy technology is used to graft depth to a convergent search or prune a divergent search. In the case of a divergent search, the process is specifically exploring for secondary search terms and information that is not part of the primary search terms. Noise and duplicates are pruned. All hits and information located with URLs, X-links, or other pointers is retained for a chain-of-custody source-indicating data, reproducibility, and human intelligence analysis. Consolidated results are insufficient for legal exploration, search warrants, or plans of action, so the retention is critical to build a rationale for action and review the relationships, connections, and networks of people.

The search is extended with the primary search terms, the secondary search terms, and combinations and permutations thereof. Duplicates and non-duplicates are pruned per the selection of convergence or divergence. Tertiary search terms and information is aggregated in the same manner as the secondary search terms and secondary information. This process would repeat unless manually interrupted, terminated by a timer, manually reviewed midstream and grafted or pruned, or terminated by repetition or lack of new information. When no new information is found both the convergent and divergent search are stopped. The termination rationale is inverted. In the case of convergence, the latest results are only new information that is not wanted and adds no depth to the knowledge. In the case of divergence, the latest results are only old information and represent no new breadth to the knowledge.

C.9 Information Life Cycle Engine

The information life cycle engine has an input configuration which is saved, an indication of the source of the information and text, metadata, data streams, blogs, RSS (Release Simple Syndication or Rich Site Summary), or a compound document. The process is a reduction of the information input into the system into its major elements by format, style, type and data type. Compound documents must be taken apart to basic identified types with tags and metadata separated out.

Figure 11:
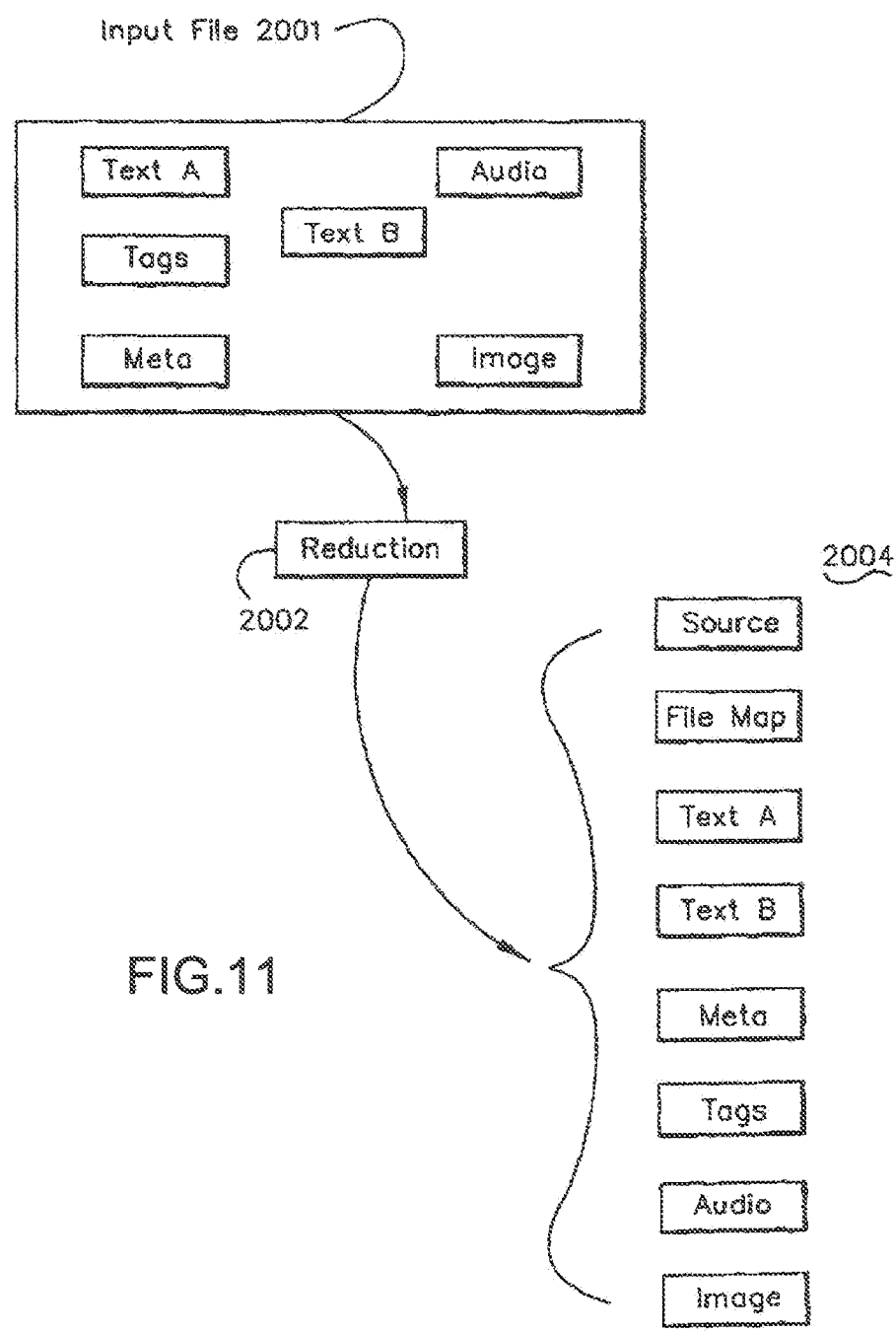
FIG. 11 diagrammatically illustrates deconstruction of an input document into segments.

FIG. 11 shows an input file 2001 (an information file or data stream) having therein text A, Text B, various tags relative to the information in the text (such as paragraph numbers), metadata associated with items and data objects in the document and image elements. The input file is subjected to a reduction or deconstruction step 2002 which creates an expanded information document which includes source data, and file map of the various elements, text A, text B, metadata, tags, audio and image. Of course, multiple audio files, image files, metadata files, tags etc. may be included in the expanded information document represented at 2004. The Editor as an Information Expander section and following sections provides greater detail of the reduction step 2002.

Further defining the source as an information file or data stream is important. "Text" is a basic defined type. The information life cycle engine automatically processes the information document. The process includes selection, extraction and categorization. For example, a document having security sensitive words or selected content (sel. cont. or SC in the figures), phrases, images or sounds, identified as secured content by Department of Defense pre-classification must be processed with a step of filtering, identifying tear lines between classified material (contextual filter or parsing technique) and ultimate identification to a base level of classification. Words, phrases, user defined words and a group list of words, phrases, combination and occurrences within a defined range are employed to identify the security (priority) level of the information document being processed. Pattern and categorization, dictionary categorization, and syntactic categorization is employed.

The information document is also parsed or separated apart by syntax, that is, words, sentences, quotations, parenthesis, other types of textual delineation, and instruction. Complex phrases are resolved for overlapping security levels and complex meanings. Categorization is employed to determine the level of security of the information. Multi tier-overlapping and hierarchical tagging is employed. Any dispute automatically identified by the system upgrades the entire information document 2004 to the next highest security level. The next step in information life cycle engine is to extract and disperse various versions of the document 2004 elements along tear lines or other types of delineation specified by the operator.

Extracted data objects or elements may be replaced by tags, codes, or null field indicators. The system may create various versions of redacted output documents. The base document, redacted of all critical or security sensitive information, should be stored along with a recovery file. The recovery file may include maps to permit a party with a preferred security clearance to recover completely the base or original source document. A metadata table is created with an intermediate resultant document. Reports are generated showing encoding, dispersion of the data and storage location. Lists are also created showing selections of data redacted from the source document, encoding of the data and synopsis of the data. Additional outputs include a recovery file and a categorized meta search file. Displays are permitted either locally or to test the discovery results.

Figure 12A:
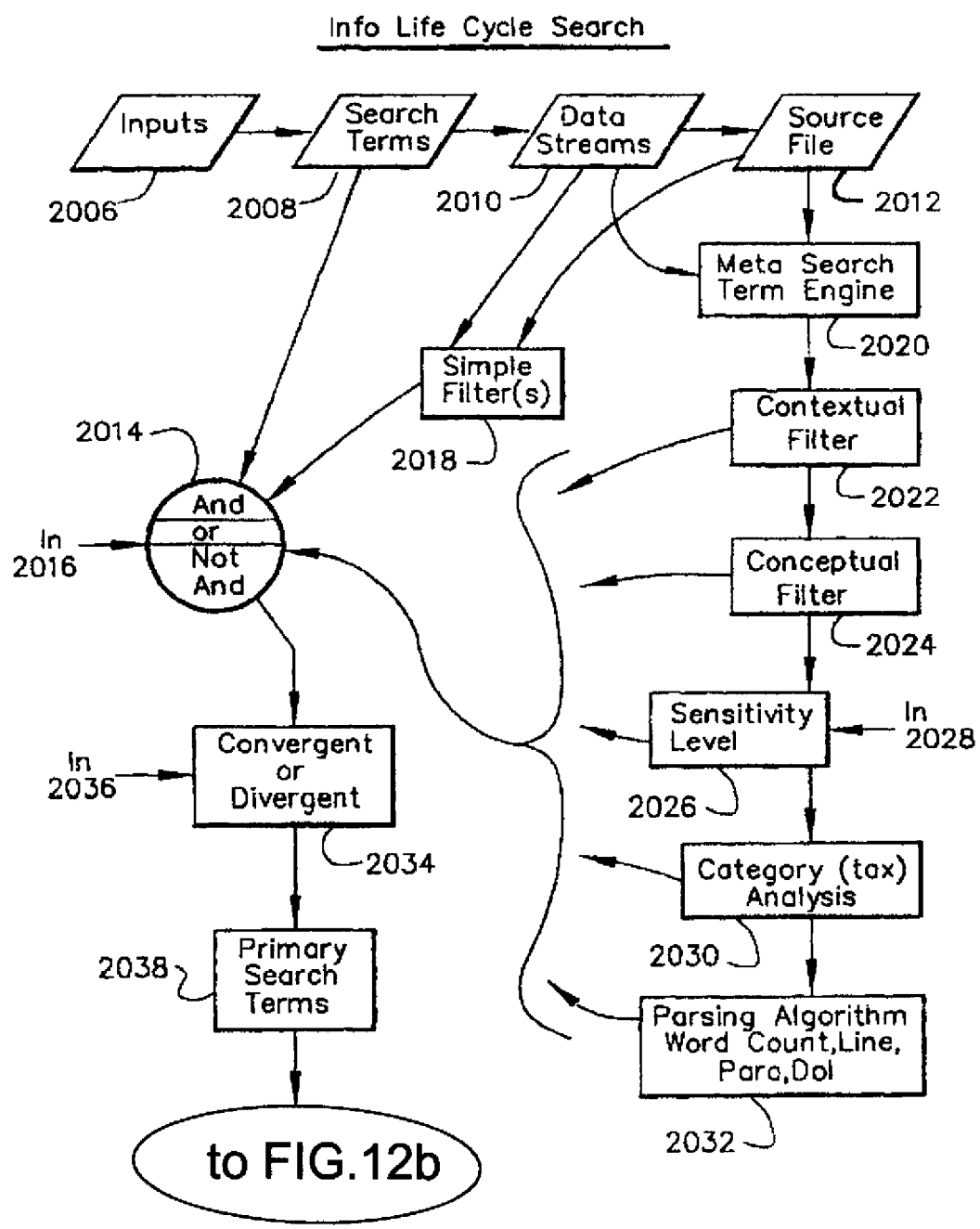
FIG. 12a diagrammatically illustrates the information life cycle knowledge expander (KE) search engine process.

FIG. 12a shows information life cycle search module. At the beginning of the program flow in FIG. 12a, an input function 2006 is noted which includes information regarding the source of the information document or "source document" which source doc may, at the operator's discretion, include search terms 2008, data stream 2010 or a source information document file 2012. The search terms may include one or more SC or select content or security sensitive content (sec-con) which is of interest to the user. If search terms are input, these terms are supplied to a summation or discrimination function 2014 (AND, OR or NOT AND operator). In other words, the operator (or the system automatically by default) could conduct an AND conjunctive search obtaining additional information from other documents or an OR exclusionary search showing and processing only the items that are identical are substantially similar from source doc and filter outputs. The AND operation may operate on the terms applied to discrimination function 2014 (e.g., the terms from input 2008 must match one output of the simple filter 2018) or may refer to a summation of all terms from input 2008 and simple filter 2018 and metasearch term engine 2020. The OR function has the same options. The NOT AND discriminator operates only to extract and use terms output from metasearch term engine 2020 which do not match search terms 2008 and the output of simple filter 2018. Some select content SC (or sec-con) must fall within the prioritized hierarchical taxonomic class or classes function 2030 in the NOT AND search. The non-matching search term engine is discussed later in connection with the Expansive Unknown Search Engine. A substantial similarity test, as a subroutine in the discriminator 2014, may ignore duplicates and may truncate search terms by eliminating suffixes (and possibly prefixes) from the search term processor. Input IN 2016 recognizes that the operator may provide a manual input into discrimination function 2014. If data stream 2010 or an information source file or document 2012 are input, these information documents may be processed through one or more simple filters 2018 extracting white list terms (inclusive lists) or black list terms (exclusive lists) or terms not found in dictionaries, the result of which is supplied to the summation-differentiation function 2014. See the Simple Filter and Complex Filter sections C.12, C.13 below. In addition, data stream 2010 and document source file 2012 are submitted to a metasearch term engine 2020. The more highly organized metasearch term engine 2020 filters the data stream or source document with a contextual filter 2022, a conceptual filter 2024, a sensitivity level filter 2026, a hierarchical taxonomic or category analysis 2030 and a parsing algorithm for word count, line, paragraph, or DOL 2032 (contextual filter with range setting module). The order of these metasearch filters may be changed. The filter modules are contextual, semiotic and taxonomic filters. Semiotic include syntactic, semantic and pragmatic features (discussed later in section C.13). Sensitivity level 2026 contemplates potential manual input IN 2028 which establishes the depth or expansive nature of either the contextual filter or conceptual filter. The sensitivity filter and the hierarchical taxonomic filters are used to focus the search in that the operator can select hierarchical taxonomic levels or terms of concern, for example, names of terrorists—priority 1, terrorist location—priority 2, date of source doc—one week—priority 3, temporal (date)—1 month—priority 4, terrorist organization—priority 5. Each "priority" is a SC selection sensitivity factor (or sec-con factor) and the class of the information is a taxonomic analysis, the result of which is a prioritized hierarchical taxonomic classification system and filter for the search. The result of this meta or more highly organized search term engine 2020 is supplied to the summation-discrimination function 2014.

The system then operates on convergent or divergent function 2034 which includes, optionally, input IN 2036 from an operator. The convergent or divergent function 2034 enables the operator to only search for converging search terms or select a more divergent search routine. Function 2038 results in a primary set of search terms.

An element of the information life cycle engine is parsing or deconstructing the original source document or information file. The structure of the source document DOM metadata and compound file format must be simplified and the source document must be broken into its atomic types such as markup data, tags, metadata, links, hyperlinks, references, comment, differing data types, purpose and format. This parsing is discussed later in connection with the DOM data structure in section C.18, among others. Categorization is applied as a resolution or coding to a single overriding security level. Priority is given to the most complex or highest security level. For example, a document with "Bin Laden" as compared with "Bin" next to "Laden" results in "Bin" being identified at the secret "S" level and "Laden" being identified at the classified "C" level wherein "Bin Laden" is classified at the top secret "TS" level. (The security classes including TS top secret, S secret, C classified and UC unclassified). The resulting document would be identified as top secret TS because "Bin Laden" represents the highest level in that paragraph (format or contextual indicator). Adjacent permutations of a linear nature could also be employed. For example, "Khalid Sheik Mohamed of Syria" results in unknown [Khalid], Sheik [title of middle eastern person], and Mohamed [name] "of" [preposition] and "Syria" [geographic territory]. The resulting analysis results in an up coding of categorization to a next higher security level (e.g., S to TS) due to the contextual range grouping of the SC.

The system may employ a "My Group" list or profile which identifies key items and triggers a certain result based upon the "My Group" pre-set profile list. The profile is an SC profile of interest or an sec-con profile of interest. The My Group list would include a profile name such as "first strike capacity" and a list of key terms under that profile such as "nuclear, ballistic, submarine" and a "range" such that anytime that key word is found in a paragraph, a certain classification is assigned. The "range" being the paragraph in the source document. The Profile Name could be used as a search term for a divergence search (discussed later) or a link to a dictionary of search terms. The search terms are either content-derived in nature or conceptual in nature. Certain contextually-derived results, see Bin Laden example above, may automatically trigger use of a specially designated My Group search profile. Further, the Profile Name can be linked to another list of synonyms associated with the specific terms nuclear, ballistic, submarine. Contextual and conceptual terms are employed in this manner.

C.10 Information Life Cycle Searches

The input into the information life cycle search (FIG. 12a) may be one or more search terms, a data stream such as a blog, RSS, or a string of data, or information document (DOM). FIG. 12a graphically shows the procedure for the information life cycle search. The system pre-processes the input and obtains metasearch terms both in a contextual manner and conceptual manner. These are identified with filters discussed later on. Sensitivity levels are set and the information is categorized both in a contextual manner and a conceptual manner. Ranges of data representing format choices are used such as lines, sentences, DOL's (lines of data) and paragraphs. Thereafter, the information life cycle search engine modifies the search terms and the user inputs either a convergent instruction or a divergent instruction. The resulting search terms are then supplemented according to the convergent or divergent system.

The search for the primary search terms (convergent or divergent) results in a federated or confederated as well as a distributed supplemental search term group. Hyperlinks, URL, network references, SQL are submitted to one or more of the following: search engines, databases, data warehouses, addressable data elements, artificial intelligence, data mining sources, text storage, method data storage, indexes, libraries, catalogs as well as other data structures.

The next step involves ascertaining the depth of the search by identifying the number of hits for the first search term and the last search term, the time involved to compile the search, the time involved until no changes, the number of iterations involved as based upon a divergence search as separate from a convergence search. The output is a consolidated search result list.

Figure 12B:
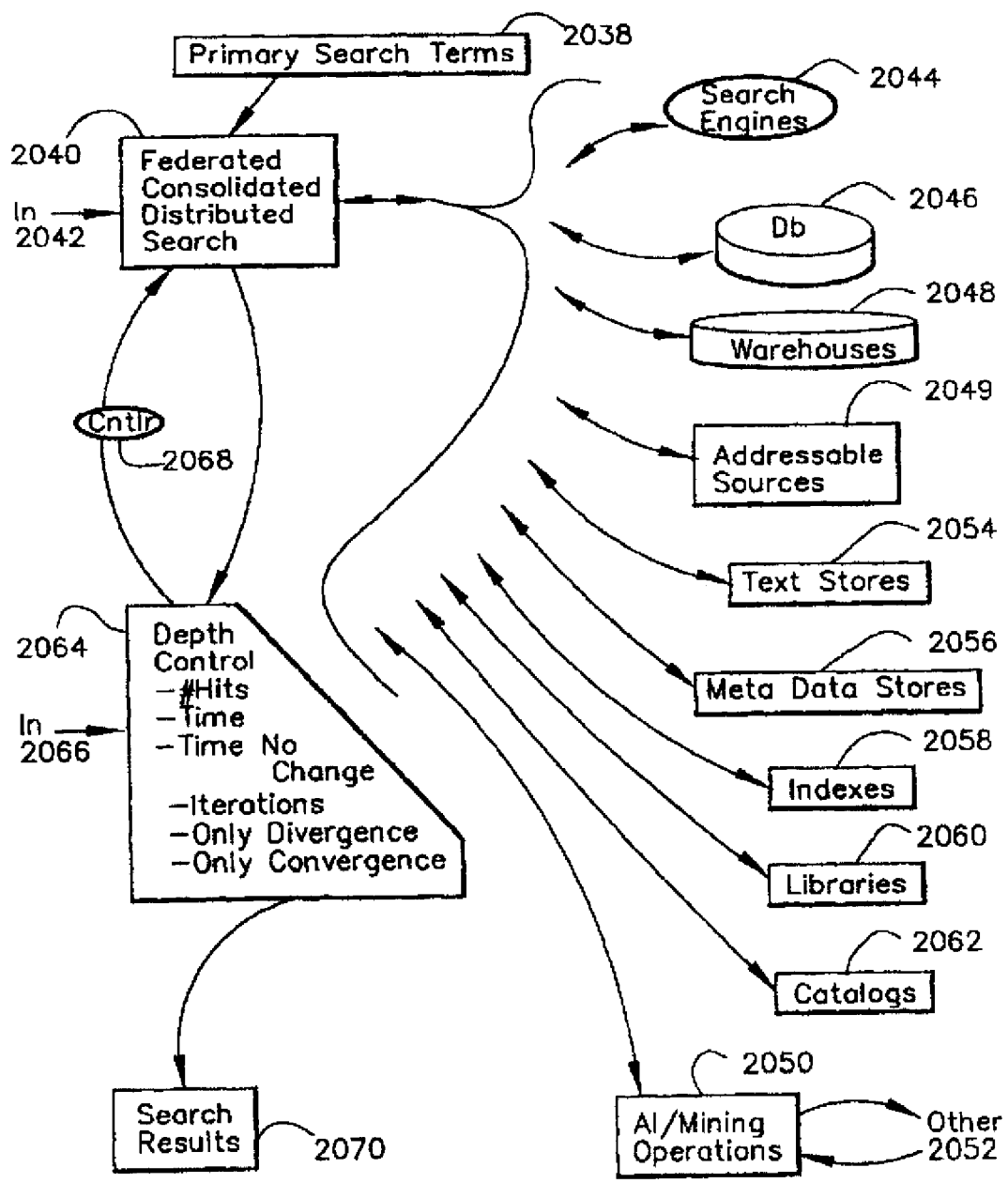
FIG. 12b diagrammatically illustrates the KE process of using search terms, data collection and depth-of-search control.

FIG. 12b starts with an input being primary search terms 2038. The search engine module then executes function 2040 which is either a federated, consolidated, or distributed search. A federated search unites the search terms and additional supplemental documents generated and located from those search terms together. A consolidated search is simply a composite of all the search documents obtained without any relationship or affiliation. A distributed search seeks to widely engage a large number of data structures for the search. Operator input IN 2042 directs the selection of the search function 2040. Search function 2040 operates by sending the primary search terms to additional data collection targets such as search engines 2044 (Google, Yahoo, etc.), databases 2046 (representing a plurality of databases), data warehouses such as dictionaries or other sources 2048, addressable data structures 2049, artificial intelligence or mining operation functions 2050 and other data collections, data structures, indices, etc. The mining operation 2050 may access further tertiary data structures 2052. The search function 2040 applies these primary search terms to text stores 2054, metadata stores 2056, indexes 2058, libraries of words, terms, images, data or data objects 2060 and catalogs 2062. The results are compiled back to search function 2040. Step 2064 is a depth or search depth control in which the operator by input IN 2066 delineates either as a pre-set or a default or an active real-time control the number of hits needed from each of the data structures accessed by search function 2040, the amount of time for the search, the amount of time when no change is found from the retrieved documents, the number of iterations (repetitions), and whether the primary goal is a divergent search or a convergent search. Search depth control 2064 provides control information CNTLR 2068 back to search function 2040. The search results 2070 (supplemental documents or supple docs) are obtained either from output of search 2040 or after the depth control 2064 is applied to the search.

The third step is to take the secondary search result or the consolidated search result and apply them in a convergent manner or divergent manner. The output is either a convergent compilation of documents which are obtained via the supplemental search terms (adding known SC to the search term group) or a divergent compilation of documents employing the same search terms. A similar output result can be obtained by using hyperlinks, URLs and other metadata aspects.

Figure 12C:
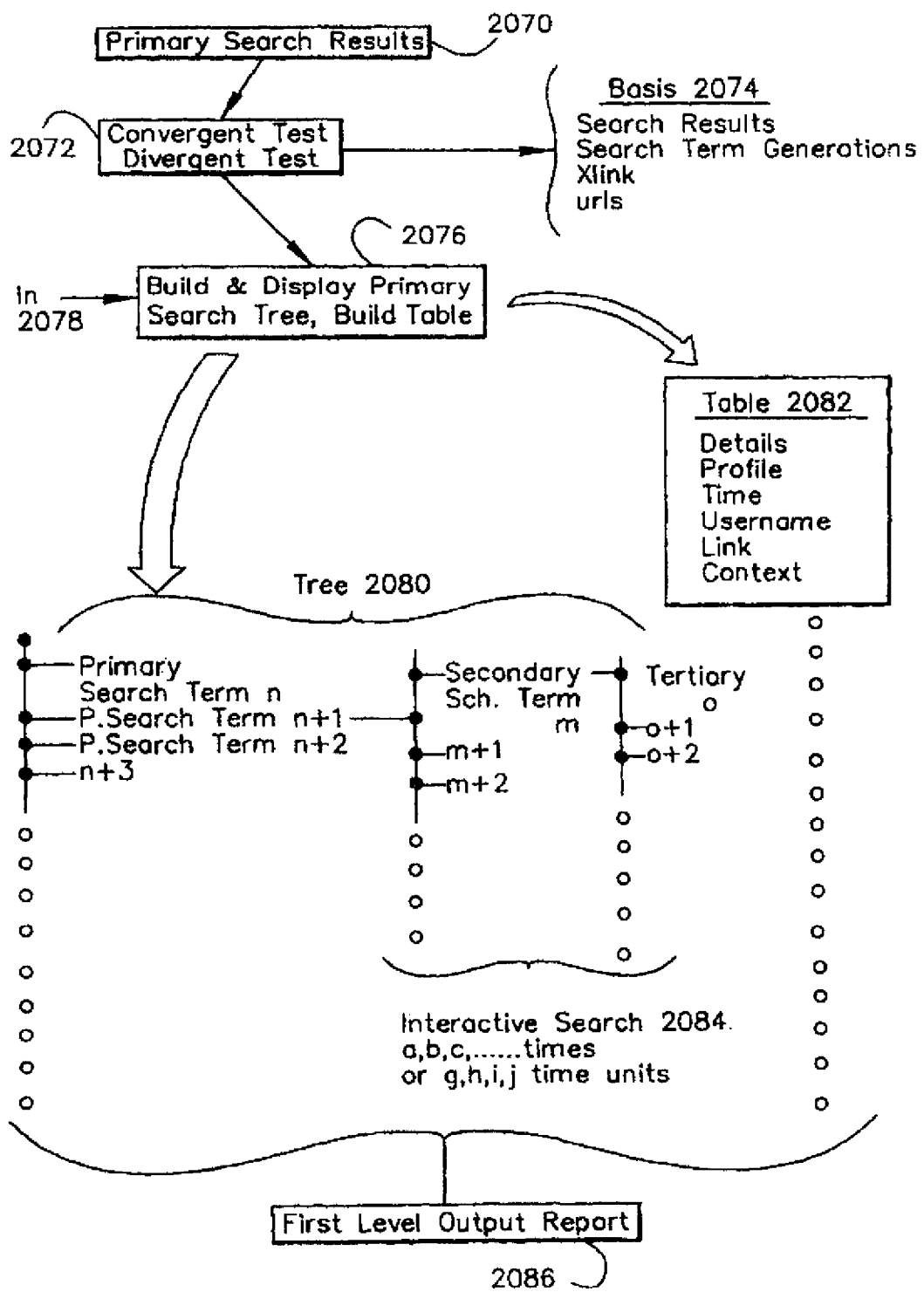
FIG. 12c diagrammatically illustrates the KE process for the primary search results.

The fourth step (see FIGS. 12c and 12d) is to build a tree or a table listing the details. The tree shows the hierarchy of the data retrieved in the convergent or divergent search and the table lists the items such as profile, time, username, link, context, etc. FIG. 12c shows that the primary search term generates a certain supplemental group of documents whereas the secondary search results in a different group of documents and the tertiary search generates a third level group of documents. The number of searches is keyed to the time involved and the criticality of the information sought to be searched. The object of the tree building and table building (FIGS. 12c, 12d) is an exploration of information linked or associated with the initial information provided. Further, a social relationship or connect-the-dots matrix display can be obtained based upon this iterative information life cycle search.

The output or yield of the information life cycle engine module results in a convergence search wherein additional supplemental information data is obtained to corroborate or validate the initial search terms and initial information document supplied. Therefore, the sec-con is tested or the SC is tested in the respective storage mediums. A divergent search yields more data which is loosely associated or related, coupled or referenced to the initial information document. Initial search terms result in a divergent documents can be expanded upon by the hierarchical tree with a list of details.

At some point, the operator must prune the hierarchical tree, reduce unnecessary items and augment others. Some of this pruning can be automated with an inference engine or artificial intelligence module. Otherwise, the operator may manually engage in the information life cycle engine.

Figure 12D:
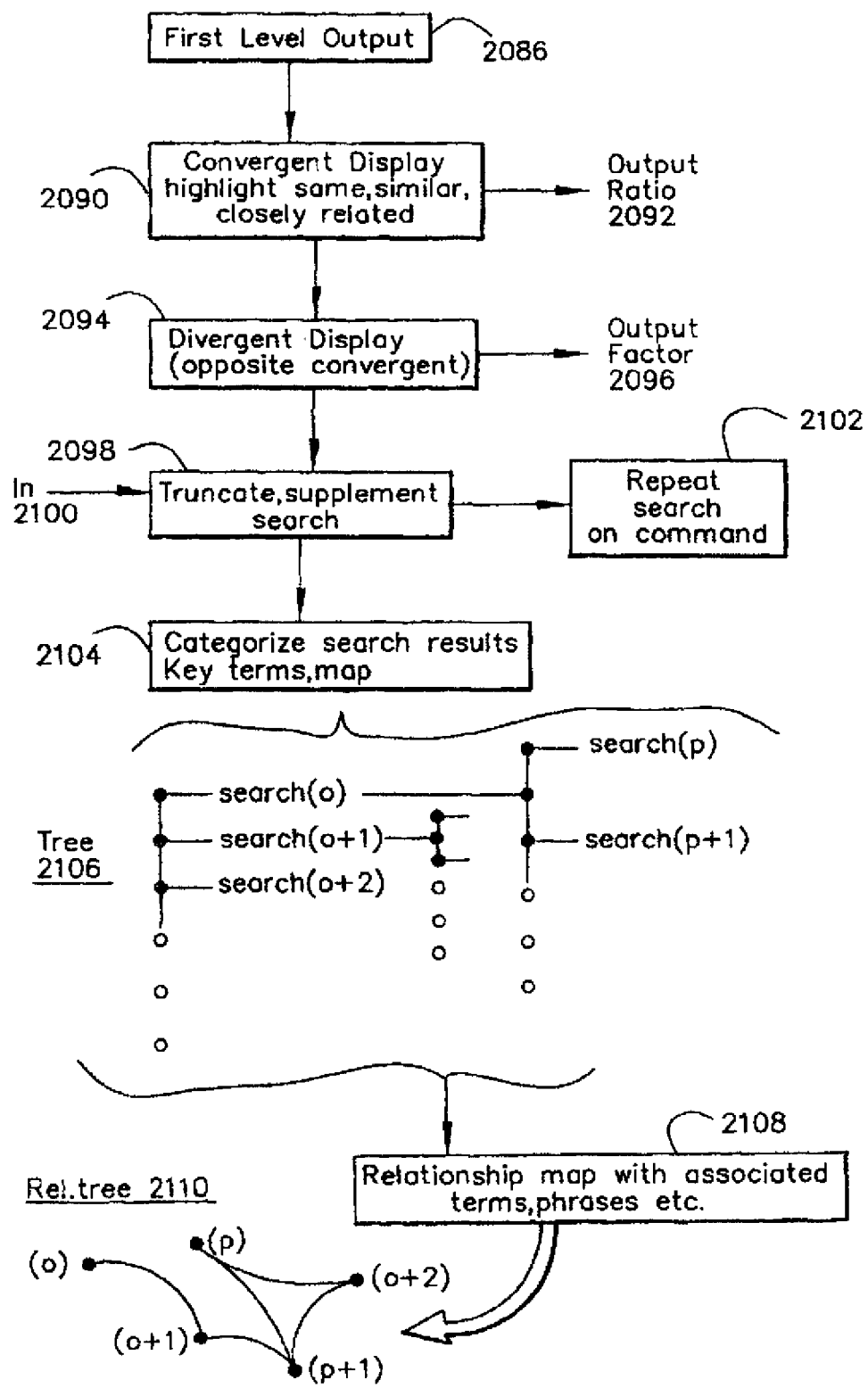
FIG. 12d diagrammatically illustrates the KE process for the output representation of search term data and search result data of supplemental documents.

The last step is a relationship map between the initial document and the supplemental documents generated through the convergent or divergent search. The final result is a map of the hierarchical search terms at various levels source, search 1, search 2, search 3 . . . search n. See FIG. 12c. A further result is shown in FIG. 12d wherein a social relationship or process relationship between the various documents is established. Some people would call this connecting the dots or relationship mapping. The relationship mapping changes the degree of separation or similarity between each information document.

FIG. 12c begins with the primary search results 2070 and function step 2072 executes a convergent test and a divergent test on the primary search result. The basis 2074 could either be the search results themselves, a search term generation which is search terms extracted from the documents located during the search, hyperlink or x-link and URLs. The convergent test determines whether the search and recovered documents converged into a certain pattern whereas a divergent test shows that the documents, search results, hyperlinks or whatever spread to wider results. The build and display function 2076 takes the primary search terms and builds a search tree and builds a table. Operator input IN 2078 optionally enables the operator to set the scope and format of the search tree and the table. Tree 2080 is a display showing the primary search terms n, n+1, n+2 and secondary search terms m, m+1, m+2 and tertiary search terms o, o+1, o+2, etc. Iterative search function 2084 establishes how many paths or branches are executed in building the primary search tree. This may be one of the input IN 2078 functions for build and display function 2076. The iterative search 2084 may be a number of times counted in branches or may be certain time unit g, h, i, j. Table 2082 is a detail showing the search term including profile, time, username, link and context of the search term. Function 2086 is this first level output report showing the search terms for the information life cycle engine.

FIG. 12d begins with the first level output for the search term 2086. Function 2090 is a convergent display which highlights the same, similar or closely related documents. Also, an output ratio 2092 may show how many of the documents are related by word, term, image segment, hyperlink or metadata factors. Step 2094 is a divergent display which is the opposite of the convergent display. Output factors 2096 may show how many divergent documents having little or no connection to the primary search terms have been discovered by the search engine. Function 2098 permits the operator by input IN 2100 to truncate the search or supplement the search. Function 2102 repeats the search on command of the operator. Step 2104 categorizes the search results by key terms (taxonomic classification) and generates a map. One map is shown by tree 2106 which shows the search results or information documents as document o, o+1, o+2 as well as secondary documents p, p+1. Step 2108 develops a relationship map with associated terms, phrases, documents or hyperlinks. Relational tree 2110 shows that point or document p+1 is related to document o+1, p and o+2. In contrast, document o is not related to any document other than o+1. The relationship tree 2110 is sometimes called a "connect-the-dots" map.

C.11 Search with Prioritized Classifications

FIG. 12a shows that the operator or user can input search terms, source document or a data stream 2006 into the system. Search terms function 2008 represents the use of a search term string, document or data stream into the metasearch engine 2020 and through the classification or category analysis filter (hierarchical taxonomic system) function 2030. The sensitivity function 2026 permits the operator or user to pre-select the priority for the hierarchical taxonomic or class system. Alternatively, "My Profile" or pre-set prioritized classes may be used. The user may also select the priority and the class/subclass of the search terms immediately prior to the search. The process, in FIG. 12a, extracts search terms from input data represented by a source document or a data stream, and identifies data elements in the input data with the classification system corresponding to n priorities therein. In one embodiment, the operator selects either a convergent search or a divergent search in function 2034. Optionally, the convergent-divergent search function 2034 may be omitted. The process then applies the prioritized and classified search terms as primary search terms in FIG. 12b, term function 2038, gathers documents and then resets n priorities in said classification system to m priorities in said classification system. This is part of the depth control function 2064 and control function 2068. Secondary search terms from the input data elements (terms 2008), classified corresponding to m priorities are again used in function 2040 and the search is repeated to gather secondary supplemental documents. The system then applies convergent-divergent test function 2072 (FIG. 12c) on all supplemental documents to find convergent or divergent characteristics of the gathered documents. The search repeats until a search end parameter is met, such as all supplemental documents exceed a predetermined number, a predetermined number of data elements from all supplemental documents fulfill a predetermined number of priorities in said classification system, a lapse of a predetermined time, a predetermined number of data elements from all supplemental documents fulfill a predetermined number of priorities in said classification system, among other search end parameters discussed herein.

Optionally, the system and process may omit convergence-divergence function input 2034, 2036, and select n priorities from the prioritized hierarchical classification system, extract search terms from input data (functions 2006, 2008, 2010, 2012) represented by a source document or a data stream or a search term string, and identify data elements in said input data with said classification system corresponding to the n priorities. The process then searches data collections with said search terms and gathering supplemental documents based thereon. FIG. 12b. The process then extracts secondary search terms as data elements from the supplemental documents with the classification system corresponding to n priorities and repeats the search of data collections with the secondary search terms. Secondary supplemental documents are then gathered. See FIG. 12d, truncate, supplement and search function 2098, and repeat search function 2102. Such an optional search ends as described above.

C.12 Simple Filters

The user, prior to initiating the knowledge expander select content (SC) engine module, may be given a choice of filtering out or identifying all SC data objects or sec-con objects with white lists or black lists or a combination thereof as a content filter. Uncommon words, terms or data elements not found in the dictionary, geographic term lists or name lists and other lists are located with a negative content filters used to discover unknown data elements. The negative content filters can be added to the metasearch term engine such that these unknown words, terms or data elements are tagged "unknown" and assigned to the hierarchical taxonomic class as an unknown data element at the hierarchical taxonomic classification level (assigned to a class of words, terms, etc., and assigned an SC sensitivity level—that is—a hierarchical marker). The search terms extracted from the source doc are supplemented with white lists or black lists words, terms, etc. (content filters additions) and the supplemented SC or select content words or terms are filtered out to identify the uncommon or unknown words. Of course, the user may be required to manually input all SC words or download the SC word filter from the Internet or another secure network system or LAN. A "profile" of SC with the hierarchical taxonomic markers can be employed by the user-operator. For select content systems having multiple levels of importance (which may be multiple security levels or multiple levels of SC importance in an organization or related to the organization, for example, primary competitors compared with secondary competitors), a plurality of filters would be created, each filter associated with a different SC level. Further, multiple SC levels may require, remainder SC document or data stores (unknown data stores) and a plurality of extracted data stores. Multiple levels are similar to the MLS security content (sec-con) system described in section D.4 to D.9.

The ability of the program to locate select content or SC words or characters (or sec-con) can be enhanced by using a telephone book, properly dissected, to identify a collection of last names. Cities and towns and street names can also be identified in this manner. The compilation of last names and cities, towns and streets can be used as a list of critical, SC words. The filter is represented by this compilation of words. Similar techniques may be used to create filters for scientific words, or words unique to a certain industry, or country.

C.13 Complex Filters

There is a need to construct filters which supplement the initial list or compilation of SC (or sec-con) words, characters, icons and data objects (herein "word" or "data object" or "word/object"). The need arises either due to the fact that the initial SC search term word/object list is incomplete, or that the author of the initial list is concerned that the list is too limited or in order to defeat an attack or an inference engine "reverse engineering" at the resultant expanded SC document. In a test mode, the complex filter is used to determine how "secret" or "special" the sec-con or SC is compared to outside databases and data collections. Further, the incorporation of a filter generator for SC or sec-con search terms enhances the user friendliness of the program. In one embodiment, the program is configured as an editor compiler to screen and build enhanced SC doc or doc collection from a source document. The user selects, at his option, functional aspects which include: compliance with laws (an application of a type of filter, e.g. HIPAA, GLB, Oxley-Sarbanes, EU privacy, executive orders); privacy (another type of filter which locates SC terms, for example, social security numbers, see also, EU policy); search for and supplement filter; pay per view (which enables the user to buy missing sensitive information (for commercial purposes); survival (which creates a distributed and dispersed copy of the user's source document and other stored documents and items using predetermined storage facilities); security (which triggers the various security routines); and storing (which permits the user to select which of the several storage options the extracted SC data/objects should be employed in the dispersal.

Figure 13:
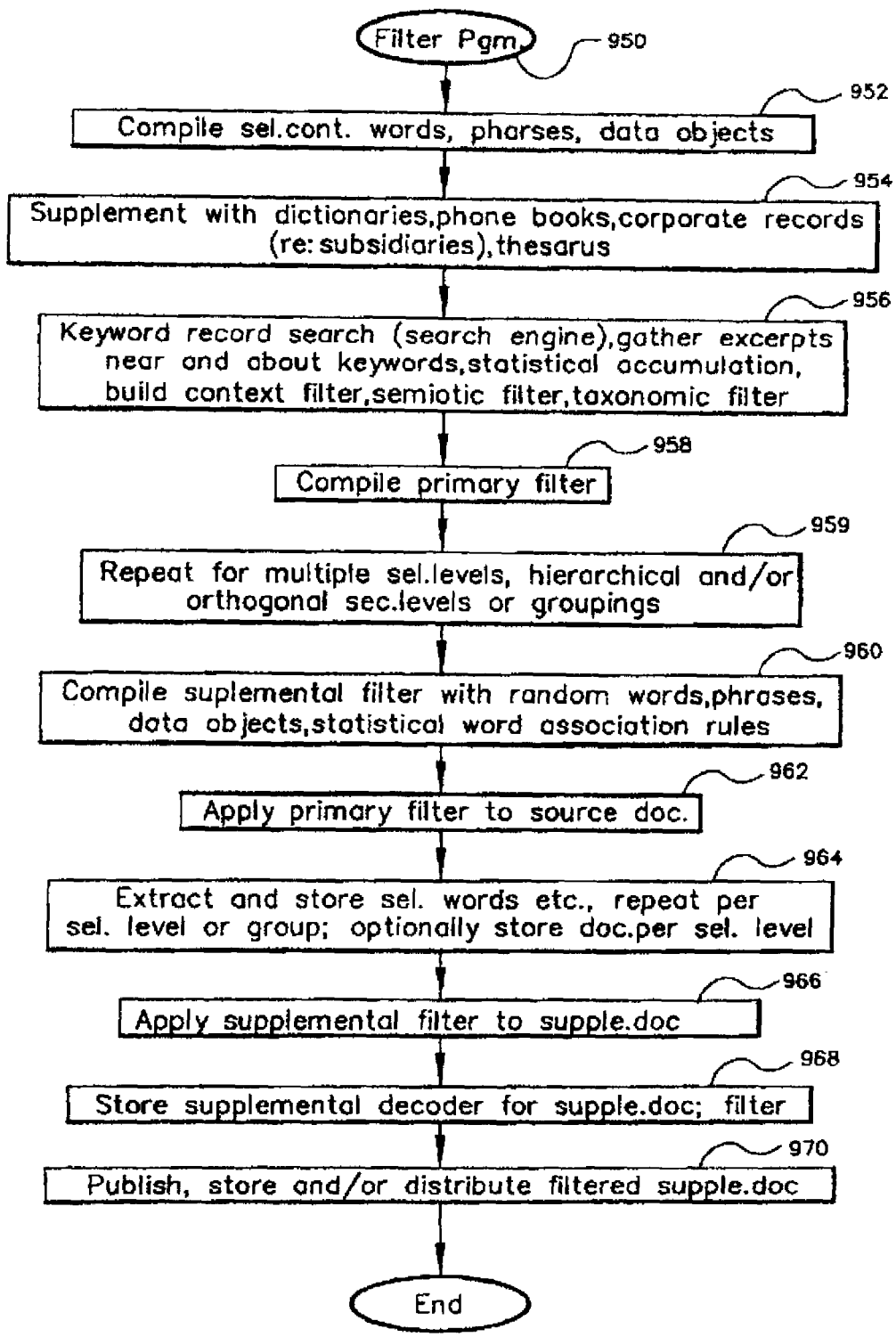
FIG. 13 diagrammatically illustrates a filter program.

The filter routine or module diagrammatically illustrated in FIG. 13 is useful in compiling a SC or sec-con search term filter which separates both the sensitive word/objects and contextual and semiotic and taxonomic aspects of the initial list of SC word/objects. The filter works in conjunction with a compilation of data, typically located on a network which could be private or public. In low level SC situations, the filter may access Internet databases to gather additional data for the filter. In more robust SC systems, the filter could access private data bases (one located at the same organization level as the user) and build or compile the additional SC word/objects. The filter program 950 in FIG. 13 begins with step 952 which compiles the initial list of SC word/objects. In 954, the initial list is supplemented with dictionaries, phone books, corporate records (to obtain subsidiary data and trade names) and thesaurus data. This is a content filter. Each of these represent different compilations of data and the added data is added to the initial list of SC word/objects. In 956 a search is conducted on a network, usually through a search engine, to gather excerpts near and abut the keywords. This is a range or contextual filtering aspect. These keywords are the initial SC word/objects. Statistical algorithms are applied to gather non-common word/objects which are associated with the keywords as found in the additional data compilations. The goal of the adaptive complex filter is to obtain contextual, semiotic and taxonomic words, characters or data objects from the compilation of additional data related to the SC words, characters or data objects. Semiotic is a general philosophical theory of signs and symbols (read language and words and objects) that especially deals with their function. Semiotics include syntactics, semantics and pragmatics. Syntactics is the formal relationship between signs. Semantics is the meaning of signs and pragmatics is the relationship between signs and their users, such as the relationship of sentences to their environment. Taxonomy is the scientific classification and categorization of items. Therefore as an example, a search through the Internet on Google search engine under "Bin Laden" may show a number of uncommon (non-dictionary words) (content filter-based search) within 200 words of the target "Bin Laden" (a contextual filter-based search). This search string would gather documents from the Google search and copy 200 words on either side of "Bin Laden" and then extract only non-dictionary words into a supplemental SC term list. This type of filter algorithm looks for contextual matters close or near to the target. The search is semiotic and statistical in nature. Additionally, the initial supplemental list would identify the Bin Laden is an Arab and this classification (a taxonomic aspect) can be used to expand the list for the filter. The algorithm may include a simple command to gather all 10 words on either side of Bin Laden. This is a pure contextual search and the "10 word" range or format aspect is a statistical number. From the supplemental list, all pronouns, prepositions and conjunctions may be eliminated. Spiders or robots may be used in the gathering of the contextual and semiotic filter data. The contextual, semiotic and taxonomic words, characters or data objects from the compilation of additional data are all related to the initial list of SC words, characters or data objects.

Step 958 compiles the adaptive or complex filter. The above noted contextual, semiotic and taxonomic filter is adaptive since it can be used to expand (and potentially contract or reduce) and adapt an existing list of SC or sec-con word/objects to a larger list which better expands the information content of the source document and supplies SC term data to an inference engine. As a test, the sec-con storage is tested with the complex filter to determine whether the security level is appropriate. For an SC test, the complex filter is used to ascertain whether the SC store should be supplemented with additional outside data or that the H-tax class be changed. Step 959 repeats the filter gathering and compilation for various levels of SC inquiries. Higher SC inquiries require a broader search (1000 uncommon words near Bin Laden and add all Arabic and sub-Asian continent cities). Orthogonal SC groups (those groups having the same level, e.g. S Secret, with each other but being different organizations, e.g, Department of Defense compared to the FBI) often have different methods to keep SC data separate between compartments.

The adaptive filter can be set to automatically gather additive SC word/objects. The test module may be run periodically. The system, with a basic filter, may identify a SC word in a paragraph being scanned by the initial filter. This SC or sec-con word may be a special word in the existing filter or may be a non-common word not found in the initial filter. The adaptive filter system may then obtain this "unknown" or "special" word (a negative filter in that the word-object is not matched to a word-object having the same content), and conduct a search through a compilation or data base of additional words, etc. Any new word/objects falling within the contextual, semiotic and taxonomic SC words, characters or data objects from the compilation of additional data (database) related to said SC words, characters or data objects are then added to the filter. The expanded filter is then used to supplement the source document.

Step 960 compiles a supplemental filter with random words, phrases, etc. in order to further defeat an inference engine reverse engineering assault on the SC supplement document matrix. In some sense, the production and use of a random filter is an encryption technique since the resultant filtered product, in order to be understood by others, must be reverse filtered or decrypted to reveal the source doc and enhanced doc matrix at the appropriate SC level. Nonsense words may be added to this supplemental filter. Step 962 applies the primary filter (with the SC word/objects and the additive word/objects from the contextual et al. filter) to the source document. Step 964 extracts the SC word/objects per SC organizational level. It is noted that several filters are used, on one for each SC level, whether hierarchical or orthogonal. The extracted SC word/objects are stored as a supplemental search term doc and the system gathers supplemental documents (supple docs) which expand the knowledge base about the SC word/object. Step 966 applies the supplemental filter to the supple docs returned per search level 1 with SC search terms. The system then repeats the process of SC search term generation on primary retrieved supple docs level 1, generates SC search terms per level 2, and retrieves SC level 2 supple docs. A tertiary search term generation and supple doc retrieval is possible based upon the operator's initial set-up or upon operator input at steps 964, 970. Step 968 stores the supplemental doc to permit information enhancement of the source doc. Step 970 publishes, distributes or pushes the source and all supple docs and search term data to others having a need to know.

C.14 the Editor as an Information Expander

FIGS. 14 through 18 diagrammatically illustrate an editor which may be employed to locate SC or sec-con word/objects in a source document and expand the knowledge base with supple docs. In one embodiment, the editor is a standalone application or a module to add onto other applications for plain text and media creation, editing, and sensitivity SC level tagging. Other types of tagging, wherein the editor supplements the initial group or subset of select content SC or sec-con sensitive words, characters, icons and data objects by categorization, taxonomy classification, privacy, security, compliance, and semiotic meaning, are also available. The editor supports a full range of document management and can be integrated into a unified infrastructure, from creation, editing, document markup, tagging, tag conversion, tag removal, context sensitivity level redaction, context reconstitution, support for complex process work flows, and expanding the knowledge base by adding supplemental documents (supple docs) to the initial collection of source doc. The architecture assures separation of data from metadata so that no security lapses are introduced into the traditional word processing and document management cycle.

The Editor automatically and with nominal operator input (after the Editor is initialized) separates the data stream from all markup and tagging word/objects for SC knowledge generation purposes.

The interlacing of user content with metadata creates significant process, storage, distribution, and workflow security failures that are not resolved with current technologies. Current technologies include encryption, firewalls, intrusion detection, perimeter guards, and locked distribution packages.

The Editor enables text and media creation. However, all additions, deletions, changes, insertions, and reorganizations and reordering are tracked as metadata that does not become part of the document or information file. The document (information file) as seen and shown to the user represents the deliverable format. Since formatting is metadata, it is not included in the representation. Formatting, such font sizing, colors, font selection, footnotes, headers, subscripts, superscripts, line numbering, indexing, and other features characteristic of standard document preparation can be supported but are represented only as metadata. Tagging, including SC sensitivity level, categorization, taxonomy classification, privacy, security, compliance, and semiotic meaning are also represented only as metadata. This separation of representation from meta-representation is critical for creating the infrastructure for SC knowledge expansion, secure information sharing, privacy, security, and compliance.

The editor is currently set in a WINDOWS environment. Pulldown menus provide access to formatting and tagging features. The document, from source, precursor (marked and tagged but not yet filtered or extracted) and resultant final versions for each SC sensitivity level, as seen and represented to the user, is distributed in resultant final form, thereby assuring SC knowledge level compliance. No hierarchical, hidden, encapsulated, linked, associated, or referential information is part of the data stream, file, or storage.

Metadata (such as formatting, such font sizing, colors, font selection, footnotes, headers, subscripts, superscripts, line numbering, indexing, and other features characteristic of standard document preparation) is usually hidden from the user. This supplemental metadata information contains all markup, tagging, formatting, and process support information for the editing process and enables immediate granular distribution of the data stream subject to the needed SC compliance rules. In other words, the data stream can be automatically processed with other functions to satisfy multiple competing requirements and SC sensitivity levels.

Figure 14:
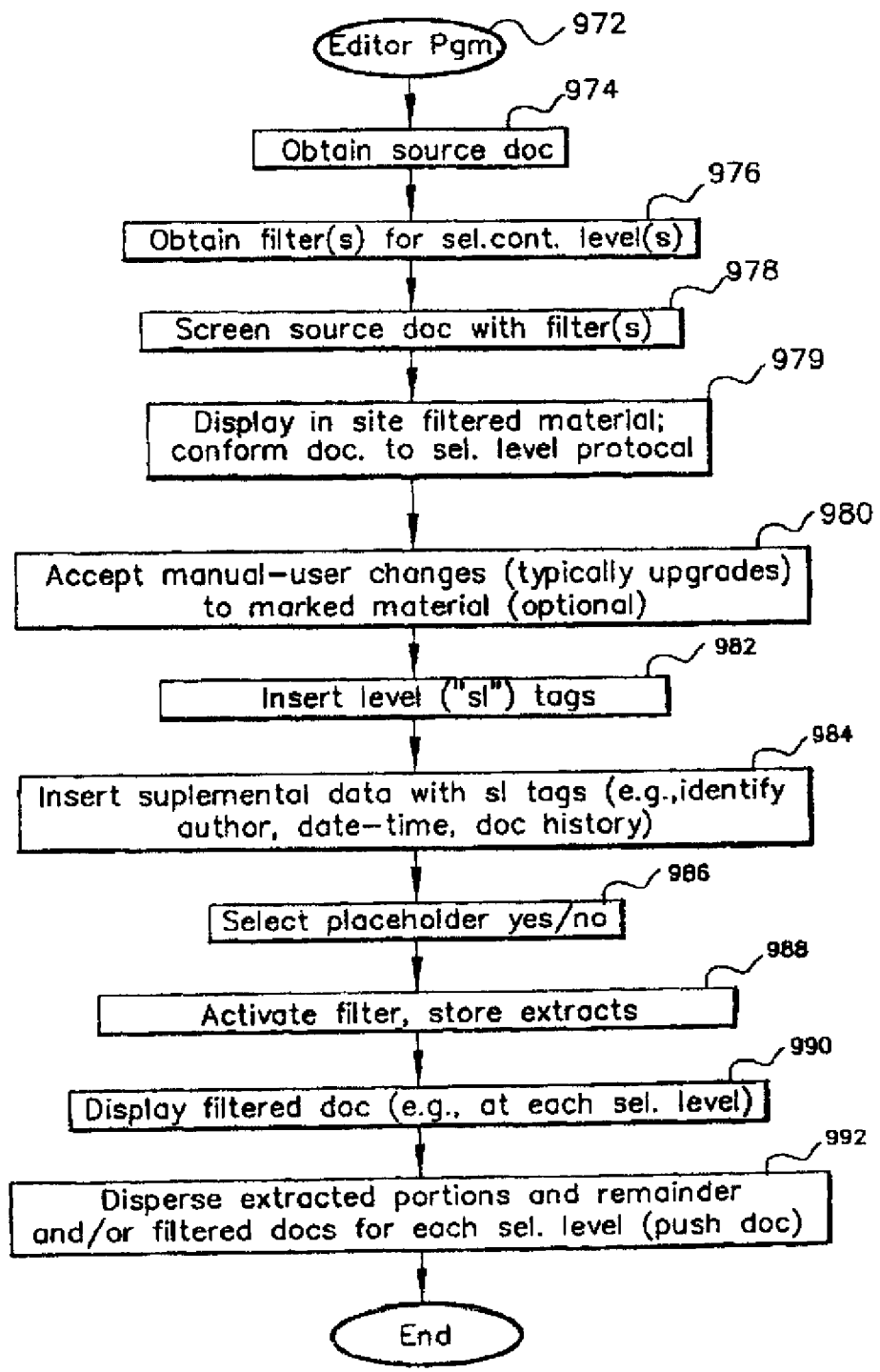
FIG. 14 diagrammatically illustrates an editor program.
Figure 15:
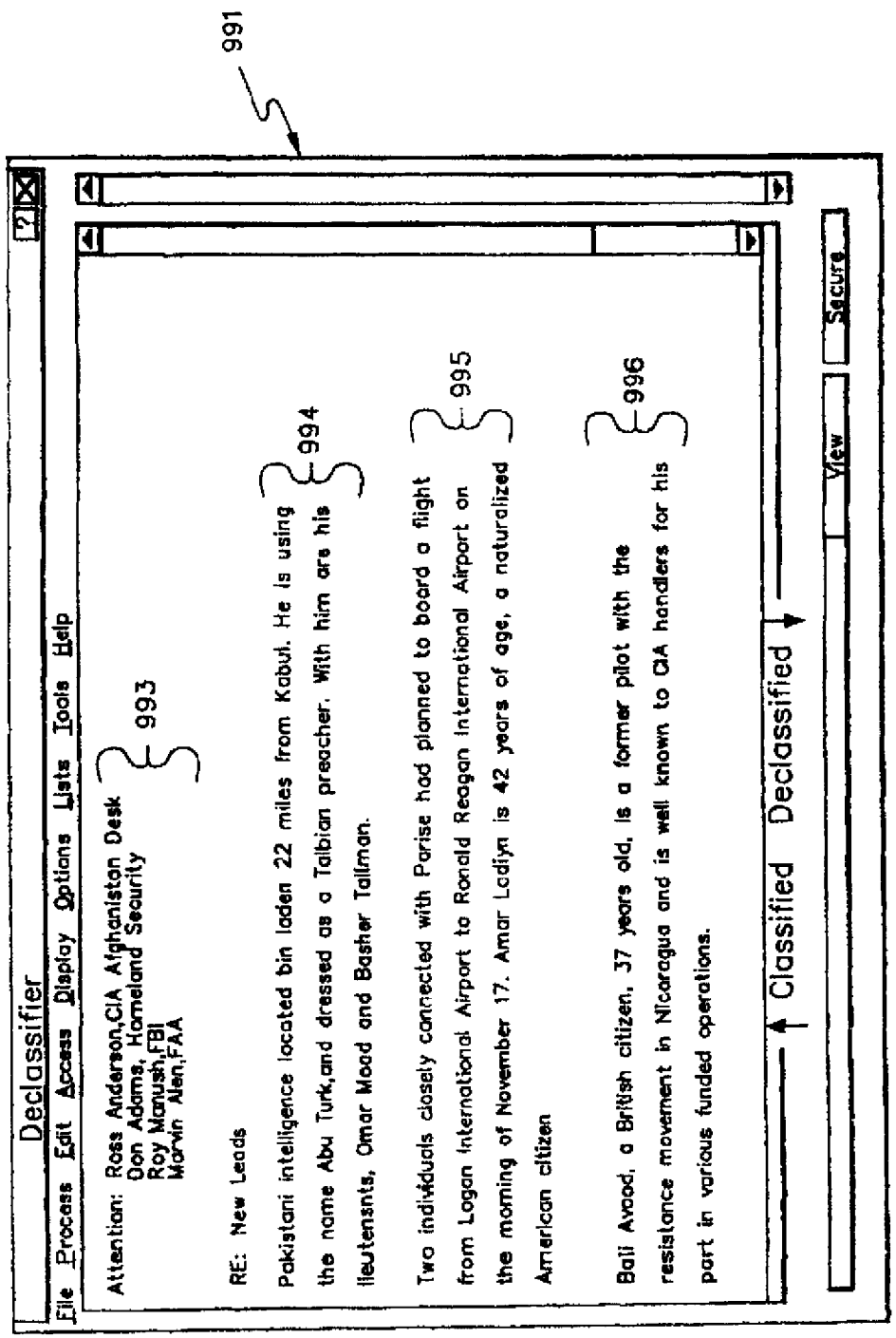
FIGS. 15, 16, 17 and 18 diagrammatically illustrate extraction of select content (SC) and a hierarchical taxonomic system based upon TS, T, C and UC security code classifications.
Figure 16:
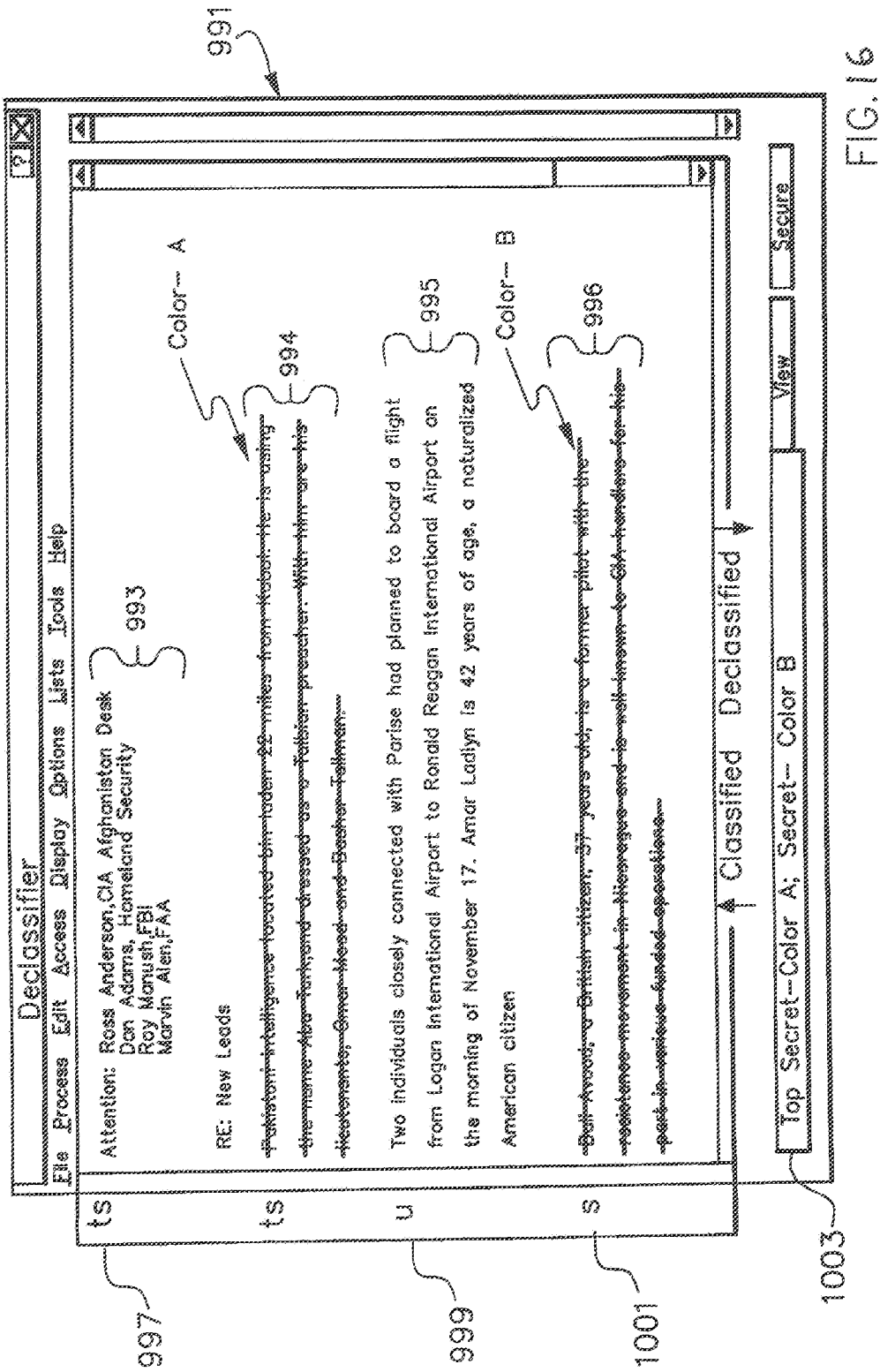

FIGS. 14, 15, 16, 17 and 18 are discussed concurrently herein. FIG. 14 is a basic flow chart for one embodiment of the Editor. Editor program 972 begins with obtaining the source document 974. Of course, the source document may be any type of document or may be a data stream. Of course, the data stream is typically delimited by start and stop characters or codes. Hence, the term "data stream" is similar to "source document" herein and in the claims. Step or function 976 obtains one or more filters for one or more SC or security sec-con or sensitivity levels. Step 978 screens or processed the source document with the filter(s). For example, the source document in FIG. 15 in window 991 has text regions 993, 994, 995 and 996. In step 979, the Editor displays, in situ (in the displayed document), the filtered identified SC or sec-con material and conforms the precursor document to the SC or sec-con sensitivity protocols. As shown, the SC or sec-con sensitivity protocols are security level protocols for the system within which the Editor is employed as an information processing tool. SC or sec-con sensitivity levels 1, 2, 3, etc. correlate to security levels TS, S, C and UC for top secret, secret, classified and unclassified. FIG. 16 shows that the address data 993 is marked TS (top secret), region 994 is displayed in color A for TS coding (please note that the addressee data may also be so marked) and is "red-lined" or struck out. In an information-expansion system, the process marks, labels or tags each word. This is a content filter and tag regime. The user may manually upgrade or downgrade SC or sec-con levels. Region 995 is displayed as presented in the source document and is labeled U (unclassified) and region 996 is shown in color B, is redlined and is labeled S. Labels TS, S, C (classified) and U are the established security labeling protocol used by the organization employing the Editor. The same tagging for each word or character in the source doc can be used. Other labeling schemes for SC elements may be employed. Color is used to assist the user to select (and in some non-standard cases, deselect) the or sec-con data marked by the editor. Redline is used to inform the user that the filter(s) will tag and extract the marked data. Labels are used to permit the entity using the editor to employ standard tear line protocol. Tear line protocol is a contextual tool. Any data beneath a security classification of the user is under the tear line and the data is permitted to be distributed to the lower security cleared user. Of course, electronic distribution of secure data need not use the hard copy or print version of the tear line. However, this nomenclature referring to the tear line is used in the prior art systems.

Figure 17:
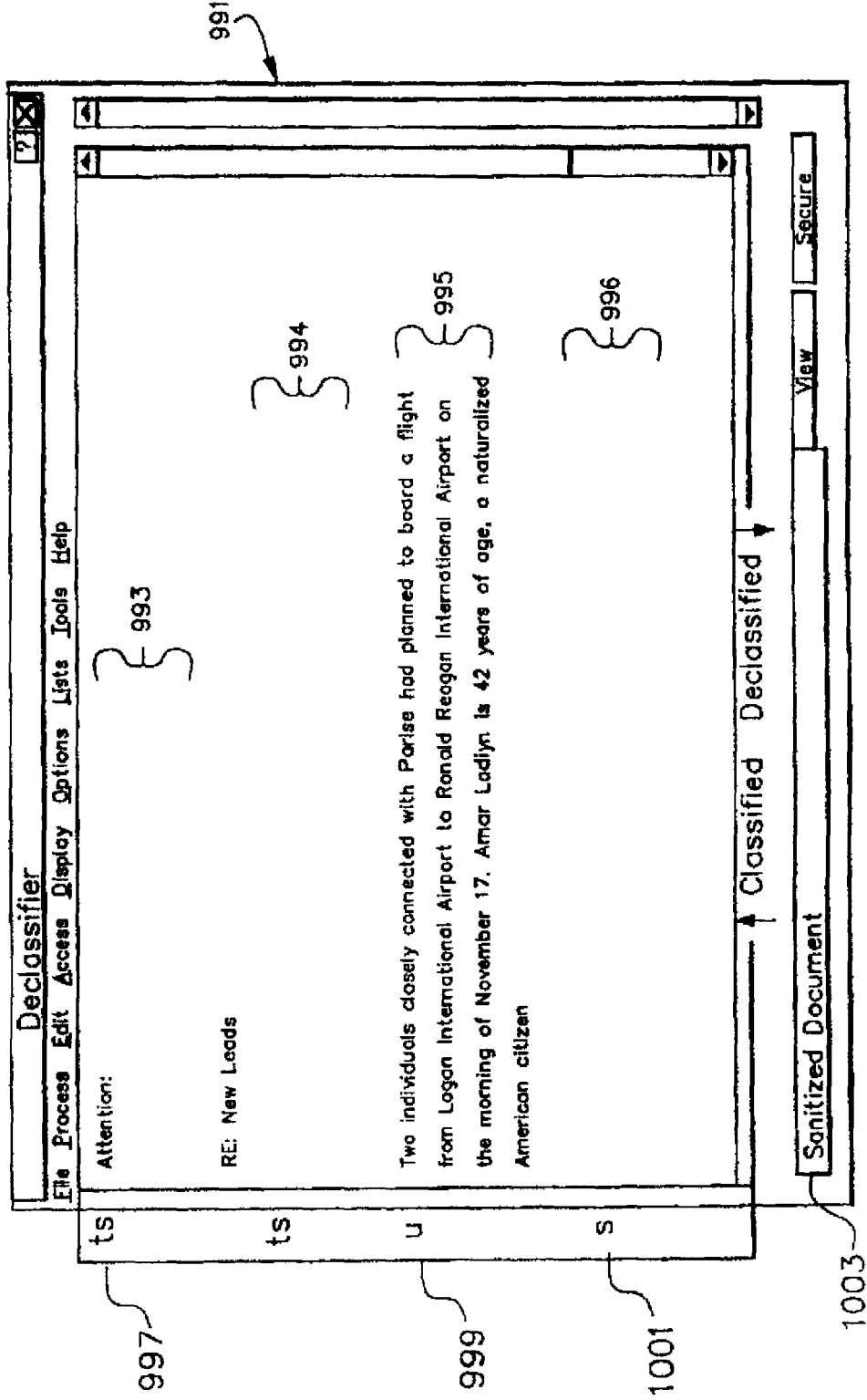
Figure 18:
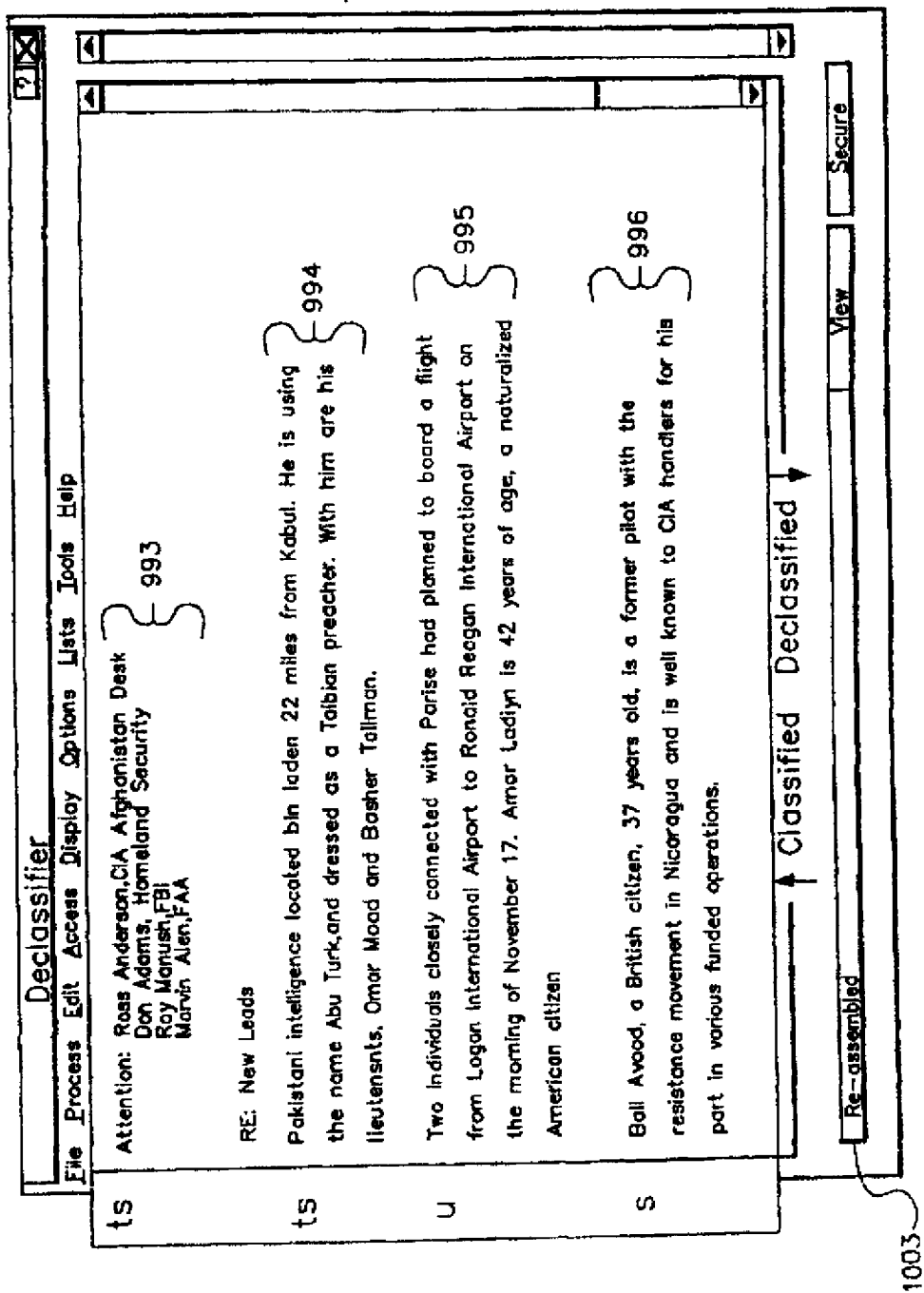

Step 980 accepts the user's manual changes (typically upgrades) to the precursor document. These manual changes are displayed, redlined, colored and labeled. Step 982 inserts the or sec-con tags (or security label TS, S, C and U for the sample doc in FIGS. 15, 16, 17 and 18) as discussed above. Step 984 notes that the system takes certain metadata such as author, date-time, version history, change history, etc. and converts this meta data into ordinary text, marks that data at the necessary security level or SC or sec-con sensitivity level and labels the meta data. Step 986 permits the user to add (or omit) placeholders into the final document. FIG. 17 shows placeholders as black lines or as XXXXX symbols (or other symbols) wherein the sensitive SC or sec-con text is not shown but some replacement markers are shown. The byline in region 1003 show "sanitized document." The byline 1003 in FIG. 16 lists the sec-con security level (or SC level of priority) and the color representation.

In a specific knowledge expander engine, each word, term and character is labeled or tagged with a content filter to show data object type (name, town, credit card number, etc.) and an SC or sec-con sensitivity level (a "tax" or taxonomic classification and sensitivity level). See step 982. The user may add tags (step 979, 980). Meta data is also tagged or labeled.

Step 988 activates the filter, extracts the sensitive SC or sec-con data and temporarily stores the extracted SC or sec-con data. The expansive knowledge engine also stores negative filter results which are those words, terms or characters, images, not found in the context filters. Step 990 displays the filtered document and the user may view the filtered document at each SC or sec-con level. Therefore, the user, before transmitting a secured email (or letter) doc may look at the source (FIG. 15), may look at the TS level (FIG. 15) without the redline strike out but with security labels and colors, may look at the T level revealing regions 996 and 994 but not regions 993 and 994 (which are TS coded regions), and look at U versions as shown in FIG. 17. Step 992 disperses the extracted data and the remainder data or disperses partial versions of the document (those partial versions formatted and containing only data at or above the target security level (all TS level data (which includes TS, S, C and U data), or all S data (comprising S, C and U) or all C data and U)).

In step 979, the SC or sec-con level protocol determines whether single words are granularly classified (TS, S, etc.) or whether a line is classified (context filter), or whether an entire paragraph is classified (see FIG. 16). If a commercial/privacy filter is used to exclude all social security numbers, the organizational protocol is set at a granular level to exclude just social security numbers. Different group protocols use algorithms to mark, filter and extract adjunctive security sensitive words, characters, icons and data objects near the target SC or sec-con sensitive words, characters, icons and data objects. The SC or sec-con words may be security sensitive words, characters or data objects defined by compliance with law, regulation or policy, privacy, national, organizational or private security concerns. For example, "Bin Laden" is the target sensitive word in FIG. 16 and this classifies the entire paragraph as TS level. The other words in the paragraph are adjunctive word/objects.

In a knowledge expander mode, the SC or sec-con filters are applied in a negative manner as follows: (a) in the user set-up, the user establishes taxonomic categories or classifications and sets the selection priority of the classes; (b) the source document or source data stream is broken apart to separate all metadata; (c) the source document (may be a data stream) is processed by a taxonomic filter which tags or labels each word or data element with the taxonomic classification and the sensitivity or priority label (multiple "tax" tags, overlapping "tax" tags and "unknown" tags are possible); (d) after labeling, a content and contextual filter is used to separate out the unknown words or data elements (a negative filter). The resulting negative list of search terms is used in various search engines for both public and private data sources, to compile a compilation of supplemental documents (supple docs) and, thereafter, the supple docs are re-cycled through the H-tax and priority filter, then the content and contextual filter and a secondary supple doc collection is obtained. The primary and secondary supple doc collection represents the expanded knowledge search not typically found with commonly available search engines and processing techniques.

C.15 Document Object Model (DOM)

Protection and Processing

The search for expanding the knowledge base from a single source document to a larger compilation of docs has changed from locating content (see the prior art GOOGLE search engine) to expanding the search and search results for concept and context. Sequential text files are the exception rather than the norm. Flat, plain, and sequential files would have disappeared entirely from all but transitional processing steps except for the recent success of HTML web sites and the desire for storage of complex data into sequential XML formats. In spite of the apparent linearity of HTML and XML, in practice these flat files participate in a greater complex hierarchy of structured data mapped by object models. The object models blur the lines between content, concept, and context such that effective security requires a broader stroke than merely encapsulating content with encryption and limiting access with tokens or encrypted certificates.

Linkages to external files, style sheets, and embedded applications or scripts undermine the simplicity of HTML and XML flat formats and compromise point security. Even structured field or line and record-oriented file formats have given way to more complex data storage models. It is insufficient to view security of content and files in terms of encryption and encapsulation alone. Structured object models mix content with metadata and methods such that non-granular access—that is, either/or barrier-based access through encryption keys, dongles, and passwords—undermines any concept of effective security.

Furthermore, simplistic document management and access control overlook the multiple purposes for each compound data document and the adverse impact on organizational processes and work flows. Barrier-based security also fails from any Pacman-style attack, where the barrier, once breached not only provides full access to the once-protected interior also interferes with analysis of the attack and observation of how to prevent the ongoing attack. Granular multi-level control of user data, metadata, data stored through the specifications of a hierarchical data object model, and methods underscores the new security paradigm.

All data sources important to data process workflow are non-linear, non-sequential, and not standalone in that the data sources are interconnected to or required by other data sources. This includes databases, structured documents, desktop application user files, hierarchies of data structures, and work flows. The most advanced data workflow and the focus of attention is the object-oriented models used in data processing today which comprise a cascade of events rather than a single point operation. This complicates SC or sec-con data expansion activities to promote security, survivability, privacy, confidentiality, and anonymity. The present invention improves the security of complex document object models and interdependent workflow by expanding the knowledge base form a source document, thereby testing the classifications levels and generally expanding the knowledge base of a user form the simple source doc.

There are only a handful of counterexamples to complex data structures, mostly monolithic file structures and simplistic processes. This includes text files, raw binary image files, and lists. These are typically inputs to older or uncomplicated computer activities; they do not reflect the complexity and interrelationships consistent with and necessary for most critical networked data processing activities. Examples of flat files are text files, binary images, and lists. Plain-text documents are used only as temporarily or as conversion paths for other activities. Binary graphics are employed for their specific simplicity, speed of display, and small size. It should be noted that they (BMP, GIF, and other formats represent the bulk of web images) are usually stored in an inverted backward last-to-first sequence. List files are rarely important and standalone files are often a temporary part of another process. One of the most ubiquitous of plain-text files, the HTML web page, is rarely a simple text file, but a circular connection to many other like files and one part of a more complex hierarchy. A relative of lists is the field-oriented record structure. This is web page usually a grid-like storage of linear data. However, even a table grid, multi-dimensional indexing, SQL query concept is giving way to object-oriented post-relational database storage methods based on object models in order to augment functionality, speed of performance, cross-platform and application functionality, and compete with easier to use user and developer products. Even the image files are becoming increasingly complex. Hierarchical images formats with vector graphics compress motion and curves into small packages. Examples include Corel Draw, Macromedia Flash, Adobe Photoshop, and Microsoft Photo. These of course contain proprietary and unintentionally-distributed information. Increased reliance on reliable data storage infrastructure and networked storage technologies is enabling the transition to data storage based on object models.

Figure 19:
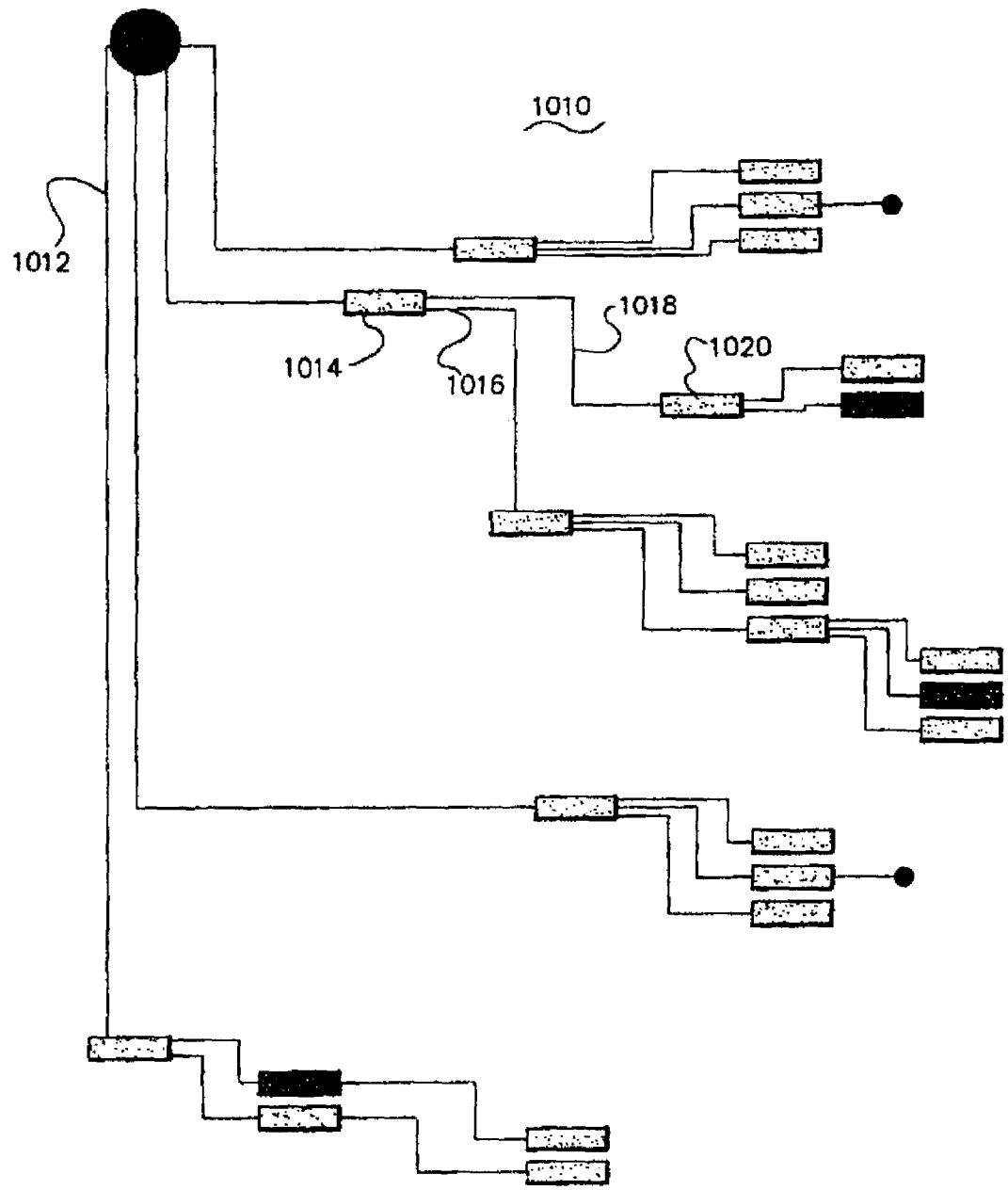
FIG. 19 diagrammatically illustrates a data object tree or map for a document model (DOM).

FIG. 19 shows the root, branch, and leaf paradigm of this principal data storage structure. See root 1012, content leaf 1014, branches 1016, 1018 and leaf 1020. The object model refers to the layout or the map (a blueprint supplied by the document object model (DOM) vendor) of how the data is potentially stored in what is definitely a linear file. The stored file is the document object structure containing the data whereas the model is the schema representation. The model FIG. 19 is just a blueprint for an empty data structure.

The data structure is stored as a binary file populated with data representing a subset of that blueprint. The data file is often referred to as the document binary file so as to make clear that it is not a plain-text file, not in user-friendly format, and generally readable by an ASCII reader only in discontinuous chunks. The model and the structure are not the same. The model (FIG. 19) does not represent a security threat in itself; it just represents how to find and define data stored within an actual data structure. It is the data structure in memory (the source document) or stored as a file that is the security threat. Usually, the file containing the data structure gives enough clues to the purpose, methods, and sources unless addressed by a multi-level security scheme attuned to the complexity of the object model. Although this "file" is stored as linear flat file, the extended structures is dependent on the hierarchical collection of potentially infinite branch and leaf references. Despite this complexity, there are clear reasons based on simplicity for this hierarchical structure, not the least of which is flexibility, self-documentation, and backwards/forwards compatibility.

The subtle differences between a plain-text file, a file containing lightly structured data, the schema, and a file containing data within an object structure becomes very important for security. When files are distributed and those files each contain data within object structures, workflow is complex and cannot be effectively protected with barrier-based security without complicating or disrupting operations. For these reasons, internalized security reflecting leaf content, structural paths, and the mesh of inter-relatedness among the paths, leaves, and external sources becomes the next paradigm for implementing effective content-level and application-level security. Consider the data structure defined by an object model as an organizing container. The contents within can be empty, or collections of containers, with more containers within. It is a security sieve with traditional encryption and the requisite inter-process work flows. The leafs and the security of the leaves does not secure a chain of evidence increasingly necessary in modern data processing activity.

Enhanced security must reflect this distributed requirement since the data sources are not single point sources, but complex relational, object-oriented, or hierarchical. In addition, data access and processing is approaching a worldwide distributed infrastructure, and completion transcends single places, times, and events. When the security problem is dispersed, the security solution cannot be monolithic either but must reflect the dispersed distribution and hierarchical complexity of the data and process. Location is not the problem, so metaphorical perimeter walls are not the answer. To treat security too as a monolithic, static, and walled solution when the security problem is granular and dispersed within a flexible time frame misses its true need. Effective data security must reflect five informational attributes in a newer paradigm for security. The five informational attributes are listed below and examples of the attributes are also listed. For each select content SC or sec-con sensitive organization, the data structure must be analyzed and the five attributes must be applied to each root, branch and leaf to ascertain the level of SC or sec-con sensitivity for that item. For example applying a security schema to the SC knowledge expander problem, a TS level may be established by applying the five attributes that all audio files are "security safe" for that SC or sec-con level but these audio files will not be downgraded or released to a lower SC or sec-con level. Therefore the meta data representing the audio file is designated TS. Another example is that all machines at the SC or sec-con level S ($3^{rd}$ level of the TS-S-C-UC schema) are 2004 machines and programs. The organization may set, as a policy, that all MS Office program meta data need not be backward compatible beyond 2004. This organizational protocol then reduces security issues relative to the backward compatibility issue.

| Informational Attributes Table for Security |
|---|
| Purpose |
| Sources and methods |
| Ownership |
| Date or timeliness |
| Content |

| Purpose Classification - Exemplary Table |
|---|
| .backwards compatibility (purpose: communication across machine .platforms |
| .background color (purpose: visual presentation) |
| .font size (purpose: visual presentation) |
| .image |
| .video |
| .audio |
| .version control (purpose: source identification) |
| .etc. |

| Sources and Methods Classification - Exemplary Table |
|---|
| .origin plain text |
| .origin entire document |
| .image |
| .video |
| .audio |

| Ownership Classification - Exemplary Table |
|---|
| .source, author |
| .security level initial document |
| .security level generating modifications to initial document |
| .hierarchical, orthogonal security classification |

| Date or Time lines - Exemplary Table |
|---|
| .version control |
| .source identification (includes all contributing .authors supplying modifications) |

These five security attributes reflect not only the data content but also the point processes, embedded resources, and work flows. In a similar manner, SC or sec-con sensitivity levels can be applied based upon time (temporal) issues, competitor or size of company, type of product (critical, sub-critical, or ancillary), etc.

This metaphor fractures complex data processing workflow. Traditional search methods point only to defined search terms, maybe with a simple truncating algorithm which deletes "s" and plural suffixes from the defined search terms. A monolithic approach to prior art searching ignores meta-data, process, multi-tiered files, delivery, and storage. Data sources are not monolithic, and certainly data is not either. Distributed data, distributed processing, and widespread distribution defeats common search techniques. Access and search techniques need to be granular and multi-level, and represent the five informational attributes presented above.

C.16 Recognizing the Document Object Model (DOM)

Many word processed documents, such as those created by MS Office, binary documents which contain confidential information, typically metadata. This ranges—from small amounts of information about authorship—to the editing history complete with deletions, reviewer comments, file attributes, and source and routing information—to extraneous baggage from documents previously edited during the same session.

A multi-faceted SC or sec-con workflow process becomes an issue over control of distribution by document type, recognition and categorization of all user content defined by security exons (discussed later), removal of non-coding or non-activating security introns (discussed later), preparation and distribution by SC or sec-con sensitive levels, content certification and accreditation (C&A) subject to conversion to primitive and certifiable file formats, distribution in print-representative-like packages, with guarded ingress and egress of the source data files. Finally, implementation of a knowledge expander search through granularity of document node elements by analysis for inclusion and exclusion is a far more effective method, permitting collaboration within a multiple-usage infrastructure.

It is important to recognize that there are many file types and document structures associated with a document management program such as MS Office. The structures are shared with other applets and competing products. Each program application, such as Word or Excel, create file binaries or binary files with different object structures but interchangeably read/write and import/export each other's file types, embed portions as formatted text or complete objects, or link through remote procedure calls to these other file types. These object model structures are generically called the Document Object Model (DOM). The DOM is another term for an object-oriented data storage package. The purpose for the DOM with hierarchical storage of metadata is three-fold. First, it is useful for backwards and forwards version compatibility. Second, metadata extends the document creation session from one-time event into an ongoing revisional process. Third, metadata provides order and structure otherwise notoriously difficult for inherently free-form and flexible documents.

Metadata provides backwards and forwards version compatibility. Metadata provides the necessary blueprint, format, and structure retention so documents can be revised in future editing sessions. Format information is part of the DOM metadata, although style sheets and schemas maintained in a different storage channel are valuable in HTML and XML and might aid the future transition to a different DOM.

It is incorrect to assume a static basis for any document structure, as a monolithic DOS-based file, or as an in-memory object. For example, the Excel DOM can be embedded inside a Word DOM, which selectively can then be pasted as a formatted object into a PowerPoint presentation. Another concern that arises in almost every document is imports, pastes, and OLE imbedding of other documents and aspects of the object model corresponding to that application type. For example, a base Word document with a spreadsheet and Project waterfall chart now includes editable components referencing a different Office applications with data in a structure referenced by that corresponding application object model, in this case Word, Excel, and Project.

Figure 20:
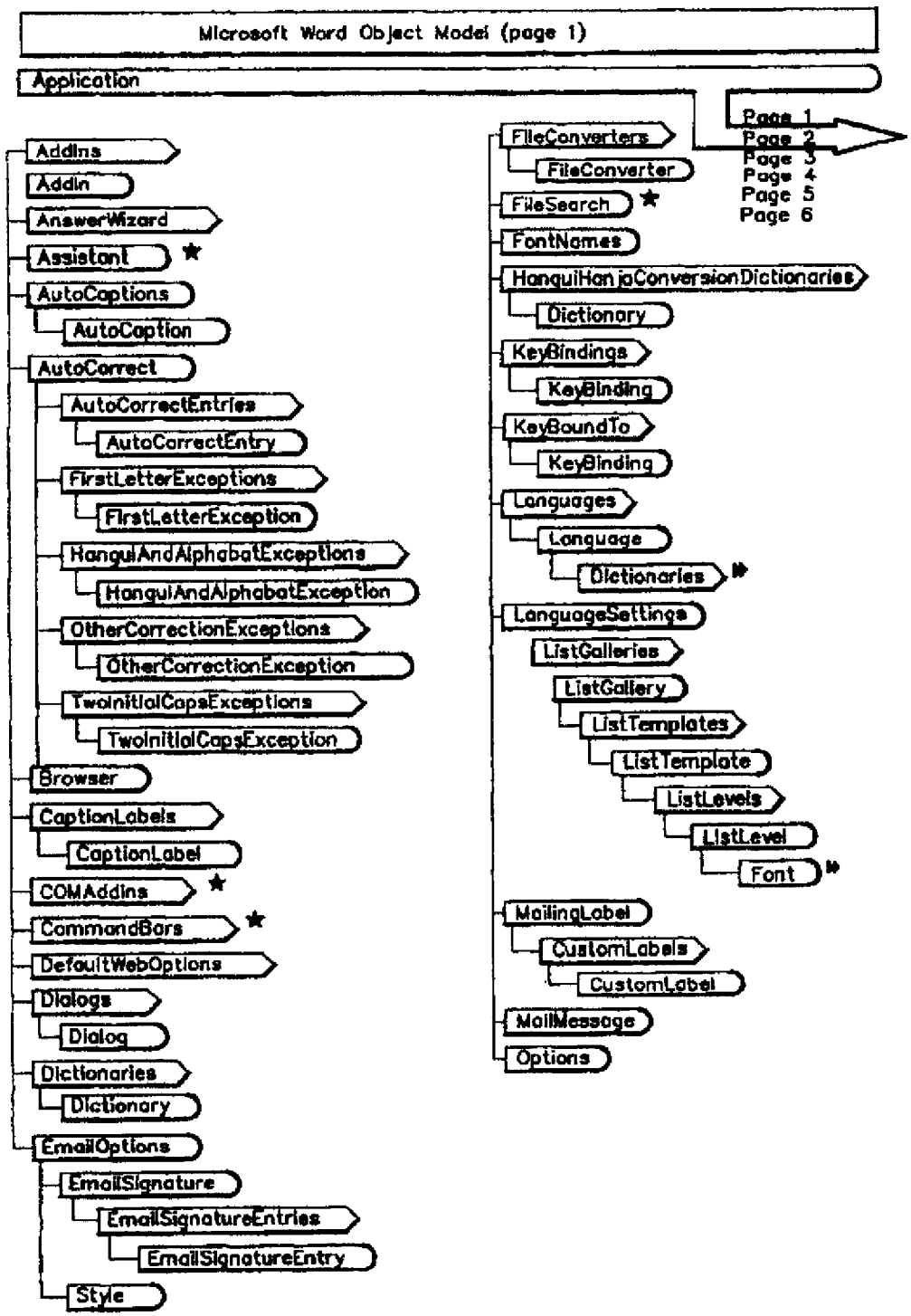
FIG. 20 diagrammatically illustrates varies metadata levels in the DOM.

FIG. 19 shows each branch or leaf can be replicated indefinitely until reaching the limits of RAM or file size. Each application has a different DOM. FIG. 20 shows the object model for word documents circa 2004. Because of DOM evolution, with the assertion of backwards and forwards compatibility, realize that some nodes might exist in the binary document file but not every function appears within each published output because it is not used by the author.

A basic Word document file requires 18 KB on initial saving, but a full 28 KB with edits and deletions, metadata, and redlining. Footnotes, font changes, hidden text, additional changes, headers, and footers, table of content, indexing, an index, macros, .DLL add-ins, .OCX add-ins, and formulae could arbitrarily increase the file size indefinitely. This shows that MS Office security risks are reproducible at any user desktop. A hex editor used in conjunction with an initial raw ASCII file and the corresponding .DOC file also shows risks. ASCII text has only 40 characters despite the directory display of the 1 KB FAT32 block. The internal encoding of the .DOC file with initial content, the binary object structure and additional metadata are partially encoded in a padded form of ASCII. The metadata displays the source location of the document, removing possible doubts of file directory structures, security based on location obscurity, and other rational workflow techniques for securing user files within the context of a network infrastructure.

Microsoft has identified thirteen key categories of metadata: Name; Initials; Organization name; Name of originating computer (desktop); Name of network server and/or hard drive; File properties and summary information; Non-visible embedded documents; Names of previous authors; Document revisions; Document versions; Template; Hidden text; and Author comments. Some of this metadata is accessible through the Office application menu interface through menus and dialog boxes. The exploitation of this metadata in an knowledge expander search is useful. There are also the document file properties exposed by the Tools/Options pull-down menu and the User Information tab. This is not the complete list of metadata. Other visible metadata with potential search characteristics include: Footnotes; Cross-references; Table of Contents tags; Indexing tags; Hyperlinks; and Smart tags. Expect x-link and x-pointers plus style sheets and schemas within documents saved in the XML format. In addition, other undocumented structures are part of the extended and expanding Office document object models. Consider fields and mail-merge fields, which are markers for information automatically inserted by Office or by a user when opening, saving, printing, or emailing documents. These fields create a built-in facility for careless information disclosure or overt hacking. There are also the document file properties exposed by the File/Properties pulldown menu. This includes: File/properties; General; Summary; Statistics; Contents; and Custom.

The knowledge expander search also contemplates finding and using other items not specific to MS Office. Techniques for information camouflage can be used in an knowledge expander search. These are equally valid in most any desktop application, and are most relevant to presentation output rather than binary file delivery. Information camouflaged in a source document includes text set to small font sizes, such as 0 or 1, fonts set to type unlikely to be installed on the system which map to symbols or line drawing, PostScript or Unicode font sets with alternate encoding, and font color set to match the paper color or an applied background. White font on white paper hides text, black font on a black border or shading hides text too. Text can also be hidden with graphics when the graphics are anchored to a specific location congruent with the text. Color games with text and graphics also hides the text. Macros, VBA (Visual Basic Application) codes, VBA add-ins, and applets also represent a search asset. Anything than anyone can imagine as an application can run from within MS Office, productive or destructive. Usually, these bits of code are stored as part of the document metadata. However, they also can be out-of-channel files. Either way, they can be compromised by a new code that overwrites the original. They also can be inserted through fields, formulae, or menu add-ins. Collaborative tools are the most obvious entrée.

New features in Windows and other Microsoft digital rights management (DRM) applications, such as ORAPI, ADSI, and MS IRM provide for collaboration, resiliency, and complex versioning and backup far beyond the capabilities of MS Office.

C.17 Content

The differentiation of content within an MS Office document based on initial owner and target distribution is important for search expansion. Some content will be strategic and some tactical. Content of MS Office documents transcends the actual presentation as a printed page, slide, spreadsheet, database report, email message, an index of documents, UML: or project waterfall, or organization chart. Microsoft Corporation is positioning Office as a platform for delivery of new services; it is not just about a PowerPoint presentation or a Word document printed to a facsimile. The DOM is a project plan, with a structure, with components that do things and are sensitive of their own.

For these reasons, it is important to explore the MS Office DOM factors: Content classification; Tagging; Clearance level; Data mining; Traffic analysis; Inference; Encryption;

Digital Signature; Document access linked to Fortezza (an encryption program/system), PC Crypto cards, smartcards, and n-factor authentication; Granularity; Strategic information; Tactical information; Common Criteria or NIST analysis; Covert channels; and Bell-LaPadula model conformance.

Content classification with taxonomic classes occurs with tagging for formatting with bold, indexing, and paragraph marking, explicit element tagging for HTML and XML or database and spreadsheet table, field, ranges, row, and column designations, as well as authorship techniques. Formulae and macros define ranges with informational content (contextual algorithms which link content), as well as indicate purpose and intent of the process as well as the target data. When content is tagged at the sideline, as in "eyes-only," or within-the text with any label name for clearance level, as in "<1>," this attests to a SC sensitivity level with an importance factor. For example, a subtotal of employee salaries within a pro form a business plan matched against a list of employee names compared to a bank check ledger gives away each employee's salary level; each document in isolation does not give away information until several are merged and analyzed together. Direct analysis through record relationships and sorting is one type of data mining, human intelligence through inference or statistical inference with set theory or Bayesian methods is yet another. For example, because you know that 6 employees are traveling to a conference in D.C. and two others are not in the office, you can approach a particular person who by inference is manning the station desk with a very specific social engineering attack. OneNote, InfoShare, Net Meeting and/or Live Meeting, Outlook, and Exchange with MS Project also enable workflow routing, group editing, and acceptance sign off. This information becomes part of the document metadata so that traffic analysis shows where the document originated, what changes were made and by whom, how it was routed by username, network, and IP address, who has seen it and has access to it, and all process flow and comments. One of the secure prizes of organization information thus unintentionally published is the names of people within the organization and functional roles.

Designing a knowledge expander search engine through granularity of MS Office node elements by analysis for inclusion and exclusion is an effective method. Multiple source documents create structure and semiotic meaning not in evidence with subsets. This process breaks the context to prevent useful data mining, routing inferences, and the more powerful semiotic information methods. It allows for the separation of strategic information from the tactical, so that access is granular by role, user, and other discriminators. Many academic and implemented security models are in use today, both as a straw man and for certification processes.

C.18 DOM Process Editor

Document object model (DOM) source documents, and particularly Office document modules, comprise the blueprints, process, external data sources and linkages, and materials for building the resulting presentation; the presentation content is usually the ultimate end product. The blueprints and process often are immaterial to the presentation and represent proprietary and confidential material. This DOM object model complexity and diverse accessibility creates an opportunity for the knowledge expander search engine.

Effective DOM and metadata searches use the object hierarchy structure as variously described as a binary tree, category structure, or hive. In any event, the entry point is the root or base, containing a potentially infinite number of subcategories, each with a potentially infinite number of leaf items. See FIG. 19. The structure can be pruned, deleted, or rearranged. The items represent object-oriented information, from entire subdocuments, to relational databases, layered graphics with vector elements, to simple plain-text, to a single binary numerical element.

The process requires a parse of all branches to each and every leaf. This process is not recursive, just extensive. Each path is examined for context, each leaf for content, all nodes for external references, and everything must be viewed within the context of sources and methods, not just obvious content. The obvious content is what the user created and sees, but as you now know, that is a minor portion of the data contained within the document object structure. This is a paradigm shift is shown in the hierarchy below:

DOM Deconstruct Table

For each document (the file and structure); Access the root; For each limb; For each branch; For each sub-branch; For each leaf (item); and Process each leaf.

Preservation of the path to each leaf is important as it defines the access to that data element. The existence and/or null value of the leaf represents a security control point. The model defines, with supplemental external knowledge of the object model, potential search opportunities. The model and the content are not separate from external knowledge of sources and methods. The model and the content are part of a contextual analysis of the source document or data stream itself. The leaf the significant search control point. It is possible to review and alter the contents of the leaf within the context of the purpose of the leaf to retain functional access with multi-level SC or sec-con sensitivity.

C.19 Five Informational Attributes

The five information attributes of SC or sec-con sensitivity in context to processing include the leaf, purpose, sources and methods, ownership, date or timeliness, and content. The entity must establish protocols which rate or prioritize the five information attributes on each root, branch and leaf in the DOM source document. With the system initialized in this manner, the processing of the DOM document within the parameters of the knowledge expander search is accomplished.

Purpose: How does the purpose of the leaf provide context, purpose, or informational reference to the document as a whole or the individual leaf? Does it provide source, destination, authorship, viability, validity, verification, or integrity to the document as a whole or the individual leaf? Consider the value of processes imbedded in the document as cell formulae, a help file, or other complex routing wizard. Does it show linkages or references to other documents? What is its status or position within the document? What is its element position, as a headline, footnote, or redlined status? These seemingly minor details transcend actual content but provide clues to the following attributes.

Sources and Method: Intelligence agencies stress the confidentially of the sources and methods used to gather information. The information itself might or might not be important, but the ongoing care of the sources and methods is important for future information gathering activities and retention of any status quo until action is initiated. In addition, the viability, validity, verification, or integrity of the document is predicated by the viability, validity, verification, or integrity of the sources and methods used to create it. In terms of the Office document, this type of information is both contextual, leaf content, and metadata. To presume that the SC search uses only doc content at the leaf misses the value of metadata and the inherent value of the object-oriented document format. For example, authorship, source, source dates, editing dates, deletions, redlining, notes, footnotes, MS hidden text, links, and other structural elements in the source doc describe when, how, where, and who created the document. This speaks to the viability, validity, verification, or integrity of the document as a whole, and can compromise past, ongoing, or future data collection efforts and operations.

Ownership: Ownership is reflected both in leaf-level content—that is obvious when a document is presented or published—but also in the metadata. Ownership is also a characteristic of file storage properties, in ring rights, file storage position, linkages, SMB or network file access rights, and HTML references. Ownership, particular the number of links, the times access and edited, numbers of hits, and the level of churning, suggests the relative importance and merit in the document.

Date-Timeliness: Date or timeliness reflects currency. The dates, in terms of edit times, access times, and frequencies suggest the relative importance and merit in the document. Touch and other file-level commands can only mask the overt date and timestamp of a file, not its purpose or content, true timeliness, or merit. This information is spread through the metadata and leaf content. In some hierarchical structures, this information is stored in tables or other structures apart from the immediate document root. When a document is a relational data structure, as in Access or SQL, hidden system fields and hidden security data define edit and deletion times. It is also important to recognize that in databases, records which are deleted by the user are only marked as deleted but persist until the database is purged, packed, cleaned, compressed, or otherwise processed in a maintenance mode. When relational technology with transactional logs and rollback facilities are enabled, data can be recreated or dated despite many types or natural of instigated disasters. This supplemental metadata defines date and timeliness too.

Security: Security of content can be compared to erecting a barrier around that content and may be viewed as an important SC sensitivity issue. However, when content becomes a collection of simple data elements along with data objects, dispersed and distributed sources, effected by embedded events and triggered methods, a search which ignores the security content characteristic fails to acknowledge that the SC sensitivity may be impacted by such omission.

While content is king in most search systems, it is not the only critical aspect of a source document. In terms of the knowledge expander processing of an Office document, each leaf must be processed and assessed for its metadata. Note again that each leaf may be another object-oriented structure in its own right or a simple element. It will need to be processed and assessed accordingly.

C.20 Select Content Introns and Exons

Terminology employed in connection with the operation DNA (deoxyribonucleic acid) provides an appropriate metaphor for the MS Office document object model or any other DOM model. While the DOM is separate from an MS Office binary file, it defines the purpose of that file and maps its activation. The DOM "genes" are expressed into the file binaries only as specifically referenced, and frequently diverge from the pure MS Office application as genes from other OLE (object linking and embedding) applications are embedded into the document. The DOM and the expressed document can mutate for better or worse, and both backwards and forwards the document is adaptable just like DNA, with unforeseen consequences including the profound security flaws evident within the MS Office workflow.

In genetics, an intron is any non-coding or non-activating sequence of DNA initially copied into RNA but cut from the final RNA transcript or unknown as to singular or recombinant purposes. Introns are excluded or ignored in the DNA process. An exon is a coding or activating sequence with a known purpose that is actually used or one that is unknown as to purpose but nonetheless still used. DNA is, of course, the blueprint for life. RNA is the functional transcript of the DNA blueprint used for cell division and replication. Exons are the useful portions in the DNA cycle.

In the object model, the DOM is metaphorically the DNA blueprint for an MS Office document whereas the actual Word, Excel, or Outlook message is an expression of the RNA as a functional transcript. Correspondingly, the SC select content or sec-con intron is any document branch, leaf, or node element with a non-coding, non-activated, or even unknown control utility for the document. From a select content-search (or sec-con-search) standpoint, each and every intron represents a non-qualified element that is a potential search term that may lead to an expanded knowledge expander supple doc compilation. Rather than ignoring SC or sec-con introns as most common search engines do, the current knowledge expander search engine employs the SC or sec-con introns to expand the scope of the search. A SC or sec-con exon is any document branch, leaf, or node element serving an end purpose. Each SC or sec-con exon in a MS Office document becomes a certifiable data element.

Unless each such SC or sec-con intron and SC or sec-con exon in the source document DOM is vetted for credentials, which vetting includes a prioritized taxonomic label or tag, the knowledge expander search, whether through conventional search engines or the novel search engines described herein, will be incomplete. This is effective for DOM, HTML. XML, databases, and any structured file binaries. The standard 2-phrase process transforms into a 3-phase process where DOM node elements are coded either as exons or introns, and thereafter processed accordingly for inclusion or exclusion.

The improved accuracy of 3-phase scanning of documents within the context of an object model is apparent. While the traditional 2-phase method find SC or sec-con introns and SC or sec-con extrons within a source document, it also miscodes several other sequences as introns. The accuracy of such process will always include statistically measurable false negatives and positives, thereby missing true threats and removing non-threats. The 3-phase process improved on the 2-phase process with granular deconstruction of the document and subsequent recoding of both false positives and false negatives to yield a higher rate of accuracy. SC or sec-con introns are added to the search term list in the knowledge expander search engine and are scalable numerically. Better DOM maps mean better intron handling.

Figure 21:
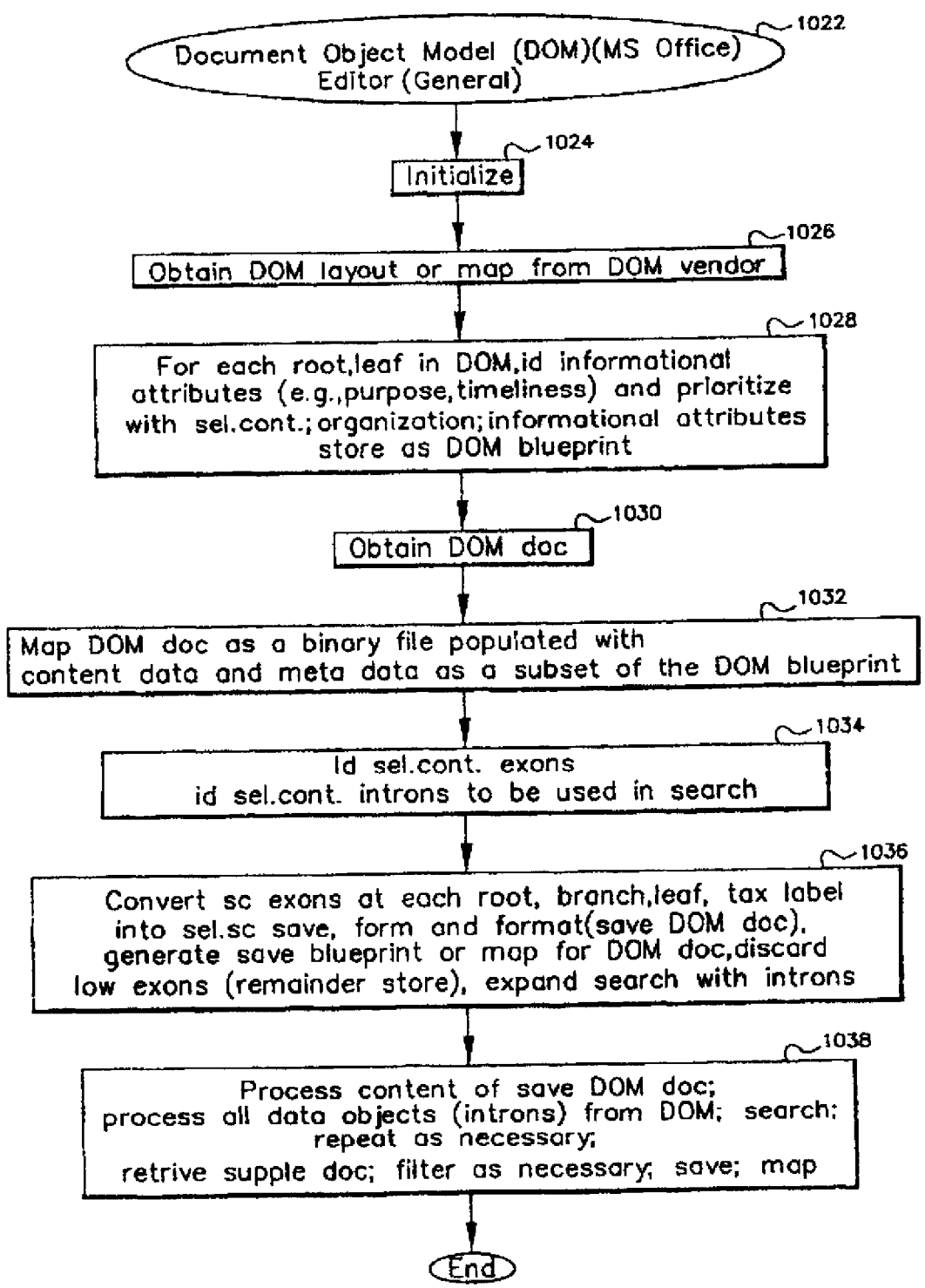
FIG. 21 diagrammatically illustrates a DOM editor process.

FIG. 21 shows the General DOM Editor program 1022 in a flow chart form. Step 1024 is the initialization that is employed by the security entity or SC or sec-con sensitivity supervisor to set up the program. Step 1026 obtains the DOM layout or blueprint from the DOM vendor. Step 1028 notes that for each root, branch and leaf in the DOM, the information attributes must be prioritized with the SC select content or sec-con and organizational informational attributes (a taxonomic routine with prioritization). SC or sec-con introns are identified and SC or sec-con exons are classified, placed in a hierarchical structure and labeled. This step, of course, uses a content filter to identify the SC or sec-con exons. A contextual filter or algorithm is used to taxonomically classify SC or sec-con exons at a higher priority level. For example, when "Bin" is next to "Laden" the SC or sec-con exon combination—Bin Laden—is classified TS or the top level for the SC or sec-con H-tax class.

Step 1030 obtains the source document DOM. Step 1032 maps the DOM source document as a binary file populated with content data and meta data as a subset of the DOM blueprint. Step 1034 identifies SC or sec-con exons and SC or sec-con Introns. Step 1036 labels or tags SC or sec-con exons per the tax class (taxonomic classification) and per priority, to be included in the further processing of the item and identifies SC or sec-con introns to be used as search terms in the knowledge expander search. Multiple tags and overlapping tags are possible and a ruled-based system is employed to upcode multiple tags and overlapping tags to the next higher tax class-priority level. Step 1036 converts SC or sec-con exons at each root, branch and leaf into SC or sec-con level save doc, form and format (for example, a safe DOM template), and generates a save blueprint or map, drops (or alternatively stores in a remainder store) all low priority SC or sec-con exons, and expands the search term list with the SC or sec-con introns and the top group of the exons. Step 1038 processes the save DOM doc, that is, the top level SC or sec-con exons and all SC or sec-con introns as search terms through public and/or private databases, indices, search engines, etc. A divergent search uses SC or sec-con intron. A convergent search uses SC or sec-con exon. Supplemental documents are gathered form the search, the filter H-tax class priority tag process is repeated on the supple docs, the SC or sec-con introns are identified and selected top priority SC or sec-con exons are identified and the search and a second tier supple docs compilation is processed. Supple docs are stored and a relational map is generated both with the search terms and the supple docs.

Figure 22:
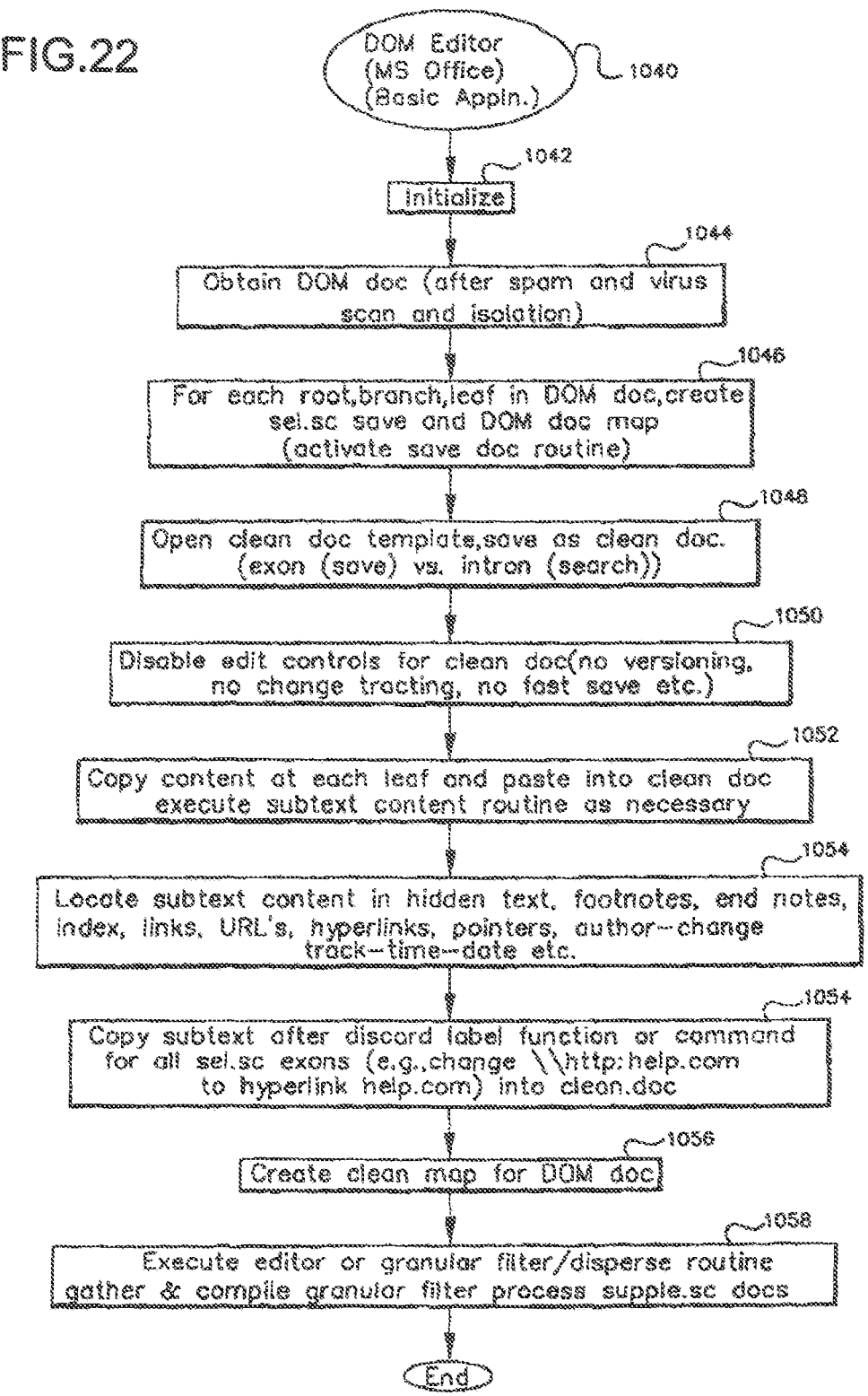
FIG. 22 diagrammatically illustrates another DOM editor process.

FIG. 22 shows a flow chart of a basic application for a DOM Editor-knowledge expander search for MS Office document. Step 1042 initializes the system. Step 1044 obtains the source DOM document and notes that all processing occurs after a spam and virus filter. Step 1046 notes that the program creates or is provided with a security safe or clean DOM document and map. All levels of SC are labeled or tagged and saved in the "save doc" routine. This hierarchical taxonomic (H-tax) tagging labels all SC or sec-con words, terms, etc. and locates and maps exons and introns in the source doc. Step 1048 notes that a template is opened and SC or sec-con exons and SC or sec-con introns (non-standard SC or sec-con and unknown terms, characters, words, etc.) are copied from the source doc into the clean DOC. A clean .DOC template (Word) or whatever the new document type is opened for the specific application. The Normal.DOC or New Spreadsheet.XLS on the MS Office distribution CD is safe. In Visio, for example, start with a new chart. Older documents saved as templates tend to accumulate unanticipated metadata. If one must use a non-standard template, clean it up. View it as both a printed document, as a binary file, and as a document object. Write protect the templates, or store the templates as non-modifiable networked volume. If the templates are used throughout the organization, create a network store for them and configure each user's installation of MS Office to look there for the templates. Search the network for duplicate copies of these templates and eliminate them.

If changes from any version of MS Office to another version are made—this can be a regularly upgrade or a even a downgrade—create new documents and cut-and-paste parts of prior documents into new ones. Lose the older files and templates. If you receive or open an Office document in either an older or newer version, create new documents and cut-and-paste parts of prior documents into new ones consistent with the MS Office version that you use.

Step 1050 disables edit controls and step 1052 copies SC or sec-con exon and SC or sec-con intron content. The point is one must edit cleanly. This is not a single step but rather a process, both one time and ongoing. Disable versioning in step 1050 to prevent a buildup of past versions of the document. With versioning, prior sessions will be stored as document.doc 1, document.doc 2, and so on. These tend to get entwined with the latest version. If workflow with InfoPath, Outlook, or other collaborative workflow tools creates duplicate copies of the source document file for each user. Step 1050 includes the concept that the system is configured to store a single network copy instead. Preserve an audit trail and backup with a system backup rather than versioning. Disable change tracking in step 1050 to curtail the buildup of additions, deletions, and changes that transcend the publishing intent of the document. If redlining is necessary, establish guidelines for periodically accepting changes to purge change log. Use the command to save the document without the change log with File/Save or File/Save As. Do not use nor rely on fast saves, timed saves, or file recovery after a MS Office crash to purge the dirty metadata. After a crash, reopen the document, save the document under a new name. Close the Office application. Delete the old file precipitating the crash. Rename the new file under the old name. Reopen the Office application.

Step 1054 locates text in footnotes, hidden text, etc and labels or tags that content as SC or sec-con exons or SC or sec-con introns and maps those data elements to the SC or sec-con save doc and copies the elements into the Clean DOC. Use comments instead of hidden text. It is documented as a feature so it can be found rather than accidentally uncovered. Hidden text with a font color change or font size change looks like an artifact that most users will ignore or delete. Avoid the use of headers, footers, footnotes, endnotes, inserts for table of contents, index and the like. These appear only in the printed output unless specifically viewed from the View pulldown menu. Such links also create a lot of dirty metadata beyond what is visible even during editing that persists until changes are accepted. Remove references from the source document. This is subtle, but very important when documents are specifically posted or even inadvertently listed on web sites. References include other files, documents, hyperlinks, and other possible embedded formatted materials. These references create the ability to infer quite a lot about the purpose of the document from other related documents in the same directory, by the same authors, and the types of other documents. For example, a spreadsheet stored with a report that is not overtly included in the report suggests that is source material that has not been reviewed with an eye towards privacy, security, or client privilege.

Paste and copy images, cut text, formatted text, pie charts, record sets, slides, waterfalls, milestones, organizational charts as plain text or an image rather than formatted Office objects. If the embed commend is used, all the metadata baggage from the other Office application is now added to the metadata in the target document. Since that metadata baggage is not native to the target document application, it is inaccessible and truly hidden. Tools, such as Metadata Assistant will not find Excel metadata within a Word Document, Word metadata within an Excel spreadsheet, and none of them within an Outlook note or message.

Step 1056 notes that a clean map for the meta data cleared DOM document must be created.

Step 1058 executes the intron search and/or granular search routine, gathers and compiles supple. docs and the processes those supple docs through the granular filters discussed earlier to locate, with the hierarchical taxonomic filter process tags new words, terms, symbols, which are related to the original SC select content or sec-con, thereby expanding the knowledge base of the meaning of the SC or sec-con source document.

C.21 Hierarchical Taxonomic Class Examples

Various type of classification systems (taxonomic systems) may be employed. For example, a dictionary classifies all words as nouns, verbs, adverbs, etc. This is one taxonomic system. A prioritized H-tax system classifies nouns into a name subclass and this name subclass may be priority or sensitivity level 1. Geographic locations (class nouns) may be priority 2. The operator of the present knowledge expander search process may place a high priority or sensitivity on "noun" class, thereby converting the simple taxonomic structure into a hierarchical taxonomic system. Identifying categories and subcategories for SC or sec-con sensitive words, etc. or critical data, creating a compilation of pre-existing data, comparing the compiled pre-existing data to the target data and labeling or tagging the SC or sec-con terms is one of many important aspects of the present invention. Table 1 in FIG. 23 provides categorical identifiers for personal identity. These categories, which may be utilized to identify a person, are not meant to be all encompassing but are mainly provided as examples.

After categories are identified for the critical data, it is important to create the hierarchical taxonomic system against which the target data is tested. Ranking or qualifying the categories at SC or sec-con sensitivity levels is next. Table 2 in FIG. 24 is a general attempt to quantify the categories for personal identification from a high risk value beginning with "name" to a low risk value ending with "personal interests". Again, the Ranked Identity Category Table 2 is not meant to be limiting but is meant to be an example. Individuals skilled in identifying a person may alter the ranking of the identity categories in Table 2, FIG. 24.

The present invention can be employed to use a hierarchical taxonomic system for a business. Table 3 in FIG. 25 set forth below provides examples of categorical identifiers for a manufacturing business. Again, this list is not meant to be exhaustive or complete, but is only provided as an example of the types of categories and subcategories which a manufacturing business would employ in order to establish the risk monitor of the present invention.

With this list, the manufacturing business may assign a SC or sec-con sensitivity level to each category (class, subclass and sub-subclass) thereby creating a prioritized hierarchical taxonomic system.

C.22 Knowledge Expander (KE) Basic Program

Figure 26:
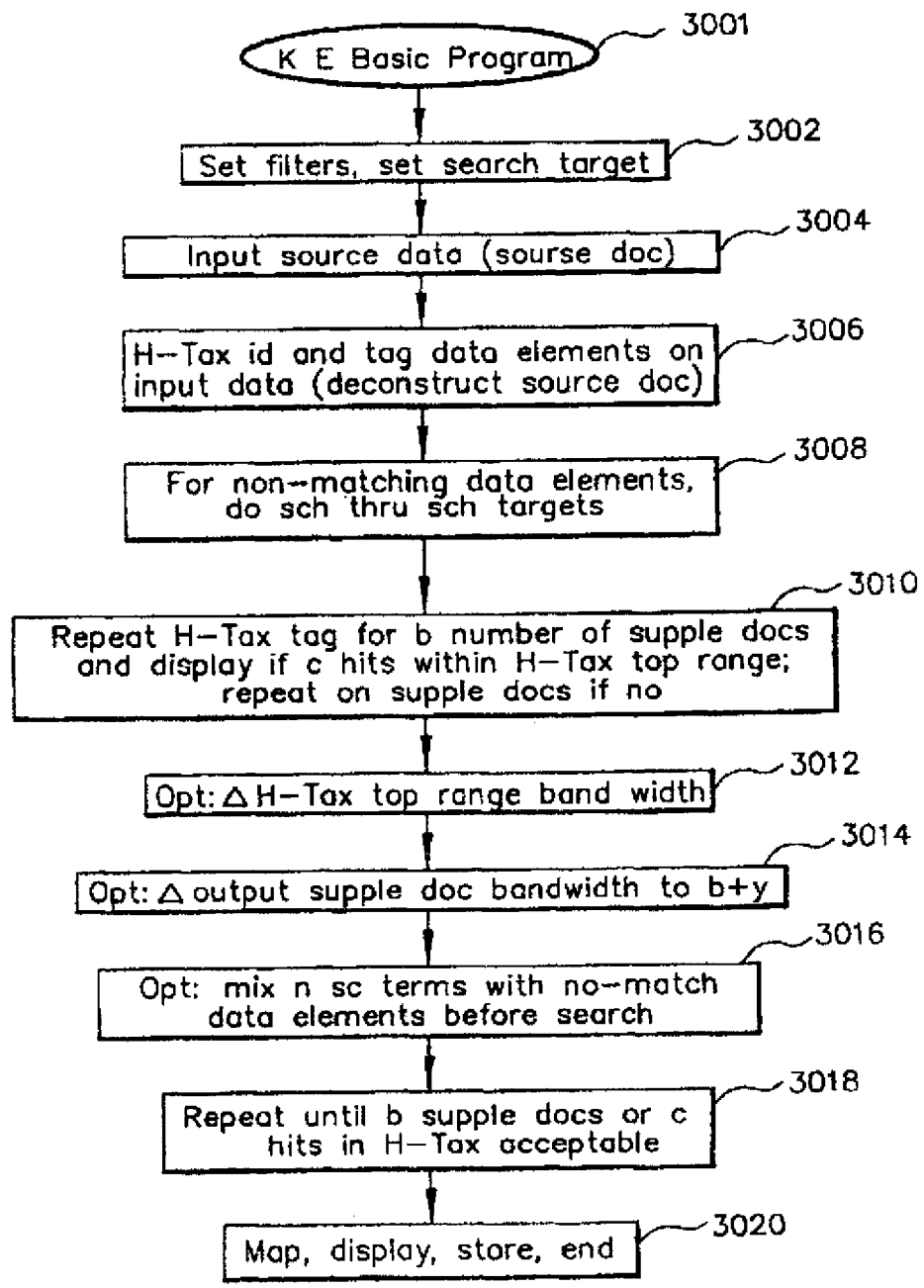
FIG. 26 diagrammatically illustrates a basic KE search process.

As discussed earlier, the information life cycle or knowledge expander search module can be configured with many different modules in order to achieve the objective of the operator. The knowledge expander or KE basic program 3001 in FIG. 26 is one basic implementation of the expander search program. FIG. 26, In step 3002, the operator or user sets various filters and sets the search targets. The search targets may be publicly available search engines or private data bases, data collections, indices or any item that the user wants the KE search to access. Filters are described earlier as hierarchical taxonomic filters or taggers, content, contextual and other types of filters. Filters are used to identify class, subclass and priority in the hierarchical taxonomic or H-tax system, to apply contextual rules or algorithms ("bomb" within 10 words of "arab"), and content (select content SC or sec-con verses non-matching SC or sec-con). Step 3004 obtains the source data or the source is input by the operator. Data input may be from a client computer in a server-client computer system. The source data may be a data stream, a source document or other item. Step 3004 contemplates that if a document is utilized, the document is deconstructed to its basic data elements and appropriately mapped. See the discussion above in connection with DOM branch, leaf and tree deconstruction. In step 3006, the hierarchical taxonomic classification (H-tax) occurs and each data element in the input document is tagged based upon the classification system which has been prioritized by the user (or the user uses a pre-set prioritized H-tax). A note to deconstruct the source document into data elements (see DOM deconstruction into its object hierarchical structure above) is found in step 3006. In step 3008, for non-matching data elements, a search is conducted through the search targets. Non-matching data elements form the input doc are those which do not match SC or sec-con. In step 3010, the system gathers the documents from the search (supplemental documents) and repeats the H-tax tagging operation for b number of supple docs. A relationship mapping function and display function is activated if c number of hits occur within the H-tax top priority range. In other words, if the search for non-matching data elements returns 50 select content or SC or sec-con terms and of those 50 SC or sec-con terms in the supple docs, 20 SC or sec-con terms fall within priority ranges 1-5 of the hierarchical taxonomic classification set by the user (n priority H-tax levels), then the system and process maps the results and displays the representations of the H-tax recovered from the supple docs c is less than 20. If less than b number of H-tax tags are noted in the supplemental documents, the system repeats steps 3006 and 3008 and gathers a second tier of supplemental documents.

Steps 3012, 3014, 3016 are optional. As an option to be set by the user or as an option to be set by the system operator as a default, step 3012 changes the H-tax top range bandwidth from n priorities to be searched to m priorities. This change may be needed to expand the search bandwidth from b to b−10 to b+20. A reduction (m less than n) is needed if too many supple docs are recovered by the search. If too few are recovered, then m is made greater than n priorities in the H-tax. Option 3014 changes the output supplemental document bandwidth to b+y if too few supple docs are recovered. Of course, the output supplemental bandwidth could be reduced with b−y. Optional step 3016 mixes n number of select content search terms with the no-match data element before the search. This effectively is a convergent filter. By adding the known SC or sec-con to the search terms (initially, search terms are generated from the input doc based upon priority H-tax), the search is biased or is set to converge on the known SC or sec-con added to the search term group. By using the no-match (NOT AND) function, the KE search diverges to gather a wider range of docs. Of course, the user may always employ common search engines in addition to the search plans set forth herein. Step 3018 repeats the process until b supplement documents or c hits (SC or sec-con sensitivity matches) are noted within the H-tax top range. Step 3020 maps, displays, stores and ends the program.

Figure 27:
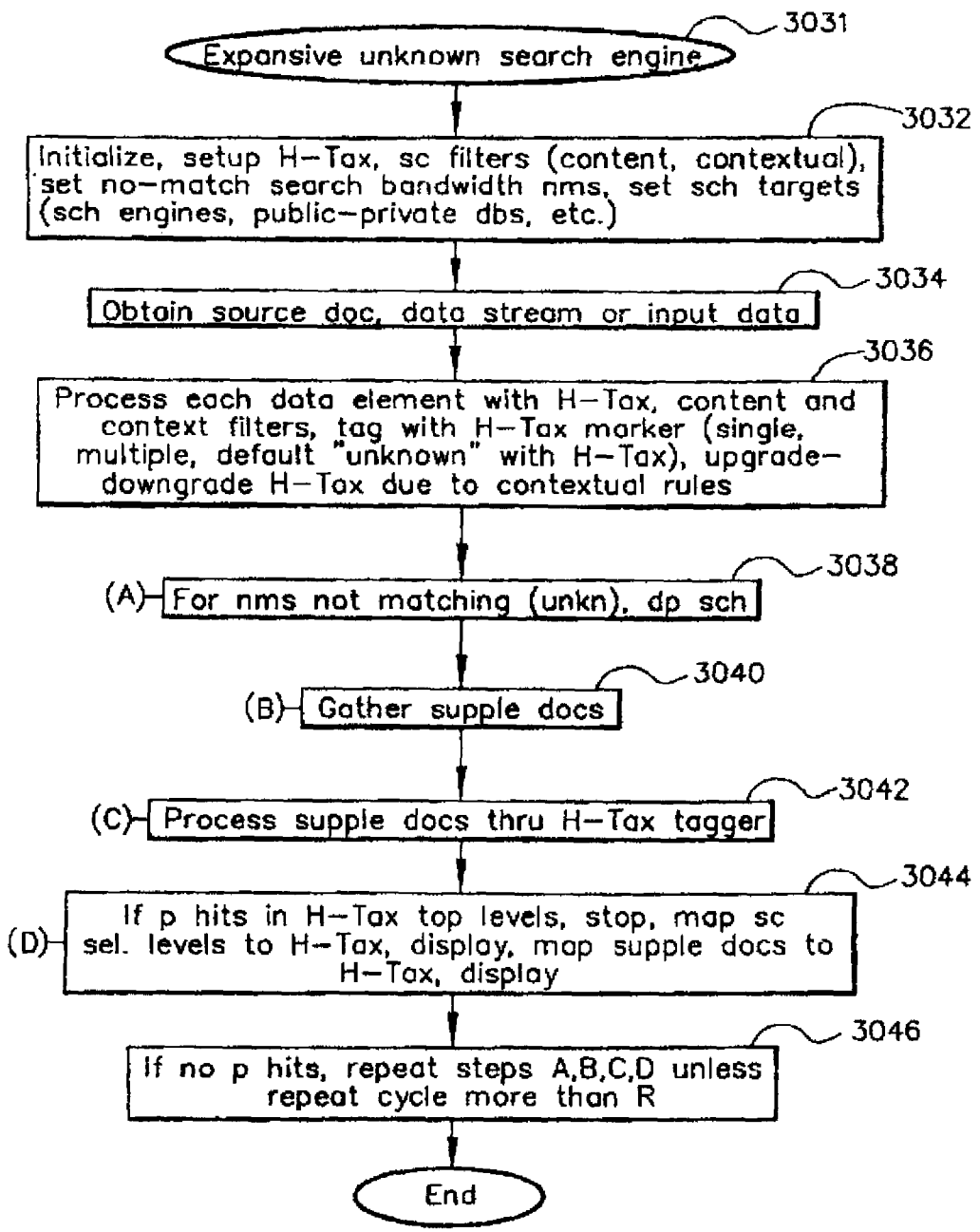
FIG. 27 diagrammatically illustrates an expanded KE search process.

FIG. 27 shows an expansive or expansion unknown search engine 3031. Step 3032 initializes the program with preferably user input, sets up the hierarchical taxonomic H-tax classification system along with a priority or sensitivity level assigned to each level and branch and leaf in the H-tax system. Select content SC or sec-con filter modules for content and contextual range or algorithm tests are also set. At least some select content should fall within the prioritized hierarchical taxonomic system. The select content SC or sec-con encompasses words, terms and data objects that the user wants to expand his or her knowledge base with the search engine. The user sets a no-match search bandwidth nms and sets search targets such as search engines, public or private databases, data compilations, indices, data collections and data structures or whatever. Step 3034 obtains a source or data stream or input document. Step 3036 processes each data element (which may include a document deconstruction) with the H-tax, content and context filters, and tags each data element with an H-tax marker. Multiple, singular, and a default "unknown" H-tax classification indicators are linked or tagged on every data element. The system in step 3036 may upgrade or downgrade the priority or sensitivity H-tax level for a particular word, term, etc., due to contextual rules in the context filter. In step 3038, the system conducts a search for nms number of not matching or unknown data elements. If nms is 10, the system takes the top 10 priority H-tax supple SC or sec-con terms obtained from the input doc and uses the top 10 supple SC or sec-con as search terms in the target data collections. The search is conducted through search targets identified in the set-up step 3032. The no-match search 3038 is sometimes identified as step A herein. Step 3040 gathers supplemental documents. Sometimes, step 3040 is step B herein. In step 3042, the system processes the supplemental documents through the H-tax tagger. The supple docs are classified with the H-tax. This is sometimes step C. In step 3044, the system determines if p hits have been noted in the H-tax top range levels. If YES, the system stops and maps the select content SC or sec-con sensitivity sel. levels to the H-tax mapping structure and displays that SC or sec-con hierarchical representation map to the user. Further, the system in step 3044 maps the supplemental documents to the H-tax map structure and displays that to the user. Sometimes, step 3044 is step D herein. In step 3046, if p number of hits are NOT identified in step 3044, steps A,B,C,D are again executed and repeated unless the repeat cycle is more than R. The nms bandwidth may automatically change (increase) or the n priority H-tax may change to m H-tax levels to increase the supple docs or the hit count for supple SC or sec-con. The same techniques may be used in reverse if too many supple docs are recovered. The system ends after step 3046.

Figure 28:
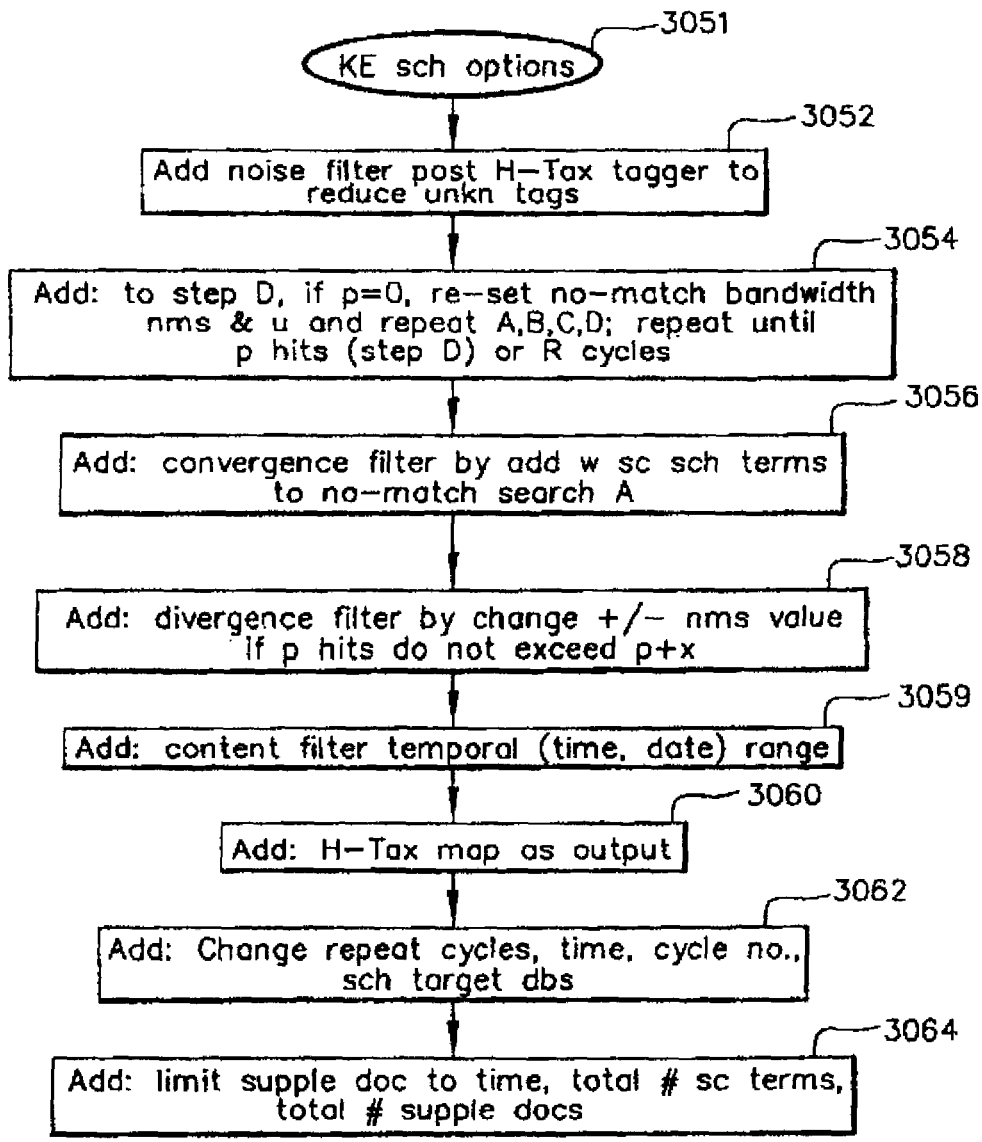
FIG. 28 diagrammatically illustrates KE search process options.

FIG. 28 shows knowledge expander KE search options 3051. Step 3052 is an option to add a noise filter after the H-tax tagger step 3036 in the expansive unknown search engine routine 3031. The noise filter reduces the number of unknown data element and operates on the unknown tags for those unknown data elements. For example, terms "and" and "or" and "the" may be deleted by the noise filter. Optional step 3054 adds to step D, if p hits is equal to zero, then the system resets the no-match bandwidth nms+u and repeats step A,B,C,D and repeats the entire process until p hits in step D or R iterative cycles have been noted (counted). In optional step 3056, a convergence filter is added to the expansive, unknown search engines 3031 by adding w select content SC or sec-con search terms to the no-match search step A. In optional step 3058, a divergence filter is added by changing, either increasing or decreasing, nms value if p hits do not exceed p+x. In optional step 3059, a content filter is added to detect temporal relationships such as time and date ranges. Time may be time of length of search or time may be a time-date range limit on recovered supple docs. The temporal contextual filter (time and date is a matter of context) would be added to step 3036 the H-tax step. In optional step 3060, the H-tax map is output to the user so the user sees the classification and the prioritization of that classification. In step 3062 the operator can change the repeat cycle R, the time the search runs, the number of cycles, and the search target databases, data sets, spreadsheets or public or private search engines. In optional step 3064, the operator can limit the supplemental documents based upon a temporal factor such as time, the total number of SC or sec-con terms located in the supplemental documents, and the total number of supplemental documents.

C.23 Secured Metasearch Engine Based on Granular Data Control

As an overview, the secured metasearch engine technology is based on granular data control. The engine is part of the KE engine described above in sections C.9-C.22. The secured metasearch engine technology enables secured searches and distribution of secured search results including secured information sharing with multi level security (MLS) search capabilities across domains. Data is explored not only by content but also context and concept. Search should occur across domains, with information shared and delivered across domains and through the extraction and integration of both private and public data sources including the Internet. Stovepipes and silos, independent efforts at information collection and intelligence analysis, and air gaps or security guards divide information domains and prevent secured information sharing. Centralization and consolidation of data gives rise to data overload, a problem in part addressed by new web-like searching techniques, but also opens the door to security leaks.

The security of current data mining and search operations as well as the security of the multi level distribution of the search results to users with different access levels is questionable. Furthermore, the current data mining and search is rigid because the starting point for each and every effort requires an index or search terms and the mining is completely content-based. When connecting the dots, it is essential that search be possible without preconceptions of utility, purpose, or cultural bias. Effective search techniques, called "metasearch" herein, comprises more than web-like textual (and other formats such as audio or video, but also compound meta-formats) search technology. It includes data mining, textual and contextual search, aggregation, inference, and data-to-data interaction all based on granular data control subject to security compliance.

Metasearch generally means the usage of multiple web-based search engines based on keywords with results combined into a single unified report; this is better described as a confederated search or federated search. Each web-based search engine is rigid in terms of its reliance on preexisting indexes; it is usually fast but limited in terms of most likely usage bias. However, the combined results reinforce the preexisting answers based on the implicit search question.

In contrast, the Secured Metasearch Engine (sections C.9-C.22) is designed for searching the unknowns and expands the base of information, as well as conducts the search operations across different domains with different security levels. The Secured Metasearch Engine results provides two distinct and fundamental directions, search convergence and search divergence, both of which are critical to the process of connecting-the-dots. Failure to consider both convergence and divergence leads to incomplete results.

Search divergence is the process of expanding the content, context, and concept beyond the strict scope of the fundamental search. Search convergence is the process of validating, substantiating, and establishing the integrity of the fundamental search. Divergence is the expansion of the search query or data mining operation. There is a need to find outliers useful to expand the scope of the users knowledge and infer new information and intelligence. Some information and intelligence operations require exploration without preconception. Herein, outliers with the least priority, relevance, or ranking frequently provide previously unknown references or interconnections that are purposefully hidden. This is a search divergence because the base search query primes the process but effectively we already know the highest ranking results and reject those results while iterating the search for non-ranking items.

The Security Metasearch Engine starts with known keywords and indexes, but accepts primarily information that is new or different from the direct response to the implicit question, that is the base search query. Validation and integrity is not important to divergence. The search engine is looking for all related metadata, references, links, and relationships without regard to accuracy. Exact matches are in effect usually ignored, but all new references are added into a secondary query yielding subsequent results (supple docs and supple search terms). The subsequent results in turn yield yet more new references. This subsequent query yields subsequent results, which is repeated indefinitely. The iterative results create an asymptotic adjacency list model, which may include a networking relatedness. The networking relatedness is often viewed as flow charts showing betweenness, closeness, and connectedness. The networking relatedness may also be a social network relatedness.

This expansion of the base search query is the process by which the user discovers more dots. Connecting dots the user already knows is pointless and does not expand the user's knowledge; the user wants to expand the set of dots and generate new content, new context, and new concepts. The Secured Metasearch Engine starts with old and/or limited information, but generates new information. The theory of six degrees of separation has some legitimacy, however there is a difference between accidental and active relatedness.

Divergence is also critical to enabling the Secured Metasearch Engine to foster security by exploring the purpose and usage of information beyond the immediate and obvious preconceptions (i.e. foresee reflexivity) of semantic and pragmatic meaning. See beyond the immediate security perception for other possible cross-domain requirements and enable information sharing. The Secure Metasearch Engines is connecting known dots with new dots, the true concept of "connecting the dots". The new dots lack integrity and substantiation. They are not ignored or dismissed outliers because they can reveal the outlines of previously unknown, undiscovered, unforeseen, uninvestigated and unrevealed situations.

The search process is really a metasearch, applying techniques of data mining, textual and contextual search, aggregation, inference, and data-to-data interaction, and the integration is the establishment of relationships. However, some of the new dots will be false and noise. At this point, a search convergence is useful to establish likelihood and risk for the new information and integrity and substantiation of the difference between accidental and active relatedness.

The Convergence Search is described herein. Convergence is the usual web-like search engine or data mining operation. It is rigid. The user starts with known keywords and indexes—search terms—as the base search query and accept hits with the highest relevancy. This information is used aggregately to confirm or deny the integrity of the initial search. The user gets back what the user expects with priority, relevance, or ranking focusing the hits to the content most consistent to the search term context. Outliers are naturally rejected and filtered out. Search convergence might entail a physical inventory, database report verification, an independent party confirmation, or a drone flyover to substantiate the information. The result is in direct response to the implicit question, that is the base search query. The user positions and substantiates the dots the user already knows. The user starts with old information, and the user gets back old information. However, the benefit provides by the Secured Metasearch Engine is that it contextualizes these convergent results with a higher level of relevancy to the user's specific purposes based on tools which manage and control granular data. Those include tools include: (1) metafilters for automatic categorization; and (2) sensitivity level taxonomy. These tools deliver "fine adjustments" to the search process and find the most appropriate results for the user prioritized according to the highest relevancy.

The combination of divergence and convergence operations provides additional information. The Secure Metasearch Engines performs three key functions. (1) First, it selects new data elements of value and recognizes unknowns for automated iterative divergent search. (2) Second, the combined divergence search delivers "fine adjustments" to the divergence search process and finds the most appropriate results for the user prioritized according to the highest relevancy. (3) The Secure Meta search Engine categorizes all aggregated results to sensitivity level and enables distribution subject to MLS-compliance cross domain. While the Secure Metasearch Engines primarily focus on unstructured information, it can be integrated with structured data sources too because it is actually easier to extract context and concept from structured data.

There are multiple starting points to the metasearch process. One or more candidate data streams, news feeds, or documents can be dragged from the desktop into a queue. These items may be monitored for changes and then fed into the Secure Metasearch Engine for granular data selection and metatag categorization with the output result that search terms are generated and metasearch terms are also generated. A document or data stream automatically sets the context of the search and is explored for likely search terms/key words. No index or bias is necessary to begin the process. The resulting search terms of interest are fed into the next search cycle, which may include also one or more URLs for further exploration. Indexes and search terms do not define the implicit question or establish parameters for an effective answer because they represent a single dimension of information. Metafilters are used to control the granular data elements in order to fine-tune the search. The metafilters add both context and concepts to the initial search and all subsequent exploration. Such metafilters may be: (1) Categories of the granular data elements in a document ("name" "location" "date" "amount"); (2) sensitivity levels of the data elements ("top Secret" "Private" "level 9"); (3) phrases, ("Mohammed Atta" "United Nations"); and (4) Group Lists, (Groups of words which represent a concept or a context—"Nuclear"+"Submarine").

Generation of keywords/search terms for conducting the continuing searches is done by controlling of data at the granular data level. Control of data at the granular data level is enabled by combining different filters. The Secure Metasearch Engine recognizes complex content and context by implementing a combination of filters/sieves. Those combinations of different filters/sieves create different permutations of resulting keywords for the search. The different keywords for the continuing searches are selected automatically based on: (1) the words entered into each filter/metafilter; and (2) the configuration of the different filters/metafilters combinations. As an example in one embodiment, all the content of a document is: (1) categorized, i.e. each individual word (or phrase) in the document is tagged by category, "name" "location" "date" etc.; (2) the individual words are also tagged by sensitivity tags "secret" "confidential" "Private" "level 3 sensitivity" etc.; and (3) all the above is presented in a matrix format. The filters will automatically select which words in the matrix will be used as keywords for the continuing search. Different keywords/search terms will be selected based on the different filters or combination of filters used. The entries for such filters may be machine or user defined. The combination and selection of different filters may create different permutation and results. The filters may include the "Word Lists", "Phrases list", and "Word Group Lists" which limit the range or area from which the keywords may be selected. The ideal combination of filters to control granular content for automatic production of keywords may be found also by trial and error. Artificial intelligence tools may be integrated.

Linear adjacent selections may be used as keywords. However, unknown content can slip through this sieve without an explicit human intervention, therefore the Secured Metasearch Engine automates this sieve by creating permutations of both categorized and unknown words and phrases. These permutations are used as new search terms. The likelihood of random combinations (included in the class of the NP! problem space) is so low, that emphasis is focused instead on linear adjacent selections. This result in is a small and focused problem space that can be solved on a typical personal computer and ads disproportionate value. For example, a Google search of "Mohammed Atta" returns "Khalid Sheikh Mohammed" as a disconnected string of categorized and unknown words out of the box; that means parts of the phrase "Khalid Sheikh Mohammed" are recognized without any special configuration, but not as a contextual phrase. Permutations of linear adjacent selections do however create the complete connected phrase and automatically submit the complete phrase for a divergent metasearch, thereby creating new and previously unrecognized relationships to connect the-dots.

The engine can be set for automated contextual pruning with flexibility to discover codes. Many divergent mining and search efforts will expose unknown, deceitfully hidden, and statistically irrelevant relationships. For example, a Google search of "Mohammed Atta" also shows meetings at Aleppo. The relevant thread for Aleppo is that it is Syrian university town with social connections to Hamburg and the 9/11 hijackers associates. However, Aleppo is also a common Lebanese street name, and the original shoemaker character in the Pinocchio story by C. Collodi. The name was changed to Geppetto in the Disney children's movie. While it is tempting just to prune this track, it is also important to explore associative contexts, because the use of codes can mask more sinister meanings. The 9/11 hijackers communicated within the seemingly innocuous context of weddings, guest lists, and dates. So while contextual pruning is easier after the fact, it can be very important before the fact when the use of codes and false contexts are not so clear.

In conclusion, although stovepipes and silos, independent efforts at information collection and intelligence analysis, and air gaps or security guards among domains prevent information sharing, the Secure Metasearch Engine enables security with information sharing including Multi Level Security (MLS) search capabilities across domains. It overcomes security leaks consistent with the needs to both protect national security interests but also enable cross-domain information sharing. The Secured Metasearch Engine technology is based on granular data control. It enables secured searches and distribution of secured search results including secured information sharing with Multi Level Security (MLS) search capabilities across domains. Data is explored not only by content but also context and concept. Search should occur across domains, with information shared and delivered across domains and through the extraction and integration of both private and public data sources including the Internet.

D.1 Secure Editor, DOM Editor (General) and DOM Editor

Basic Applied as Extractor Modules

Figure 52:
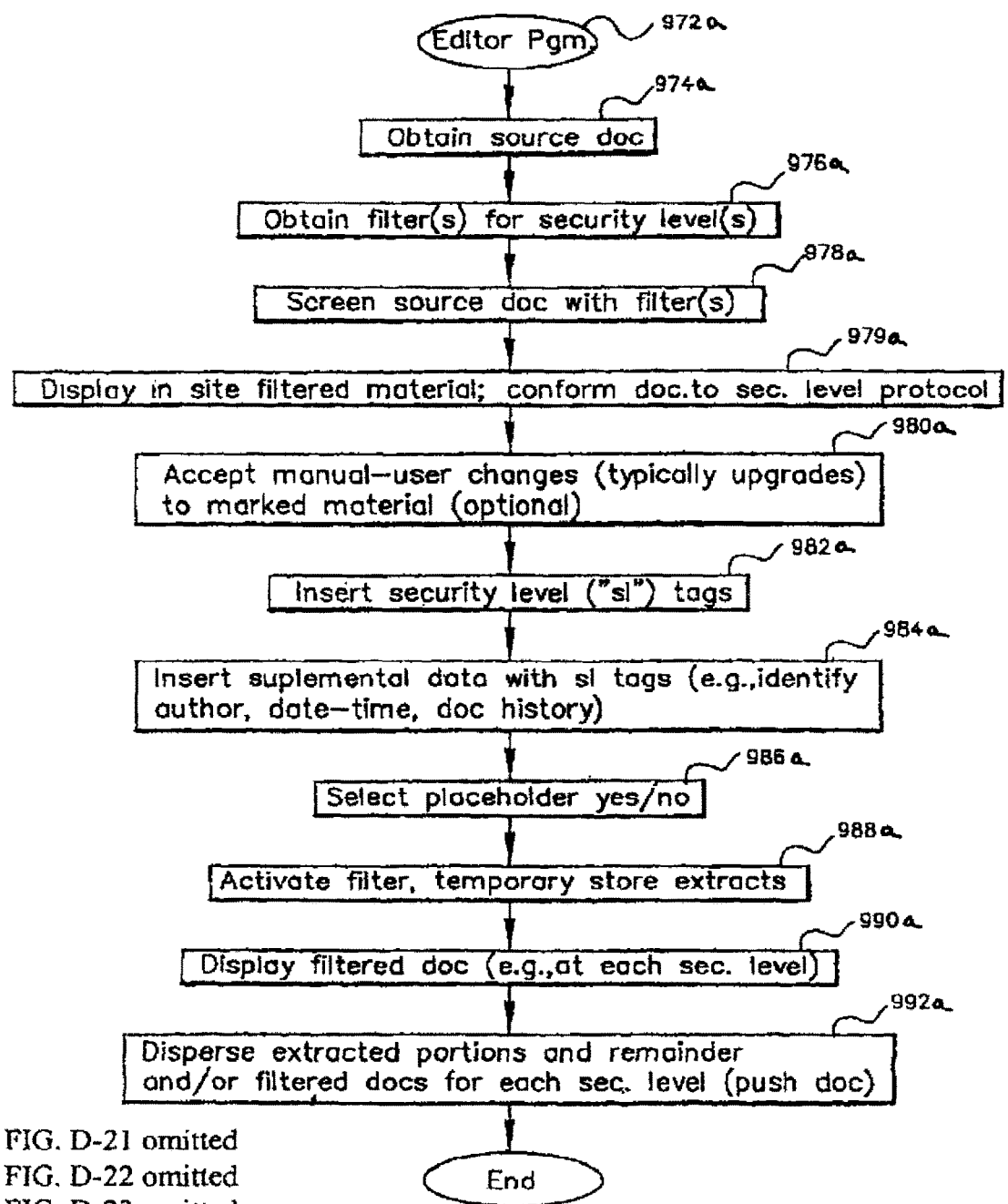
FIG. 52 diagrammatically illustrates a basic security editor program.

The Secure Editor can be used to generate SC or sec-con data for a search and can also be used to locate and extract security or sec-con data and SC data before storage of the sec-con or SC data in the distributed storage sites. The Secure Editor in FIG. 52 diagrammatically illustrates an editor which may be employed to secure sensitive word/objects in a source document. In a current working embodiment, the secure editor is a standalone application or a module to add into other applications for plain text and media creation, editing, and sensitivity level tagging. Other types of tagging, wherein the editor supplements the initial group or subset of security sensitive (or select content) words, characters, icons and data objects by categorization, taxonomy classification, privacy, security, compliance, and semiotic meaning, are also available. The editor supports a full range of document management and can be integrated into a unified infrastructure, from creation, editing, document markup, tagging, tag conversion, tag removal, context sensitivity level redaction, context reconstitution, and support for complex process work flows. The architecture assures separation of data from metadata so that no security lapses are introduced into the traditional word processing and document management cycle.

FIG. 52 is a basic flow chart for one embodiment of the Secure Editor module. Editor program 972*a* begins with obtaining the source document 974*a*. Of course, the source document may be any type of document as explained later herein. Step or function 976*a* obtains one or more filters for one or more security or sensitivity levels. Step 978 screens or processed the source document with the filter(s). For example, the source document in FIG. 15 in window 991 has text regions 993, 994, 995 and 996. In step 979, the Secure Editor displays, in situ (in the displayed document), the filtered identified material and conforms the precursor document to the security level protocols for the system within which the Secure Editor is employed as an information processing tool. FIG. 16 shows that the address data 993 is marked TS (top secret), region 994 is displayed in color A for TS coding (please note that the addressee data may also be so marked) and is "red-lined" or struck out. Region 995 is displayed as presented in the source document and is labeled U (unclassified) and region 996 is shown in color B, is redlined and is labeled S. Labels TS, S, C (classified) and U are the established security labeling protocol used by the organization employing the Secure Editor. Other labeling schemes may be employed. Color is used to assist the user to select (and in some non-standard cases, deselect) the sensitive data marked by the editor. Redline is used to inform the user that the filter(s) will extract the marked data. Labels are used to permit the entity using the editor to employ standard tear line protocol. Any data beneath a security classification of the user is under the tear line and the data is permitted to be distributed to the lower security cleared user. Of course, electronic distribution of secure data need not use the hard copy or print version of the tear line. However, this nomenclature referring to the tear line is used in the prior art systems.

Step 980a (FIG. 52) accepts the user's manual changes (typically upgrades) to the precursor document. These manual changes are displayed, redlined, colored and labeled. Step 982a inserts the security label TS, S, C and U has discussed above. Step 984a notes that the system takes certain meta data such as author, date-time, version history, change history, etc. and converts this meta data into ordinary text, marks that data at the necessary security level and labels the data. Step 986a permits the user to add (or omit) placeholders into the final document. FIG. 17 shows placeholders as black lines or as XXXXX symbols (or other symbols) wherein the sensitive text is not shown but some replacement markers are shown. The byline in region 1003 shows "sanitized document." The byline 1003 in FIG. 16 lists the security level and the color representation.

Step 988a (FIG. 52) activates the filter, extracts the sensitive or SC data and temporarily stores the extracted data. Step 990a displays the filtered document and the user may view the filtered document at each security level. Therefore, the user, before transmitting a secured email (or letter) may look at the source (FIG. 15), may look at the TS level without the redline strike out but with security labels and colors, may look at the T level revealing regions 996 and 994 but not regions 993 and 994 (which are TS coded regions), and look at U versions as shown in FIG. 17. Step 992a disperses the extracted data and the remainder data or disperses partial versions of the document (those partial versions formatted and containing only data at or above the target security level (all TS level data (which includes TS, S, C and U data), or all S data (comprising S, C and U) or all C data and U data)).

One feature of the present invention is that in step 979a, the security level protocol determines whether single words are granularly classified (TS, S, etc.) or whether a line is classified, or whether an entire paragraph is classified (see FIG. 52). If a commercial/privacy filter is used to exclude all social security numbers, the organizational protocol is set at a granular level to exclude just social security numbers. Different group protocols use algorithms to mark, filter and extract adjunctive security sensitive (or select content) words, characters, icons and data objects near the target security sensitive words, characters, icons and data objects. The sensitive words may be security sensitive (or select content) words, characters or data objects defined by compliance with law, regulation or policy, privacy, national, organizational or private security concerns. For example, Bin Laden is the target sensitive word in FIG. 52 and this classifies the entire paragraph as TS level. The other words in the paragraph are adjunctive word/objects.

Several steps are prudent to enable MS Office document protection. The first step is have a network guard (see FIG. 48) that filters all incoming and outgoing traffic for MS Office document files and quarantines them. Spam and virus filtering is necessary to preclude system, resource, and file exploits. URL filtering, quarantine lists, black lists, white lists represent the minimum responsible approach. Ingress files can harbor viruses, etc. Outgress files can harbor privileged information at any and all levels of the DOM. With a means to filter and check every node for purpose, content, metadata, formats, structure, comments, links, and so on, there is no other way to vet the integrity of the file.

Figure 53:
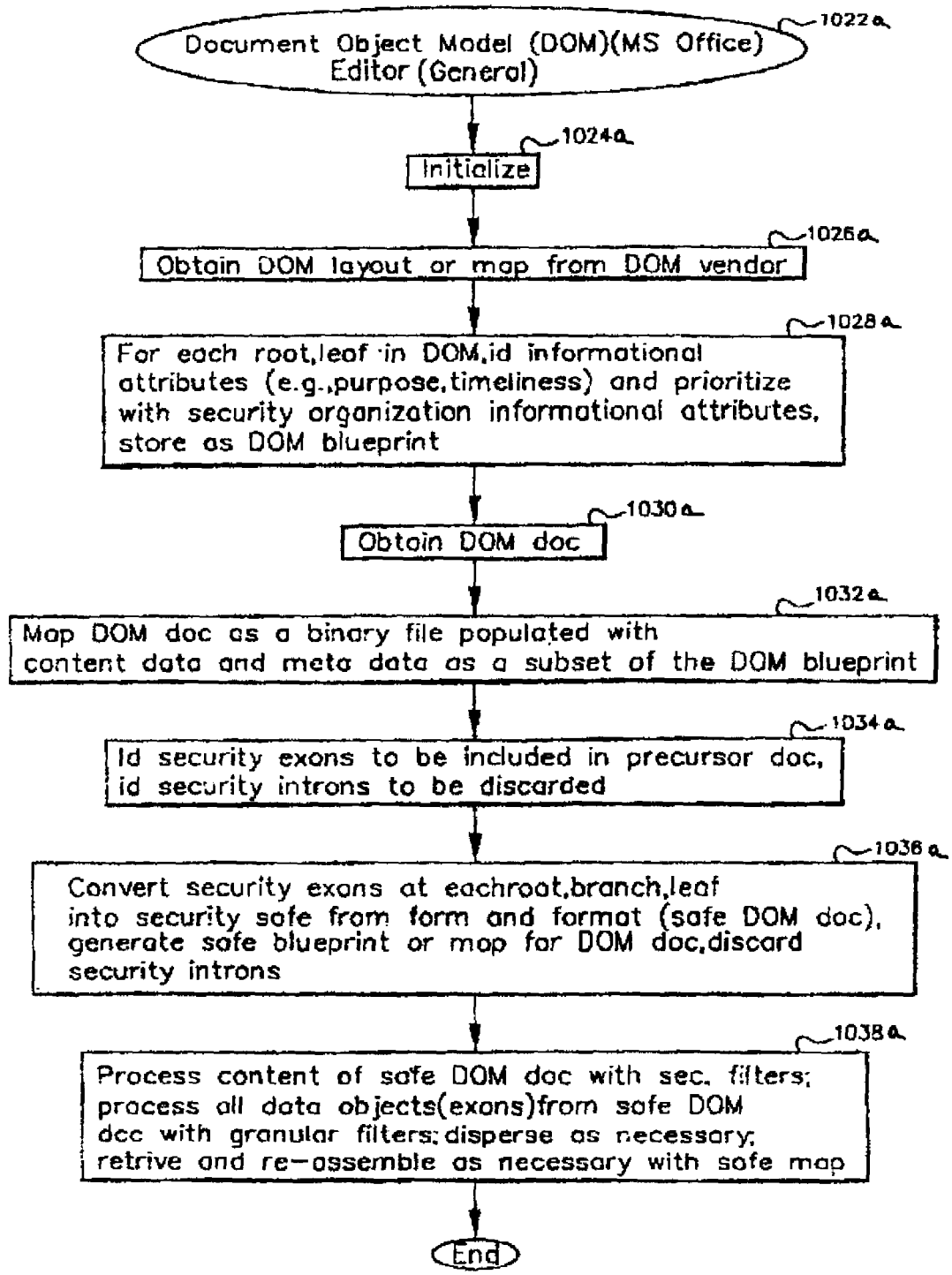
FIG. 53 diagrammatically illustrates a general flow chart for a comprehensive filter operable on a document DOM.

FIG. 53 shows the General DOM Editor program 1022a in a flow chart form. Step 1024a is the initialization that is employed by the security entity to set up the program. Step 1026a obtains the DOM layout or blueprint from the DOM vendor. Step 1028a notes that for each root, branch and leaf in the DOM, the information attributes must be prioritized with th the security organizational informational attributes. For example, the audio files of potential Bin Laden voice prints may be critical at TS and S levels but be completely excluded at C and U levels. Therefore, any audio files below C and U are security introns which are excluded or ignored.

Step 1030a obtains the source document DOM. Step 1032a maps the DOM source document as a binary file populated with content data and meta data as a subset of the DM blueprint. Step 1034a identifies security exons to be included in the further processing of the item and identifies security introns to be ignored or excluded in the processing. Step 1036a converts security exons at each root, branch and leaf int security safe form and format (for example, a safe DOM template), and generates a safe blueprint or map for the precursor DOM and discards all security introns. Step 1038a processes the content of the safe DOM with security filters discussed above. It also processes all data objects (exons) from the safe DOM with granular filters. Data is dispersed as necessary and retrieved and re-assembled as necessary with a safe map.

Figure 54:
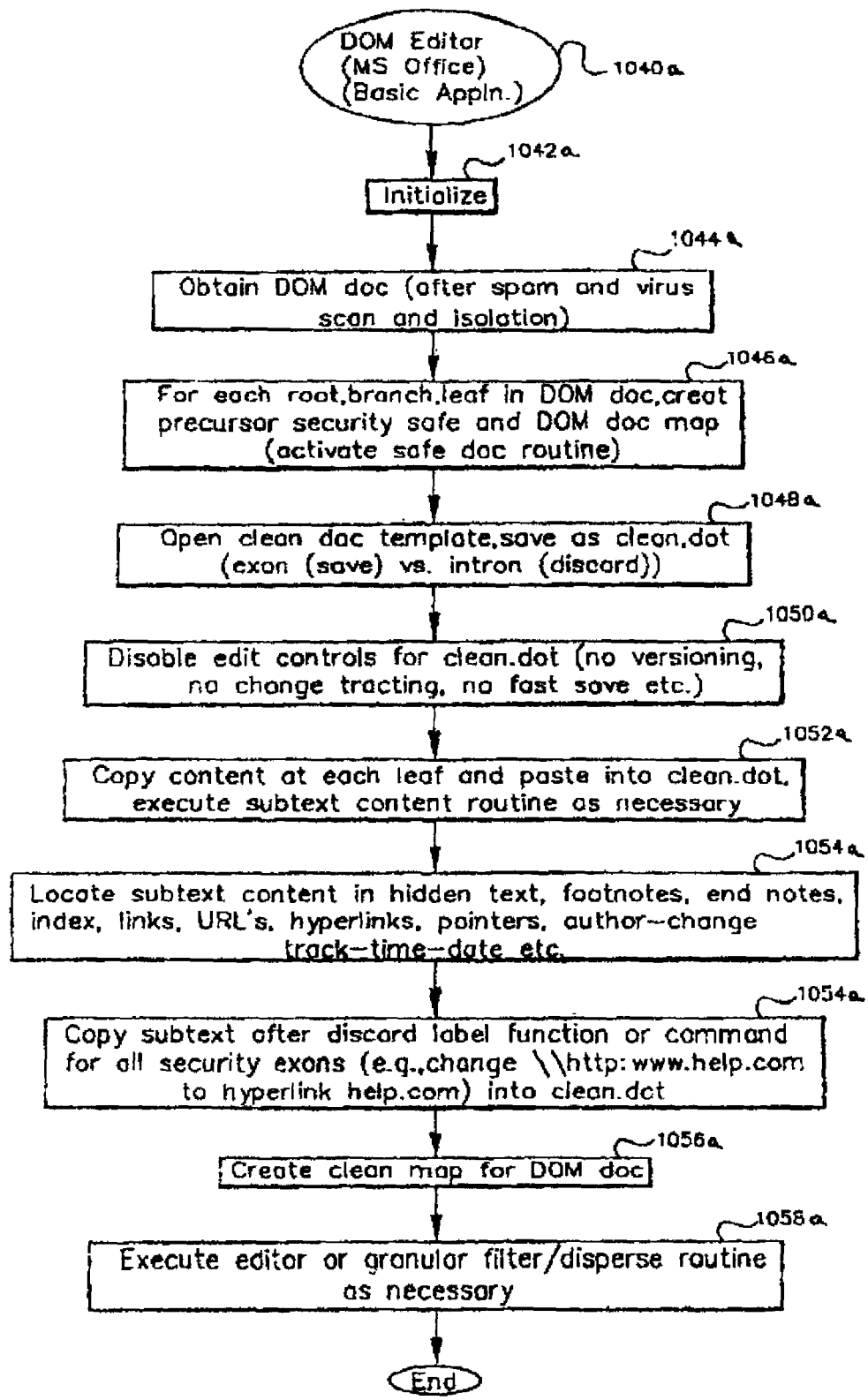
FIG. 54 diagrammatically illustrates a basic application of the comprehensive DOM editor.

FIG. 54 shows a flow chart of a basic application for a DOM Editor for MS Office document. Step 1042a initializes the system. Step 1044a obtains the source DOM document and notes that all processing occurs after a spam and virus filter. Step 1046a notes that the program creates or is provided with a security safe DOM document and map. Step 1048a notes that a template is opened. A clean .DOT template (Word) or whatever the new document type is opened for the specific application. The Normal.DOT or New Spreadsheet.XLS on the MS Office distribution CD is safe. In Visio, for example, start with a new chart. Older documents saved as templates tend to accumulate unanticipated metadata. If one must use a non-standard template, clean it up. View it as both a printed document, as a binary file, and as a document object. Write protect the templates, or store the templates as non-modifiable networked volume. If the templates are used throughout the organization, create a network store for them and configure each user's installation of MS Office to look there for the templates. Search the network for duplicate copies of these templates and eliminate them.

Step 1050a disables edit controls and step 1053a copies content. The point is one must edit cleanly. This is not a single step but rather a process, both one time and ongoing.

Disable versioning in step 1050*a* to prevent a buildup of past versions of the document. With versioning, prior sessions will be stored as document.doc 1, document.doc 2, and so on. These tend to get entwined with the latest version. If workflow with InfoPath, Outlook, or other collaborative workflow tools creates duplicate copies of the source document file for each user. Step 1050*a* includes the concept that the system is configured to store a single network copy instead. Preserve an audit trail and backup with a system backup rather than versioning. Disable change tracking in step 1050*a* to curtail the buildup of additions, deletions, and changes that transcend the publishing intent of the document. If redlining is necessary, establish guidelines for periodically accepting changes to purge change log. Use the command to save the document without the change log with File/Save or File/Save As. Do not use nor rely on fast saves, timed saves, or file recovery after a MS Office crash to purge the dirty metadata. After a crash, reopen the document, save the document under a new name. Close the Office application. Delete the old file precipitating the crash. Rename the new file under the old name. Reopen the Office application.

Step 1054*a* locates text in footnotes, hidden text, etc and either discards or ignores the subtext because those items are considered security introns or copies them into a safe DOM text form and disables functions, if necessary. Step 1056*a* notes that a clean map for the security cleared DOM document must be created. Step 1058*a* executes the editor or granular filter and dispersal routine as necessary. The distribution or push of partial security cleared versions of the text can be included in step 1058*a*.

D.2 Applications of the Secure and SC Data Systems

The secure data storage systems in Part B, combined with the search engine or KE engine in Part C can be deployed in various applications, some of which are described in this Part D.

D.3 Automatic Features

The system and method described herein may operate substantially automatically, that is, without operator intervention, other than the security clearance function. The clearance function does require some type of operator authentication prior to retrieval of the extracted and remainder data.

The system and the method may operate automatically in that the plaintext or originating data could be identified by a party desiring security. The system could obtain that data from any data input device (hard drive memory, floppy drive memory, flash card memory, personal data assistant (PDA), or any other type of data input device), filter the data, separate the extracted text or the remainder text, encrypt (or not encrypt) the data, separately store the extract and remainder data (all automatically, that is, without operator intervention). Hence, it is not necessary that the system operate with significant operator or manual intervention. Of course, the system may also operate on a plaintext document or data object that is being created "in real time" by an operator and keyboard, mouse or other type of data input device.

The automatic operation of the system and the method can be caused by a triggering event. This triggering event may be a security attack (generating a trigger to start the gathering of plaintext, filtering, extraction and storing) or may be any other type of trigger such as a building burglar alarm, door alarm, fire alarm, or virus detection algorithm trigger. The event may be a time of day, week or month. It may be n seconds after the user stops typing on a keyboard. It may be a timed back-up feature.

D.4 Multiple Security Levels

Multiple filters may be utilized in the system and in connection with the method. These multiple filters may be useful in the operation of the system with a plurality of security levels. Each filter could filter out different levels of security sensitive (or select content) items and each bundle or group of security sensitive items (from each distinct filter) could be stored at different computer storage locations. Multiple filters, multiple security levels and multiple storage areas may also include multiple encryption routines and decryption routines. Encryption and decryption routines can be related to the level of security of a particular group of data.

Multiple maps may also be provided for singular or multiple storage of extracted data and remainder data. These maps may or may not indicate the originating point of the data. Maps can be parsed such that an intruder, upon discovery of a single map or map portion, could not locate the storage locations of all piece of the extracted data and remainder data. Maps may also be encrypted. The map may also be stored at a distinct map store location.

The concept of partial reconstruction also includes the concept that a portion of the plaintext would be reconstructed and the unreconstructed portions of the plaintext could be encrypted or could show blanks or other symbolic indicators. See the placeholder table above. Partial reconstruction of the plaintext also includes a concept that the security sensitive (or select content) items or materials may be subject to different types of encryption. Hence, a single plaintext document may have multiple levels of security and multiple levels of encryption wherein each encryption has a different level of security assigned to it.

The present invention can also be configured to provide a computer network which transparently establishes and manages the separation of user-based communities of interest. The separation is accomplished by extraction pursuant to security levels, dispersion of data into secure storage facilities (memory stores) and reconstruction based upon the assigned security level. A low level security clearance results in only partial reconstruction of the plain text or source document. These user-based communities of interest are a plurality of users each having respective security clearances. As described above, each successively higher level of security clearance permits the user to see greater degrees of reconstructed plain text obtained from the extracted data stored in extract stores and the remainder data from the remainder stores. By integrating encryption (and necessarily decryption), separation of user-based communities of interest are established such that the users in a particular community are permitted access to some or all of the plain text data based crypto-graphically separated communities and need to know security levels.

Figure 30:
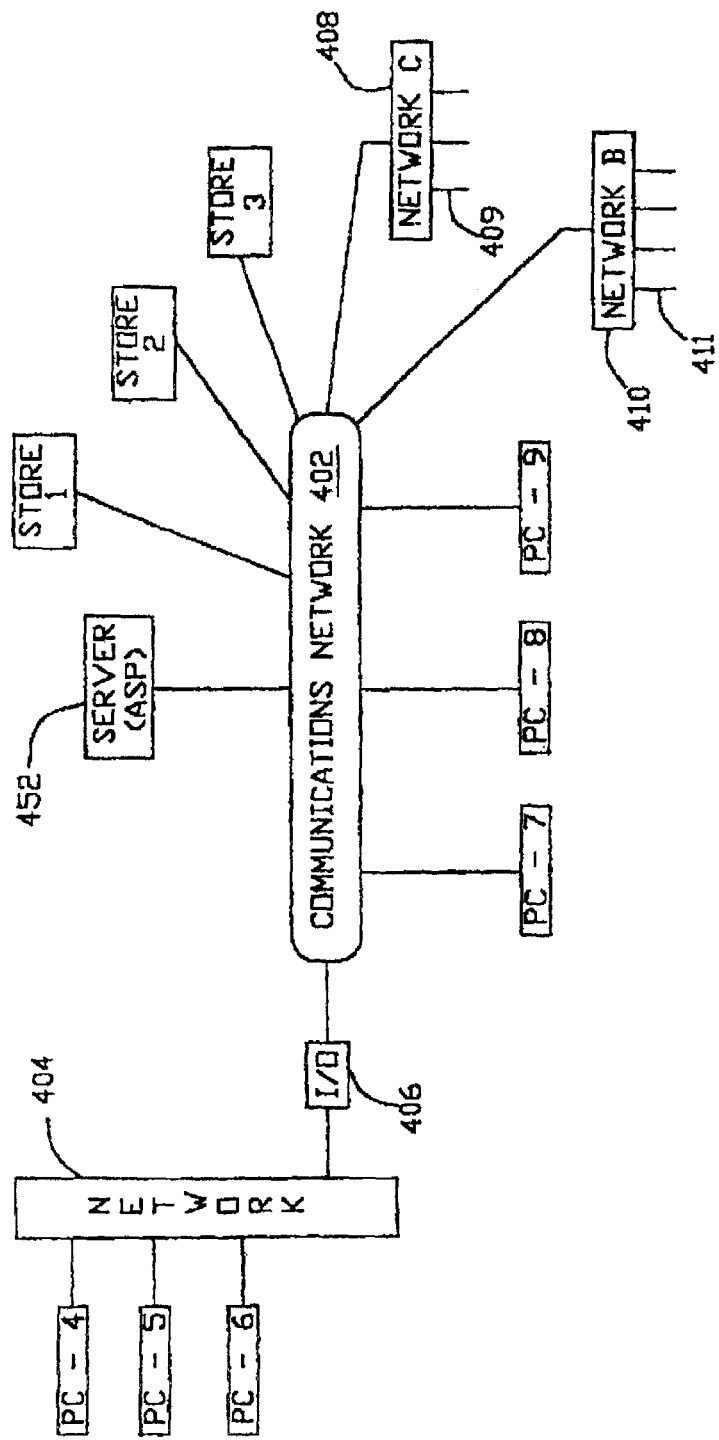
FIG. 30 is a computer network diagram showing various user communities.

FIG. 30 is an exemplary computer network diagram showing various user communities. It should be noted that select content SC data stores may be grouped for different portions of the same enterprise. Therefore, rather than have security groups as discussed herein, the system could provide SC interest groups in an enterprise. An "SC interest group" is the same as a security level group. The telecommunications network 402 is connected to the server application server provider ASP 452 and to various networks and personal computers or PCs. The PCs may be computer work stations. Network A 404 is coupled to telecommunications network 402 via an input/output unit 406. Network A is coupled to various PCs identified in FIG. 30 as PC-4, PC-5 and PC-6. Of course, Network A could be coupled to other PCs not illustrated in FIG. 30. As described earlier, server 452 can facilitate remote or offsite storage of extract data and remainder data in store 1, store 2 and/or store 3. Further, the map showing the storage location may be encrypted and stored in any one or more of these stores. Also as described earlier, the memory in one of the PCs, for example PC-4, PC-5 could be utilized to store extract data and remainder data from PC-6 and PC-6 can be configured as the input data computer. Hence, the present system and methodology encompasses the concept of local storage and remote storage. On the local level, the storage begins by storing the extract data at different locations in the hard drive of the PC. The next level higher is storing the extract data in removable computer media such as floppy disk, removable tape drives, CDs etc. associated with the PC accepting data or associated with a server on Network A. The next higher level of extract store is storage of the extract data on a server or other computer in a particular network. If PC-6 is designated as the input computer, the extract data may be stored on PC-4. Of course, PC-4 could be designated as the server for Network A.

PC-7, PC-8 and PC-9 are coupled to telecommunications network 402. Network C 408 and Network B 410 is coupled to communications network 402. The lines, one of which is line 409 extending from Network C 408, represent a plurality of computers or workstations coupled to Network C. Line 411 represents a plurality of workstations or computers coupled to Network B 410. In an e-mail implementation of one embodiment of the present invention, PC-7, PC-8, etc. may represent computerized devices accepting e-mail (personal data assistant, pager, cell phone, etc.). The sender and the e-mail addressee may utilize simple computerized systems to communicated via e-mail. Further, the network may be any telecommunications network including wire, cable, cellular, wireless, satellite, IR or RF systems.

Figure 31A:
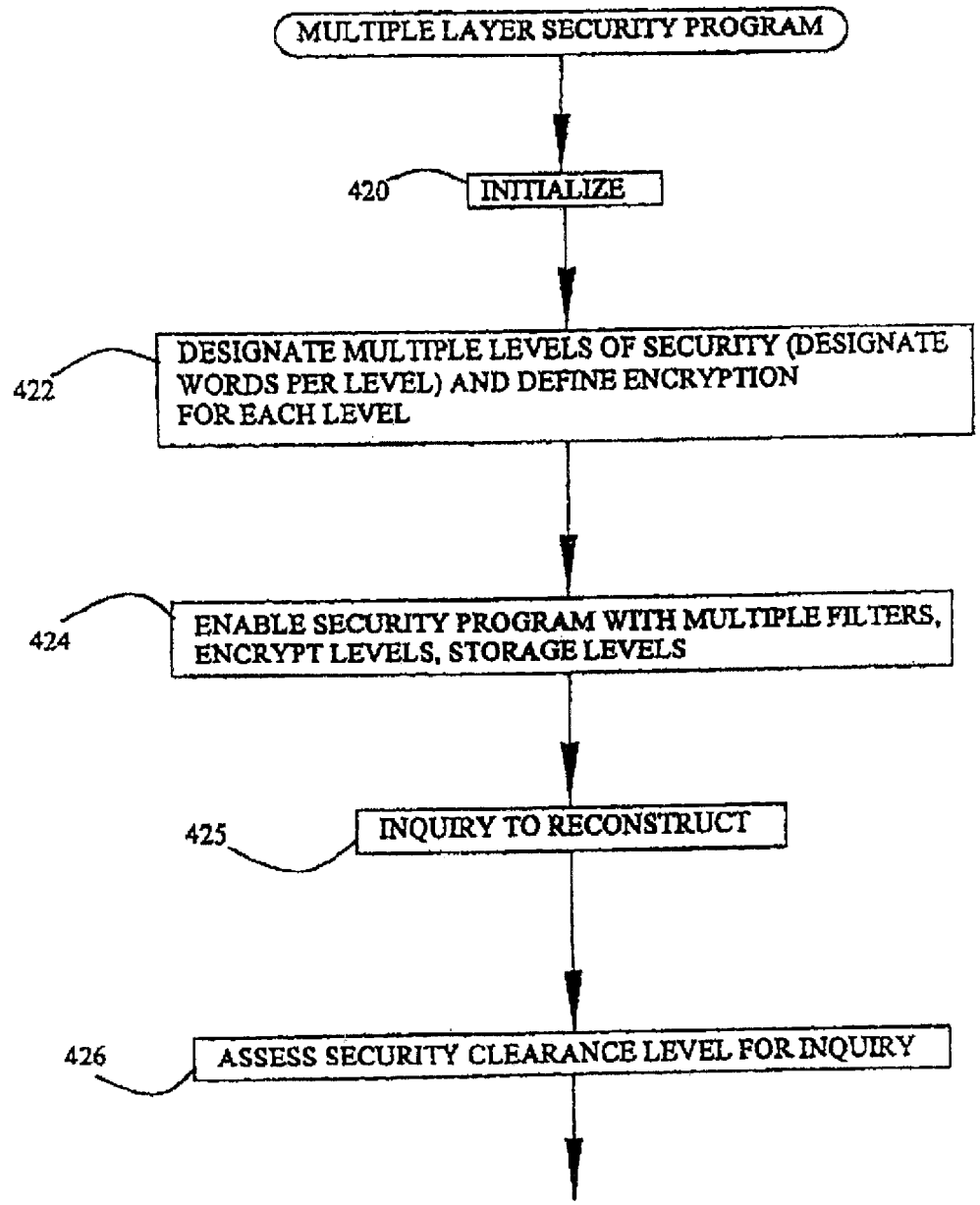

FIGS. 31a and 31b diagrammatically illustrate a flow chart showing the key component steps for the multiple layer security program for the community of users. The "community of interest" system described herein enables persons and organizations at the same security level to share data on a peer to peer level. Further the security or SC system may operate automatically, with respect to extraction, storage and reconstruction, such that the peer to peer dissemination of data objects is quickly and readily available to all at the same or higher security levels. Step 420 initializes the program. Step 422 enables the user, administrator or system operator to designate multiple levels of security, that is, multiple words, characters, icon, data objects, or whatever, for each security level and further to define encryption for each security level. The designation step 422 also includes identifying the communities of interest and the particular security level and security clearance or SC level for each community of interest. One example of various security levels for communities is set forth below in the Community Security Level Table which is keyed to the computer network diagram of FIG. 30.

| Community Security Level Table | |
|---|---|
| Security level | Community Group |
| High | PC-7; PC-8 |
| Medium high | all high group plus Network B |
| Medium | all above plus Network A |
| Low | all with nominal clearance |
| Special set medium | PC-7; PC-9; Network B |

Further, designation step 422 will include identifying the words, phrases, icons or data objects subject to security or SC concerns and the potential location of the extract data and, if necessary the remainder data and the degree of encryption. The following Selection Table provides some examples.

| Selection Table | |
|---|---|
| Level of encryption/storage | type or category of word or phrase; input specific word, phrase |
| High, web-based storage | dollar values, names of streets, countries, "Smith" and 5 words about "Smith," "avocado" |
| Medium high, remote storage | all addresses, all names |
| Medium network storage | all family names, all client names |
| Low, encrypt and separate store in local memory | all items not in dictionary |

As an example of various encryption methodologies, the following Encryption Table is illustrative.

| Encryption Table |
|---|
| DES, random pad A ("r. pad A") |
| Huffman, r. pad B |
| Crypto API, r. pad 7 |
| Two fish, r. pad C-2 |
| Blowfish |
| RC4 |
| Skipjack |
| Ghost |

In FIGS. 31a and 31b, step 424 executes or enables the security program or SC levels with multiple filters, multiple encryption levels and multiple storage levels. Each one of these filters, encryption levels and storage levels correspond to the security level for the various communities of interest. Step 425 responds to an inquiry from a user to reconstruct the document. Step 426 accesses the user's security clearance and the particular inquiry. Decision 428 determines whether the inquiring party is entitled to full or partial access to the source document. If not, the NO branch is taken and the system, in step 429 adds placeholder substitutions. Step 429 may be optional. If YES, the system reconstruct pursuant to the clearance level in step 430. The following provides an example of multiple level encryption utilizing placeholder substitution.

Example

Multiple Level Encryption

Applicants must be _____ zzxx xx _____ xxx _____ _____ _____ citizens and have a high school diploma or equivalent. They must possess a valid subsubsub driver's license and qualify for top SUBWORD _____ clearance.

With this multiple level encryption, substitutions may be utilized "subword" to indicate to the user with a less than superior security level that a certain word, term or phrase has been extracted and stored by he or she is entitled to know that substitute word, term or phrase has been inserted into the plain text document. Of course, any type of substitution character may be used for the placeholder.

In step 432, the system displays the plain text in a normal format or utilizing a split or bifurcated video memory or utilizing overlay display screen. FIG. 7 and the description of that figure set forth above describes the normal display in steps 202, 204, the split video memory display in steps 206, 208, 210 and 212 and the overlay display system in steps 214, 216, 218.

The system, in step 434, monitors and logs the location of the user making the inquiry, the type of inquiry, the time, day, date, clearance level and access level and logs all modifications to the plain text source document. One example of the log is set forth below in the Security Report Table.

| Security Report Table |
|---|
| Privacy Scrubber Report |
|    source file: path\filename |
|    scrubbed file: path\filename-scrub |
|    source file: date, time, size |
|    process: date, time |
|    user: name |
|    system: name |
| Recovery File |
|    (a) storage location, type of encryption, random key |
|    (b) storage location B . . . |
|    (c) store C . . . |
|    (d) store D . . . |

Step 436 enables the security program and parses and extracts the data per the security program, filters the data, extracts it and codes it disperses it and stores it as discussed above. The multiple layer security program ends in step 440.

The following Security Level Access Placeholder Table is another example of the type of placeholder substitutions that may be available. The example in the Security Table Access Placeholder Table may be used in conjunction with step 429.

| Security Level Access Placeholder Table |
|---|
| [security level 2] intelligence located [security level 4] 20 miles from [security level 4]. He is using the name [security level 4], and dressed as a [security level 4] preacher. With him are his lieutenants, [security level 4] and [security level 4]. He is communicating with the international media through Mr. [security level 4], who resides at [security level 3], [security level 4], [security level 4]. Telephone is [security level 1] and Facsimile is [security level 1]. |

It should be noted that in order to reconstruct some or all of the plain text source data, some or all of the subsets of extracted data from the extract stores will be utilized dependent upon the respective security level of the inquiring party or user.

D.5 Sharing Data with Different Security Levels

Data Mining

The present invention can be configured to overcome obstacles to intelligence sharing and data sharing between parties by enabling the parties to identify granular critical data and control the release the granular critical electronic data subject to a sharing arrangement with other parties. In some instances, the controlled release process is designed to implement an agreed upon plan to share secured data or SC data based upon arms length negotiations between the parties. The invention enables a party to release specific granular data such as a name, address, or date without releasing the entire "classified" document. In a commercial context, this is akin to data mining in that the inquiring party seeks limited data (not the entire data file, record or document) and is willing to pay for the "mined" data. As an example of a security intelligence system, a local police chief may release granular critical data about a suspect to a federal agency, when in return the federal authority will release further intelligence "mined" or obtained for the secured data storage, about the suspect. The controlled release of data from the higher security level party (the FBI) may be an intelligence document or a granular part of it (a partial reconstruction provided to the local police). The rational behind this implementation of the invention is that there are many obstacles for sharing intelligence and information. There are even many more hurdles when it comes to sharing of raw intelligence. The invention creates a leveled playing field in which the different parties must share and exchange information in order to achieve their objectives.

The invention can be configured to resolve the major challenges facing government by enabling sharing of information between its different organizations in relationship to fighting terrorism. The invention for example can enable organizations, connected to the Homeland Security Department, to search data bases of various other government, state and local organizations, eliminating the fear of the "source" organizations, owning or controlling the source or plaintext documents that their proprietary data or granular critical data is released without their specific permission. The invention enables open negotiations between the parties regarding what data to release and for what consideration. When several organizations are seeking access to a specific document, the invention and can allow a controlled release of different granular data to different parties for different considerations and benchmarks.

The invention's mechanism of controlled release of the located document/data enables other parties to search their documents without the fear that sensitive information will be released to the searching party. This invention is designed to foster sharing of documentation between different parties, taking into consideration the need to limit the access of other parties to the total content of the owner's document.

The invention is a machine and process and its purposes and advantages may be as follows: (a) To automatically control selection of data objects within a data stream and release them in a controlled method only to authorized parties. (b) To automatically separate data objects within a data stream into two or more digital data streams according to the importance and categorization of contents, through extraction and removal of the prioritized content and its replacement by appropriate placeholders. (c) To automatically control selected contents in E-mail, and enable its release in a controlled method only to authorized parties. (d) To enable users to leverage the growth in computer and telecommunications connectivity and electronic commerce by reducing security risks. (e) To enable users to release documents, digital files, and data streams into closed and opened digital networks with the confidence that important, identifying, and critical contents in that documents, digital files, and data streams is secure and will be seen only by authorized parties. (f) To enable real time simultaneous customization and personalization of selected contents within a data stream to different parties, allowing instant display of the selected content or part of it based on, and tailored made to the status of the user or receiving party. (g) To secure the important and critical contents of a document or digital file by transporting said contents into a separated data stream and removing said data stream to a removed storage memory, while eradicating any copies, temporary caches, or traces of the removed extracts on the original computer or machine. (h) To enable instant return transfer to the display or to another display all or part of extracted content instantly with verification of authorized user. (i) To create a projection of the original document, digital file, data objects within a data stream, or variations of it through combined projection of the splinted data streams, while maintaining separation between the data streams. (j) To create an alternative method for security, instead of encryption, which is secure, cost effective, less time-consuming, and flexible. (k) To enable automatic timed removal of specific content items, automatically or manually selected from a document, digital file, or data objects within a data stream. (l) To enable an automatic timed reconstruction (reconstitution) of the said document, digital file, or data objects within a data stream.

Another object of this invention is as a system and method for automatically creating customized and personalized versions of a document, data object, or data stream. In real time, simultaneous versions of the original are created and altered, then disseminated based on the status of the different users and their access privileges. The system and method enables content management and control by automatically locating content items prioritized by importance, transporting them to a secure memory, and releasing them under explicit controls or preset rules.

Another object of the invention is as a system and method for control, analysis and management of important and prioritized information within documents, files, data object, and data streams. The system and method, enables the processing of all data objects at the time in which they are created or imported into the system. The early stage processing, enables early stage inventorying of prioritized contents as well as early stage pattern recognition. Extracting critical information, such as credit card numbers, last names, first names, social security numbers, phones numbers, transaction dollar amounts and addresses, enables the system and method to aggregate data in categories and analyze the data in different optional methodologies including pattern recognition.

Another object of the invention is as a system and method for comprehensive monitoring of various activities including business activities in real time. With this level of detail, the system and method becomes a management information tool and information/data command and control center. The said system and method can include an alert system, which in effect creates a real time apparatus for command and control of the systems activities. In real time, and at any point in time, the user can get a comprehensive view of different activities including: (a) How many transactions are being processed, their content, their context, identity of the involved parties identity, their profiles, and the personnel involved. (b) How much money is being transacted. (c) When, in terms of dates, relevant to the transaction. (d) Where, in terms of geographical location, the transactions are taking place. (e) Where, in terms of geographical location, monies or goods are being transferred. (f) Which departments in the organization are involved.

D.6 Multilevel Security Through Sanitization with Reconstruction of Sanitized Content A multilevel security (MLS) or SC level technology secures the targeted, filtered content with extraction and dispersal to storage, bypassing the use of classification labels, in order to achieve stronger security of the source document or data or better understanding of the SC material. During the process of developing security or SC technologies for defending critical infrastructure, it was discovered that the business model was too complex and there was a need to redefine and create new systems and methods for doing business. As a result, one aspect of the present invention provides a system and codifies methods and business processes to automatically identify, extract, store critical data (as an input security system) and permit reconstruction of critical data only in the presence of certain security clearances (as the output of the security system) or as established by the SC policy release rules.

The invention is a method and process to establish a stronger multilevel security (or MLS) architecture and product, than is currently available. The invention introduces multilevel security through sanitization of critical content of a source or plaintext document (or data object) with the unique ability to reconstruct all or part of the original document in conformance to the classification level of the user. A user with top classification may view the entire document, while a user with a lower level classification will view a sanitized document, tailor made automatically for his clearance level. The invention secures the targeted filtered content of a document, file, or data stream, through extraction and dispersal to storage, bypassing the common use of classification labels in order to achieve stronger security. The invention enables secure document storage and secure message transfers between users and networks with different security classification levels while protecting the information on a need to know basis.

Currently multilevel security MLS systems are using multiple PCs for each user, and using physically separate systems for processing data at each classification level. The inventive system, in several embodiments, eliminates the need for the use of multiple computers. All the documents in the user's PC are automatically secured with a granular classification process generally described above with identification of special security data, extraction from the source document or data object, and then separate storage of the security data. The classified granular content is dispersed to different secure, distributed storage locations. The classification level of a user will determine his right and ability to access and release the stored critical extracted content from the various storage locations for reconstruction. A user with top classification will view the entire document, while a user with a lower level classification will view a sanitized document, tailor made automatically for his clearance level.

Types of government security levels are: Top Secret (TS); Secret (S); Confidential (C); and Unclassified (UC). Business identifies security levels as: Restricted to Management (R, for example, attorney-client privilege); Proprietary (P); Sensitive (S); and Public (P). These MLS security levels may be supplemented with "need to know" classification labels, organizational limits (Army, Navy, DoD) and time limits. Prior art security systems identified each file with: owner, size, date and time of creation and security attributes. The Bell Lapadula (BPL) security model uses concepts such as domination of the MLS security level over both a process and the subject (a data object). Some examples of various processes are read, execute, overwrite, append, write, kill (delete), etc. Some examples of process rules under the BPL model are: NRU—No Read Up (a lower security level cannot read a document at a higher security level); NWD—No Write Down (a higher level cannot write down to a lower MLS level).

The invention herein does not use the "classification labels" of the prior art. Instead it creates a situation in which the user gets access rights to specific distributed storage locations based upon his MLS level, each access right can be classified with a different classification level. With respect to the editor described later herein, security labels (for example ("e.g."), TS, S, C and UC labels) are added or inserted into the filtered but not disassembled document. As explained later, the insertion of these SL labels conforms the current inventive system to the prior art methodology and protocol. However, the current inventive system does not use the SL labels for processing purposes. The current system uses a granular or filter approach to make secure the sensitive data in a particular document. SC labels, matching the relevancy of the SC data may be employed rather than security level tags.

Figure 32:
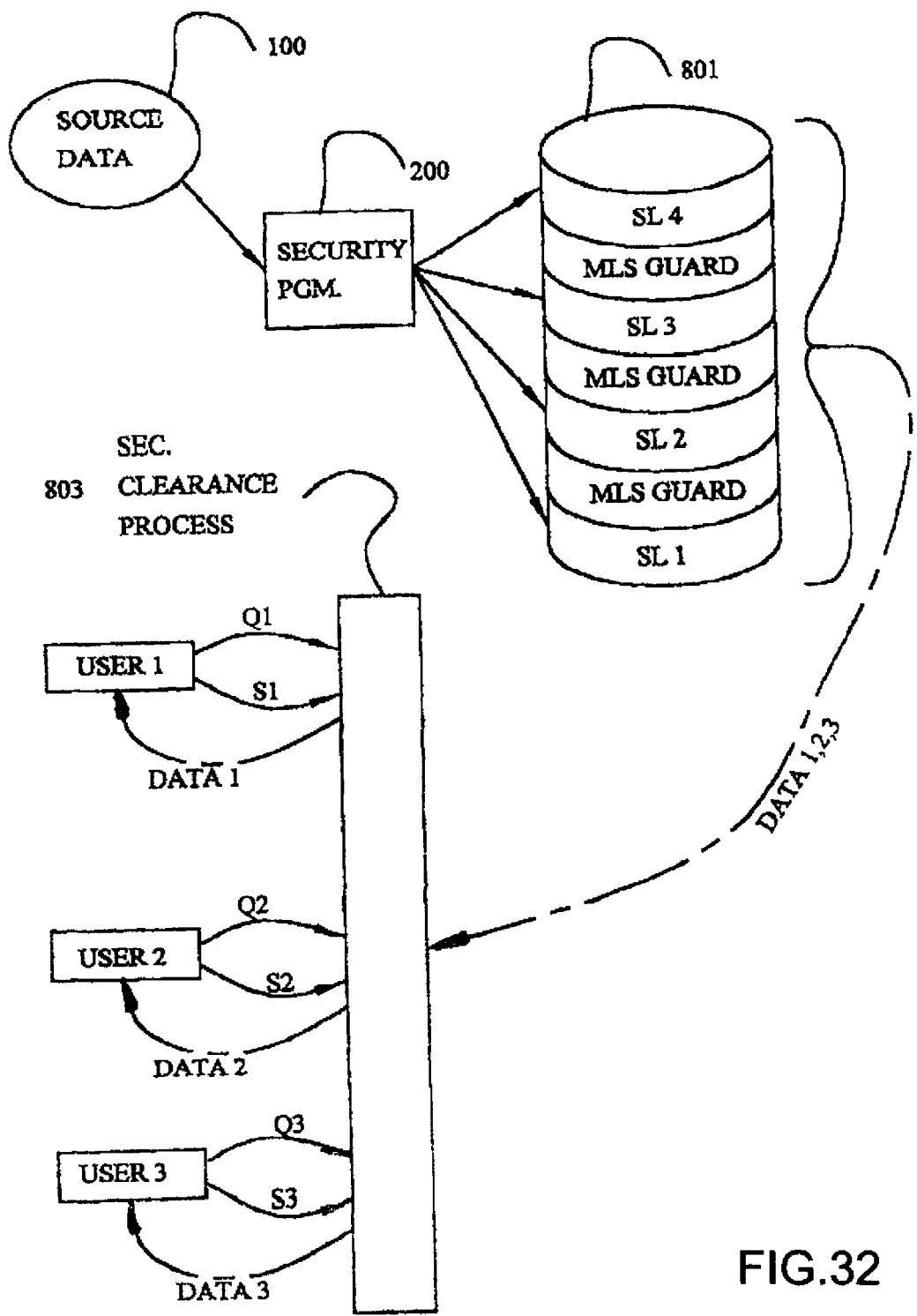
FIG. 32 diagrammatically illustrates a multiple level security system accessed by users having different security clearances (which also represents a data mining system and operation).

FIG. 32 diagrammatically illustrates a multiple level security system accessed by users having different security clearances (which also represents a data mining system and operation). A MLS SC data system uses different SC policy rules permitting access to different SC levels of interest. Source data 100 passes through security program 200. Critical, important data objects or elements are extracted and dispersed into storage 801. In the illustrated embodiment, storage 801 has four security levels SL1-SL4, level SL4 being the most secure data requiring the highest security clearance. Levels SL1-SL4 may refer to SC relevancy levels or organizational levels. Between each level is an MLS or multiple level security guard. The guard (physical or software configured) limits transfer of data objects there between. Upon a request or inquiry from user 1, 2 or 3, each having a security clearance s1, s2 or s3, respectively, the query or request for access to data Q1, Q2, or Q3 is sent to security clearance process 803. The process 803 detects and confirms the user's clearance level and passes a cleared query to storage 801. Cleared data (an entire document/data object or a portion thereof or simply one secured data (i.e., a name)), is sent as Data 1, 2 or 3 to clearance process 803. If clearance is still valid, data 1, 2 or 3 is sent to the respective user.

FIG. 32 can be a data mining system in that the user is permitted to mine the "cleared" data from storage 801. Data mining may be a monetary charge associated with the clearance function in process 803.

In a secured system, the documents in the user's PC may be in "declassified" to his security level 99.9% of the time. The "declassified" or available documents are reconstituted through a controlled release of the critical data from storage, and re-classified only when the user presents his identification and his classification level is being verified. Reclassification is automatic at the user's PC. The result is that the user's PC or workstation can operate in classified and un-classified modes. It is unclassified when the documents are declassified and when the documents are reconstituted the user is working in a classified mode.

The invention introduces anew paradigm whereby computers that are classified as secret or top secret, in actuality will contain 99.9% of the time declassified documents. This capability strengthens substantially the security of such classified systems.

The invention can resolve the major challenges facing government in enabling sharing of information between its different organizations in relationship to conducting military operations as well as fighting terrorism. The invention for example can enable organizations connected to the Department of Defense (DOD) or the Homeland Security Department to search into data bases of various other government, state and local organizations, eliminating the fear of the organizations owning the documents that their proprietary data or granular critical data would be released without their specific permission. The invention's mechanism of controlled release of the located document/data enables other parties to search their documents without the fear that sensitive information will be released to the searching party. This invention is designed to foster sharing of documentation between different parties, taking into consideration the need to limit the access of other parties to the total content of the owner's document. The invention enables overcoming the obstacles of existing multiple level security MLS systems by enabling sharing of sensitive data, and granular data between parties in a much more flexible way which also enables much greater access to information not enabled by the current MLS systems. The invention includes a controlled release mechanism for release of data in conformance to benchmarks, which can include submitting of access identification, the giving of consideration, submitting of other information, etc.

The invention creates better collaboration between users and organizations based on a better flow of information. It enables better efficiency enabling easier communication between users and networks with different levels of classification while maintaining the highest levels of security. The invention enables a much better management of documents in storage and in transport including e-mail. The invention introduces automation to the sanitization process and an automatic reconstruction process. The automation will avoid human error both intentionally as well as unintentionally. The automation will enable a substantial reduction in costs, furthermore the ability to create a multilevel security environment in one PC or workstation will save costs of purchasing operating and maintaining multiple machines as is the current practice.

The challenge of many organizations is in getting mission critical and time sensitive information speedily to the users who need it. In many cases the needed non-classified or low-level classified information is stored in systems but is not provided to the user who needs it, because the information is in documents which are highly classified. This creates situations in which users are unable to access information, which they need to accomplish their tasks, because of a technological classification barrier. This over classification of information results in hampering critical tasks and activities, as well as creating system redundancies inefficiencies. The DoD (Department of Defense) multiple level security (MLS) was based upon the Bell-Lapadula (BPL) Model. Many believe that the BLP security model is superior to other models. The Bell-Lapadula Model and the existing MLS uses labels to classify users and subject matter. A professional attacker will use his efforts to change or damage the labels in-order to compromise the machines secured information.

The architecture or the present invention extracts and physically separates data whereby content is being recognized not by labels by automatically based on the semantic content of the plaintext. In some embodiments of the present invention, labels are added to the granular, filtered document to conform to known organizational protocols. These labels are displayed but not used by the system in processing.

In the DoD's MLS, data of multiple security levels are processed and transferred by the system, which separates the varying security levels and controls access to the data. In the prior art MLS system, some applications process only one level of data at a time, (for example, when a user edits a document with a word processing tool, the data in the document are treated as if they were a single level, the classification of the document itself). Other applications treat individual data elements at their actual levels. For example, a word processor enforces paragraph and page MLS classification labels, or an MLS data base brings together data elements of different security levels to allow an analyst a multilevel view of the information.

The vulnerabilities of MLS: The components in the MLS system contain the data in their memories and disks, and the data could be compromised if adequate physical security is not maintained. An attacker who gets access to the system might be able to locate the data or its copies. MLS guards control the flow of information across security boundaries. These MLS guards are known. One concern with the Bell-Lapadula Model and the existing MLS is the use of labels to classify users and subject matter. A professional attacker will use all his efforts to change or damage the labels in-order to compromise the machines secured information. The invention introduces an architecture whereby content is being recognized not by labels by automatically based on the semantic contents of the plain text. The invention sanitizes and enables reconstitution upon valid authentication. It is the only architecture and system which enables both sanitization and reconstitution according to user's verified access identification. The conventional way of classifying documents with high classification (TS), limits the low level clearance users (C) from accessing substantially un-classified information "granular data" which is in the classified document. Furthermore, the invention enables maximum sharing of unclassified information which lies dormant in classified documents. Top security-secret information is dispersed to distributed storage in many locations. The invention is designed to avoid any one point of failure. The theory behind the architecture is the creation of substantial lines of defense in depth. The attacker will need to break through many obstacles before accessing all the dispersed data of the document. Additional levels of security are provided with multi-type encryption. The system and process introduces the capability to encrypt different parts of a document with different types of encryption. Multi type encryption creates a major barrier to an attacker. Should he wish to break the encryption, he would need many super computers. Should the attacker look for implementation mistakes, even if he finds few, he will still not get access to the total plain text. The inventive system provides flexibility. The system and process delivers flexibility to accommodate changing circumstances. By controlling the level of the granularity, the user can boost the level of security according to changing circumstances. For example, if a competitor becomes a partner the user enables him access to more storage locations, by changing the matrix.

The system and process integrates the Internet for dispersal and hiding of contents. If a party needs more information it could be released granularly. There is no need to release the whole secret document. The system and process does not use labeling but rather extracts the critical to storage (but the system may label sensitive text to conform to known protocols). The system avoids situations, in which, attackers may manipulate the labels or the labeling system. Furthermore, the release of information is based on changing circumstances (time, location-GPS, event).

The invention is a machine and process and its purposes and advantages may be as follows: (a) To automatically control selection of data objects within a data stream and release them in a controlled method only to authorized parties. (b) To automatically separate data objects within a data stream into two or more digital data streams according to the importance and categorization of contents, through extraction and removal of the prioritized content and its replacement by appropriate placeholders. (c) To automatically control selected contents in E-mail, and enable its release in a controlled method only to authorized parties. (d) To enable users to leverage the growth in computer and telecommunications connectivity and electronic commerce by reducing security risks. (e) To enable users to release documents, digital files, and data streams into closed and opened digital networks with the confidence that important, identifying, and critical contents in that documents, digital files, and data streams is secure and will be seen only by authorized parties. (f) To enable real time simultaneous customization and personalization of selected contents within a data stream to different parties, allowing instant display of the selected content or part of it based on, and tailored made to the status of the user or receiving party. (g) To secure the important and critical contents of a document or digital file by transporting said contents into a separated data stream and removing said data stream to a removed storage memory, while eradicating any copies, temporary caches, or traces of the removed extracts on the original computer or machine. (h) To enable instant return transfer to the display or to another display all or part of extracted content instantly with verification of authorized user. (i) To create a projection of the original document, digital file, data objects within a data stream, or variations of it through combined projection of the splinted data streams, while maintaining separation between the data streams. (j) To create an alternative method for security, instead of encryption, which is secure, cost effective, less time-consuming, and flexible. (k) To enable automatic timed removal of specific content items, automatically or manually selected from a document, digital file, or data objects within a data stream. (l) To enable an automatic timed reconstruction (reconstitution) of the said document, digital file, or data objects within a data stream.

The invention differs from the current implementations of multilevel security MLS systems based on the Bell-Lapadula Model, and the prior art use of labels to classify users and subject matter. A professional attacker will use all his efforts to change or damage the labels in-order to compromise the machines secured information. The present invention introduces an architecture whereby content is being recognized not by labels by automatically based on the semantic contents of the plain text. The invention enables overcoming the obstacles of existing multiple level security systems by enabling sharing of sensitive data, and granular data between parties in a much more flexible way which also enables much greater access to information not enabled by the current MLS systems. The invention includes a controlled release mechanism for release of data in conformance to benchmarks, which can include submitting of access identification, the giving of consideration, submitting of other information, etc. The invention creates better collaboration between users and organizations based on a better flow of information. It enables better efficiency enabling easier communication between users and networks with different levels of classification while maintaining the highest levels of security. The invention enables a much better management of documents in storage and in transport including e-mail. The invention introduces automation to the sanitization process and an automatic reconstruction process. The automation will avoid human error both intentionally as well as unintentionally. The automation will enable a substantial reduction in costs, furthermore the ability to create a multilevel security environment in one PC or workstation will save costs of purchasing operating and, maintaining multiple machines as is the current practice.

D.7 Multiple Independent Levels of Security (MILS)

Figure 49:
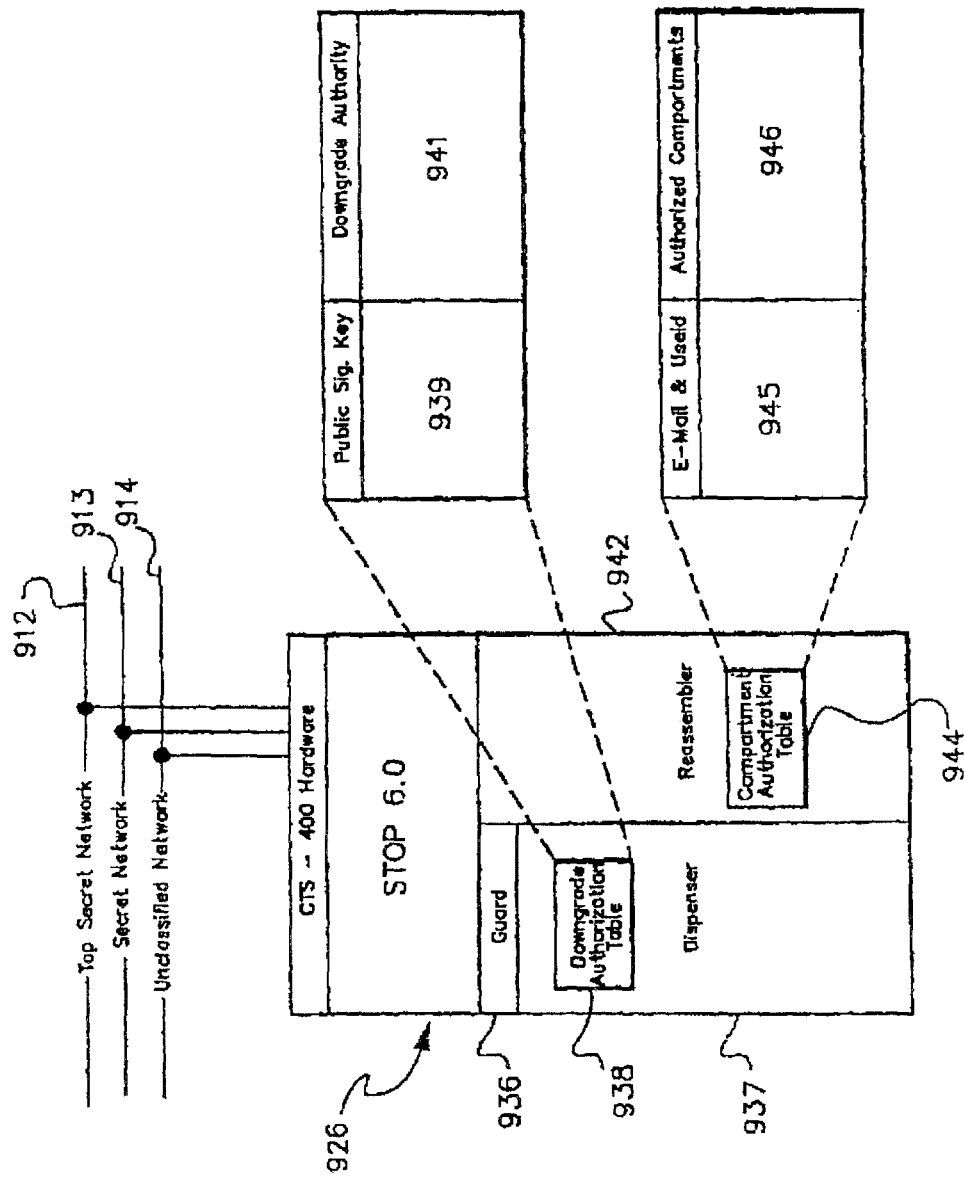
FIG. 49 diagrammatically illustrates a security guard computer useful in the network of FIG. 16.
Figure 50:
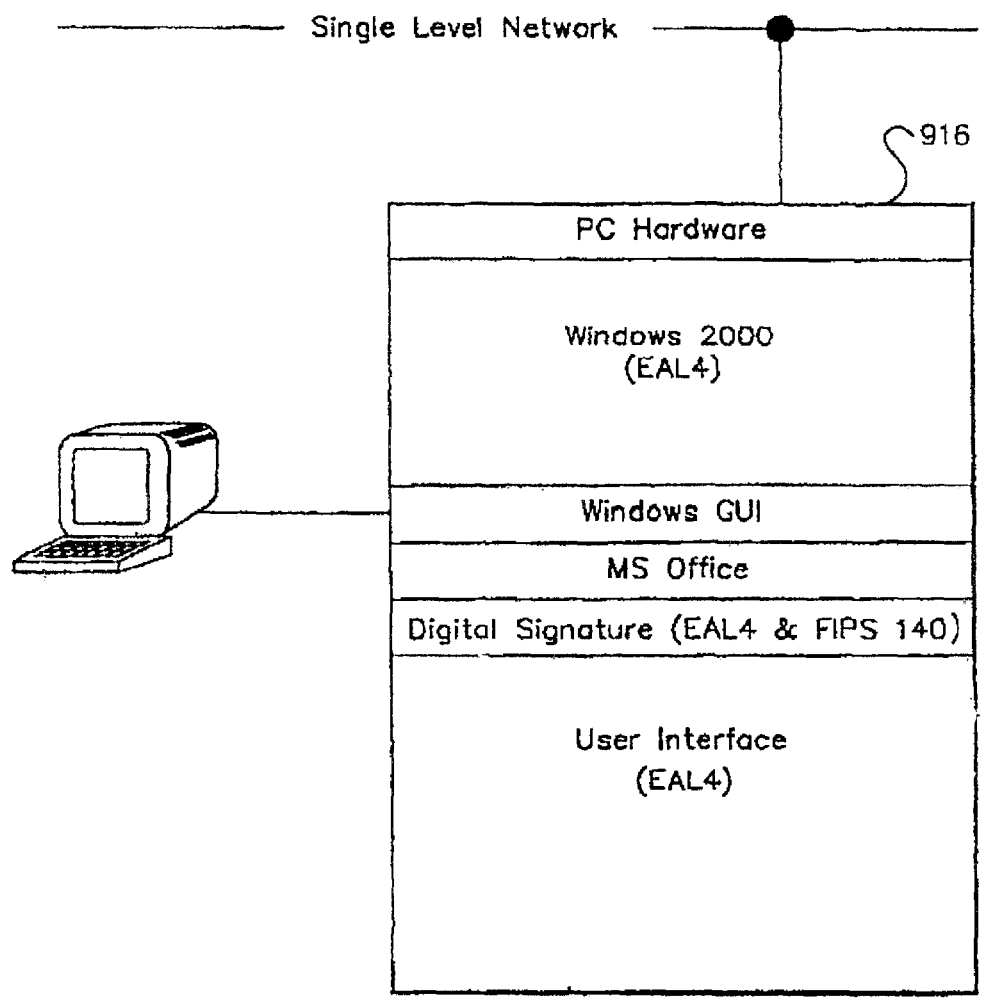
FIG. 50 diagrammatically illustrates a workstation useful in the MILS network.

FIGS. 48, 49 and 50 diagrammatically illustrate a computer system configured as a multiple independent levels of security (MILS) system. Although the general operation and layout of the MILS system is well known, the incorporation of the inventive system, that is, granular filtration, extraction and re-assembly is unique to the inventive system. In the following MILS system 910, the dispersion and retrieval operation of the present application is discussed using, as an example, one of the most common environments for protecting classified data, that is, Multiple Independent Levels of Sensitivity (MILS). The MLS system, discussed in connection with security levels, can be implemented with SC based upon either relevancy or based upon enterprise units who have permission (policy rights) to access the SC data.

As is known in a MILS configuration, each level (TS—top secret; S—secret, U—unclassified) of classified data is isolated from other levels by confining it to set of components dedicated to a single classification level. Data labels are not used within the system, since its components are Commercial-Off-The-Shelf (COTS) products that are not able to handle data labels. The level of the system TS, S or U (top secret, secret or unclassified) establishes an implied sensitivity label. Data is explicitly labeled only in guards 926, 932 (the Dispersal and Re-assembly guard computers) and other MLS devices that connect the MILS system to systems at other sensitivity levels, that connect the TS system to the S system and to the U system. Data transfer between levels is accomplished manually (sneaker net), or through a few, high assurance and closely protected MLS devices, such as guards, digital diodes, etc. A user with the authority to access multiple levels of data is required to use a separate set of interface equipment to access each MILS system. In some cases, keyboard-video-mouse (KVM) switches are permitted.

FIG. 48 shows an implementation of the present invention in a MILS environment. Two similarly configured domains 911, 915 are shown (upper region consisting of sub-networks 912, 913 and 914 and lower network 915), presumably under different administrative control. Each domain has three networks, one for each of three classification levels. Each network includes a plurality of workstations (only one station being shown in the figure), a Dispersion and Reassembly (D&R) server 926, 932, (a MLS device connected to all networks), and database servers TS, S and U data servers (928, 929 and 930 in the upper domain and 934 in the lower domain) to support the D&R server's proxy document server functionality.

The user interface components of the present invention reside on the user workstations W St-U (920), W St-S (918) and W St-TS (916). Dispersion and reassembly functionality is hosted in the D&R servers 926, 932. Digital signatures (encryption) protects the integrity of user data between the user interface at 916, 918, 920 and the D&R server 926. Encryption provides a level of discretionary access controls that prevents disclosure in cases where others have the appropriate clearance but lack the formal "need to know" level to view the classified information.

The present example discusses an e-mail and a file server to help clarify its operation in a MILS environment. The system may be configured to handle other documents, images, etc. In the e-mail example, a Top Secret user 916 will prepare a multi-level message and send it to a Secret user 922b, and the recipient 922b will only be able to read the "Secret Level" and below parts. In the file server example, a Top Secret user 916 will prepare a multi-level document and post it to a file server, then a Secret user 922b will retrieve it, getting only the Secret and below parts. These are both downgrading examples. Movement of data within a level and to higher level conforms to existing security rules, for example, Bell-LaPadulla rules.

The path an e-mail message takes from a Top Secret workstation 916 in one domain 911 to a Secret workstation 922b in the other domain 915. It would work similarly if both sender and receiver were in the same domain; the local D&R server 926 would perform the functions of both D&R servers 926, 932 in this example. The D&R server 926 hosts an e-mail server that is customized to perform D&R functions, as described below.

An e-mail originator on a Top Secret workstation 916 composes an e-mail using MS Outlook. Originator marks sections of the message with TS, S, and U levels (explained herein), and the system on workstation 916 compartment tags the email document using a combination of the automatic features described earlier and manual tagging (user based), as allowed by the security policy of the accrediting organization. Originator 916 digitally signs and sends the message to the mail server on the D&R system 926.

The Disperser component of the D&R mail server 926 verifies that the originator 916, identified by e-mail address and authenticated by the digital signature key, has the authority to downgrade messages to the requested levels. The Disperser within Server 926 separates the message according to the originator's tags. The Disperser writes the message sections tagged higher than Unclassified to the Secret and Top Secret servers 929, 928. The unclassified part becomes the base message map stored in server 930 and contains pointers to the higher-level components. The pointers map the re-assembly path when the document is fully or partially re-assembled. This base message map is the only step in the process that requires downgrading. A guard 926 is used to provide increased assurance that the downgrading is done correctly (see FIG. 49, guard 936). The originator's identity is provided to the guard as part of the downgrade credentials. The Disperser forwards the base message and message map, to the D&R e-mail server 932 of the addressee, using its Top Secret network path c. Other paths 924a, b and c link the same security levels in either domain. Using the TS path prevents downgrading if the target server 932 is not a D&R server. Alternately, the D&R servers 926, 932 could authenticate each other before transferring messages.

The target D&R e-mail server 932 determines the clearance of the addressee 922b from its network address and looks up the addressee's compartment authorization in its own tables. It then removes links from the base message and map to all message components that are not dominated by the addressee (as defined by Bell-LaPadula). The target D&R e-mail server 932 then retrieves the data for the remaining message components from S database server 929 via guard server 926, constructs or re-assembles the message that the addressee is cleared to read (secret level, not top secret level), and places the message in the addressee's inbox 922b that is at the security level of the highest component in the message. These steps are executed for each addressee. The addressees 922b connect to their local D&R e-mail servers 932 and download unread e-mail.

A similar method is used for document serving, such as would be used for file service, web service, ftp service, etc. The document creators tag their documents, sign them digitally, and post them to a D&R file server 926, 932, which is actually a proxy using storage in the database servers 928, 929, 930, 934, and others not numbered. The server 926, 932 disperses the message components to its database servers on the MILS networks.

The following describes the path a document takes from its creation (or modification) in a Top Secret workstation 922a in one domain 915 to a reader on a Secret workstation 918 in another domain 911. The D&R server 932 hosts file servers that are customized to perform D&R functions, as described. The document posting process follows: A document is created on a Top Secret workstation 922a using MS Word, Excel, etc. The originator 922a marks sections of the document with TS, S, and U, and compartment tags using a combination of automatic and manual tagging features, as allowed by the organization's security policy. Originator at 922a digitally signs and sends the document to the file server on the D&R system 932.

The Disperser component of the D&R file server 932 verifies that the originator 922a, identified by the digital signature, has the authority to downgrade documents to the requested levels. The Disperser in server 932 separates the document according to the originator's tags, creating a base document at the lowest tagged level (U-Db or S-Db) that contains pointers to the more classified components (TS-Db 934). The base document is encrypted using an algorithm appropriate to its level. The Disperser writes the document sections to the file servers (U-Db or S-Db or TS-Db 934) according to their tags. This is the only place in the system where downgrading is performed. A guard 932 is in the downgrade path to provide additional assurance that data is not leaked. The user identity derived from the originator's 922a digital signature on the tagged message will be provided to the guard 932 as part of the downgrade credentials. The disperser places references to the document in the directory of each file server 932, 926 for which a version of the document can be built (e.g., if there is no unclassified data in the document, a reference to the document will not be placed in the unclassified directory).

The document retrieval process follows. A user on a workstation 916 logs onto its local D&R proxy document server 926. The strength of user authentication is application specific and determined during system accreditation. The user 916 locates a document and requests that it be downloaded for reading, specifying a requested sensitivity level and compartment. The Re-assembler component of the D&R server 926 loads and decrypts the base document. The Re-assembler in server 926 verifies that the requestor 916 dominates the requested security level and compartment, based on the level of the network over which the request was received and the contents of its compartment authorization table. The Re-assembler in server 926 constructs the document to the authorized security and compartment level. The Re-assembler provides the document to the requestor. The re-assembly function does not violate Bell-LaPadula and does not require downgrade authority.

D.8 MLS Server and Workstation Components

FIGS. 49 and 50 diagrammatically illustrate the server and workstation. FIG. 49 shows the D&R Server 926 hosted on a DigitalNet CTS-400 system, which is currently evaluated. It consists of the CTX-400 hardware and the STOP 6.0 operating system. The disperser part 937 of the D&R server 926 has the most security critical functions, since it must move data contrary to the Bell-LaPadula security policy. It maintains a table of user downgrade authorizations 938 keyed by the originator's public digital signature key 939 and downgrade authority 941. A guard 936 is also included, which may employ a version of automated tagging system of the present invention to identify sensitive data. The double check of the security label tag for each part of the message/document provided by the guard 936 is particularly important since the downgrade labels are applied in a single-level system.

The re-assembly side (in re-assembler 942) requires no policy violation, but requires its own table of user compartment authorizations 944 because the MILS systems do not have the ability to label data. The table 944 is keyed by e-mail address (for e-mail routing) or user identity 945 from the user authentication process (for file service). Authorized compartments 946 are coupled to email user id 945.

The components of the user workstations are shown in FIG. 50. A MILS workstation 916 is a single-level component, that is, it is coupled to a single security level network. The user interface will in some cases be installed on existing workstations 916 and in other cases new workstations procured for this use. The workstations include an operating system Windows 2000, a graphical user interface Windows GUI, WS Office as a document processor, digital signature system rated at EAL 4 and a rated user interface.

D.9 Flexibility of the Present MLS Approach

The late-binding techniques or retrieval and reassembly features used in the present invention is a compelling feature, because it provides solutions to some of the most significant problems of sharing data in modern warfare and international coalition operations. A single comprehensive document can include data sensitive to many different environments, yet by tagging its components correctly, maximally useful versions can be provided to readers with widely different authorizations, and without having to identify them all ahead of time.

For example, in a coalition environment, countries or classes of countries, or agencies within countries can be assigned non-hierarchical and hierarchical labels and then a single document, suitably tagged, can be securely distributed to all of them using a properly configured and administrated infrastructure of the present invention.

In the presently configured MILS embodiment, the tagging protocol is, at a minimum, confirmed by the guard in the D&R servers. In prior art systems, only the guard tags documents. In the presently configured system, the thin client applications program on the workstation tags the document segments but the guard confirms this preliminary tagging. One feature which seems to be important in certain security systems is that the re-assembly map be cleaned or scrubbed to match the then current security level where the map is stored. This theory, carried forward, would include the concept that the re-assembly map, stored in each version of the secured document, only point to the next level storage location. Hence, if all portions TS extracts, S extracts, C (classified) extracts and U (remainder) document are dispersed into, for example TS 928, S 929, C (not shown) and U 930, then the document in U 930 only includes a pointer to the location of C extracts and the C extracts only includes a pointer to the S extracts and the S extracts includes only a pointer to the TS extract location. The downgrade discussed above refers tot he location of the higher secured extract.

D.10 Multiple Extraction Filters and Application Outline

There is a need to construct filters which supplement the initial list or compilation of security sensitive (sec-con) or select content (SC) words, characters, icons and data objects (herein "word/objects"). The need arises either due to the fact that the initial security or SC word/object list is incomplete, or that the author of the initial list is concerned that the list is too limited or in order to defeat a attack or an inference engine "reverse engineering" the sanitized document and ascertaining not only the filter (a type of code) but also the sensitive word/object removed from the source document. Further, the incorporation of a filter generator enhances the current user friendliness of the program. In its current embodiment, the program is configured as an editor to screen and sanitize a source document. The user selects, at his option, functional aspects which include: compliance with laws (an application of a type of filter, e.g. HIPAA, GLB, Oxley-Sarbanes, EU privacy, executive orders); privacy (another type of filter which excludes, for example, social security numbers, see also, EU policy); search for and supplement filter; pay per view (which enables the user to buy missing sensitive information (for commercial purposes); survival (which creates a distributed and dispersed copy of the user's document and other stored documents and items using predetermined storage facilities); security (which triggers the various security routine discussed herein); and storing (which permits the user to select which of the several storage options the extracted sensitive or SC data/objects should be employed in the dispersal.

Figure 51:
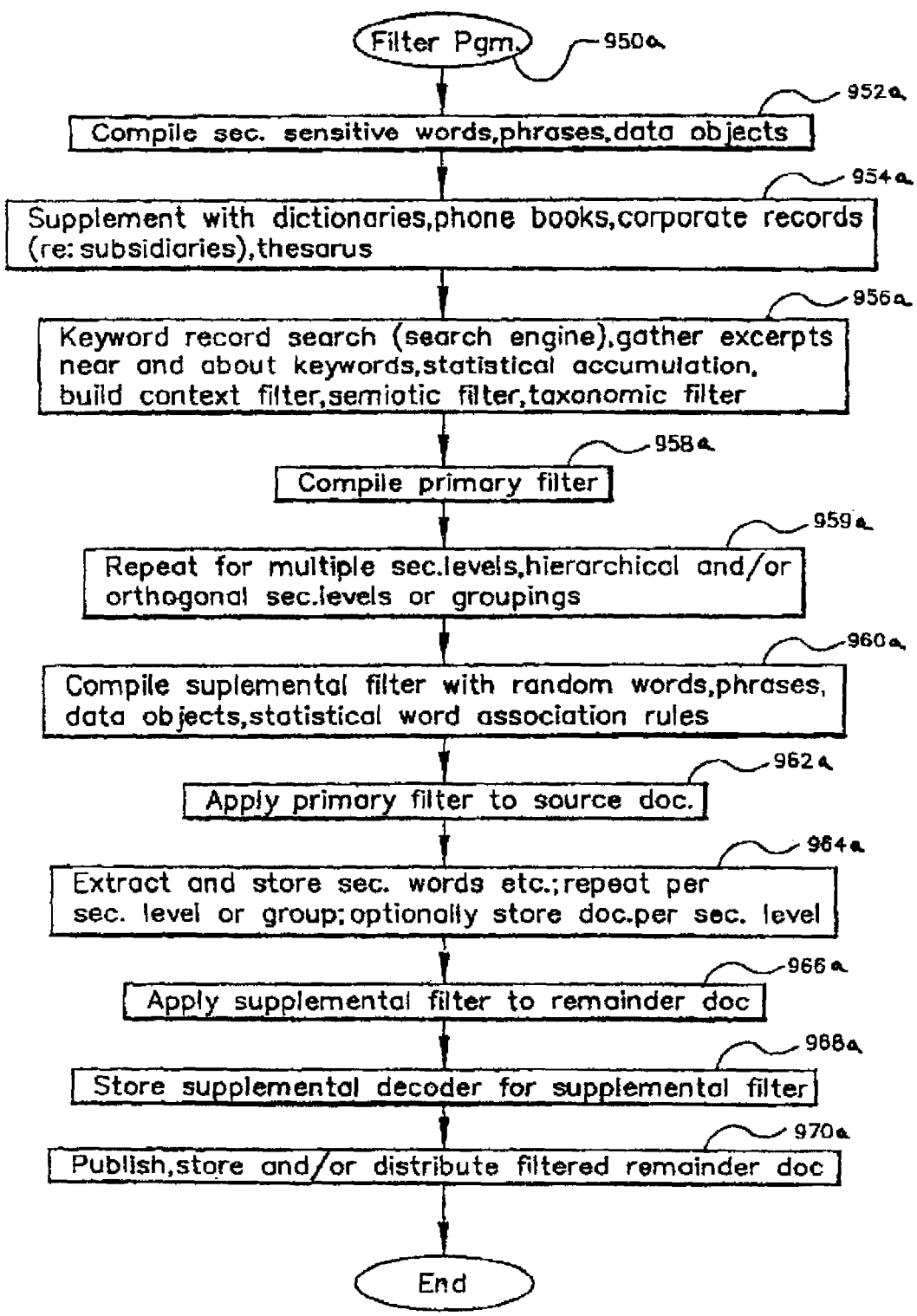
FIG. 51 diagrammatically illustrates a filter program flow chart.

The filter routine diagrammatically illustrated in FIG. 51 is useful in compiling a filter which separates both the sensitive word/objects and contextual and semiotic and taxonomic aspects of the initial list of security sensitive (or select content) word/objects. The filter works in conjunction with a compilation of data, typically located on a network which could be private or public. In low level security or SC situations, the filter may access Internet databases to gather additional data for the filter. In more secure or SC systems, the filter could access a secure or SC data base (one located at the same security level as the user) and build or compile the additional word/objects. The filter program 950*a* in FIG. 51 begins with step 952*a* which compiles the initial list of security sensitive (or select content) word/objects. In 954*a*, the initial list is supplemented with dictionaries, phone books, corporate records (to obtain subsidiary data and trade names) and thesaurus data. Each of these represent different compilations of data and the added data is added to the initial list of sensitive word/objects. In 956*a*, a search is conducted on a network, usually through a search engine, to gather excerpts near and abut the keywords. These keywords are the initial sensitive word/objects. Statistical algorithms are applied to gather non-common word/objects which are associate with the keywords as found in the additional data compilations. The goal of the adaptive filter is to obtain contextual, semiotic and taxonomic words, characters or data objects from the compilation of additional data related to the security sensitive (or select content) words, characters or data objects. Semiotic is a general philosophical theory of signs and symbols (read language and words and objects) that especially deals with their function. Semiotics include syntactics, semantics and pragmatics. Syntactics is the formal relationship between signs. Semantics is the meaning of signs and pragmatics is the relationship between signs and their users, such as the relationship of sentences to their environment. Taxonomy is the scientific classification and categorization of items. Therefore as an example, a search through the Internet on Google search engine under "Bin Laden" may show a number of uncommon (non-dictionary words) within 200 words of the target "Bin Laden." This search string would gather documents form the Google search and copy 200 words on either side of "Bin Laden" and then extract only non-dictionary words into a supplemental list. This type of filter algorithm looks for contextual matters close or near to the target. The search is semiotic and statistical in nature. Additionally, the initial supplemental list would identify the Bin Laden is an arab and this classification (a taxonomic aspect) can be used to expand the list for the filter. The algorithm may include a simple command to gather all 10 words on either side of Bin Laden. This is a pure contextual search and the "10 word" aspect is a statistical number. From the supplemental list, all pronouns, prepositions and conjunctions may be eliminated. Spiders or robots may be used in the gathering of the contextual and semiotic filter data. The contextual, semiotic and taxonomic words, characters or data objects from the compilation of additional data is all related to the initial list of security sensitive (or select content) words, characters or data objects.

Step 958*a* compiles the adaptive filter. The above noted contextual, semiotic and taxonomic filter is adaptive since it can be used to expand (and potentially contract or reduce) and adapt an existing list of sensitive word/objects to a larger list which better protects the source document and inhibits the operation of an inference engine. Step 959*a* repeats the filter gathering and compilation for various levels of security. Higher security may require a broader search (1000 uncommon words near Bin Laden and add all Arabic and sub-Asian continent cities). Orthogonal security groups (those groups having the same level, e.g. S Secret, with each other but being different organizations, e.g, Department of Defense compared to the FBI) often have different methods to keep data secret between compartments.

The adaptive filter can be set to automatically gather additive sensitive word/objects. The system, with a basic filter, may identify a sensitive word in a paragraph being scanned by the initial filter. This sensitive word may be a special word in the existing filter or may be anon-common word not found in the initial filter. The adaptive filter system may then obtain this "unknown" or "special" word, and conduct a search through a compilation or data base of additional words, etc. Any new word/objects falling within the contextual, semiotic and taxonomic words, characters or data objects from the compilation of additional data (database) related to said security sensitive (or select content) words, characters or data objects are then added to the filter. The expanded filter is then used to screen the source document.

Step 960*a* compiles a supplemental filter with random words, phrases, etc. in order to further defeat an inference engine reverse engineering assault on the secured and sanitized document. In some sense, the production and use of a random filter is an encryption technique since the resultant filtered product, in order to be understood by others, must be reverse filtered or decrypted to reveal the document at the appropriate security level. Nonsense words may be added to this supplemental filter. Step 962a applies the primary filter (with the security word/objects and the additive word/objects from the contextual et al. filter) to the source document. Step 964a extracts the sensitive word/objects per security level. It is noted that several filters are used, on one for each security level, whether hierarchical or orthogonal. The extracted word/objects are stored or the partially extracted document per security level is stored in the corresponding security cleared data base or storage. Step 966a applies the supplemental filter to the remainder or lowest classified document. Step 968a stores the supplemental random filter to permit the low level user to decrypt the document. Step 970a publishes, distributes or pushes the document to others having a need to know. The pointer to the location of the supplemental filter decoder is encrypted and stored in the filtered remainder document. This permits the low level person to decode the remainder document.

D.11 Multiple Security Features for Data

Figure 40:
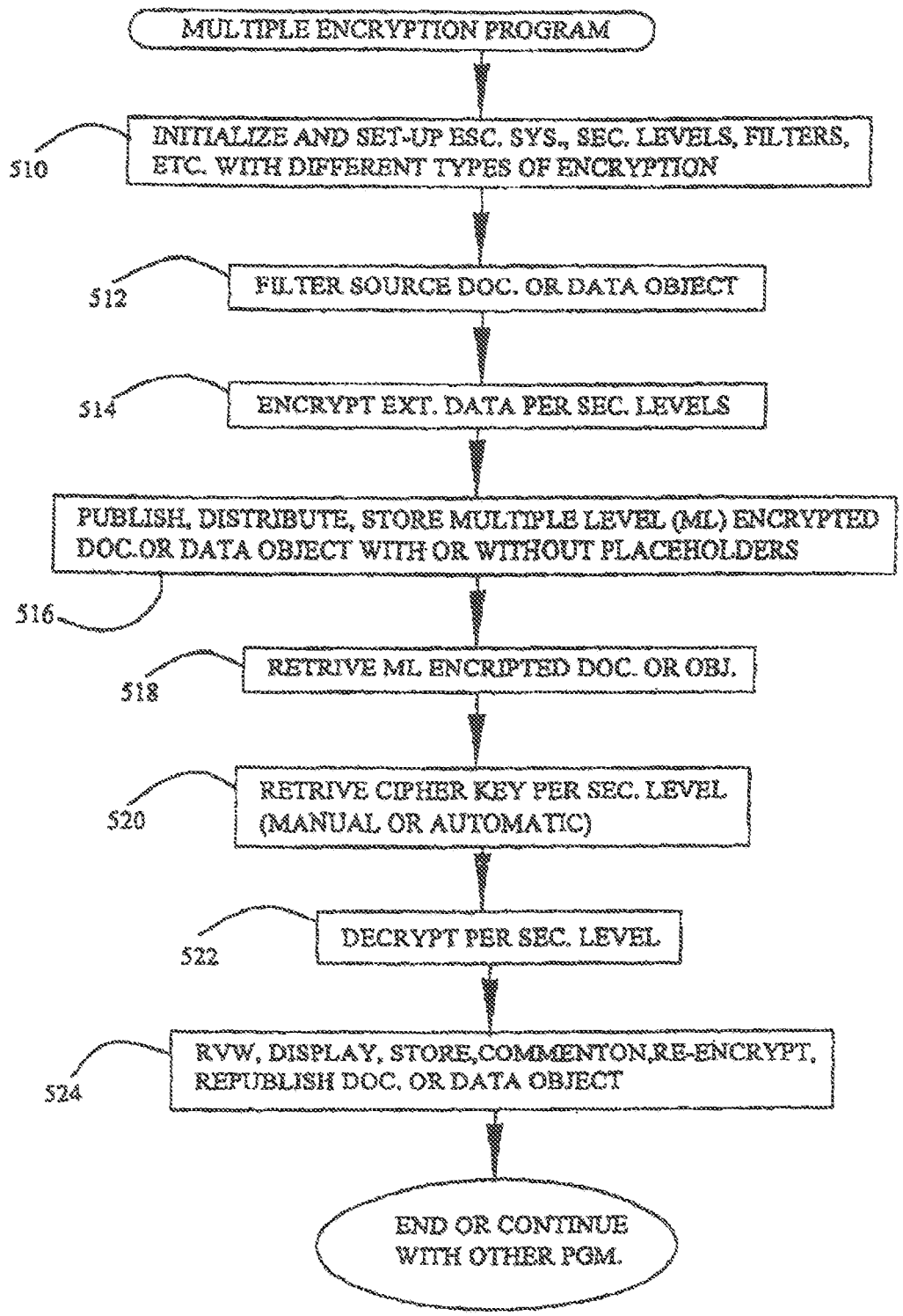
FIG. 40 diagrammatically illustrates a flowchart showing the key components of a multiple encryption program using multiple types of encryption in one document or data object. Encryption may include data compression and/or expansion or parsing techniques.

FIG. 40 diagrammatically illustrates a flowchart showing the key components of a multiple encryption program using multiple types of encryption in one document or data object. Multiple levels, types or modes of encryption are utilized in the same document or data object to enable securing data and transparently managing the separation of user-based communities of interest based upon crypto-graphically separated, need to know security levels. These security levels are associated with a plurality of encryption types or with different cipher keys using the same encryption. An example of a multiple level encrypted document is shown above in the Multiple Level Encryption sample. Different levels or modes or types of encryption are listed in the Encryption Table above.

Step 510 in FIG. 40 initializes the system by organizing different security levels with different encryption types and cipher keys. Also, the program sets filters to create the multiple encryption or ML document or data object. Step 512 filters the document or data object. Step 514 encrypts the extracted data for each security level. These steps 510, 512 and 514 utilize many of the routines discussed above in connection with FIGS. 9 and 31a, steps 232, 234, 236, 238, 240, 422 and 424. Step 516 recognizes that the secured document or data object may be stored for later use (with associated multiple decryption), published, distributed, or otherwise utilized to achieve the primary purpose of the document, i.e., to communicate information or to safely store security critical information. Step 518 permits the user, with the proper security clearance to retrieve the document or data object. Step 520 illustrates that the user must retrieve his or her cipher key to decode all or a portion of the ML encrypted document or data object. This step may be manual which engages the user to into certain codes or may be automatic such that the user's computer automatically, without operator input, decodes all or part of the document or data object. Step 522 decrypts the document pursuant to the user's security clearance. Step 524 recognizes that the user may review, re-publish, store, comment on, re-encrypt or otherwise deal and handle the full or partially decoded document or data object. The program ends or otherwise continues with other programs set forth herein. It should be noted that storage of the extracted data may be included in the flow path of the program in FIG. 40 is necessary.

Figure 41:
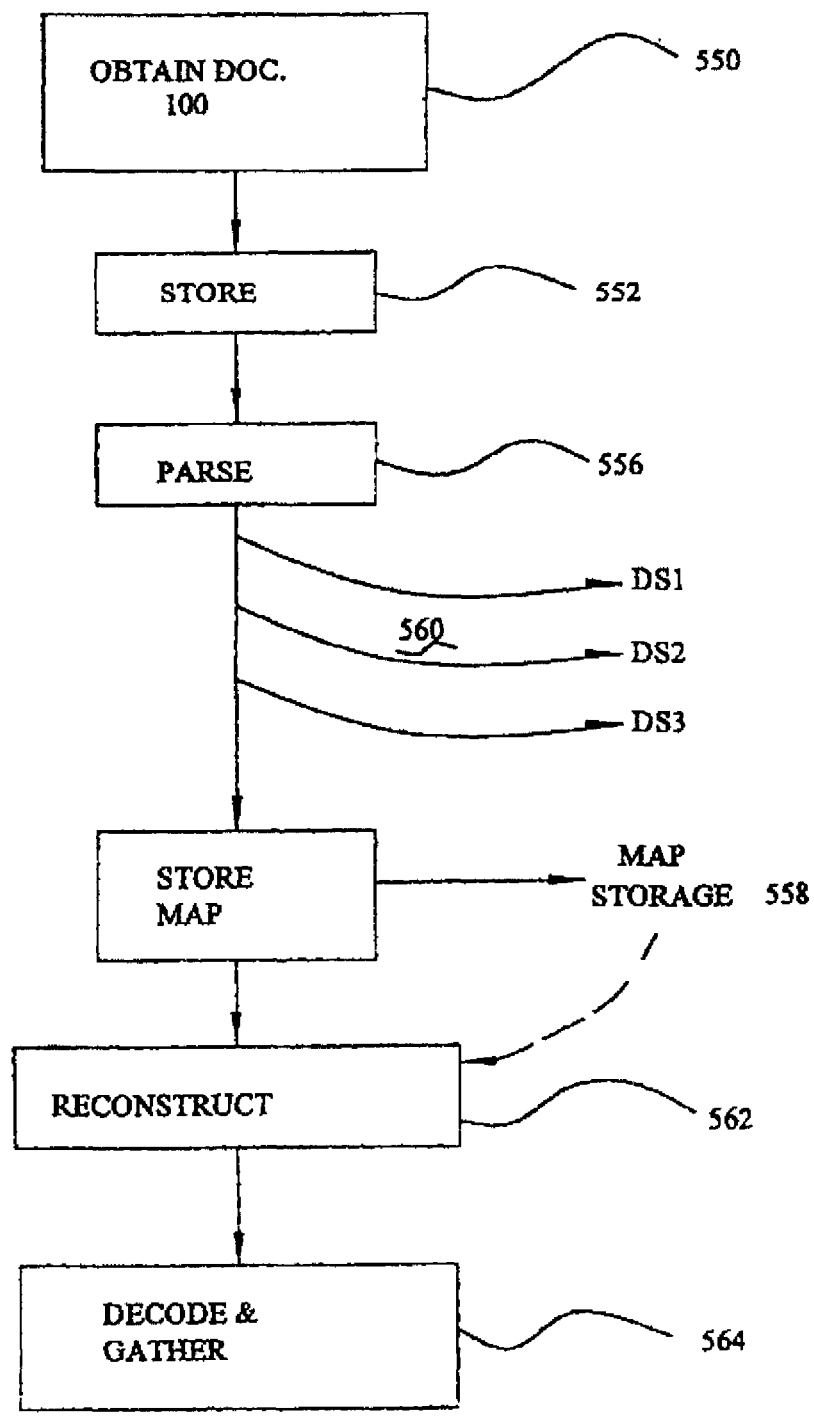
FIG. 41 diagrammatically illustrates a chart showing the key components of the parsing, dispersion, multiple storage and reconstruction (under security clearance) of data.

FIG. 41 diagrammatically illustrates a chart showing the key components of the parsing, dispersion, multiple storage and reconstruction (under security clearance) of data. Document or data object 100, in function element 550, is created or obtained by the input computer device. The document is stored in a normal manner in customary data store 552. A parsing algorithm function 554 is utilized in parsing step 556. The parsing algorithm, as stated earlier, targets the plaintext document or data object 100 and splits, cuts and segments (that is, parses) the document by bit count, word, word count, page, line count, paragraph count, any identifiable document or icon characteristic, or other identifiable feature such as capital letters, italics, underline, etc. Hence, the parsed document 100 constitutes at least remainder data and data which is extracted or parsed or segmented out. A plurality of data extracts may be obtained. The parsed data (which is both the extract data and remainder data) is then dispersed into storage facilities data store DS 1, 2, 3, 4, etc. Preferably, the parsed documents are encrypted as shown by "e" in FIG. 41. In order to facilitate the potential reconstitution of document 100, a map is stored in a map storage 558. Hence, the disbursement 560 largely spreads out or distributes the parsed document 100 to a plurality of memories in the distributed computer system. These memories may be removable memory devices (floppy disc, removable tape drive, CDs) or may be more fixed devices such as hard drives, Internet storage facilities, etc. Preferably, the map is also encrypted.

Reconstruction step 562 enables a person with the appropriate security to obtain the map from map storage 558, decode the map, gather the dispersed, parsed segments of document 100 and compile the document. This is noted in function 564.

Since the original document 100 is stored in a customary manner in data storage 552, the parsed document stored in multiple data storage units DS1-DS4 provides a unique backup for document 100. The algorithm can employ many different mathematical constructions but is, in the current embodiment, primarily based upon one or more of a bit count, a word, a word count, a page count, a line count, a paragraph count, and identifiable document characteristic, and identifiable word characteristic, and identifiable icon characteristic and identifiable data object characteristic, capital letters, italics, and underline found in the plaintext document or data object. Further, the parsing algorithm can generate different security levels wherein parsed segments are stored at different storage facilities having various degrees of security clearance. This establishes a hierarchy of data storage units and corresponding degrees of security clearances. The parsing algorithm may identify unique words or strings of data, i.e., credit card numbers. The hierarchy of security clearances may involve first a password, second a biometric confirmation such as a voice match and a third highly unique biometric characteristic such as a fingerprint or retinal scan. The parsing system enables a large distribution of data in a secured environment. In this manner, if the original data object 100 at customary data storage 552 is destroyed, a person with an appropriate security clearance can reconstitute the original data document 100 due to the secured parsing and dispersal of document 100 through data storage units DS1-DS4 and map storage 558. The parsing may occur on a granular level. In particular, the parsing may occur on a financial document in electronic form.

Financial Document Table

Startcode; Abel, Robert, NMI; 100567; TRANSFER803; To8900586943; FROM3897622891; $700.00; end code In the Financial Document Table, the start code and end code is typically represented by a digital code unique to the communications channel, the name on the account has no middle initial (NMI) and the various words "transfer 803" and "to 8900586943" and the words "from" and "$" are represented by predefined numeric or alpha numeric codes. The electronic financial document complies with an established protocol. In any event, financial documents are often times transmitted through electronic communications and telecommunications channels. The present invention, in one embodiment, enables a higher level of security by parsing the financial document or data stream. Further, a higher level of security may be employed by extracting identified text or characters and storing the extracted text as discussed above in connection with FIGS. 4, 5 and 6.

To some extent, the present system can also be utilized for key management and encryption systems.

In a broad sense, the parsing methodology disclosed herein is not based upon the separation of critical versus non-critical or classified versus non-classified security information. The primary focus of the parsing methodology is (1) automatic transparent parsing of data content into granular data groups which are thereafter dispersed to different storage locations in order to maintain a very high level of security with or without encryption; (2) dispersal of the segmented data to different storage locations each which, potentially, demand additional identification or security clearance prior to the release of the stored segmented data, including, possibly, the creation of a digital bureaucracy, in order to hinder or circumvent digital attacks on the plaintext document or data object; (3) proposing and implementing a system wherein the user has a very basic appliance since most of the user's data is stored both locally (customary data storage 552; FIG. 41) and parsed and stored in a distributed system (DS1-DS4) and wherein an important asset is the map stored in map location 558; (4) enabling an institutional system to parse highly confidential information and extract the same in granular form and disperse the same throughout the Internet or other storage locations with or without encryption without compromising the document's security privacy and integrity.

The process involves parsing the documents or content into granular data groups and optionally creating small groups of data wherein the data segments cannot be recognized even to the level of providing 2-4 data objects in each file; dispersing the granular data groups into different storage locations; creation of a map of dispersal to the different storage locations (wherein the map is secured and encrypted and stored); and reconstructing the documents or data content. The reconstruction utilizes the map of dispersed and distributed storage and requires the presentation of security clearances such as passwords, biometric information and/or physical identifiers for access at the storage level and potentially at all the other data storage sites. The data is compartmentalized through distributed storage and sometimes requires separate security clearance. This need for presenting additional security clearance at different storage locations (DS1-DS4) creates a digital bureaucratic process which enhances the security level of the entire system. The selection and extraction of data and dispersal of that data to select storage locations can be established under different criteria. For example, one level of criteria extracts last name, address and social security numbers. Another criteria extracts every other line, every third word, etc. The parsing algorithm can utilize random selection or systematic selection as long as the parsing algorithm is documented and utilized in reconstruct step 562. The parsing algorithm may be stored with map and map store 558 or may be stored separately. An additional feature, as discussed above, involves utilizing place holders or adding substitute content to the remainder data of the parsed document 100. The use of place holders and substitute content may be thought of as an algorithm for the parsing. By using place holders and substitute data, private or highly confidential data is masked insuring privacy, security, and confidentiality. The ability to parse the information and/or extract security information is important for financial transactions. The transactions which require account numbers (see Financial Document Table above) are useless without the account numbers. The security of the account numbers, whether identified and extracted or severely parsed and segmented, stored and reconstituted under security clearances, is enhanced by the present system.

To achieve a very high level of security, the system can optionally incorporate a two-man key system. The system automatically separates the selected data stream into one or more data groups and extracts one or more of these data groups and disperses them into data storage DS1-DS4. To release the extracted data groups and/or critical content, the reconstruct step 562 may require two persons submitting identification credentials or security clearances. This two-man key method is a further protection against identity theft and insider attacks. The two-men key system can be implemented on a regular basis or on an emergency basis when there is need for a higher level of security.

Financial documents sometimes include substantial amounts of numerical data such as financial projections, balance sheets, electronic funds transfer messages, etc. It should be noted that the extraction may be based upon a particular item such a digit and a nine digit number representing money or may be parsed automatically based upon some parsing facility. Of course, the financial document may also be viewed as a data stream with delimiters ";" separating fields in the data stream. The parsing algorithm may work on the data in each field as well as different fields in the entire data stream.

Most storage facility systems require a map in order to reconstruct the original plaintext document 100. The map may be encrypted and may require a secret key sharing scheme for access thereto. Further, the map may be a physical map (a printout) or may be stored on a removable data storage medium, rather than be an electronic representation. In some instances, a map is not necessary. For example, if the security data or the parsed or segmented data were automatically stored on a floppy disc, the originator of plaintext document 100 could move the floppy disc from the computer system thereby physically safeguarding the security data or the segmented, parsed data. Without the disc, another person or the originator of plaintext document 100 could not reconstitute the document. The originator may deliver the floppy disc to another in order to permit reconstitution. The same is true regarding removable tapes and CD-ROMs.

Advantages of the present parsing system, methodology and program, include the ability to connect to unsecured networks without adversely affecting the overall security of the plaintext document 100; less dependence on existing security system including fire walls; the reduction of the requirement to keep daily updates regarding vulnerabilities of the computer system originating plaintext document 100; the security of plaintext document 100 is not dependent upon the number of access points into the network or number of users located on the network originating plaintext document 100; there is no damage to the parsed and stored backup version of plaintext document 100 if new security systems are installed wrong or misconfigured and there is no damage if system administrators turn OFF the existing security systems or improperly install or operate the security systems.

The parsing system can operate as a main security operation or an emergency backup system or as a customary backup system. The plaintext source document or data object may be preserved with or without encryption, or destroyed as a further data security step. The parsing and disbursement of data protects plaintext document 100 and insures the survivability of plaintext document 100 if the system originating plaintext document 100 comes under significant electronic or physical attack. That is, if customary data storage 552 is destroyed electronically or physically, the survivability of data in the plaintext document 100 is established by the present system. The storage of granular data groups most likely would defeat any attempt to view the entire content of plaintext document 100. Only verified user users with a confirmed security clearances or identifications verified at reconstruct step 562 and in data storage sites DS1-DS4 are permitted to reconstruct plaintext document 100. Further, the parsing of the system can be triggered based upon an electronic attack, an electronic hack or a physical environmental detection scheme. This system immediately protects of the critical data plaintext document 100 with a transparent, automatic parsing, dispersal and storage system.

It should be noted that various aspects of the methodology and program described above in connection with FIGS. 4 through 9 and 30 through 40 can be incorporated into the parsing methodology and program in order to enhance or modify the system.

D.12 Adaptive Data Security

Event Responsive System

The present invention can also be configured as an adaptive security program which adapts and adjusts the security provisions based upon intrusion into a particular network or attempts to electronically attack or hack into that network or successful hack events. Programs are available to track electronic attacks or hacking attempts. One of these programs is manufactured by Cisco and identified as the Cisco Intrusion Detection System (IDS). The Cisco IDS system can work on a server or on PCs in a network. The Cisco IDS is an electronic intrusion detector, or an electronic attack detector or a hacking monitor. The hack or attack monitor is software loaded into a designated computer.

The output of the electronic attack or hacking monitor loaded into PC 142 (FIG. 6) for example, or loaded into PC-6 acting as a server for Network A 404 in FIG. 30, generates a plurality of attack warnings. The attack warnings progressively and incrementally indicate the severity and degree of intrusion and hacking attacks directed to the computer system. The following Security Level Table illustrates an example of various responses to increasing levels of attacks. These increasing security responses include engaging the filter and extracting critical data and storing it locally; the next level involves storing the critical data on removable storage media; the next higher level involves offsite storage of all security data; the subsequent security alert results in multiple offsite storage for multiple levels of security or critical data and the highest level involves offsite storage of both common data (remainder data) and security data. Of course, other combinations responsive to the hack attack may be provided. The electronic attack monitor may use artificial intelligence AI to (a) assess the severity of the attack, (b) plan an appropriate "secure data" response, (c) select the degree of filter, extraction and/or encryption, and (d) locate secure extract data storage sites. AI or inference machines can ascertain (a) traffic on communications channels, both intra and inter network, (b) storage limit issues, (c) transmission failures in the communications links, and (d) the degree of security necessitated by exterior events, i.e., terrorism alerts, virus alerts, war, data security warnings posted by trusted sources, MicroSoft, Norton, NASA, DoD, CDC, FBI, etc. Higher security alerts trigger the AI security monitor to heighten the security level (or to decrease that security level in view of a reduction or withdrawal of an electronic attack). Aspects of AI systems, inference engines and neural networks are discussed above in conjunction with the AI configured filter. These AI aspects can be utilized with an AI configured security sensor.

| Security Level Table |
|---|
| Attack (low threat level) Level One |
|     engage filter |
|     local storage - disk drive |
|     encrypt map |
| Attack (moderate threat level) Level Two |
|     same as Level One but use removable storage media (local) |
| Attack (nominal attack) Level Three |
|     Engage higher level filter |
|     Off site storage, single storage for all security data |
| Attack (moderate attack) Level Four |
|     Multiple off site storage, multiple levels of security data |
| Attack (severe attack) Level Five |
|     Off site storage both common data and security data |

Hence, the filtering of data is based upon respective ones of the plurality of attack or hack warnings and the extraction of data and degree of extraction is dependent upon respective ones of the plurality of attack-hack warnings. Storage of the extracted data and the remainder data is also based upon the degree of attack which is reflected in the attack-hack warning issued by the monitor.

Figure 33A:
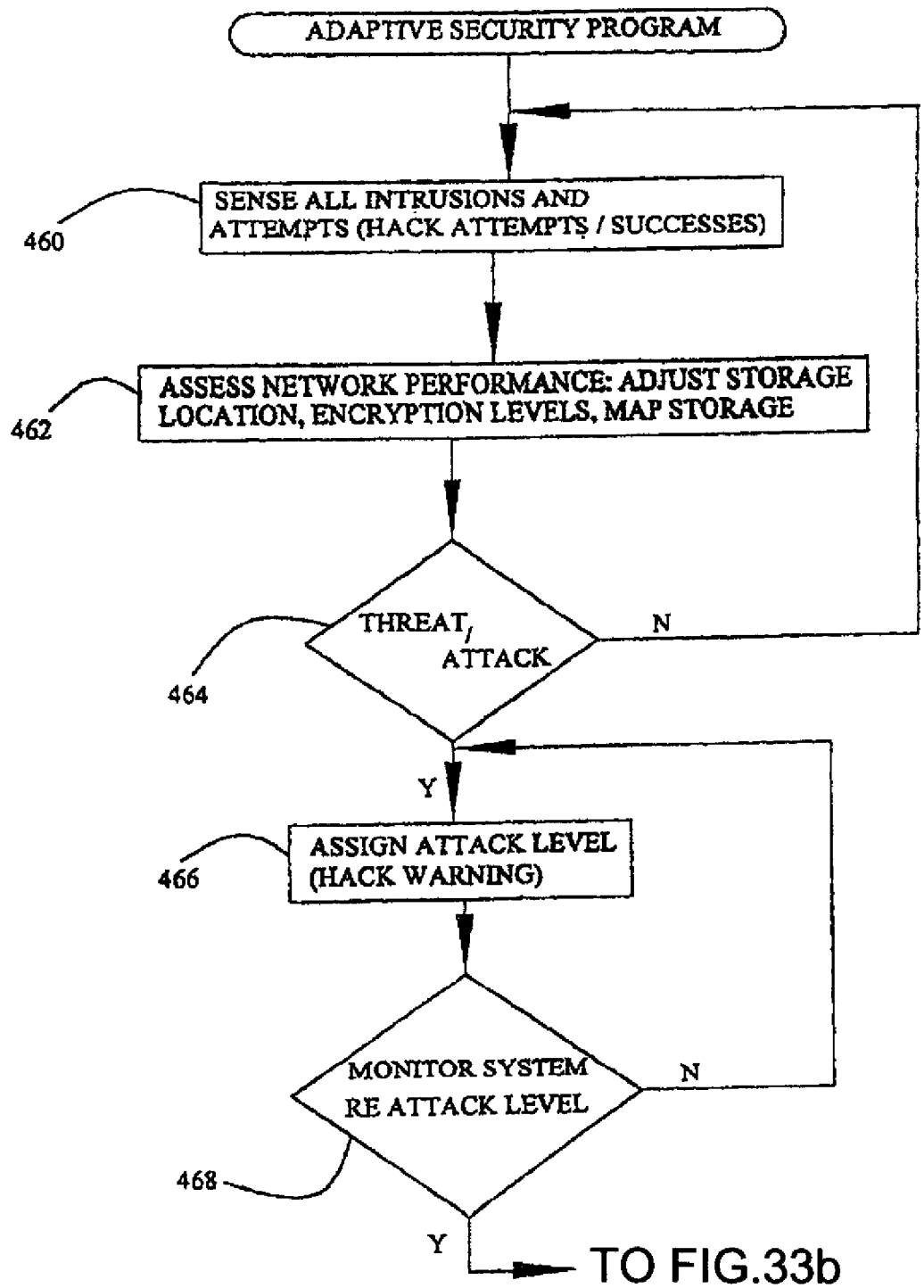
FIGS. 33a and 33b diagrammatically illustrate a flowchart showing the key components of an adaptive security program adaptable to various levels of electronic attacks, hacker or hack attacks.
Figure 33B:
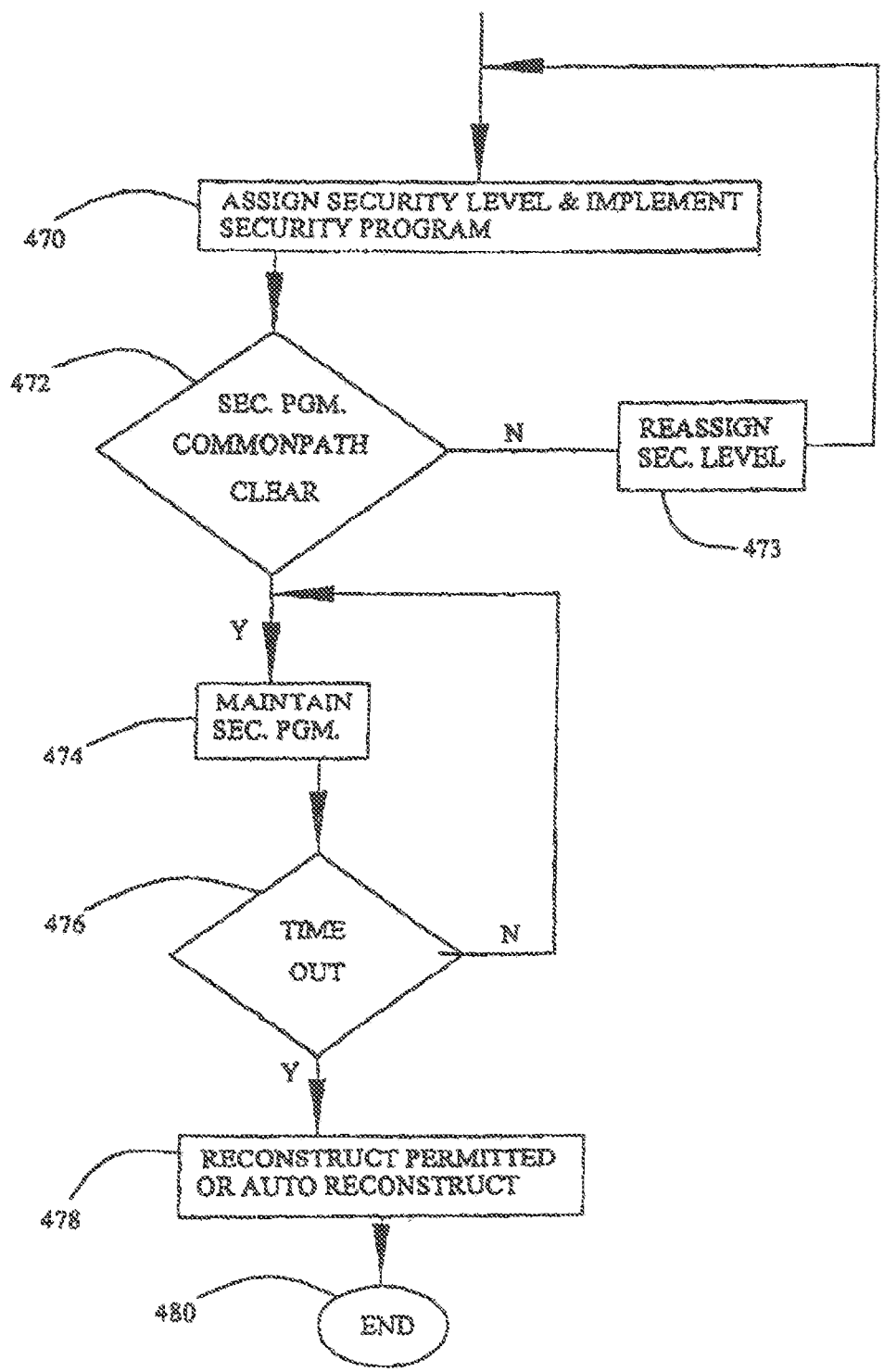

FIGS. 33*a* and 33*b* diagrammatically illustrate a flow chart showing the key components of the adaptive security program adaptable to various levels of hacker of electronic attacks. Step 460 senses all intrusions and attempts, that is, electronic attacks, hack attacks or hacking actions on a computer or a computer network. This step is equivalent to the output of the attack-hack monitor. Step 462 assesses the current network performance, adjusts the storage location for the extract data (the location of the extract store), the encryption level (the degree of encryption) and the storage of the map showing the extract data storage (if necessary) and storage of remainder data, if necessary given the severity of the attack. For example, during high utilization of the computer network (high utilization in a server computer in a server-client environment), local storage of extracted data may be preferable as compared with offsite storage of critical data. However, if the attack occurs during non-working hours, the performance of the network is very high, and the security system could utilize all the resources in the computer network to achieve the security goal of safe guarding the data during the attack. System resources include processing resources (for encryption/decryption), bandwidth resources to store extract data and any other resources that are critical for the utilization of the security system described herein. Decision step 464 determines whether a threat or attack as occurred. If not, the system takes the NO branch returns to step 460. If YES, the system in step 466 assigns an attack level or a hack warning level to the threat or attack. The system in decision step 468, monitors the network during the attack. If the network performance or the computer performance does not change, the YES branch is taken. If the computer performance or network performance changes based upon or during the attack, the NO branch is taken and the system returns to step 466 which reassigns an attack level or a warning level to the next higher or significantly higher warning levels.

After decision step 468, the system executes step 470 which assigns the security level and implements the security program based upon the attack. It should be noted that the administrator establishes the degree of security level, the encryption, the extract store and remainder store (if necessary) for various levels of attacks or hack warnings. The security level assigned to a particular attack warning is implemented in step 470. Decision step 472 determines whether the security program's communication path is clear. For offsite storage of extract and/or remainder data, a communication path is important. If the path is blocked or compromised by the attack, the NO branch is taken and the system in step 473 reassigns the security level to a next higher level or a different, safer security level and returns to step 470. If the security and communications path is clear, the YES branch is taken from decision step 472 and, in step 474, the system maintains the security program. Decision step 476 determines whether sufficient time has passed from the attack. If not, the system loops to step 474. If YES, the system executes step 478 which either permits reconstruction of the user operating the plain text or source document or automatically reconstructs those documents that were filtered, parsed, extracted, and subject to outside storage. The system ends in step 480. To provide additional security, the attack monitor can be configured to monitor security warnings from trusted parties such as MicroSoft, Norton, NASA, DoD, CDC, FBI, etc. Emails or electronic communications from trusted parties can trigger higher levels of security. The attack monitor described above can be configured to accept messages from trusted parties. These messages are equivalent to detecting an electronic attack.

Further, the attack-hack monitor can be configured to monitor and assess other environmental conditions such as fire, power failure, equipment failure, unauthorized physical entry into the building, plant, or computer room. These exterior threats or events are monitored by the attack monitor since they may quickly develop into an electronic attack on the secured data retained by the computer system. In response to these exterior events, the attack monitor generates corresponding attack warnings similar in nature to the hack attack warnings discussed above.

There are various methodologies that may be utilized in the adaptive system. The tables in FIGS. 34 (Standard Automatic Defenses Matrix Table), 35 (Optional Automatic Defenses Matrix Table), 36 (Security Meter Module Table), 37 (Normal Work Mode Table), 38 (Threat Made Table), and 39 (Attack Mode Table) sets forth these various security methodologies.

Another object of the system and method is to enhance the survivability of a system, network, or an organization through distribution of critical information. The objective is to enable a network or organization to carry on its critical missions even while under attacked or damaged. Survivability is the ability of a system to execute its mission and provide critical operational services during and after a successful intrusion or damage. Providing critical operational services includes maintaining availability of information and data such as credit card numbers, names, phone numbers, transaction amounts, shipment details without compromising the security of the information and data.

The invention is designed to enable a network to adapt to ongoing attack and react in a way that permits critical missions to continue. With the current state of the art, when firewalls or other security measures are compromised, no real obstacles curtail or hinder intruders. The system and method is very adaptable and flexible to provide additional layers of security, privacy, anonymity, redundancy, and backup through the selection, extraction, storage, transportation, and reconstruction processes. The dynamic architecture of the invention enables it to conduct an automatic real time configuration of its extraction/transport/recovery activities, in response to the challenge of attacks.

The invention's survivability modes enable: (a) Presetting of rules for computer or network functioning under attack or alert. (b) An automatic assessment of damage and automatic reaction to enable functionality of critical missions.

D.13 Email, Web-Based and Other Types of Applications

Figure 42:
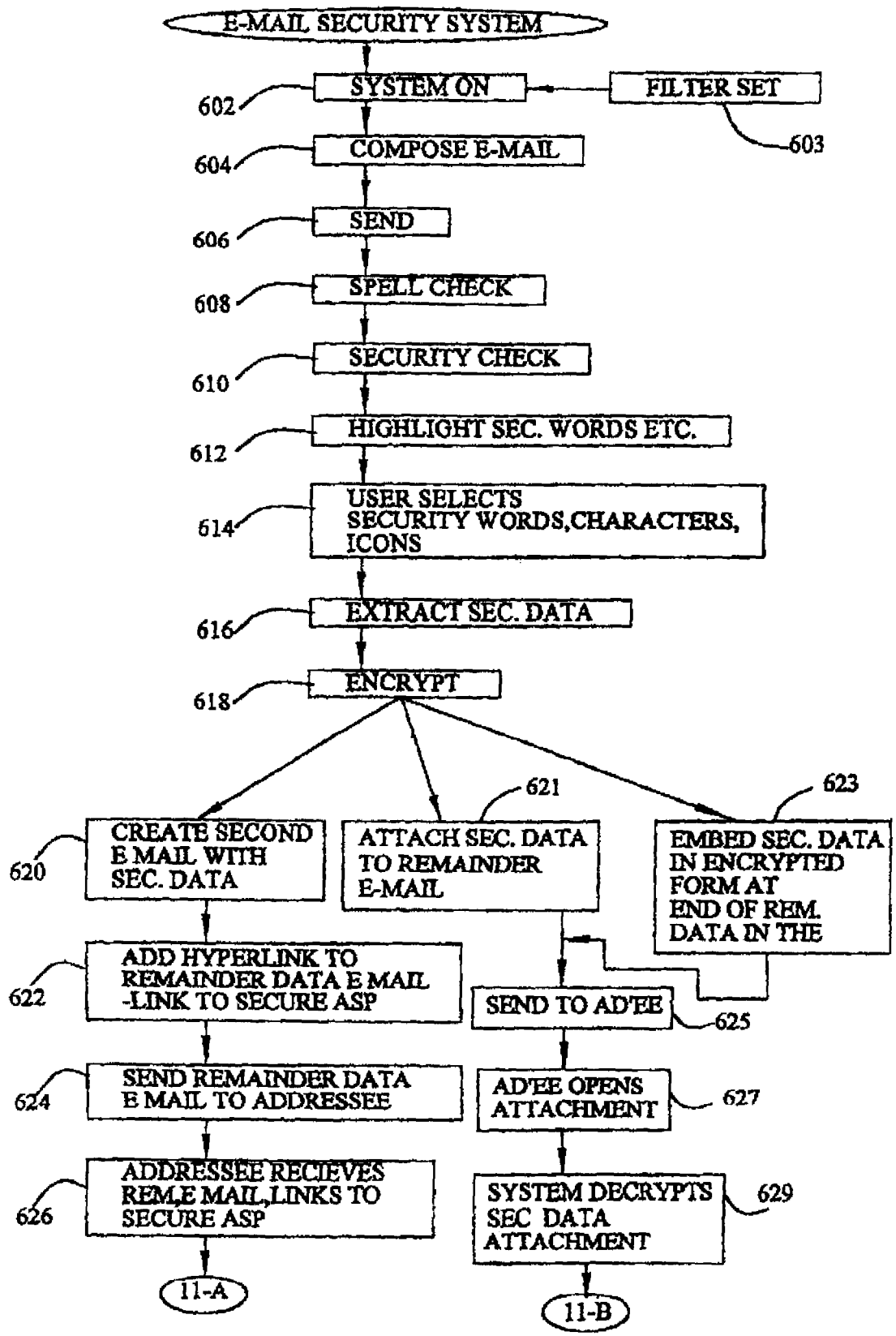
FIGS. 42 and 43 diagrammatically illustrate a flowchart showing the key components of one embodiment of the e-mail security system (jump points D-11-A and D-11-B link the flow charts).
Figure 43:
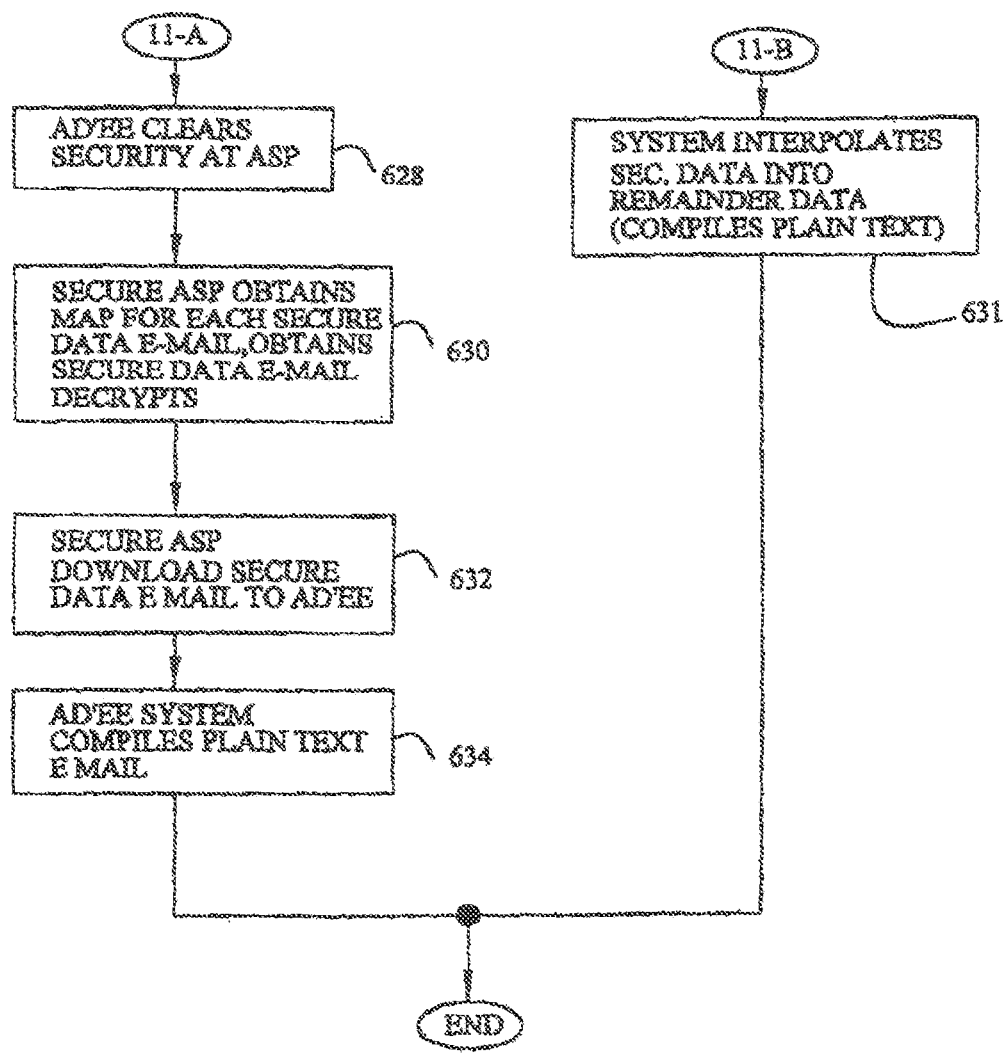

FIGS. 42 and 43 diagrammatically illustrate a flowchart showing the key components of one embodiment of the present invention, that is, an e-mail security system. A similar system may be deployed to capture select content Sc data in real time FIG. 42 is linked to FIG. 43 via jump points 11-A and 11-B. The method of securing e-mail data operates on a distributed computer system which at least includes a remote memory designated as an extract store. Of course, the extract store may comprise a plurality of extract stores operative in conjunction with a plurality of security clearance levels. The extract stores may be SC stores. A singular security or SC relevancy level is identified in FIG. 42. Further, the e-mail may be subject to a parsing algorithm which, as discussed above, is generally independent of the identification of security sensitive (or select content) data. However, with respect to the parsing aspect of the present invention, the original e-mail data is split into extracted data and remainder data and the extracted data is stored in an extract store. Hence, the parsing algorithm operates essentially independent of the content whereas the secured e-mail program operates based upon content identification. Although FIGS. 42 and 43 primarily relate to identification of security or SC data, the same is true regarding the use of securing e-mail data with a parsing algorithm.

The e-mail security or SC system begins with step 602 wherein the system or program is turned ON or is activated. Step 603 recognizes that the user originating plaintext document 100 (not shown) has set a security or SC filter identifying one or more security sensitive (or select content SC relevant) words, characters or icons. In step 604, the user composes the e-mail representative of plaintext document 100. In step 606, the user selects the "send" command in the typical e-mail program. As is customary, the system in step 608 conducts a spell checking routine prior to sending the e-mail. In step 610, the system conducts a security or SC check on the plaintext document or composed e-mail generated in step 604. The filter is used in step 604. In step 612, security or SC words are highlighted or distinguished in the e-mail prior to the actual sending of the e-mail to the addressee. This step 612 is optional. In step 614, the user selects the security or SC words for data to be extracted out. The highlighting step facilitates this selection. In step 616, the system extracts the security or SC data and, preferably, in step 618, the security or SC data is encrypted. Step 618 is optional. In a parsing application to secure e-mail, the parsing algorithm operates automatically at step 610 thereby eliminating steps 612 and 614. The extracting step 616 simply represents that the segmented data obtained from the original plaintext e-mail generated at step 604 is separated from remainder data.

After encryption step 618, the e-mail security or SC system generally operates in one of three manners. Other systems may be formulated based upon the systems and subsystems discussed herein. In one methodology, a second e-mail is created (see step 629), in a second methodology the secured or SC data in encrypted form is attached or appended to the original e-mail containing remainder data (step 621) or, in a third methodology, the encrypted security or SC data is simply added to or inserted into the end of the remainder data of the e-mail (step 623). The methodology of generating a second e-mail is initially discussed.

A second e-mail having encrypted security or SC data is created in step 620. Further, the system in step 622 adds a hyperlink to the remainder data in the original e-mail created in step 604. The hyperlink presents a pointer for the addressee to a secured application service provider ASP or SC application service provider ASP. See the discussion of FIG. 6 above. The ASP represents a data storage facility for the secured or SC e-mail data. In step 624, the remainder data from the original e-mail is sent to the addressee in a normal manner. This step also includes the concept that the second e-mail containing the encrypted security or SC data is sent to the ASP. In step 626, the addressee receives the remainder e-mail which includes a hyperlink to the secured or SC data ASP. The system jumps at jump step D-11-A from FIG. 42 to FIG. 43.

In step 628, the addressee receives the remainder e-mail, visits the ASP via the hyperlink and clears the security levels at the secured ASP. In the SC system, the SC data is stored in the SC storage and this data capture is logged into the system. In step 630, the secured or SC data ASP obtains a map for each secured or SC data e-mail (since the original e-mail may be broken up into a plurality of extracted, secured or SC data e-mails) obtains all secured or SC data e-mail and decrypts the same. In step 632, the secured or SC ASP downloads the secured or SC data as an e-mail to the addressee. In step 634, the addressee system compiles the original plaintext e-mail 100. In the SC mode, the SC data in added to the remainder data and the user-viewer is permitted to see additional SC content associated with that relevancy level. In this sense, the SC email is a knowledge expander permitted the user-viewer to enhance his or her knowledge with additional SC content. A reconstruction program may be necessary to decode the secured or SC data and insert the data into the document via the placeholders.

Optionally, the decryption could occur at the recipient's e-mail device somewhat prior to the reconstitution of the e-mail plaintext document 100 during step 634. This requires the addressee to have the encryption routine and the correct key or decrypt code. The e-mail security or SC system described above may include many of the features discussed earlier in connection with the other figures. For example, both the security or SC data and the remainder e-mail data can be encrypted prior to transmission to the addressee and the secured or SC data ASP. The encryption may include multiple levels of encryption and decryption may require multiple levels of security clearance. The encryption may be mixed in the remainder e-mail. Partial as well as full reconstruction is enabled as discussed above in connection with FIG. 7.

From the senders or originator's viewpoint, the e-mail facility described herein facilitates the storage of the extracted data at one or more secured or SC sites.

Another implementation of the secured or SC e-mail system attaches the encrypted and secured or SC data to the remainder e-mail data as indicated in step 621. For an SC email system, the addressee may add the SC sent with the email to the addressee's SC database. E-mail attachments are well known. Alternatively, the encrypted secured or SC data may be embedded or copied in encrypted form at the end of the remainder data in the original e-mail as indicated in step 623. In either case, in step 625, the e-mail is sent to the addressee. In step 627, the addressee opens the attachment. In step 629, the system of the recipient decrypts the secured or SC data attachment or the embedded data attachment. In step 631, the recipient's system integrates the now decrypted secured or SC data with the remainder data. Of course, this a compilation step. Place holders or other position indicators are customarily utilized. Appending the encrypted security or SC data is generally equivalent to attaching a file to the original e-mail which constitutes, after extraction, the remainder data. Including the encrypted security or SC data is adding the security or SC data to the original e-mail at a predetermined location (either the top of the e-mail, the bottom of the e-mail or some predetermined line number). All SC data may be added to the addressee's SC store. Relevancy of the SC is based upon SC relevancy markers transmitted with the email, similar to the security levels for the MLS secure email system.

It should be appreciated that the e-mail or SC security system may work automatically or may be selected manually by the user. The highlighting or special distinguishing manner for the security or SC words in step 612 is optional. By highlighting the security or SC words, the user may select or deselect those words for extraction. At the addressee's side, the addressee's system may be configured to automatically seek out the secured or SC data ASP, enter security clearance data, download the secure or SC data and integrate the secure or SC data in the remainder data e-mail (or SC data structure). The present invention contemplates automatic as well as manual steps in steps 626, 628, 630, 632 and 634. The hyperlink with the original remainder e-mail essentially maps the remainder data to the secured or SC data and the remote storage locations handling the secure or SC data. Multiple security clearances may be required of the recipient or addressee. The e-mail system can be combined with other features of the security or SC system discussed above such as multiple security data locations, secret key sharing schemes, multiple encryption of the data in a single document, multiple security clearance levels required for a plurality of storage facilities, the two man key system, automation of key management and a plurality of levels of access to the data such as partial reconstruction in step 634 and full reconstruction.

Figure 44A:
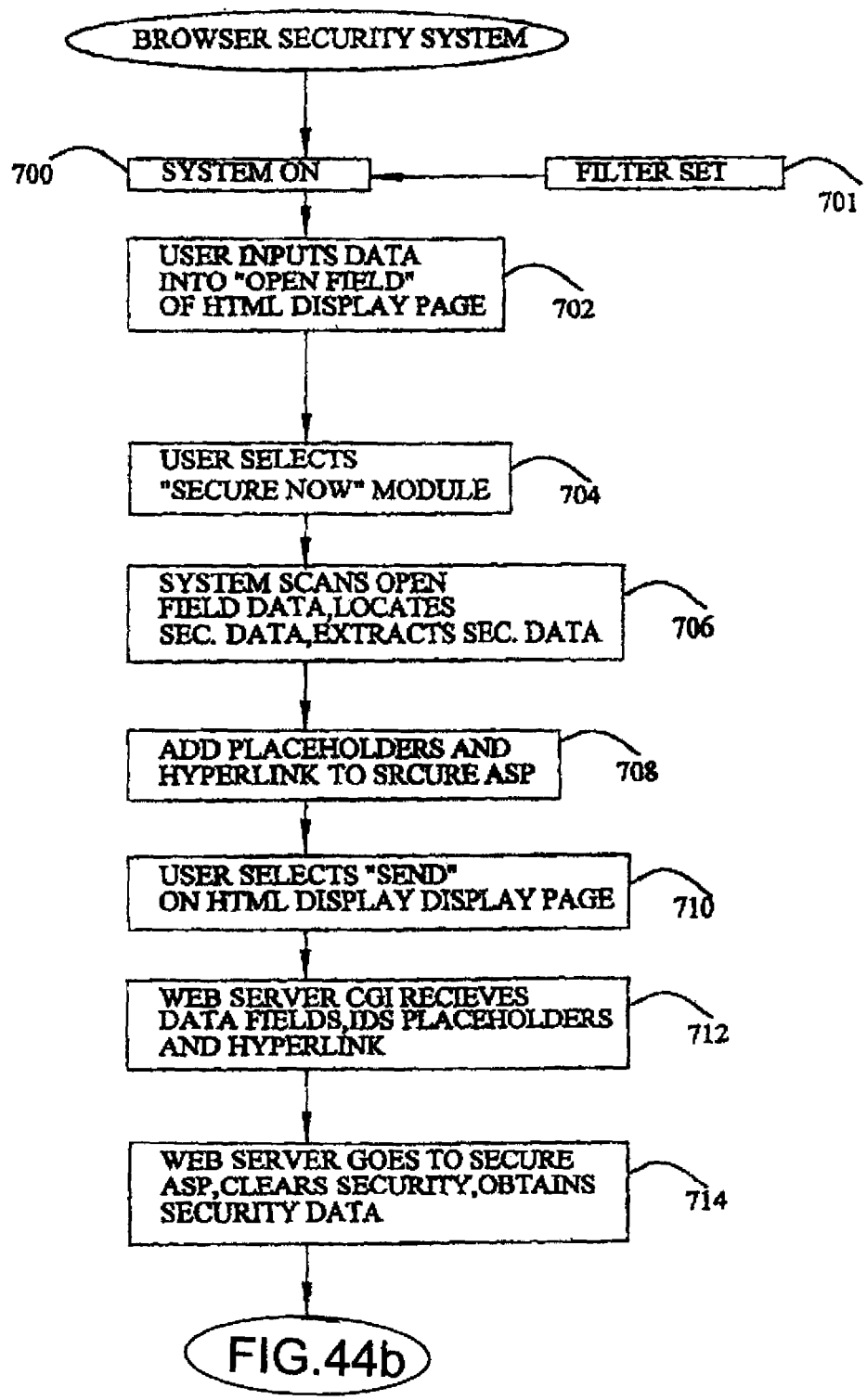
FIGS. 44a and 44b diagrammatically illustrate a flowchart showing the key components of one embodiment of the invention implements the security system on a web browser (jump point 12-A links the flow charts).
Figure 44B:
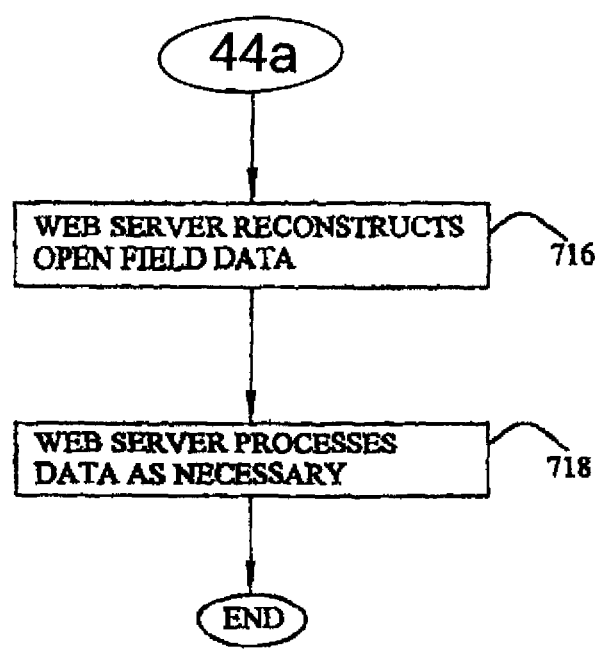

FIGS. 44a and 44b diagrammatically illustrate a flowchart showing the key components of one embodiment of the system and the invention which implements the security or SC system on a web browser. Jump point 12-A links FIG. 44a to FIG. 44b. The system, at step 700 is ON. The filters establishing either the parsing or the identification of security or SC data are established in the filter set step 701. In step 702, the user inputs data into open field of an HTML display page which the user has previously downloaded from a web server. In step 704, the user may select "secure now" turning ON the system (or ON SC operator) or the system may automatically be ON such that the filter is screening all the data input by the user in the open field. In step 706, the system scans all the open field data, locates security or SC data and extracts security or SC data. In step 708, place holders are added to replace the extracted security or SC data in the remainder data and a hyperlink is added to the open field remainder data providing a link to the secure or SC data ASP. In the SC system, the placeholders show the addressee critical terms subject to the SC knowledge expander feature. In step 710, the user selects the "send button" or any other indicator on the HTML page triggering an operation which transmits the open field data (which is now remainder data) to the web server. In step 712, the web server and particularly the common gateway interface (CGI) receives the remainder data fields, identifies the place holders in the data and the hyperlink to the secure or SC data ASP. In step 714, the web server receiving the data from user's browser goes to the secure or SC data ASP, inputs and clears any security level, and obtains the secured or SC data. In step 716, the web server reconstructs the open field data which generally is represented by plaintext document 100. In step 718, the web server processes the data as necessary. Many of the features discussed above in connection with the above figures may be implemented on the browser system.

The credit card scrubber or financial data scrubber operates in a similar manner to the email and browser data security system described above. A similar system can be designed to comply with privacy laws or other governmental regulations. A credit card number is similar to a social security number and patent name, address and phone are common personal identifiers that some privacy laws require extraction and special handling. The credit card or financial data or social security number scrubber (herein collectively "CC scrubber") typically operates on a defined sequence of numbers. For example, if a credit card number is 17 digits, whenever the email or browser security system or program detects 17 sequential numerical digits (a pre-set filter), a pop-up window may appear enabling the user to select or turn ON the scrubber. If ON, the data security program strips or parses the credit card number and sends, for example, five of the 17 digits to a secure store. In an SC system, the CC data may be data mined by affiliated companies. Placeholders or substitute characters may be inserted into the remainder CC data. To reconstitute the entire CC data, the intended recipient would be required to pass security clearance levels at the secure store. An SC system requires SC relevancy clearances set by the policy administrator. Of course, the CC scrubber could be set to detect bank account numbers, personal or business account holder names, pre-set passwords, etc. In an OFF state, the CC scrubber would let pass the CC number, account number or pre-set data stream or string. The user may select (i) always ON; (ii) pop-up window, select ON or OFF per transaction; (iii) pop-up window to select OFF (default being ON); or (iv) always OFF but minor reminder (audible sound, icon appearance, etc.) of data security risk. The CC scrubber may encrypt the extracted data for security. Other visual ques may rather than a pop-up window may be used (for example, a drop down menu). The scrubber can also be deployed on wireless devices to scrub sensitive data such as credit card and other financial data.

Figure 45:
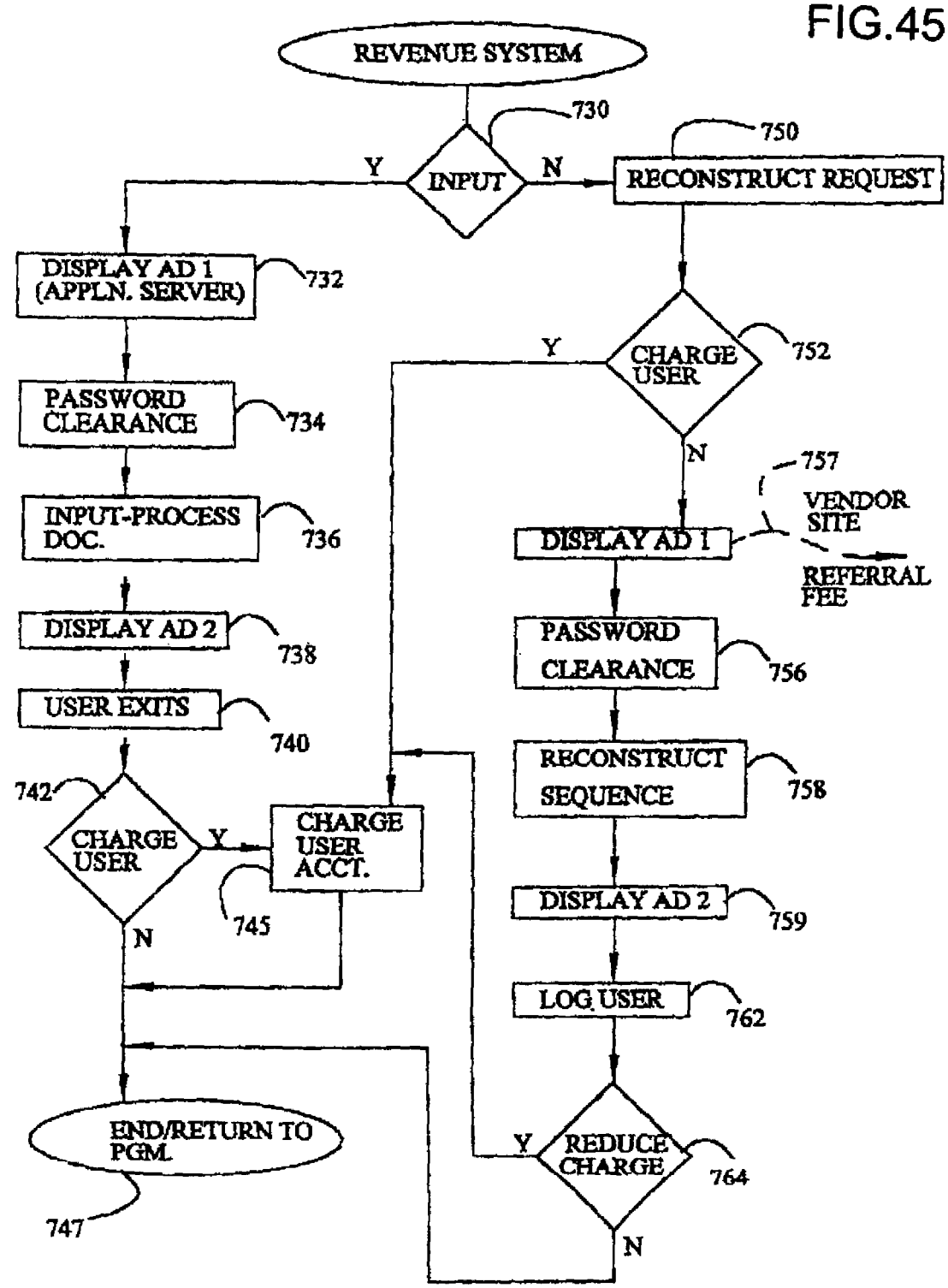
FIG. 45 diagrammatically shows several revenue systems which may be employed with the data security systems described herein.

FIG. 45 diagrammatically shows several revenue systems which may be employed with the data security systems described herein. Many types of revenue systems may be employed in conjunction with the present invention. FIG. 45 shows two basic systems, one at the data input stage and the second at the data output or reconstruction phase. Release of the reconstructed document or portions thereof are based upon security clearance or SC relevancy and compensation. "Compensation" includes an exchange of information, particularly for the SC storage system. Within each revenue subsystem are two types of revenue generators, an advertising revenue generator and a user charge generator. The user charge system contemplates charging or assessing a fee to the user's employer or organization. Therefore, the system operator may select up to four (4) revenue generation systems (ads at the input, charges at the input, ads at the output and charges at the output). It is well known that vendors selling goods and services over the Internet are willing to pay a certain percentage of their sales revenue to other entities referring customers to the vendor's web sites. The concept of display ads in FIG. 45 includes this revenue stream. The system operator may choose all, one, several or none of these revenue systems to be deployed in conjunction with the data security system described earlier herein. Other revenue system may also be utilized. The steps in the revenue system described herein may be reorganized to attain higher consumer and user acceptance and/or to maximize the revenue to the system operator. Swapping SC content may include an evaluator module that tests the "proposed" SC data file and determines whether the proposed SC data file is worthy or being exchanged for an existing SC data file.

Decision step 730 determines whether the system is deployed at the data input phase or not. It is clear that the system operator may utilize the data reconstruction revenue system and hence the decision step 730 is not necessary. If the data input system is employed, step 732 displays the ad to the user. The user may be uploading a complete document to an application server on the Internet or may be using a application service provider on the Internet or an private LAN to secure his or her data. The display ad 732 step enables the user to click on the ad and visit the vendor, thereby potentially generating a referral fee. See referral fee branch 757. Step 734 requires password clearance. Step 736 processes the document or data object with the security or SC system. The user may input the document real time or input it to the application server or may upload the complete document to the server. Alternatively, the ad could be buried in the email or application program run on the user's computer and the user would be shown an ad and given a link to the vendor's Internet site. Selecting the link points the user's browser to the vendor's site.

Step 738 shows display ad 2 to the user thereby potentially generating referral revenue for the system operator. Step 740 notes that the user exits the revenue system. Step 742 determines whether the system charges the user for the security or SC service. If YES, the program processes the charge in step 745 (charge systems are known). If NO, the system ends or returns to other programs in step 747.

The NO branch from determination step 730 leads to the receipt of a reconstruction request by the user in step 750. Step 752 determines whether the user will be charged. If YES, the system executes step 745. If NO, the system displays the ad 1 in step 754. Referral generation is noted by branch 757 from step 754. In step 756, the user's password is subject to clearance. In step 758, the user's request is processed, the document or data object is reconstructed (fully or partially as described earlier), and in step 759 the system displays ad 2. In step 762, the user's activity is logged in to the system. Step 764 determines whether the charge to the user is reduced (because he or she viewed the ads) and if not, the system ends in step 747, if YES, the system processes the charge in step 745. Alternatively, the user may be shown display ads and/or charged for services upon storage of extracted data. Step 750 includes this concept.

D.14 Portable Computing Device Environment

The invention can be applied to portable computing devices to secure files and data objects in such devices. The invention extracts, disperses, via a controlled release of data segments to storage locations, and permits reconstruction utilizing security protocols to provide a security or SC system for data based upon the location of the portable device, typically detected by a global position signal generator (GPS) or based upon triangulation data from several broadcast points. In an SC system, the sensitive data may be made available to the user-viewer for a period of time or as long as the user is in a geographic territory. Beyond that time-space limit, the SC data is removed from the user's portable data device. Scrubbing security or SC icons from maps, credit card data or financial data from text, a data object or data stream is part of the portable security system.

As used herein, the term "portable computing device" means a laptop computer, a PC with a movable feature, such as a PC mounted in a car, plane, truck or trailer, PDAs or personal data assistants, mobile or cellular phones configured with a memory, a processor and some type of GPS or locator system to determine where the phone or cellular unit is located within a territory and digital pagers having similar electronic systems.

The present invention can be linked with a location sensing circuit, such as a global position sensor or system (GPS) or other type of location sensing system, such as a system which utilizes triangulated signals. The concept is a location based access oriented security (or SC relevancy) such as an automated trigger (which activates the security or SC program discussed hereinabove when the portable computing device is beyond a predetermined region); an automated safety system; a trip wire; an interlock; a method to disable systems, activity or access to data; and means to limit functionality or access in whole or in granular parts. The portable security system operates on text, data objects, images or other digitally configured data objects. Security access (or relevancy access) is limited by a location way point (in relation to a reference point) or a calculated range (using satellite GPS, high altitude services, or earth-based range finding GLS (geographic location services)) about a way point with physical means or mathematical calculations to define a geographic area by equations or geometric shapes or aggregated ranges (the shapes including rectangles, solids, cubes, circles, oval, spherical region or other areas defined by algorithms). Physical and logical access or entry control to weapons, devices, vehicles, computers, equipment, tools, data, networks, local access, remote access beyond a physical location (reference point), can be enabled or disabled with the system of the present invention. The regions (sometimes identified as a single predetermined region or a plurality of predetermined regions), can consist of complex definitions of three dimensional areas of arbitrary shape and sizes, as long as those regions can be defined by algorithms. The region can also be defined as an area circumscribed internally by a perimeter or by an area external to that perimeter. In other words, access can be denied if the portable device is within a certain region as compared with denying access when the device is beyond a predetermined regions. The claims are meant to cover both situations.

Figure 46:
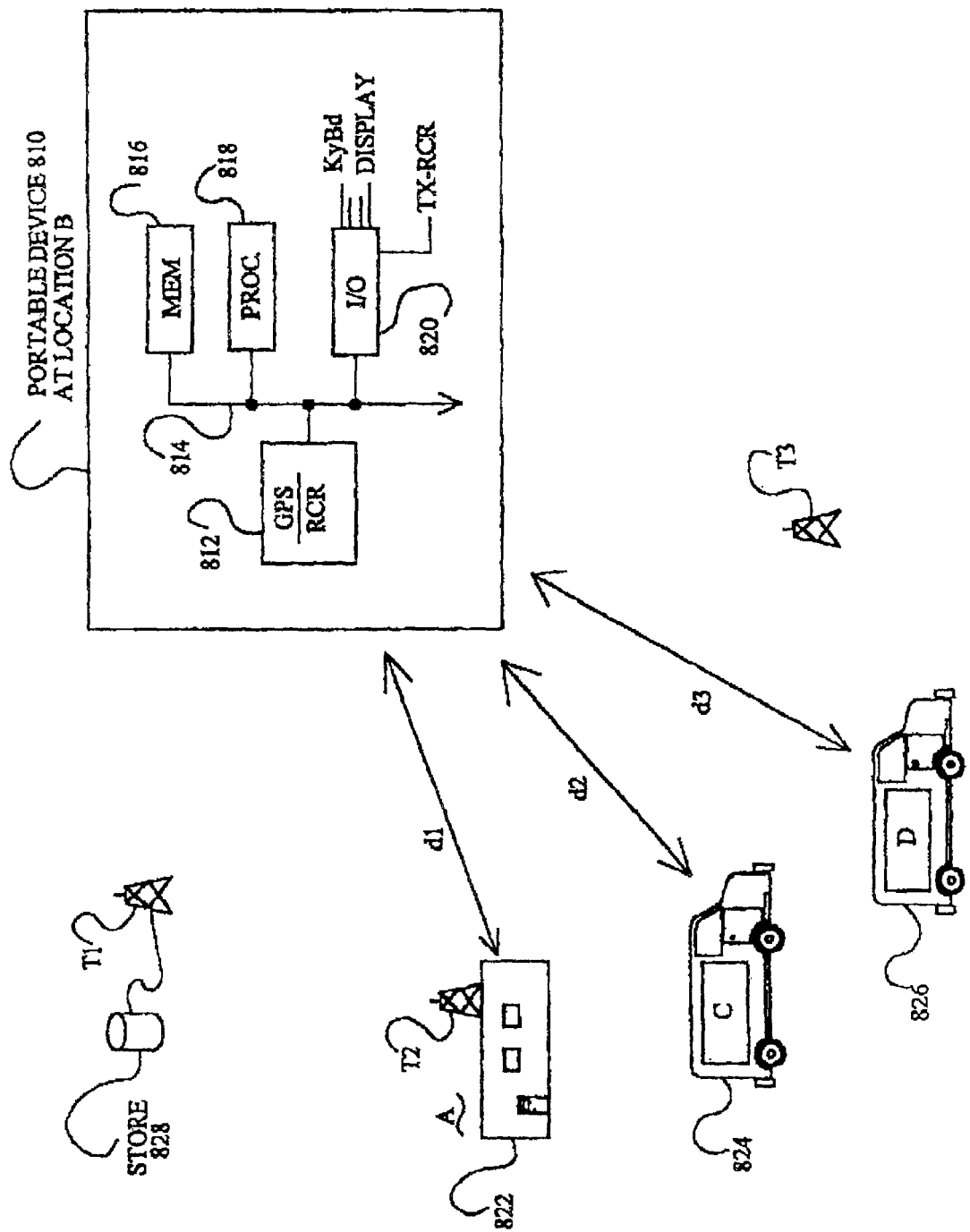
FIG. 46 diagrammatically illustrates a portable computing device (or the critical parts thereof, see FIG. B-2 for further details) associated with the portable data security locator system and method.

FIG. 46 diagrammatically illustrates a portable computing device 810 at location B. The portable computing device 810 includes, in the illustrated embodiment, a GPS system (or a receiver system) 812 coupled to a bus 814 and further coupled to memory 816, a processor 818 and an input/output system 820. Input/output 820 is coupled to, among other things, a key board or key pad, a display, and possibly a transmitter and receiver subsystem. As is known, GPS Systems detect satellite positioning signals and generate an output indicative of the location of the GPS system. In the illustrated embodiment, this location is location B in FIG. 46.

A simple implementation of the present security or SC system provides that upon detection of d1 from location A, defined by building 822, certain security events occur, e.g., automatic extraction and a denial of reconstruction rights. In one example, GPS subsystem 812 continually monitors the location of portable device 810. When the location of device 810 exceeds a predetermined distance (d1-limit), the program operating in memory 816, operable by processor 818, either extracts data and stores the extracted data as discussed in detail above or prohibits reconstruction of data as requested by the operator of portable device 810. Alternatively, automatic extraction may occur without prohibiting reconstruction due to device 810 being located beyond the predetermined region d1-limit. The portable computing device 810 in FIG. 46 may have many other electronic components such as those shown in FIG. 6 in connection with computer 165. Alternatively, the security or SC system can be configured in a reverse manner such that the extraction of security or SC information is triggered when portable 810 is within a predetermined region (less than d1-max) close to location A and building 822, that is, the security or SC system disclosed above is triggered to extract information when distance d1 is less than d1-max.

The security or SC system can also be configured such that GPS or locator system 812 detects a variable distance such as distance d2 between truck 824 and location B of portable device 810. In this sense, the location of portable device 810 is obtained by GPS circuit 812 and further some type of communications must be established between truck 824 at location C and the portable device 810. For example, the receiver coupled to input/output 820 receives this information from location of truck 824 and location C. This reference location C is then processed in conjunction with the location data from GPS circuit 812 by processor 818 and memory 816. The same results as discussed above in conjunction with fixed reference location A can be achieved with a variable reference location C. Truck 826 at variable location D enables the system to provide an additional level of security. In other words, within distance d2 (d2-limit), the operator of portable device 810 may be able to reconstruct information upon request. However, if portable device 810 intrudes upon or is less than distance d3 (d3-max) the distance between location B and location D, the security system may trigger an immediate extraction routine thereby disbursing, on a granular basis, the secured or SC words, data objects or whatever and further prohibit reconstruction. Of course, the security or SC system could be configured simply to extract the information and permit reconstruction. Otherwise, the security or SC system could be configured to simply extract information and prohibit reconstruction. In this manner, the security or SC system discussed in conjunction with the portable computing device 810 can have multiple triggers or location established events enabling the security or SC program to extract security or SC information or disabling the security or SC program to prohibit reconstruction based upon a fixed location A or one or more variable locations C, D.

Another configuration of the present invention utilizes triangulation to obtain location B for the portable computing device 810. In a triangulation situation, the receiver system 812 for the locator receives signals from one or more fixed locations, and preferably three locations diagrammatically illustrated by tower T1, T2 and T3 in FIG. 46. The triangulation of signals to obtain location B is known in the art. However, the combination of such location position coupled to extraction of security or SC data and/or reconstruction of security or SC data based upon certain location parameters is part of the present invention.

For illustration purposes only, the present security or SC system for the portable computing device 810 can remotely store extracted security or SC information. Remote store 828 coupled to receiving tower T1 illustrates this concept.

Figure 47:
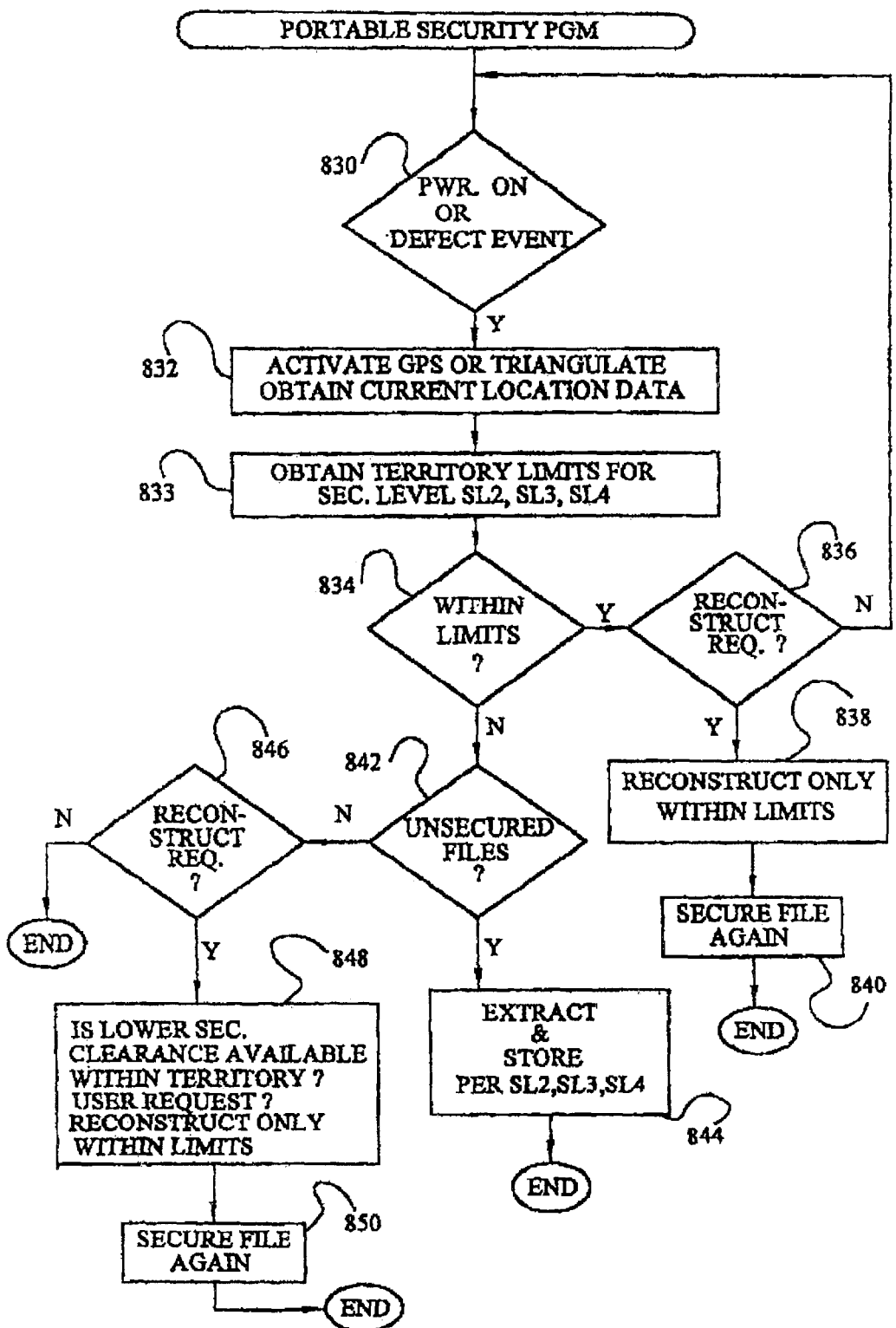
FIG. 47 diagrammatically illustrates a basic flow chart for the portable security system program in accordance with the basic principles of the present invention.
Figure 4B:
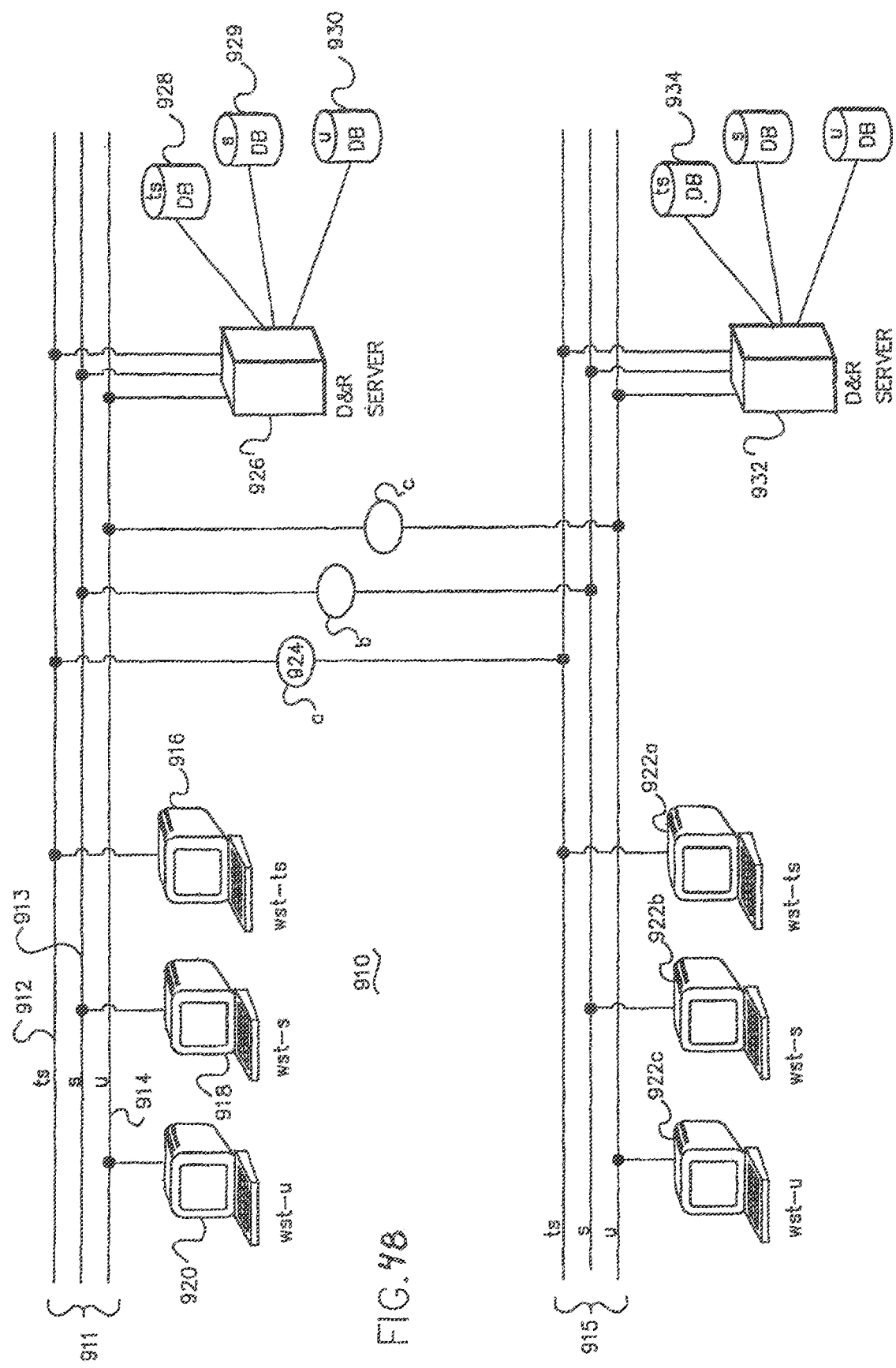

FIG. 47 diagrammatically illustrates a basic flow chart for the portable security or SC system program utilized in connection with portable computing device 810. Decision step 830 determines whether a certain event has occurred. This event may include a power ON for the portable computing device, may be a "save document" command, may be a screen ON event or may be a timed function. For example, if the portable computing device 810 is continually ON, the program may periodically poll the locator circuit (GPS 812) and determine whether location B is within or beyond the predetermined regions (d-max or d-limit). Step 832 activates the GPS or the triangulation circuit to obtain current location data. This may include locating variable locations C, D. Step 833 obtains territory limits for various security levels or SC relevancy levels. As discussed earlier, security or SC level SL1 is public or non-confidential information, security or SC SL2 confidential or proprietary information, level SL3 is secret information and level SL4 is top secret or SC information. This system can be configured such that various territories or predetermined regions correspond to respective ones of the security or SC levels SL1-SL4.

Decision step 834 determines whether location B of portable computing device 810 is within or without the predetermined territory limits or predetermined region. If YES, the system determines in decision step 836 whether the user has initiated a reconstruction request. If not, the system returns to a point preceding decision step 830, the detect event function or step. If YES, the system, in step 838, reconstructs the document only if location B is beyond a predetermined region. Of course, a negative operation could occur in that reconstruction would be prohibited if location B was within a predetermined region. The claims appended hereto are meant to cover both within a region and without a region and independently, extract or permit reconstruction. Step 840 secures the reconstructed file again as necessary.

Returning to decision step 834, if location B is not within the predetermined regions or territories defined by security or SC levels SL1-SL4, the NO branch is taken and decision step 842 determines whether portable computing device 810 has any unsecured files. If YES, the system executes step 844 which is extract and store the security or SC sensitive words, data objects etc. in accordance with security or SC levels SL2-SL4. As stated above, the storage could be on media in a local drive or can be remotely distributed to memory segments designated as a remote extract store. If the NO branch is taken from decision step 842, the system executes decision step 846 which determines whether the user has requested a reconstruction of data. If not, the program ends or returns to the event detection step 830. If YES, the system executes step 848 which determines whether a lower security or SC clearance is available within the current territory, determines whether the user has the proper pass code to access the reconstruction and process the reconstruction or whether the system prohibits all reconstruction. Partial reconstruction for lower security or SC items may be permitted. For example, reconstruction at top secret or SC level SL4 may be prohibited when distance d2 is greater than d2-limit but reconstruction at a lower security or SC level such as confidential level SL2 may be permitted beyond limit d2-limit. In this sense, the present invention can be configured to generate extraction for various security or SC levels at various predetermined regions based upon a fixed reference point or a variable reference point. Alternatively, reconstruction can be permitted or denied based on a plurality of security or SC levels and a plurality of corresponding regions or distances. The term "mobile predetermined region" is sometimes utilized in conjunction with variable regions d2 and d3.

As an example, the data object retained by portable computing device 810 may be a map having security or SC sensitive icons on the map. These icons are extracted if location B is less than a predetermined defined distance d3-limit between variable location D and location B. If location B is beyond d3-minimum, the map can be viewed by the operator on portable device 810. If location B is less than distance d3-minimum, the security or SC icons are removed from the map. In a similar sense, security or SC sensitive credit card characters can be extracted from plain text documents carried on portable computing device 810 when device 810 is a certain distance beyond d1-limit from fixed reference point A. This location A may be a bank headquarters. Encrypting and decrypting the data based upon the geographic event is also contemplated by the present invention. Of course, portable device 810 may be a plurality of portable devices linked via a hard wire network or via a wireless network. The same security or SC program disclosed above in herein can be utilized with one computer or a series of computers. Further, portable computing device 810 can include a plurality of memory segments (see FIG. 8) and may include a plurality of display screens as discussed above in conjunction with FIG. 7. The extraction and storage and reconstruction of streaming data is possible as is operation on voice data. Additionally, the portable computing device may set off an audible and/or visual alarm prior to extraction of data. For variable territories or predetermined regions, step 832 or 833 may include gathering information regarding the variable location of vehicles 824, 826 prior to determining the territorial limits for various security or SC levels SL2, SL3 and SL4.

E.1 General System Comments

It is important to know that the embodiments illustrated herein and described herein are only examples of the many advantageous uses of the innovative teachings set forth herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality. In the drawings, like numerals refer to like parts or features throughout the several views. The section titles are not meant to limit the detailed description of the system and process described therein.

The present invention could be produced in hardware or software, or in a combination of hardware and software, and these implementations would be known to one of ordinary skill in the art. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in the art.

According to the inventive principles as disclosed in connection with the preferred embodiment, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer as would be known to one of ordinary skill in the art. The computer medium which may be used to hold or contain the computer program product, may be a fixture of the computer such as an embedded memory or may be on a transportable medium such as a disk, as would be known to one of ordinary skill in the art.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, flash memory, floppy disk, disk drive memory, CD-ROM, and other permanent storage. Additionally, a computer readable medium may include, for example, volatile storage such as RAM, buffers, cache memory, and network circuits. Furthermore, the computer readable medium may include computer readable information in a transitory state medium such as a network link and/or a network interface, including a wired network or a wireless network, that allow a computer to read such computer readable information.

In the drawings, and sometimes in the specification, reference is made to certain abbreviations. The following Abbreviations Table provides a correspondence between the abbreviations and the item or feature.

| Abbreviations Table | |
|---|---|
| A-com | computer or memory store for common or remainder data |
| ASP | application service provider - server on a network |
| B-ext | computer or memory store for extracted data |
| bd | board |
| CD-RW | compact disk drive with read/write feature for CD disk |
| CIO | Chief Information Officer or system administrator |
| comm. | communications, typically telecommunications |
| comp | computer |
| CPU | central processing unit |

| Abbreviations Table | |
|---|---|
| DB or db | data base or structured data file |
| D & R | dispersion and re-construct or re-assemble |
| Distrib | distribution or transmission of data (information) files |
| DS | data storage |
| doc | document |
| dr | drive, e.g., computer hard drive |
| e | encryption |
| ext-data | extracted data |
| F | floppy computer drive or flash drive memory |
| H-tax | hierarchical taxonomic system, a prioritized classification system |
| I/O | input/output |
| I-com | Internet storage for common or remainder data |
| id | identify |
| I-ext | Internet storage for extracted data |
| KE | knowledge expander, such as a knowledge expander search |
| loc | location |
| MLS | multilevel security |
| mem | memory |
| mod | module or software-firmware-hardware function |
| obj | object, for example, a data object |
| opt | optional |
| PC | personal computer or any other type of general computer |
| pgm | program |
| re | regarding or relating to |
| recon | reconstruct |
| rel | release |
| req | request |
| rev | review |
| SC | select content -- e.g., words, terms, images, sound that is of particular interest to the user |
| sec | security |
| sec-con | security sensitive content |
| sec. level | TS top secret, S secret, C classified, UC unclassified |
| sel | SC sensitivity level, sometimes SC sel. level |
| sel cont | select content |
| sel levels | SC levels, hierarchical taxonomic classification levels of SC |
| sch | search |
| SL | security level (sometimes S1 for sec. Level 1, S2 is Level 2, etc., also, for example, TS is Top Secret, S is Secret, C is Classified, U is Unclassified)) |
| supple | supplemental |
| supple doc | supplemental document of data object |
| sys | system |
| sys-admin | CIO or system operator |
| t | time |
| tax | taxonomic or classification system |
| tele-com | telecommunications system or network |
| unkn | unknown item or data element or data object |
| URL | Uniform Resource Locator, x pointer, or other network locator |
| W St | computer work station |

"Data," as used herein, includes any data object, e.g., text, image, icons, audio, video, still images, etc. and data is sometimes referred to herein as a "data object." A source document is either a document, any data structure, or a data stream. Since a data stream has a start bit or term and an end bit or term, the data stream is structured data, and reference to a "document" refers to any document, data structure, or data stream. Likewise a "supplemental document" is any document, data structure, or data stream. The select content (SC) is any critical or security sensitive word, character, image, or data object as pre-defined or as established by the user. The user may specifically design the filter, begin with a dictionary to define common terms, identify any additional SC words, letters, images, icons, partial versions of the foregoing or any other granular aspect of the source document.

Figure 29:
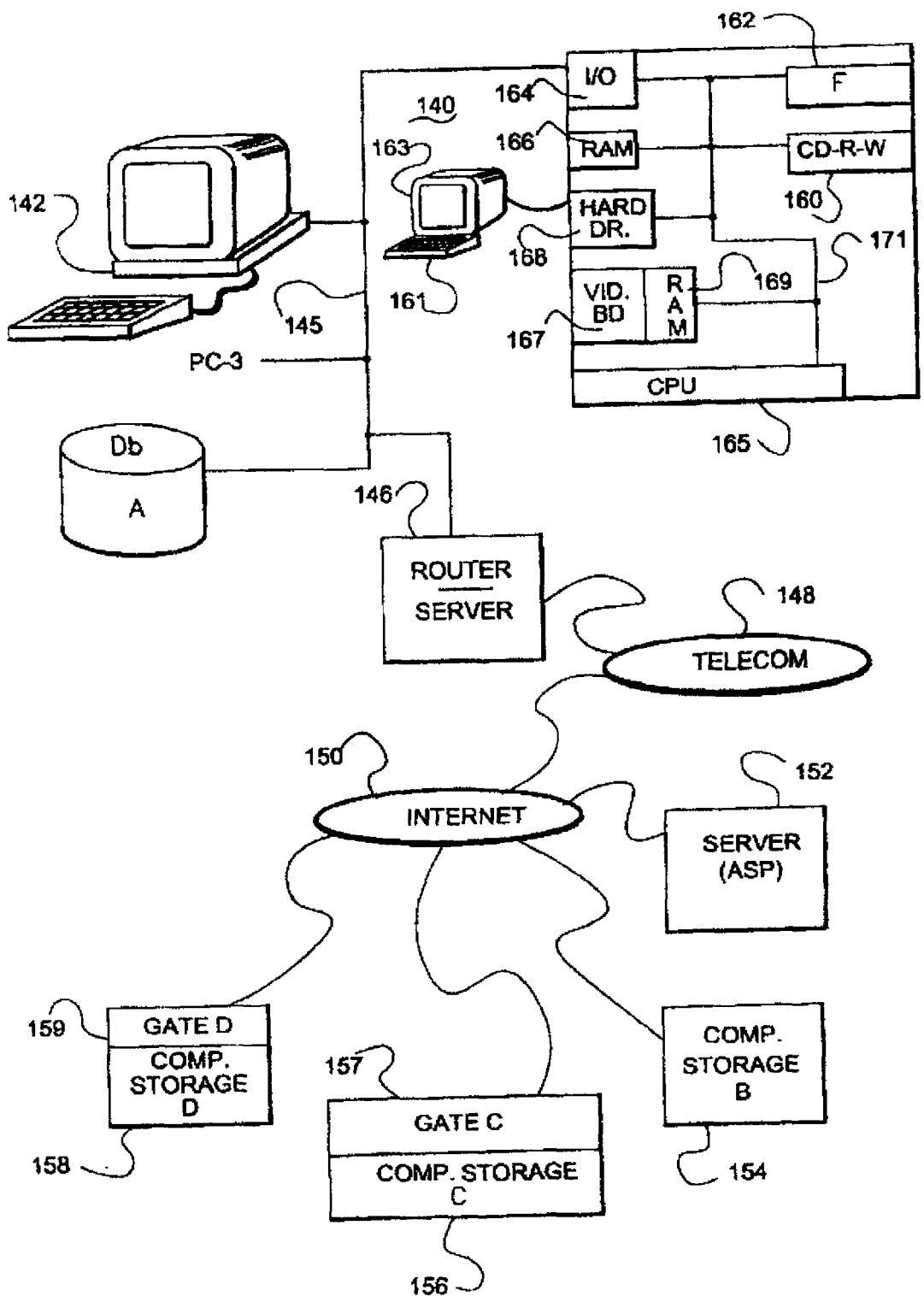
FIG. 29 diagrammatically illustrates a hardware implementation for the KE search system.

FIG. 29 diagrammatically illustrates a personal computer or PC computer system 140, a second PC or computer 142, and a third PC-3. Similar numerals designate similar items in FIGS. 29 and 6. PCs 140, 142 and PC-3 are connected together via a network 145 (LAN or WAN) and connected to one or more private databases or data structures which are represented by Db A. The LAN 145 is also connected to an input/output device 146 that may be generally described as a router or an I/O device to an outside communications system. The input/output device 146 is connected to a telecommunications system 148 which leads to Internet 150. The Internet is a global computer network. Internet 150 is coupled to a plurality of servers, one of which is server 152. Server 152 may be designated as an application service processor ASP. The ASP provides various tools to the user on computer 142 such a Google search through other data bases, indices and data structures. Internet 150 also includes various computer memory storage devices such as computer storage B 154a, computer storage C 156a accessible through Gate C 157a (via password or other control device) and computer storage D 158a accessible via Gate D 159a. Access to computer storage C and D is permitted via, in one instance, security level clearance modules or Gate C and D 157a, 159a. Maps to the computer stores C and D may require security level clearance.

Typically, PCs include a keyboard or data input device 161, a display 163, a central processing unit CPU 165, a video board 167 having video board memory 169, a fixed disc hard drive 168, a RAM 166, and input/output device 164, a removable memory F media (flash or floppy) drive 162 and a removable compact disk (CD) read-write (CD-RW) device or drive 160. The system may include other removable disk drives, tape drives, or flash memory units. Internal units CPU 165, video board 167, hard drive 168, RAM 166 input/output device 164, floppy drive 162 and CD-ROM device 160 are all coupled together via an internal bus 171. Bus 171 represents a plurality of buses as is known to persons of ordinary skill in the art.

One methodology of implementing the present invention utilizes filters on the PC or on removable memory F. The present invention may also be embodied utilizing an Application Service Provider (ASP) on server 152 and in a client-server network. The user or operator on the PC 142 calls up an ASP on system 152 and operates the KE process on the computer system 152. Filters and rules may be located with a uniform research locator or URL to find filters, data collections, target files from computer store B, C and D. In a client-server environment, server 152 acts as a server generally cooperating with data operations with client computer 140. Of course, persons of ordinary skill in the art recognize that the server may be located on the local area network 145 rather than being interconnected with Internet 150 as shown in FIG. 29. The claims appended hereto are meant to cover the alternative embodiments.

As an example of a client-server or web-based implementation of the present invention, the user at computer 140 may define the SC 2018 as described above, and input data via keyboard 161 or load source data from F drive 162 or CD-ROM drive 160 into RAM 166. Alternatively, the data stream on LAN 145 may be monitored by PC 140. In any event, whether the source data is input via keyboard 161 or copied or accessed in or from F drive 162 or CD-RW drive 160, the source data is filtered as discussed above in connection with FIGS. 11-12a. Prior to filtering, it is appropriate for the user at computer 140 to identify the hierarchical taxonomic system and the location of SC filters and My Group Profiles. Off site data storage and processes are available permitting activation of server 152 and enabling the server to take over the process directly from user 140. In other words, the user at computer 140 could call up the URL of the server 152, the server could request certain user information (user name, password), and would request data from the client computer to establish the SC filter and H-tax classes pursuant to input selected by the user. The client compute may (a) filter the source doc thereat or (b) send the data to the server for filtering. The server could store data either locally on computer 140 or remotely at computer memories 154a, 156a. Either the PC or the server could conduct the knowledge expander search and return the compiled data, supple docs, and map results to the PC.

The claims appended hereto are meant to cover modifications and changes within the scope and spirit of the present invention.

What is claimed is:

1. A method of creating data stores for an information infrastructure for processing data throughput in a distributed computing system with respective ones of a plurality of filters, comprising:

identifying sensitive content (SENC) or select content (SELC) in said data throughput with one or more of said plurality of filters, said SENC represented by one or more sensitive words, characters, images, data elements or data objects therein grouped into a plurality of sensitivity levels, said SELC represented by one or more predetermined words, characters, images, data elements or data objects;

extracting said SENC or said SELC from said data throughput;

storing said SENC or said SELC in one or more predetermined storage stores related to said SENC sensitive content or said SELC;

using said SENC or said SELC from said one or more predetermined storage stores in a search of one or more data collections within or without said distributed computing system;

gathering supplemental documents based on said search and further extracting said SENC or said SELC and storing said sensitive SENC or said SELC in said one or more predetermined storage stores related thereto; and data processing said SENC or said SELC obtained from said predetermined storage stores with one or more of a data mining process through said one or more data collections, a transfer process to other predetermined storage stores, and a presentation process to an inquiring party;

wherein said data processing is triggered by a detected event or an algorithm incorporating either a randomness or a predetermined factor related to data type, category or content; and wherein said extracting and storing results in a formless distribution of said SENC or said SELC in said one or more predetermined storage stores.

2. The method of creating data stores for an information infrastructure as claimed in claim 1 wherein said data throughput is a data document or a data stream.

3. The method of creating data stores for an information infrastructure as claimed in claim 1 wherein said data processing responds to either recognition of financial consideration or data barter or data exchange.

4. The method of creating data stores for an information infrastructure as claimed in claim 1 wherein the method of creating data stores includes:

employing at least one taxonomic classification filter to classify transfer data from the data processing step into data classifications in said taxonomic classification filter;

gathering supplemental data from said one or more data collections by searching with data classifications;

repeating extracting, storing and data processing using the supplemental data.

5. The method of creating data stores for an information infrastructure as claimed in claim 4 including creating a supplemental taxonomic classification filter based upon employing said at least one taxonomic classification filter and gathering said supplemental data.

6. The method of creating data stores for an information infrastructure as claimed in claim 1 including:
- operator selection of a respective filter from said plurality of filters by selection of an action from the group of actions including: security; privacy; compliance; archiving; replication; backup; continuity of operations; survivability; broadcasting; information sharing; and alerting.

* * * * *